(12) United States Patent
Nanba et al.

(10) Patent No.: US 12,503,527 B2
(45) Date of Patent: Dec. 23, 2025

(54) METHOD FOR PRODUCING FLUOROPOLYMER, METHOD FOR PRODUCING POLYTETRAFLUOROETHYLENE, METHOD FOR PRODUCING PERFLUOROELASTOMER, AND COMPOSITION

(71) Applicant: DAIKIN INDUSTRIES, LTD., Osaka (JP)

(72) Inventors: Yoshinori Nanba, Osaka (JP); Taketo Kato, Osaka (JP); Kenji Ichikawa, Osaka (JP); Soushi Tsuchiya, Osaka (JP); Souta Yuasa, Osaka (JP); Yosuke Kishikawa, Osaka (JP); Masahiro Higashi, Osaka (JP); Masaki Irie, Osaka (JP); Taku Yamanaka, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 768 days.

(21) Appl. No.: 17/747,685

(22) Filed: May 18, 2022

(65) Prior Publication Data

US 2022/0282008 A1 Sep. 8, 2022

Related U.S. Application Data

(63) Continuation of application No. PCT/JP2020/043295, filed on Nov. 19, 2020.

(30) Foreign Application Priority Data

Nov. 19, 2019 (JP) ................. 2019-209158

(51) Int. Cl.
*C08F 14/26* (2006.01)
*C08F 2/10* (2006.01)

(52) U.S. Cl.
CPC ............... *C08F 14/26* (2013.01); *C08F 2/10* (2013.01)

(58) Field of Classification Search
CPC .... C08F 14/26; C08F 2/10; C08F 2/26; C08F 6/003; C08F 6/22; C08F 116/14; C08F 214/26; C08F 214/262; C08F 114/26; C08F 259/08; C08K 5/0025; C08K 5/34924; C08K 5/14
See application file for complete search history.

(56) References Cited

U.S. PATENT DOCUMENTS

| | | | | |
|---|---|---|---|---|
| 5,804,650 A | * | 9/1998 | Tsuda ................ | C08F 214/22 526/248 |
| 6,150,426 A | | 11/2000 | Curtin et al. | |
| 6,552,093 B1 | | 4/2003 | Curtin et al. | |
| 11,767,379 B2 | * | 9/2023 | Nanba ................ | C08F 259/08 526/242 |
| 2003/0023015 A1 | | 1/2003 | Tatemoto et al. | |
| 2003/0176515 A1 | | 9/2003 | Curtin et al. | |
| 2005/0119357 A1 | | 6/2005 | Curtin et al. | |
| 2005/0171220 A1 | | 8/2005 | Curtin et al. | |
| 2007/0004848 A1 | | 1/2007 | Hintzer et al. | |
| 2008/0227875 A1 | | 9/2008 | Curtin et al. | |
| 2010/0160490 A1 | | 6/2010 | Leffew et al. | |
| 2010/0174003 A1 | | 7/2010 | Curtin et al. | |
| 2018/0030182 A1 | * | 2/2018 | Jochum ............... | C08F 214/222 |
| 2018/0186913 A1 | | 7/2018 | Watabe et al. | |
| 2020/0392266 A1 | * | 12/2020 | Nanba ................ | B29C 55/005 |
| 2022/0002531 A1 | | 1/2022 | Nanba et al. | |
| 2022/0010118 A1 | | 1/2022 | Nanba et al. | |

FOREIGN PATENT DOCUMENTS

| | | |
|---|---|---|
| EP | 3 885 372 A1 | 9/2021 |
| EP | 3 960 775 A1 | 3/2022 |
| JP | 2001-226436 A | 8/2001 |
| JP | 3936402 B2 | 6/2007 |
| JP | 2008-545873 A | 12/2008 |
| JP | 2012-513530 A | 6/2012 |
| WO | 2010/075494 A1 | 7/2010 |
| WO | 2017/038827 A1 | 3/2017 |
| WO | 2019/168183 A1 | 9/2019 |
| WO | 2020/105650 A1 | 5/2020 |
| WO | 2020/105651 A1 | 5/2020 |

OTHER PUBLICATIONS

International Preliminary Report on Patentability with Translation of Written Opinion dated May 17, 2022 in International Application No. PCT/JP2020/043295.
Communication dated Nov. 6, 2023 issued by the European Patent Office in application No. 20890717.0.
Indian Application No. 202137050966, filed Nov. 8, 2021, Daikin Industries, Ltd.
International Search Report PCT/JP2020/043295 dated Feb. 2, 2021.

* cited by examiner

*Primary Examiner* — Jiangtian Xu
(74) *Attorney, Agent, or Firm* — Sughrue Mion, PLLC

(57) ABSTRACT

The present disclosure provides a method for producing a fluoropolymer, the method includes polymerizing a fluoromonomer in an aqueous medium in the presence of a polymer (1) to obtain a fluoropolymer, wherein the polymer (1) is a polymer of a monomer (1) represented by the general formula (1) below, in which the content of a dimer and a trimer of the monomer (1) is 1.0% by mass or less based on the polymer (1):

$$CF_2=CF-R-CZ^1Z^1-A^0 \qquad (1)$$

wherein R is a linking group; $Z^1$ and $Z^2$ are each independently F or $CF_3$; and $A^0$ is an anionic group.

4 Claims, No Drawings

METHOD FOR PRODUCING FLUOROPOLYMER, METHOD FOR PRODUCING POLYTETRAFLUOROETHYLENE, METHOD FOR PRODUCING PERFLUOROELASTOMER, AND COMPOSITION

CROSS-REFERENCE TO RELATED APPLICATIONS

This application is a Rule 53(b) Continuation of International Application No. PCT/JP2020/043295 filed Nov. 19, 2020, which claims priority based on Japanese Patent Application No. 2019-209158 filed Nov. 19, 2019, the respective disclosures of which are incorporated herein by reference in their entirety.

TECHNICAL FIELD

The present disclosure relates to a method for producing a fluoropolymer, a method for producing a polytetrafluoroethylene, a composition comprising a polytetrafluoroethylene, a method for producing a low-molecular-weight polytetrafluoroethylene, a composition comprising a low-molecular-weight polytetrafluoroethylene, a method for producing a perfluoroelastomer, a composition comprising a perfluoroelastomer, a method for producing a partially fluorinated elastomer, and a composition comprising a partially fluorinated elastomer.

BACKGROUND ART

Patent Document 1 describes particles comprising a bulk of a fluoropolymer and a nucleus of a fluorinated ionomer.

CITATION LIST

Patent Literature

Patent Literature 1: International Publication No. WO2010/075494

SUMMARY

The present disclosure provides a method for producing a fluoropolymer, the method comprising polymerizing a fluoromonomer in an aqueous medium in the presence of a polymer (1) to obtain a fluoropolymer, wherein the polymer (1) is a polymer of a monomer (1) represented by the general formula (1) below, in which a content of a dimer and a trimer of the monomer (1) is 1.0% by mass or less based on the polymer (1):

$$CF_2=CF-R-CZ^1Z^2-A^0 \quad (1)$$

wherein R is a linking group; $Z^1$ and $Z^2$ are each independently F or $CF_3$; and $A^0$ is an anionic group.

EFFECTS

According to the present disclosure, a production method by which a fluoropolymer can be produced that is substantially free from a dimer and a trimer of a monomer constituting a polymer used in the polymerization of a fluoromonomer can be provided.

DESCRIPTION OF EMBODIMENTS

Hereinafter, specific embodiments of the present disclosure will be described in detail, but the present disclosure is not limited to the following embodiments.

Before describing the present disclosure in detail, some terms used in the present disclosure will be defined or described.

In the present disclosure, the fluororesin is a partially crystalline fluoropolymer which is a fluoroplastic. The fluororesin has a melting point and has thermoplasticity, and may be either melt-fabricable or non melt-processible.

The melt-fabricable in the present disclosure, means that a polymer has an ability to be processed in a molten state using a conventional processing device such as an extruder or an injection molding machine. Thus, a melt-fabricable fluororesin usually has a melt flow rate of 0.01 to 500 g/10 min as measured by the measurement method to be described later.

The fluoroelastomer in the present disclosure, is an amorphous fluoropolymer. The term "amorphous" means that a fluoropolymer has a melting peak (ΔH) of 4.5 J/g or lower as determined by differential scanning calorimetry (DSC) (temperature-increasing rate: 10° C./min) or differential thermal analysis (DTA) (temperature-increasing rate: 10° C./min). The fluoroelastomer exhibits elastomeric characteristics when crosslinked. The elastomeric characteristics mean that a polymer has an ability to be stretched and to retain its original length when the force required to stretch the polymer is no longer applied.

The partially fluorinated elastomer in the present disclosure, means a fluoropolymer containing a fluoromonomer unit, having a perfluoromonomer unit content of less than 90 mol % based on all polymerized units, having a glass transition temperature of 20° C. or lower, and having a melting peak (ΔH) of 4.5 J/g or lower.

The perfluoroelastomer (perfluororubber) in the present disclosure, means a fluoropolymer having a perfluoromonomer unit content of 90 mol % or more, preferably 91 mol % or more based on all polymerized units, having a glass transition temperature of 20° C. or lower, having a melting peak (ΔH) of 4.5 J/g or lower, and having a fluorine atom concentration in the fluoropolymer of 71% by mass or more, preferably 71.5% by mass or more. The fluorine atom concentration in the fluoropolymer in the present disclosure, is the concentration (% by mass) of the fluorine atoms contained in the fluoropolymer calculated based on the type and content of each monomer constituting the fluoropolymer.

The perfluoromonomer in the present disclosure, means a monomer free from a carbon-hydrogen bond in the molecule. The perfluoromonomer may be a monomer containing carbon atoms and fluorine atoms in which some of the fluorine atoms bonded to any of the carbon atoms are replaced by chlorine atoms, and may be a monomer containing a nitrogen atom, an oxygen atom, a sulfur atom, a phosphorus atom, a boron atom, or a silicon atom in addition to the carbon atoms. The perfluoromonomer is preferably a monomer in which all hydrogen atoms are replaced by fluorine atoms. The perfluoromonomer does not encompass a monomer that provides a crosslinking site.

The monomer that provides a crosslinking site is a monomer (cure-site monomer) having a crosslinkable group that provides the fluoropolymer with a crosslinking site for forming a crosslink with the curing agent.

The polytetrafluoroethylene (PTFE) in the present disclosure, is preferably a fluoropolymer having a tetrafluoroethylene content of 99 mol % or more based on all polymerized units.

The fluororesin other than polytetrafluoroethylene and the fluoroelastomer in the present disclosure, are each preferably a fluoropolymer having a tetrafluoroethylene content of less than 99 mol % based on all polymerized units.

The content of each of the monomers constituting the fluoropolymer can be calculated in the present disclosure, by any appropriate combination of NMR, FT-IR, elemental analysis, X-ray fluorescence analysis in accordance with the types of the monomers.

The term "organic group" in the present disclosure, means a group containing one or more carbon atoms or a group obtainable by removing one hydrogen atom from an organic compound.

Examples of the "organic group" include:
an alkyl group optionally having one or more substituents,
an alkenyl group optionally having one or more substituents,
an alkynyl group optionally having one or more substituents,
a cycloalkyl group optionally having one or more substituents,
a cycloalkenyl group optionally having one or more substituents,
a cycloalkadienyl group optionally having one or more substituents,
an aryl group optionally having one or more substituents,
an aralkyl group optionally having one or more substituents,
a non-aromatic heterocyclic group optionally having one or more substituents,
a heteroaryl group optionally having one or more substituents,
a cyano group,
a formyl group,
$R_aO$—,
$R_aCO$—,
$R_aSO_2$—,
$R_aCOO$—,
$R_aNR_aCO$—,
$R_aCONR_a$—,
$R_aOCO$—,
$R_aOSO_2$—, and
$R_aNR_bSO_2$—,
wherein each $R_a$ is independently
an alkyl group optionally having one or more substituents,
an alkenyl group optionally having one or more substituents,
an alkynyl group optionally having one or more substituents,
a cycloalkyl group optionally having one or more substituents,
a cycloalkenyl group optionally having one or more substituents,
a cycloalkadienyl group optionally having one or more substituents,
an aryl group optionally having one or more substituents,
an aralkyl group optionally having one or more substituents,
a non-aromatic heterocyclic group optionally having one or more substituents, or
a heteroaryl group optionally having one or more substituents, and
each $R_b$ is independently H or an alkyl group optionally having one or more substituents.

The organic group is preferably an alkyl group optionally having one or more substituents.

The term "substituent" in the present disclosure, means a group capable of replacing another atom or group. Examples of the "substituent" include an aliphatic group, an aromatic group, a heterocyclic group, an acyl group, an acyloxy group, an acylamino group, an aliphatic oxy group, an aromatic oxy group, a heterocyclic oxy group, an aliphatic oxycarbonyl group, an aromatic oxycarbonyl group, a heterocyclic oxycarbonyl group, a carbamoyl group, an aliphatic sulfonyl group, an aromatic sulfonyl group, a heterocyclic sulfonyl group, an aliphatic sulfonyloxy group, an aromatic sulfonyloxy group, a heterocyclic sulfonyloxy group, a sulfamoyl group, an aliphatic sulfonamide group, an aromatic sulfonamide group, a heterocyclic sulfonamide group, an amino group, an aliphatic amino group, an aromatic amino group, a heterocyclic amino group, an aliphatic oxycarbonylamino group, an aromatic oxycarbonylamino group, a heterocyclic oxycarbonylamino group, an aliphatic sulfinyl group, an aromatic sulfinyl group, an aliphatic thio group, an aromatic thio group, a hydroxy group, a cyano group, a sulfo group, a carboxy group, an aliphatic oxyamino group, an aromatic oxyamino group, a carbamoylamino group, a sulfamoyl amino group, a halogen atom, a sulfamoyl carbamoyl group, a carbamoyl sulfamoyl group, a dialiphatic oxyphosphinyl group, and a diaromatic oxyphosphinyl group.

The aliphatic group may be saturated or unsaturated, and may have a hydroxy group, an aliphatic oxy group, a carbamoyl group, an aliphatic oxycarbonyl group, an aliphatic thio group, an amino group, an aliphatic amino group, an acylamino group, a carbamoylamino group, or the like. Examples of the aliphatic group include alkyl groups having 1 to 8, preferably 1 to 4 carbon atoms in total, such as a methyl group, an ethyl group, a vinyl group, a cyclohexyl group, and a carbamoylmethyl group.

The aromatic group may have, for example, a nitro group, a halogen atom, an aliphatic oxy group, a carbamoyl group, an aliphatic oxycarbonyl group, an aliphatic thio group, an amino group, an aliphatic amino group, an acylamino group, a carbamoylamino group, or the like. Examples of the aromatic group include aryl groups having 6 to 12 carbon atoms, preferably 6 to 10 carbon atoms in total, such as a phenyl group, a 4-nitrophenyl group, a 4-acetylaminophenyl group, and a 4-methanesulfonylphenyl group.

The heterocyclic group may have a halogen atom, a hydroxy group, an aliphatic oxy group, a carbamoyl group, an aliphatic oxycarbonyl group, an aliphatic thio group, an amino group, an aliphatic amino group, an acylamino group, a carbamoylamino group, or the like. Examples of the heterocyclic group include 5- or 6-membered heterocyclic groups having 2 to 12, preferably 2 to 10 carbon atoms in total, such as a 2-tetrahydrofuryl group and a 2-pyrimidyl group.

The acyl group may have an aliphatic carbonyl group, an arylcarbonyl group, a heterocyclic carbonyl group, a hydroxy group, a halogen atom, an aromatic group, an aliphatic oxy group, a carbamoyl group, an aliphatic oxycarbonyl group, an aliphatic thio group, an amino group, an aliphatic amino group, an acylamino group, a carbamoylamino group, or the like. Examples of the acyl group include acyl groups having 2 to 8, preferably 2 to 4 carbon atoms in total, such as an acetyl group, a propanoyl group, a benzoyl group, and a 3-pyridinecarbonyl group.

The acylamino group may have an aliphatic group, an aromatic group, a heterocyclic group, or the like, and may have, for example, an acetylamino group, a benzoylamino group, a 2-pyridinecarbonylamino group, a propanoylamino group, or the like. Examples of the acylamino group include acylamino groups having 2 to 12, preferably 2 to 8 carbon atoms in total, and alkylcarbonylamino groups having 2 to 8 carbon atoms in total, such as an acetylamino group, a benzoylamino group, a 2-pyridinecarbonylamino group, and a propanoylamino group.

The aliphatic oxycarbonyl group may be saturated or unsaturated, and may have a hydroxy group, an aliphatic oxy group, a carbamoyl group, an aliphatic oxycarbonyl group, an aliphatic thio group, an amino group, an aliphatic amino group, an acylamino group, a carbamoylamino group, or the like. Examples of the aliphatic oxycarbonyl group include alkoxycarbonyl groups having 2 to 8, preferably 2 to 4 carbon atoms in total, such as a methoxycarbonyl group, an ethoxycarbonyl group, and a (t)-butoxycarbonyl group.

The carbamoyl group may have an aliphatic group, an aromatic group, a heterocyclic group, or the like. Examples of the carbamoyl group include an unsubstituted carbamoyl group and alkylcarbamoyl groups having 2 to 9 carbon atoms in total, preferably an unsubstituted carbamoyl group and alkylcarbamoyl groups having 2 to 5 carbon atoms in total, such as a N-methylcarbamoyl group, a N,N-dimethylcarbamoyl group, and a N-phenylcarbamoyl group.

The aliphatic sulfonyl group may be saturated or unsaturated, and may have a hydroxy group, an aromatic group, an aliphatic oxy group, a carbamoyl group, an aliphatic oxycarbonyl group, an aliphatic thio group, an amino group, an aliphatic amino group, an acylamino group, a carbamoylamino group, or the like. Examples of the aliphatic sulfonyl group include alkylsulfonyl groups having 1 to 6 carbon atoms in total, preferably 1 to 4 carbon atoms in total, such as methanesulfonyl group.

The aromatic sulfonyl group may have a hydroxy group, an aliphatic group, an aliphatic oxy group, a carbamoyl group, an aliphatic oxycarbonyl group, an aliphatic thio group, an amino group, an aliphatic amino group, an acylamino group, a carbamoylamino group, or the like. Examples of the aromatic sulfonyl group include arylsulfonyl groups having 6 to 10 carbon atoms in total, such as a benzenesulfonyl group.

The amino group may have an aliphatic group, an aromatic group, a heterocyclic group, or the like.

The acylamino group may have, for example, an acetylamino group, a benzoylamino group, a 2-pyridinecarbonylamino group, a propanoylamino group, or the like. Examples of the acylamino group include acylamino groups having 2 to 12 carbon atoms in total, preferably 2 to 8 carbon atoms in total, and more preferably alkylcarbonylamino groups having 2 to 8 carbon atoms in total, such as an acetylamino group, a benzoylamino group, a 2-pyridinecarbonylamino group, and a propanoylamino group.

The aliphatic sulfonamide group, aromatic sulfonamide group, and heterocyclic sulfonamide group may be, for example, a methanesulfonamide group, a benzenesulfonamide group, a 2-pyridinesulfonamide group, respectively.

The sulfamoyl group may have an aliphatic group, an aromatic group, a heterocyclic group, or the like. Examples of the sulfamoyl group include a sulfamoyl group, alkylsulfamoyl groups having 1 to 9 carbon atoms in total, dialkylsulfamoyl groups having 2 to 10 carbon atoms in total, arylsulfamoyl groups having 7 to 13 carbon atoms in total, and heterocyclic sulfamoyl groups having 2 to 12 carbon atoms in total, more preferably a sulfamoyl group, alkylsulfamoyl groups having 1 to 7 carbon atoms in total, dialkylsulfamoyl groups having 3 to 6 carbon atoms in total, arylsulfamoyl groups having 6 to 11 carbon atoms in total, and heterocyclic sulfamoyl groups having 2 to 10 carbon atoms in total, such as a sulfamoyl group, a methylsulfamoyl group, a N,N-dimethylsulfamoyl group, a phenylsulfamoyl group, and a 4-pyridinesulfamoyl group.

The aliphatic oxy group may be saturated or unsaturated, and may have a methoxy group, an ethoxy group, an i-propyloxy group, a cyclohexyloxy group, a methoxyethoxy group, or the like. Examples of the aliphatic oxy group include alkoxy groups having 1 to 8, preferably 1 to 6 carbon atoms in total, such as a methoxy group, an ethoxy group, an i-propyloxy group, a cyclohexyloxy group, and a methoxyethoxy group.

The aromatic amino group and the heterocyclic amino group each may have an aliphatic group, an aliphatic oxy group, a halogen atom, a carbamoyl group, a heterocyclic group ring-fused with the aryl group, and an aliphatic oxycarbonyl group, preferably an aliphatic group having 1 to 4 carbon atoms in total, an aliphatic oxy group having 1 to 4 carbon atoms in total, a halogen atom, a carbamoyl group having 1 to 4 carbon atoms in total, a nitro group, or an aliphatic oxycarbonyl group having 2 to 4 carbon atoms in total.

The aliphatic thio group may be saturated or unsaturated, and examples thereof include alkylthio groups having 1 to 8 carbon atoms in total, more preferably 1 to 6 carbon atoms in total, such as a methylthio group, an ethylthio group, a carbamoylmethylthio group, and a t-butylthio group.

The carbamoylamino group may have an aliphatic group, an aryl group, a heterocyclic group or the like. Examples of the carbamoylamino group include a carbamoylamino group, alkylcarbamoylamino groups having 2 to 9 carbon atoms in total, dialkylcarbamoylamino groups having 3 to 10 carbon atoms in total, arylcarbamoylamino groups having 7 to 13 carbon atoms in total, and heterocyclic carbamoylamino groups having 3 to 12 carbon atoms in total, preferably a carbamoylamino group, alkylcarbamoylamino groups having 2 to 7 carbon atoms in total, dialkylcarbamoylamino groups having 3 to 6 carbon atoms in total, arylcarbamoylamino groups having 7 to 11 carbon atoms in total, and heterocyclic carbamoylamino group having 3 to 10 carbon atoms in total, such as a carbamoylamino group, a methylcarbamoylamino group, a N,N-dimethylcarbamoylamino group, a phenylcarbamoylamino group, and a 4-pyridinecarbamoylamino group.

The ranges expressed by the endpoints in the present disclosure, each include all numerical values within the range (for example, the range of 1 to 10 includes 1.4, 1.9, 2.33, 5.75, 9.98, and the like).

The phrase "at least one" in the present disclosure, includes all numerical values equal to or greater than 1 (e.g., at least 2, at least 4, at least 6, at least 8, at least 10, at least 25, at least 50, at least 100, and the like).

Next, the method for producing of the present disclosure will be specifically described.

The production method of the present disclosure comprises polymerizing a fluoromonomer in an aqueous medium in the presence of a polymer (1) to obtain a fluoropolymer.

<Polymer (1)>

The polymer (1) used in the production method of the present disclosure is a polymer of a monomer (1) represented by the general formula (1) below, in which the content of a dimer and a trimer of the monomer (1) is 1.0% by mass or less based on the polymer (1):

$$CF_2=CF-R-CZ^1Z^2-A^0 \quad (1)$$

wherein R is a linking group; $Z^1$ and $Z^2$ are each independently F or $CF_3$; and $A^0$ is an anionic group.

The polymer (1) used in the production method of the present disclosure is substantially free from the dimer and trimer of the monomer (1). The dimer and trimer of the monomer (1) are usually generated when the monomer (1)

is polymerized to obtain the polymer (1). The content of the dimer and trimer in the polymer (1) is 1.0% by mass or less, preferably 0.1% by mass or less, more preferably 0.01% by mass or less, still more preferably 0.001% by mass or less, and particularly preferably 0.0001% by mass or less, based on the polymer (1).

The content of the dimer and trimer in the polymer (1) can be specified by carrying out gel permeation chromatography (GPC) analysis of the polymer (1) and calculating the proportion (area percentage) of the total area of the dimer and trimer peaks to the total area of each peak in the chromatogram obtained by the GPC analysis.

Also, when the content of the dimer and trimer in the polymer (1) is less than 0.5% by mass based on the polymer (1), it can be specified by measurement by liquid chromatography-mass spectrometry (LC/MS/MS).

Specifically, aqueous solutions having five or more different content levels of the monomer (1) are prepared, LC/MS/MS analysis is carried out on the aqueous solutions with the respective content levels, and the relationship between the content level and the area (peak integrated value) corresponding to that content level is plotted to prepare a calibration curve of the monomer (1). Furthermore, from the calibration curve of the monomer (1), a calibration curve of the dimer and trimer of the monomer (1) is prepared.

Methanol is added to the polymer (1) to prepare a mixture, the mixture is centrifuged to collect an extracted liquid (supernatant) from the mixture, and the obtained extracted liquid is subjected to LC/MS/MS analysis.

Then, using the calibration curve, the area (peak integrated value) of the chromatogram of the dimer and trimer of the monomer (1) can be converted to the content of the dimer and trimer.

By using the polymer (1) substantially free from the dimer and trimer when polymerizing the fluoromonomer in the aqueous medium, a fluoropolymer substantially free from the dimer and trimer of the monomer (1) can be produced. It has not been conventionally known that the dimer and trimer of the monomer (1), which constitute the polymer (1), are contained in the polymer (1). In the present disclosure, the presence of the dimer and trimer of the monomer (1) in the polymer (1) has been revealed for the first time, and the present disclosure provides a method for removing them for the first time.

The polymer (1) is a polymer comprising a polymerized unit (1) derived from the monomer (1). The polymer (1) used in the present disclosure is a polymer in which the dimer (polymer comprising two polymerized units (1)) and the trimer (polymer comprising three polymerized units (1)) have been substantially removed from the polymer (1) comprising two or more polymerized units (1).

The molecular weight of the monomer (1) is preferably 500 or less, and more preferably 400 or less. That is, it is preferable that the polymer (1) is substantially free from the dimer and trimer having a molecular weight of 1,500 or less, and it is more preferable that the polymer (1) is substantially free from the dimer and trimer having a molecular weight of 1,200 or less. It has not been conventionally known that the dimer and trimer of the monomer (1), which have low molecular weights, are contained in the polymer (1). In the present disclosure, the presence of the dimer and trimer of the monomer (1), which have low molecular weights, in the polymer (1) has been revealed for the first time, and the present disclosure provides a method for removing them for the first time.

Accordingly, it is preferable that the production method of the present disclosure comprises polymerizing the monomer (1) represented by the general formula (1) to obtain a crude composition containing the polymer of the monomer (1) and removing the dimer and trimer of the monomer (1) contained in the crude composition from the crude composition to obtain the polymer (1) in which the content of the dimer and trimer of the monomer (1) is 1.0% by mass or less based on the polymer (1).

Examples of the anionic group in the present disclosure, include functional groups that give anionic groups such as acid groups like —COOH and acid bases like —COONH$_4$, in addition to anionic groups such as sulfate group and carboxylate group. As the anionic group, it is preferably a sulfate group, a carboxylate group, a phosphate group, a phosphonate group, a sulfonate group, or —C(CF$_3$)$_2$OM, wherein M is —H, a metal atom, —NR$^7{}_4$, imidazolium optionally having a substituent, pyridinium optionally having a substituent, or phosphonium optionally having a substituent, and R$^7$ is H or an organic group.

In the production method of the present disclosure, as the monomer (1) represented by the general formula (1), one type of monomer or two or more types of monomers can be used.

The dimer and trimer of the monomer (1) may be a polymer formed from, among monomers (1) represented by the general formula (1), one type of monomer (1), or may be a copolymer formed from two or more types of monomers (1) with different structures.

The polymer (1) may only comprise a polymerized unit (1) derived from one type of monomer (1) represented by the general formula (1), or may comprise polymerized units (1) derived from two or more types of monomers (1) represented by the general formula (1).

In the present disclosure, the presence of the dimer and trimer of the monomer (1), which have low molecular weights, in the polymer (1) has been revealed for the first time, and the present disclosure provides a method for removing them for the first time.

R is a linking group. The term "linking group" in the present disclosure, refers to a divalent linking group. The linking group may be a single bond and preferably contains at least one carbon atom, and the number of carbon atoms may be 2 or more, 4 or more, 8 or more, 10 or more, or 20 or more. The upper limit thereof is not limited, and may be 100 or less, and may be 50 or less, for example.

The linking group may be linear or branched, cyclic or acyclic, saturated or unsaturated, substituted or unsubstituted, and optionally contains one or more heteroatoms selected from the group consisting of sulfur, oxygen, and nitrogen, and optionally contains one or more functional groups selected from the group consisting of esters, amides, sulfonamides, carbonyls, carbonates, urethanes, ureas, and carbamates. The linking group may be free from carbon atoms and may be a catenary heteroatom such as oxygen, sulfur, or nitrogen.

R is preferably a catenary heteroatom such as oxygen, sulfur, or nitrogen, or a divalent organic group.

When R is a divalent organic group, the hydrogen atom bonded to the carbon atom may be replaced by a halogen other than fluorine, such as chlorine, and may or may not contain a double bond. Further, R may be linear or branched, and may be cyclic or acyclic. R may also contain a functional group (e.g., ester, ether, ketone (keto group), amine, halide, etc.).

R may also be a fluorine-free divalent organic group or a partially fluorinated or perfluorinated divalent organic group.

R may be, for example, a hydrocarbon group in which a fluorine atom is not bonded to a carbon atom, a hydrocarbon group in which some of the hydrogen atoms bonded to a carbon atom are replaced by fluorine atoms, or a hydrocarbon group in which all of the hydrogen atoms bonded to the carbon atoms are replaced by fluorine atoms, and these groups optionally contain an oxygen atom, optionally contain a double bond, and optionally contain a functional group.

R is preferably a hydrocarbon group having 1 to 100 carbon atoms that optionally contains an ether bond, or a keto group, wherein some or all of the hydrogen atoms bonded to the carbon atoms in the hydrocarbon group may be replaced by fluorine.

R is preferably at least one selected from $-(CH_2)_a-$, $-(CF_2)_a-$, $-O-(CF_2)_a-$, $-(CF_2)_a-O-(CF_2)_b-$, $-O(CF_2)_a-O-(CF_2)_b-$, $-(CF_2)_a-[O-(CF_2)_b]_c-$, $-O(CF_2)_a-[O-(CF_2)_b]_c-$, $-[(CF_2)_a-O]_b-[(CF_2)_c-O]_d-$, $-O[(CF_2)_a-O]_b-[(CF_2)_c-O]_d-$, $-O-[CF_2CF(CF_3)O]_a-(CF_2)_b-$, $-[CF_2CF(CF_3)O]_a-$, $-[CF(CF_3)CF_2O]_a-$, $-(CF_2)_a-O-[CF(CF_3)CF_2O]_a-$, $-(CF_2)_a-O-[CF(CF_3)CF_2O]_a-(CF_2)_b-$, $-[CF_2CF(CF_3]_a-CO-(CF_2)_b-$, and combinations thereof.

In the formula, a, b, c, and d are each independently at least 1 or more. a, b, c and d may be each independently 2 or more, 3 or more, 4 or more, 10 or more, or 20 or more. The upper limits of a, b, c, and d are 100, for example.

R is more preferably at least one selected from $-O-CF_2-$, $-O-CF_2CF_2-$, $-O-CF_2CF_2CF_2-$, and $-O-CF_2CF(CF_3)-O-$.

R is preferably a divalent group represented by the general formula (r1):

  (r1)

wherein $X^6$ is each independently H, F, or $CF_3$; e is an integer of 0 to 3; f is an integer of 0 to 3; and g is 0 or 1, and is more preferably a divalent group represented by the following general formula (r2):

  (r2)

wherein $X^7$ is each independently H, F, or $CF_3$; e is an integer of 0 to 3; and g is 0 or 1.

Specific examples suitable for R include $-CF_2-O-CF_2-$, $-CF_2-O-CH_2-$, $-CF_2-O-CH_2CF_2-$, $-CF_2-O-CF_2CF_2-$, $-CF_2-O-CF_2CH_2-$, $-CF_2-O-CF_2CF_2CH_2-$, $-CF_2-O-CF(CF_3)-$, $-CF_2-O-CF(CF_3)CF_2-$, $-CF_2-O-CF(CF_3)CF_2-O-$, $-CF_2-O-CF(CF_3)CF_2-O-CF_2-$, and $-CF_2-O-CF(CF_3)CH_2-$. Of these, R is preferably a perfluoroalkylene group optionally containing an oxygen atom, and specifically, it is preferably $-CF_2-O-$, $-CF_2-O-CF_2-$, $-CF_2-O-CF_2CF_2-$, $-CF_2-O-CF(CF_3)-$, $-CF_2-O-CF(CF_3)CF_2-$, $-CF_2-O-CF(CF_3)CF_2-O-$.

$-R-CZ^1Z^2-$ in the general formula (I) is preferably one represented by the following formula (s1):

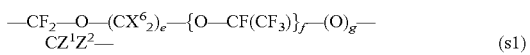  (s1)

wherein $X^6$ is each independently H, F, or $CF_3$; e is an integer of 0 to 3; f is an integer of 0 to 3; g is 0 or 1; and $Z^1$ and $Z^2$ are each independently F or $CF_3$. In the formula (s1), it is more preferable that $Z^1$ and $Z^2$ are that one thereof is F and the other is $CF_3$.

In addition, $-R-CZ^1Z^2-$ in the general formula (I) is preferably one represented by the formula (s2):

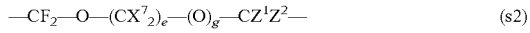  (s2)

wherein $X^7$ is each independently H, F, or $CF_3$; e is an integer of 0 to 3; g is 0 or 1; and $Z^1$ and $Z^2$ are each independently F or $CF_3$. In the formula (s2), it is more preferable that $Z^1$ and $Z^2$ are that one thereof is F and the other is $CF_3$.

$-R-CZ^1Z^2-$ in the general formula (I) is preferably $-CF_2-O-CF_2-$, $-CF_2-O-CF(CF_3)-$, $-CF_2-O-C(CF_3)_2-$, $-CF_2-O-CF_2-CF_2-$, $-CF_2-O-CF_2-CF(CF_3)-$, $-CF_2-O-CF_2-C(CF_3)_2-$, $-CF_2-O-CF_2CF_2-CF_2-$, $-CF_2-O-CF_2CF_2-CF(CF_3)-$, $-CF_2-O-CF_2CF_2-C(CF_3)_2-$, $-CF_2-O-CF(CF_3)-CF_2-$, $-CF_2-O-CF(CF_3)-CF(CF_3)-$, $-CF_2-O-CF(CF_3)-C(CF_3)_2-$, $-CF_2-O-CF(CF_3)-CF(CF_3)-$, $-CF_2-O-CF(CF_3)-C(CF_3)_2-$, $-CF_2-O-CF(CF_3)CF_2-CF(CF_3)-$, $-CF_2-O-CF(CF_3)CF_2-CF(CF_3)-$, $-CF_2-O-CF(CF_3)-C(CF_3)_2-$, $-CF_2-O-CF(CF_3)CF_2-O-CF_2-$, $-CF_2-O-CF(CF_3)CF_2-O-CF(CF_3)-$, or $-CF_2-O-CF(CF_3)CF_2-O-C(CF_3)_2-$, and it is more preferably $-CF_2-O-CF(CF_3)-$, $-CF_2-O-CF_2-CF(CF_3)-$, $-CF_2-O-CF(CF_3)-CF(CF_3)-$, $-CF_2-O-CF(CF_3)CF_2-CF(CF_3)-$, or $-CF_2O-CF(CF_3)CF_2-O-CF(CF_3)-$.

It is also preferable that the polymer (1) is highly fluorinated. For example, it is preferable that 80% or more, 90% or more, 95% or more, or 100% of the C—H bonds in the polymer (1) are replaced by C—F bonds, except for the anionic group ($A^0$) such as the phosphate group moiety (for example, $CH_2OP(O)(OM)_2$) and the sulfate group moiety (for example, $CH_2OS(O)_2OM$).

It is also preferable that the monomer (1) and the polymer (1) has C—F bonds and no C—H bonds, except for the anionic group ($A^0$). In other words, in the general formula (1), $X^1$, $X^2$, and $X^3$ are all F, and R is preferably a perfluoroalkylene group having 1 or more carbon atoms; the perfluoroalkylene group may be either linear or branched, may be either cyclic or acyclic, and may contain at least one catenary heteroatom. The perfluoroalkylene group may have 2 to 20 carbon atoms or 4 to 18 carbon atoms.

The monomer (1) and the polymer (1) may be partially fluorinated. In other words, it is also preferable that the monomer (1) and the polymer (1) has at least one hydrogen atom bonded to a carbon atom and at least one fluorine atom bonded to a carbon atom, except for the anionic group ($A^0$).

The anionic group ($A^0$) may be $-SO_3M$, $-OSO_3M$, $-COOM$, $-SO_2NR'CH_2COOM$, $-CH_2OP(O)(OM)_2$, $[-CH_2O]_2P(O)(OM)$, $-CH_2CH_2OP(O)(OM)_2$, $[-CH_2CH_2O]_2P(O)(OM)$, $-CH_2CH_2OSO_3M$, $-P(O)(OM)_2$, $-SO_2NR'CH_2CH_2OP(O)(OM)_2$, $[-SO_2NR'CH_2CH_2O]_2P(O)(OM)$, $-CH_2OSO_3M$, $-SO_2NR'CH_2CH_2OSO_3M$, or $-C(CF_3)_2OM$. Of these, it is preferably $-SO_3M$, $-OSO_3M$, $-COOM$, or $-P(O)(OM)_2$; it is more preferably $-COOM$, $-SO_3M$, $-OSO_3M$, or $-C(CF_3)_2OM$; it is still more preferably $-SO_3M$, $-COOM$, $-P(O)(OM)_2$ or $-C(CF_3)_2OM$; it is particularly preferably $-SO_3M$ or $-COOM$; and it is most preferably $-COOM$.

That is, it is preferable that the monomer (1) is a monomer (2) represented by the following general formula (2):

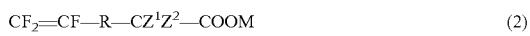  (2)

wherein R is a linking group; $Z^1$ and $Z^2$ are each independently F or $CF_3$; M is H, a metal atom, $NR^7_4$, imidazolium optionally having a substituent, pyridinium optionally having a substituent, or phosphonium optionally having a substituent; and $R^7$ is H or an organic group.

M is H, a metal atom, $NR^7_4$, imidazolium optionally having a substituent, pyridinium optionally having a substituent, or phosphonium optionally having a substituent, and $R^7$ is H or an organic group.

Examples of the metal atom include alkali metals (Group 1) and alkaline earth metals (Group 2), and preferred is Na, K, or Li.

M is preferably —H, a metal atom, or —$NR^7_4$, more preferably —H, an alkali metal (Group 1), an alkaline earth metal (Group 2), or —$NR^7_4$, still more preferably —H, —Na, —K, —Li, or —$NH_4$, further preferably —H, —Na, —K, or —$NH_4$, particularly preferably —H, —Na or —$NH_4$, and most preferably —H, or —$NH_4$.

In the dimer and trimer of the monomer (1), each polymerized unit (1) may have a different anionic group or may have the same anionic group.

In the polymer (1), each polymerized unit (1) may have a different anionic group or may have the same anionic group.

It is also preferable that the monomer (1) is a monomer represented by the general formula (1a) below.

It is also preferable that the polymer (1) is a polymer comprising a polymerized unit (1a) derived from the monomer represented by the general formula (1a):

$$CF_2=CF-O-Rf^o-A^o \quad (1a)$$

wherein $A^o$ is an anionic group; and $Rf^o$ is a perfluorinated divalent linking group which is perfluorinated and may be a linear or branched, cyclic or acyclic, saturated or unsaturated, substituted or unsubstituted, and optionally contains one or more heteroatoms selected from the group consisting of sulfur, oxygen, and nitrogen.

It is preferable that $Rf^o$ is a fluorine-containing alkylene group having 1 to 40 carbon atoms or a fluorine-containing alkylene group having 2 to 100 carbon atoms and having an ether bond. The fluorine-containing alkylene group having 2 to 100 carbon atoms and having an ether bond is an alkylene group which does not include a structure in which an oxygen atom is an end and contains an ether bond between carbon atoms.

In the general formula (1), it is preferable that $A^o$ is a sulfate group. $A^o$ is, for example, —$CH_2OSO_3M$, —$CH_2CH_2OSO_3M$, or —$SO_2NR'CH_2CH_2OSO_3M$, wherein R' is H or an alkyl group having 1 to 4 carbon atoms; and M is as described above.

Examples of the monomer represented by the general formula (1) when $A^o$ is a sulfate group include $CF_2$=CF($OCF_2CF_2CH_2OSO_3M$), $CF_2$=CF(O($CF_2)_4CH_2OSO_3M$), $CF_2$=CF($OCF_2CF(CF_3)CH_2OSO_3M$), $CF_2$=CF($OCF_2CF(CF_3)OCF_2CF_2CH_2OSO_3M$), $CF_2$=CF($OCF_2CF_2SO_2N(CH_3)CH_2CH_2OSO_3M$), and $CF_2$=CF($OCF_2CF_2CF_2CF_2SO_2N(CH_3)CH_2CH_2OSO_3M$). In the formula, M is as described above.

In the general formula (1), it is also preferable that $A^o$ is a sulfonate group. $A^o$ is, for example, —$SO_3M$, wherein M is as described above.

Examples of the monomer represented by the general formula (1) when $A^o$ is a sulfonate group include $CF_2$=CF($OCF_2CF_2SO_3M$), $CF_2$=CF(O($CF_2)_3SO_3M$), $CF_2$=CF(O($CF_2)_4SO_3M$), $CF_2$=CF($OCF_2CF(CF_3)SO_3M$), $CF_2$=CF($OCF_2CF(CF_3)OCF_2CF_2SO_3M$), and $CF_2$=CF($OCF_2CF(CF_3)OCF_2CF_2CF_2SO_3M$). In the formula, M is as described above.

In the general formula (1), it is also preferable that $A^o$ is a carboxylate group. $A^o$ is, for example, COOM or $SO_2NR'CH_2COOM$, wherein R' is H or an alkyl group having 1 to 4 carbon atoms; and M is as described above.

Examples of the monomer represented by the general formula (1) when $A^o$ is a carboxylate group include $CF_2$=CF($OCF_2CF_2COOM$), $CF_2$=CF(O($CF_2)_3COOM$), $CF_2$=CF(O($CF_2)_5COOM$), $CF_2$=CF($OCF_2CF(CF_3)COOM$), $CF_2$=CF($OCF_2CF(CF_3)O(CF_2)_nCOOM$) (n is greater than 1), $CF_2$=CF($OCF_2CF_2SO_2NR'CH_2COOM$), $CF_2$=CF(O($CF_2)_4SO_2NR'CH_2COOM$), $CF_2$=CF($OCF_2CF(CF_3)SO_2NR'CH_2COOM$), and $CF_2$=CF($OCF_2CF(CF_3)OCF_2CF_2SO_2NR'CH_2COOM$). In the formula, R' is H or an alkyl group having 1 to 4 carbon atoms, and M is as described above.

In the general formula (1), it is also preferable that $A^o$ is a phosphate group. $A^o$ is, for example, —$CH_2OP(O)(OM)_2$, [—$CH_2O]_2P(O)(OM)$, —$CH_2CH_2OP(O)(OM)_2$, [—$CH_2CH_2O]_2P(O)(OM)$, [—$SO_2NR'CH_2CH_2O]_2P(O)(OM)$, or —$SO_2NR'CH_2CH_2OP(O)(OM)_2$, wherein R' is an alkyl group having 1 to 4 carbon atoms and M is as described above.

Examples of the monomer represented by the general formula (1) when $A^o$ is a phosphate group include $CF_2$=CF($OCF_2CF_2CH_2OP(O)(OM)_2$), $CF_2$=CF(O($CF_2)_4CH_2OP(O)(OM)_2$), $CF_2$=CF($OCF_2CF(CF_3)CH_2OP(O)(OM)_2$), $CF_2$=CF($OCF_2CF(CF_3)OCF_2CF_2CH_2OP(O)(OM)_2$), $CF_2$=CF($OCF_2CF_2SO_2N(CH_3)CH_2CH_2OP(O)(OM)_2$), and $CF_2$=CF($OCF_2CF_2CF_2CF_2SO_2N(CH_3)CH_2CH_2OP(O)(OM)_2$). In the formula, M is as described above.

In the general formula (1), it is also preferable that $A^o$ is a phosphonate group. Examples of the monomer represented by the general formula (1) when $A^o$ is a phosphonate group include $CF_2$=CF($OCF_2CF_2P(O)(OM)_2$), $CF_2$=CF(O($CF_2)_4 P(O)(OM)_2$), $CF_2$=CF($OCF_2CF(CF_3)P(O)(OM)_2$), and $CF_2$=CF($OCF_2CF(CF_3)OCF_2CF_2P(O)(OM)_2$), wherein M is as described above.

It is preferable that the monomer (1) is a monomer (3) represented by the general formula (3) below.

It is preferable that the polymer (1) is a polymer (3) comprising a polymerized unit (3) derived from the monomer represented by the general formula (3):

$$CF_2=CF(-CZ_2-O-Rf-A) \quad (3)$$

wherein Z is the same or different and is —H, —F, an alkyl group, or a fluoroalkyl group; Rf is a fluorine-containing alkylene group having 1 to 40 carbon atoms or a fluorine-containing alkylene group having 2 to 100 carbon atoms and having an ether bond; and A is —COOM, —$SO_3M$, —$OSO_3M$, or —$C(CF_3)_2OM$, where M is —H, a metal atom, —$NR^7_4$, imidazolium optionally having a substituent, pyridinium optionally having a substituent, or phosphonium optionally having a substituent, where $R^7$ is H or an organic group, with the proviso that at least one of X, Y, and Z contains a fluorine atom.

In the production method of the present disclosure, the monomer (3) represented by the general formula (3) and another monomer may be copolymerized.

The polymer (3) may be a homopolymer of the fluoroallyl ether compound represented by the general formula (3) or may be a copolymer thereof with another monomer.

The fluorine-containing alkylene group having 2 to 100 carbon atoms and having an ether bond is an alkylene group which does not include a structure in which an oxygen atom is an end and contains an ether bond between carbon atoms.

In the general formula (3), Z is the same or different and is —H, —F, an alkyl group, or a fluoroalkyl group. The alkyl group is an alkyl group free from fluorine atoms and may have one or more carbon atoms. The alkyl group preferably has 6 or less carbon atoms, more preferably 4 or less carbon atoms, and still more preferably 3 or less carbon atoms. The fluorine-containing alkyl group is an alkyl group containing at least one fluorine atom, and may have one or more carbon atoms. The fluorine-containing alkyl group preferably has 6 or less carbon atoms, more preferably 4 or less carbon atoms, and still more preferably 3 or less carbon atoms. Z is preferably —H, —F, or —CF$_3$, and more preferably —F.

In the general formula (3), Rf is a fluorine-containing alkylene group having 1 to 40 carbon atoms or a fluorine-containing alkylene group having 2 to 100 carbon atoms and having an ether bond.

The fluorine-containing alkylene group preferably has 2 or more carbon atoms. The fluorine-containing alkylene group also preferably has 30 or less carbon atoms, more preferably 20 or less carbon atoms, still more preferably 10 or less carbon atoms, particularly preferably 6 or less carbon atoms, and most preferably 3 or less carbon atoms. Examples of the fluorine-containing alkylene group include —CF$_2$—, —CH$_2$CF$_2$—, —CF$_2$CF$_2$—, —CF$_2$CH$_2$—, —CF$_2$CF$_2$CF$_2$—, —CF$_2$CF$_2$CH$_2$—, —CF(CF$_3$)—, —CF(CF$_3$)CF$_2$—, and —CF(CF$_3$)CH$_2$—. The fluorine-containing alkylene group is preferably a perfluoroalkylene group, and more preferably an unbranched, linear perfluoroalkylene group.

The fluorine-containing alkylene group having an ether bond preferably has 3 or more carbon atoms. The fluorine-containing alkylene group having an ether bond preferably has 60 or less carbon atoms, more preferably 30 or less carbon atoms, and still more preferably 12 or less carbon atoms, particularly preferably 9 or less carbon atoms, and most preferably 6 or less carbon atoms. It is also preferable that the fluorine-containing alkylene group having an ether bond is a divalent group represented by the following general formula:

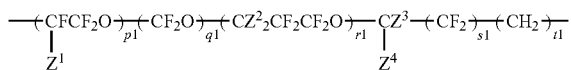

wherein $Z^1$ is F or CF$_3$; $Z^2$ and $Z^3$ are each H or F; $Z^4$ is H, F, or CF$_3$; p1+q1+r1 is an integer of 1 to 10; s1 is 0 or 1; and t1 is an integer of 0 to 5.

Specific examples of the fluorine-containing alkylene group having an ether bond include —CF(CF$_3$)CF$_2$—O—CF(CF$_3$)—, —(CF(CF$_3$)CF$_2$—O)$_n$—CF(CF$_3$)— (where n is an integer of 1 to 10), —CF(CF$_3$)CF$_2$—O—CF(CF$_3$)CH$_2$—, —(CF(CF$_3$)CF$_2$—O)$_n$—CF(CF$_3$)CH$_2$— (where n is an integer of 1 to 10), —CH$_2$CF$_2$CF$_2$O—CH$_2$CF$_2$CH$_2$—, —CF$_2$CF$_2$CF$_2$O—CF$_2$CF$_2$—, —CF$_2$CF$_2$CF$_2$O—CF$_2$CF$_2$CH$_2$—, —CF$_2$CF$_2$O—CF$_2$—, and —CF$_2$CF$_2$O—CF$_2$CH$_2$. The fluorine-containing alkylene group having an ether bond is preferably a perfluoroalkylene group.

In the general formula (3), A is —COOM, —SO$_3$M, —OSO$_3$M, or —C(CF$_3$)$_2$OM, wherein M is —H, a metal atom, —NR$^7_4$, imidazolium optionally having a substituent, pyridinium optionally having a substituent, or phosphonium optionally having a substituent, where R$^7$ is H or an organic group.

R$^7$ is preferably H or a C$_{1\text{-}10}$ organic group, more preferably H or a C$_{1\text{-}4}$ organic group, and still more preferably H or a C$_{1\text{-}4}$ alkyl group.

Examples of the metal atom include alkali metals (Group 1) and alkaline earth metals (Group 2), and preferred is Na, K, or Li.

M is preferably —H, a metal atom, or —NR$^7_4$, more preferably —H, an alkali metal (Group 1), an alkaline earth metal (Group 2), or —NR$^7_4$, still more preferably —H, —Na, —K, —Li, or —NH$_4$, further preferably —H, —Na, —K, or —NH$_4$, particularly preferably —H, —Na or —NH$_4$, and most preferably —H, or —NH$_4$.

A is preferably —COOM or —SO$_3$M, and more preferably —COOM.

Examples of the monomer represented by the general formula (1) further include a monomer represented by the following formula:

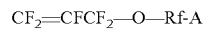

wherein Rf and A are as described above.

More specific examples thereof include:

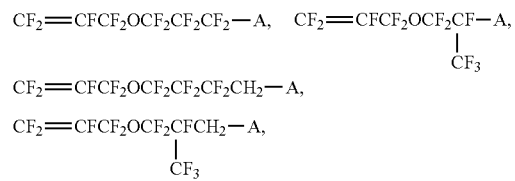

It is also preferable that the monomer (1) is a monomer (4) represented by the general formula (4) below.

It is also preferable that the polymer (1) is a polymer (4) comprising a polymerized unit (4) derived from the monomer (4) represented by the general formula (4):

  (4)

wherein Rf is a fluorine-containing alkylene group having 1 to 40 carbon atoms or a fluorine-containing alkylene group having 2 to 100 carbon atoms and having an ether bond or a keto group; and A is as described above.

In the production method of the present disclosure, the monomer (4) represented by the general formula (4) and another monomer may be copolymerized.

The polymer (4) may be a homopolymer of the monomer (4) represented by the general formula (4) or may be a copolymer thereof with another monomer.

In the general formula (4), Rf is a fluorine-containing alkylene group having 1 to 40 carbon atoms, a fluorine-containing alkylene group having 2 to 100 carbon atoms and having an ether bond, or a fluorine-containing alkylene group having 2 to 100 carbon atoms and having a keto group. The fluorine-containing alkylene group having 2 to 100 carbon atoms and having an ether bond is an alkylene group which does not include a structure in which an oxygen atom is an end and contains an ether bond between carbon atoms.

The fluorine-containing alkylene group for Rf preferably has 2 or more carbon atoms. The fluorine-containing alkylene group for Rf also preferably has 30 or less carbon atoms, more preferably 20 or less carbon atoms, and still more preferably 10 or less carbon atoms, particularly preferably 5 or less carbon atoms. Examples of the fluorine-containing alkylene group include —CF$_2$—, —CH$_2$CF$_2$—, —CF$_2$CF$_2$—, —CF$_2$CH$_2$—, —CF$_2$CF$_2$CH$_2$—, —CF(CF$_3$)—, —CF(CF$_3$)CF$_2$—, and —CF(CF$_3$)CH$_2$—, —CF$_2$CF$_2$CF$_2$—, and CF$_2$CF$_2$CF$_2$CF$_2$—. The fluorine-containing alkylene group is preferably a perfluoroalkylene group, and more preferably an unbranched, linear perfluoroalkylene group.

The fluorine-containing alkylene group having an ether bond preferably has 3 or more carbon atoms. The fluorine-containing alkylene group having an ether bond preferably has 60 or less carbon atoms, more preferably 30 or less carbon atoms, still more preferably 12 or less carbon atoms, and particularly preferably 5 or less carbon atoms. It is also preferable that the fluorine-containing alkylene group having an ether bond is, for example, a divalent group represented by the following general formula:

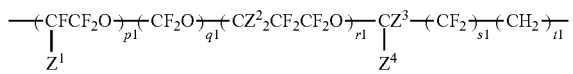

wherein $Z^1$ is F or $CF_3$; $Z^2$ and $Z^3$ are each H or F; $Z^4$ is H, F, or $CF_3$; p1+q1+r1 is an integer of 1 to 10; s1 is 0 or 1; and t1 is an integer of 0 to 5.

Specific examples of the fluorine-containing alkylene group having an ether bond include —$CF_2CF(CF_3)$ $OCF_2CF_2$—, —$CF(CF_3)CF_2$—O—$CF(CF_3)$—, —(CF $(CF_3)CF_2$—O)$_n$—$CF(CF_3)$— (where n is an integer of 1 to 10), —$CF(CF_3)CF_2$—O—$CF(CF_3)CH_2$—, —($CF(CF_3)$ $CF_2$—O)$_n$—$CF(CF_3)CH_2$— (where n is an integer of 1 to 10), —$CH_2CF_2CF_2O$—$CH_2CF_2CH_2$—, —$CF_2CF_2CF_2O$— $CF_2$—, —$CF_2CF_2CF_2O$—$CF_2CF_2$—, —$CF_2CF_2CF_2O$— $CF_2CF_2CF_2$—, —$CF_2CF_2CF_2O$—$CF_2CF_2CH_2$—, —$CF_2CF_2O$—$CF_2$—, and —$CF_2CF_2O$—$CF_2CH_2$—. The fluorine-containing alkylene group having an ether bond is preferably a perfluoroalkylene group.

The fluorine-containing alkylene group having a keto group preferably has 3 or more carbon atoms. The fluorine-containing alkylene group having a keto group preferably has 60 or less carbon atoms, more preferably 30 or less carbon atoms, still more preferably 12 or less carbon atoms, and particularly preferably 5 or less carbon atoms.

Specific examples of the fluorine-containing alkylene group having a keto group include —$CF_2CF(CF_3)CO$— $CF_2$—, —$CF_2CF(CF_3)CO$—$CF_2CF_2$—, —$CF_2CF(CF_3)$ $CO$—$CF_2CF_2CF_2$—, and —$CF_2CF(CF_3)CO$— $CF_2CF_2CF_2CF_2$—. The fluorine-containing alkylene group having a keto group is preferably a perfluoroalkylene group.

The monomer represented by the general formula (4) is preferably at least one selected from the group consisting of monomers represented by the general formulas (4a), (4b), (4c), (4d), and (4e):

$$CF_2=CF-O-(CF_2)_{n1}-A \quad (4a)$$

wherein n1 represents an integer of 1 to 10, and A is as described above;

$$CF_2=CF-O-(CF_2C(CF_3)F)_{n2}-A \quad (4b)$$

wherein n2 represents an integer of 1 to 5, and A is as defined above;

$$CF_2=CF-O-(CFX^1)_{n3}-A \quad (4c)$$

wherein $X^1$ represents F or $CF_3$, n3 represents an integer of 1 to 10, and A is as defined above;

$$CF_2=CF-O-(CF_2CFX^1O)_{n4}-(CF_2)_{n6}-A \quad (4d)$$

wherein n4 represents an integer of 1 to 10, n6 represents an integer of 1 to 3, and A and $X^1$ are as defined above; and $$CF_2=CF-O-(CF_2CF_2CFX^1O)_{n5}-CF_2CF_2CF_2-A \quad (4e)$$

wherein n5 represents an integer of 0 to 10, and A and $X^1$ are as defined above.

In the formula (4a), n1 is preferably an integer of 5 or less, and more preferably an integer of 2 or less.

Examples of the monomer represented by the formula (4a) include $CF_2=CF-O-CF_2COOM$, $CF_2=CF$ $(OCF_2CF_2COOM)$, $CF_2=CF(OCF_2CF_2SO_3M)$, and $CF_2=CF(O(CF_2)_3COOM)$, wherein M is as defined above.

In the general formula (4b), n2 is preferably an integer of 3 or less from the viewpoint of dispersion stability of the resulting composition.

In the formula (4c), n3 is preferably an integer of 5 or less from the viewpoint of water-solubility, A is preferably —COOM, and M is preferably H or $NH_4$.

In the formula (4d), $X^1$ is preferably —$CF_3$ from the viewpoint of dispersion stability of the composition, n4 is preferably an integer of 5 or less from the viewpoint of water-solubility, A is preferably —COOM, and M is preferably H or $NH_4$.

Examples of the monomer represented by the formula (4d) include $CF_2=CFOCF_2CF(CF_3)OCF_2CF_2COOM$, $CF_2=CFOCF_2CF(CF_3)OCF_2COOM$, and $CF_2=CFOCF_2CF(CF_3)OCF_2CF_2CF_2COOM$, wherein M represents H, $NH_4$, or an alkali metal.

In the general formula (4e), n5 is preferably an integer of 5 or less from the viewpoint of water-solubility, A is preferably —COOM, and M is preferably H or $NH_4$.

An example of the monomer represented by the general formula (4e) is $CF_2=CFOCF_2CF_2CF_2COOM$, wherein M represents H, $NH_4$, or an alkali metal.

It is also preferable that the monomer (1) is a monomer (5) represented by the general formula (5) below.

It is also preferable that the polymer (1) is a polymer (5) comprising a polymerized unit (5) derived from the monomer represented by the general formula (5):

$$CF_2=CF(-Rf-A) \quad (5)$$

wherein Rf is a fluorine-containing alkylene group having 1 to 40 carbon atoms or a fluorine-containing alkylene group having 2 to 100 carbon atoms and having an ether bond; and A is as described above.

In the production method of the present disclosure, the monomer (5) represented by the general formula (5) and another monomer may be copolymerized.

The polymer (5) may be a homopolymer of the monomer represented by the general formula (5) or may be a copolymer thereof with another monomer.

The fluorine-containing alkylene group having 2 to 100 carbon atoms and having an ether bond is an alkylene group which does not include a structure in which an oxygen atom is an end and contains an ether bond between carbon atoms.

In the general formula (5), Rf is preferably a fluorine-containing alkylene group having 1 to 40 carbon atoms.

The monomer represented by the general formula (5) is preferably at least one selected from the group consisting of:

a monomer represented by the general formula (5a):

$$CF_2=CF-(CF_2)_{n1}-A \quad (5a)$$

wherein n1 represents an integer of 1 to 10, and A is as defined above; and a monomer represented by the general formula (5b):

$$CF_2=CF-(CF_2C(CF_3)F)_{n2}-A \quad (5b)$$

wherein n2 represents an integer of 1 to 5, and A is as defined above.

In the general formula (5a) and the general formula (5b), A is preferably —$SO_3M$ or COOM, and M is preferably H, a metal atom, $NR^7_4$, imidazolium optionally having a substituent, pyridinium optionally having a substituent, or phosphonium optionally having a substituent. $R^7$ represents H or an organic group.

In the formula (5a), n1 is preferably an integer of 5 or less, and more preferably an integer of 2 or less. A is preferably —COOM, and M is preferably H or $NH_4$.

Examples of the monomer represented by the formula (5a) include $CF_2$=$CFCF_2COOM$, wherein M is as defined above.

In the formula (5b), n2 is preferably an integer of 3 or less from the viewpoint of dispersion stability of the resulting composition, A is preferably —COOM, and M is preferably H or $NH_4$.

The monomer (1) is preferably at least one selected from the group consisting of the monomer (3), the monomer (4), and the monomer (5), more preferably the monomer (4), and still more preferably at least one selected from the group consisting of the monomer (4a) and the monomer (4d).

The polymer (1) is preferably at least one selected from the group consisting of the polymer (3), the polymer (4), and the polymer (5), and is more preferably the polymer (4).

In the production method of the present disclosure, the monomer (1) and another monomer may be copolymerized.

The polymer (1) may be a homopolymer containing only the polymerized unit (1), or may be a copolymer of the polymerized unit (1) and a polymerized unit derived from another monomer copolymerizable with the monomer (1) represented by the general formula (1). From the viewpoint of solubility in the aqueous medium, preferred is a homopolymer containing only the polymerized unit (1). The polymerized unit (1) may be the same or different in each occurrence, and the polymer (1) may comprise polymerized units (1) derived from two or more different monomers represented by the general formula (1).

The other monomer is preferably a monomer represented by the general formula: CFR=$CR_2$ (where R is independently H, F, or a perfluoroalkyl group having 1 to 4 carbon atoms). It is also preferable that the other monomer is a fluorine-containing ethylenic monomer having 2 or 3 carbon atoms. Examples of the other monomer include $CF_2$=$CF_2$, $CF_2$=CFCl, $CH_2$=$CF_2$, CFH=$CH_2$, CFH=$CF_2$, $CF_2$=$CFCF_3$, $CH_2$=$CFCF_3$, $CH_2$=$CHCF_3$, CHF=$CHCF_3$ (E isomer), and CHF=$CHCF_3$ (Z isomer).

Of these, preferred is at least one selected from the group consisting of tetrafluoroethylene ($CF_2$=$CF_2$), chlorotrifluoroethylene ($CF_2$=CFCl), and vinylidene fluoride ($CH_2$=$CF_2$) from the viewpoint of achieving good copolymerizability, and more preferred is tetrafluoroethylene. Accordingly, it is preferable that the polymerized unit derived from the other monomer is a polymerized unit derived from tetrafluoroethylene. The polymerized unit derived from the other monomer may be the same or different in each occurrence, and the polymer (1) may comprise polymerized units derived from two or more different other monomers.

Examples of the other monomer further include a monomer represented by the formula (n1-2):

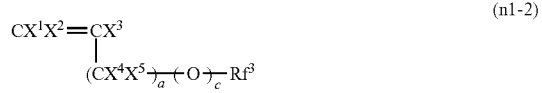

(n1-2)

wherein $X^1$ and $X^2$ are the same or different and are each H or F; $X^3$ is H, F, Cl, $CH_3$, or $CF_3$; $X^4$ and $X^5$ are the same or different and are each H or F; and a and c are the same or different and are each 0 or 1; $Rf^3$ is a fluorine-containing alkyl group having 1 to 40 carbon atoms or a fluorine-containing alkyl group having 2 to 100 carbon atoms and having an ether bond.

Specifically, preferred examples thereof include $CH_2$=$CFCF_2$—O—$Rf^3$, $CF_2$=CF—O—$Rf^3$, $CF_2$=$CFCF_2$—O—$Rf^3$, $CF_2$=CF—$Rf^3$, $CH_2$=CH—$Rf^3$, and $CH_2$=CH—O—$Rf^3$ (wherein $Rf^3$ is as described in the above formula (n1-2)).

Another example of the other monomer is a fluorine-containing acrylate monomer represented by the formula (n2-1):

(n2-1)

wherein $X^9$ is H, F, or $CH_3$; and $Rf^4$ is a fluorine-containing alkyl group having 1 to 40 carbon atoms or a fluorine-containing alkyl group having 2 to 100 carbon atoms and having an ether bond. Examples of $Rf^4$ group include:

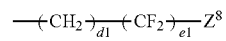

wherein $Z^8$ is H, F or Cl; d1 is an integer of 1 to 4; and e1 is an integer of 1 to 10;

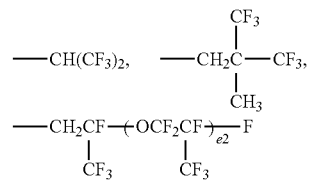

wherein e2 is an integer of 1 to 5; and

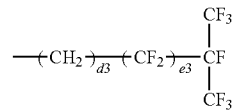

wherein d3 is an integer of 1 to 4, and e3 is an integer of 1 to 10.

Another example of the other monomer is a fluorine-containing vinyl ether represented by the formula (n2-2):

(n2-2)

wherein $Rf^5$ is a fluorine-containing alkyl group having 1 to 40 carbon atoms or a fluorine-containing alkyl group having 2 to 100 carbon atoms and having an ether bond.

Specific preferred examples of the monomer of the general formula (n2-2) include:

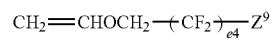

wherein $Z^9$ is H or F; and e4 is an integer of 1 to 10;

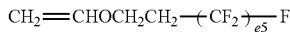

wherein e5 is an integer of 1 to 10; and

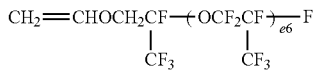

wherein e6 is an integer of 1 to 10.
More specific examples thereof include:

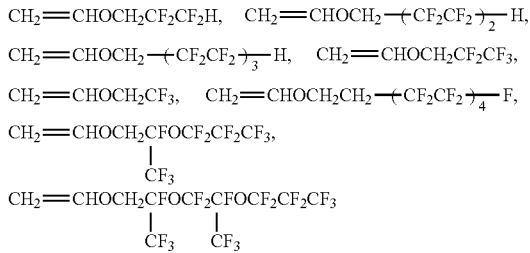

Additional examples of the other monomer include a fluorine-containing allyl ether represented by the general formula (n2-3):

  (n2-3)

wherein $Rf^6$ is a fluorine-containing alkyl group having 1 to 40 carbon atoms or a fluorine-containing alkyl group having 2 to 100 carbon atoms and having an ether bond, and a fluorine-containing vinyl monomer represented by the general formula (n2-4):

  (n2-4)

wherein $Rf^7$ is a fluorine-containing alkyl group having 1 to 40 carbon atoms or a fluorine-containing alkyl group having 2 to 100 carbon atoms and having an ether bond.

Specific examples of the monomers represented by the general formulas (n2-3) and (n2-4) include:

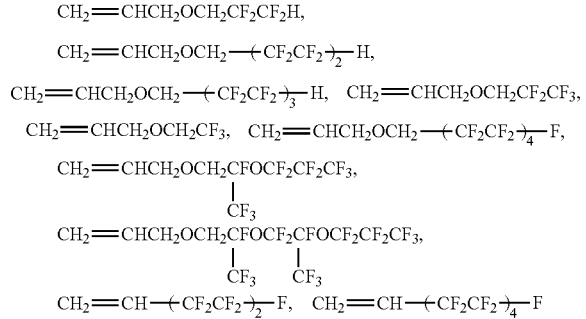

The polymer (1) normally has an end group. The end group is an end group produced during polymerization, and a representative end group is independently selected from hydrogen, iodine, bromine, linear or branched alkyl groups, and linear or branched fluoroalkyl groups, and may optionally contain at least one catenary heteroatom. It is preferable that the alkyl group or fluoroalkyl group has 1 to 20 carbon atoms. These end groups are generally produced from the initiator or chain transfer agent used to form the polymer (1), or produced during the chain transfer reaction.

In the polymer (1), the content of the polymerized unit (1) is in the preferred order, 1.0 mol % or more, 3.0 mol % or more, 5.0 mol % or more, 10 mol % or more, 20 mol % or more, 30 mol % or more, 40 mol % or more, 50 mol % or more, based on all polymerized units. It is particularly preferable that the content of the polymerized unit (1) is substantially 100 mol %, and it is most preferable that the polymer (1) contains only the polymerized unit (1).

In the polymer (1), the content of the polymerized unit derived from the other monomer copolymerizable with the monomer represented by the general formula (1) is, in the preferred order, 99.0 mol % or less, 97.0 mol % or less, 95.0 mol % or less, 90 mol % or less, 80 mol % or less, 70 mol % or less, 60 mol % or less, 50 mol % or less, 40 mol % or less, 30 mol % or less, 20 mol % or less, or 10 mol % or less, based on all polymerized units. It is particularly preferable that the content of the polymerized unit derived from the other monomer copolymerizable with the monomer represented by the general formula (1) is substantially 0 mol %, and it is most preferable that the polymer (1) contains no polymerized unit derived from the other monomer.

The number average molecular weight of the polymer (1) is preferably $0.1 \times 10^4$ or more, more preferably $0.2 \times 10^4$ or more, still more preferably $0.3 \times 10^4$ or more, further preferably $0.4 \times 10^4$ or more, still further preferably $0.5 \times 10^4$ or more, particularly preferably $1.0 \times 10^4$ or more, even further preferably $3.0 \times 10^4$ or more, and most preferably $3.1 \times 10^4$ or more. The number average molecular weight thereof is also preferably $75.0 \times 10^4$ or less, more preferably $50.0 \times 10^4$ or less, still more preferably $40.0 \times 10^4$ or less, still further preferably $30.0 \times 10^4$ or less, and particularly preferably $20.0 \times 10^4$ or less. The number average molecular weight and the weight average molecular weight are values calculated by gel permeation chromatography (GPC) using monodisperse polystyrene as a standard. Also, in the case where measurement by GPC is not possible, the number average molecular weight of the polymer (1) can be determined by the correlation between the number average molecular weight calculated from the number of end groups obtained by NMR, FT-IR, or the like and the melt flow rate. The melt flow rate can be measured in accordance with JIS K 7210.

The lower limit of the weight average molecular weight of the polymer (1) is, in the preferred order, $0.2 \times 10^4$ or more, $0.4 \times 10^4$ or more, $0.6 \times 10^4$ or more, $0.8 \times 10^4$ or more, $1.0 \times 10^4$ or more, $2.0 \times 10^4$ or more, $5.0 \times 10^4$ or more, $10.0 \times 10^4$ or more, $15.0 \times 10^4$ or more, $20.0 \times 10^4$ or more, or $25.0 \times 10^4$ or more. The upper limit of the weight average molecular weight of the polymer (1) is, in the preferred order, $150.0 \times 10^4$ or less, $100.0 \times 10^4$ or less, $60.0 \times 10^4$ or less, $50.0 \times 10^4$ or less, or $40.0 \times 10^4$ or less.

It is preferable that the polymer (1) has an ion exchange rate (IXR) of 53 or less. The IXR is defined as the number of carbon atoms in the polymer main chain relative to the ionic groups. Precursor groups that become ionic by hydrolysis (for example, $-SO_2F$) are not considered to be ionic groups, for the purpose of determining the IXR.

The IXR is preferably 0.5 or more, more preferably 1 or more, still more preferably 3 or more, further preferably 4 or more, still further preferably 5 or more, and particularly preferably 8 or more. The IXR is also more preferably 43 or less, still more preferably 33 or less, and particularly preferably 23 or less.

The ion exchange capacity of the polymer (1) is, in the preferred order, 0.80 meq/g or more, 1.50 meq/g or more, 1.75 meq/g or more, 2.00 meq/g or more, 2.50 meq/g or more, 2.60 meq/g or more, 3.00 meq/g or more, or 3.50 meq/g or more. The ion exchange capacity is the content of ionic groups (anionic groups) in the polymer (1) and can be determined by calculation from the compositional features of the polymer (1).

In the polymer (1), the ionic groups (anionic groups) are typically distributed along the polymer main chain. The polymer (1) comprises the polymer main chain together with repeating side chains bonded to this main chain, and these side chains preferably have ionic groups.

The polymer (1) preferably comprises ionic groups having a pKa of less than 10, more preferably less than 7. The ionic groups of the polymer (1) are preferably selected from the group consisting of sulfonate, carboxylate, phosphonate, and phosphate.

The term "sulfonate, carboxylate, phosphonate, and phosphate" is intended to refer to the respective salts or the respective acids that can form the salts. When a salt is used, that salt is preferably an alkali metal salt or an ammonium salt. The preferred ionic group is a sulfonate group.

It is preferable that the polymer (1) has water-solubility. The term "water-solubility" refers to the property of being easily dissolved or dispersed in an aqueous medium. When the polymer (1) has water-solubility, the particle size thereof cannot be measured by, for example, dynamic light scattering (DLS). On the other hand, when the polymer (1) has water-insolubility, the particle size thereof can be measured by, for example, dynamic light scattering (DLS).

As the polymer (1), a polymer (11) of a monomer (11) represented by the general formula (11) below, in which the content of a polymerized unit (11) derived from the monomer (11) is 50 mol % or more based on all polymerized units constituting the polymer (11), and the weight average molecular weight (Mw) is $38.0\times10^4$ or more can also be used. The polymer (11) is a novel polymer.

General Formula (11):  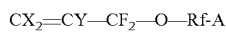

wherein X and Y are each independently H, F, $CH_3$, or $CF_3$, and at least one of X and Y is F; Rf is a fluorine-containing alkylene group having 1 to 40 carbon atoms or a fluorine-containing alkylene group having 2 to 100 carbon atoms and having an ether bond; and A is —COOM, —$SO_3M$, —$OSO_3M$, or —$C(CF_3)_2OM$, where M is H, a metal atom, $NR^7_4$, imidazolium optionally having a substituent, pyridinium optionally having a substituent, or phosphonium optionally having a substituent, and $R^7$ is H or an organic group.

In the general formula (11), X and Y are each independently H, F, $CH_3$, or $CF_3$, and at least one of X and Y is F. X is preferably H or F, and more preferably H. Y is preferably H or F, and more preferably F.

Rf and A in the general formula (11) are the same as Rf and A in the general formula (3), which represents the monomer constituting the polymer (3).

The polymer (11) may be a homopolymer containing only the polymerized unit (11) derived from the monomer (11), or may be a copolymer of the polymerized unit (11) and a polymerized unit derived from another monomer copolymerizable with the monomer (11). The other monomer is as mentioned above. The polymerized unit (11) may be the same or different in each occurrence, and the polymer (11) may comprise polymerized units (11) derived from two or more different monomers represented by the general formula (11).

The content of the polymerized unit (11) in the polymer (11) is, in the preferred order, 50 mol % or more, 60 mol % or more, 70 mol % or more, 80 mol % or more, 90 mol % or more, or 99 mol % or more, based on all polymerized units constituting the polymer (11). It is particularly preferable that the content of the polymerized unit (11) is substantially 100 mol %, and it is most preferable that the polymer (11) contains only the polymerized unit (11).

In the polymer (11), the content of the polymerized unit derived from the other monomer copolymerizable with the monomer (11) is, in the preferred order, 99.0 mol % or less, 97.0 mol % or less, 95.0 mol % or less, 90 mol % or less, 80 mol % or less, 70 mol % or less, 60 mol % or less, or 50 mol % or less, based on all polymerized units constituting the polymer (11). It is particularly preferable that the content of the polymerized unit derived from the other monomer copolymerizable with the monomer (11) is substantially 0 mol %, and it is most preferable that the polymer (11) contains no polymerized unit derived from the other monomer.

The lower limit of the weight average molecular weight of the polymer (11) is, in the preferred order, $38.0\times10^4$ or more or $40.0\times10^4$ or more. The upper limit of the weight average molecular weight of the polymer (11) is, in the preferred order, $150.0\times10^4$ or less, $100.0\times10^4$ or less, or $60.0\times10^4$ or less.

The lower limit of the number average molecular weight of the polymer (11) is, in the preferred order, $5.0\times10^4$, $8.0\times10^4$, $10.0\times10^4$ or more, or $12.0\times10^4$ or more. The upper limit of the number average molecular weight of the polymer (11) is, in the preferred order, $75.0\times10^4$ or less, $50.0\times10^4$ or less, $40.0\times10^4$ or less, or $30.0\times10^4$ or less.

As the polymer (1), a polymer (12) of a monomer (12) represented by the general formula (12) below, in which the content of a polymerized unit (12) derived from the monomer (12) is 50 mol % or more based on all polymerized units constituting the polymer (12), and the weight average molecular weight (Mw) is $1.4\times10^4$ or more can also be used. The polymer (12) is a novel polymer.

General Formula (12):  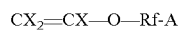

wherein X is independently F or $CF_3$, and Rf is a fluorine-containing alkylene group having 1 to 40 carbon atoms or a fluorine-containing alkylene group having 2 to 100 carbon atoms and having an ether bond or a keto group; and A is —COOM, —$SO_3M$, —$OSO_3M$, or —$C(CF_3)_2OM$, where M is —H, a metal atom, —$NR^7_4$, imidazolium optionally having a substituent, pyridinium optionally having a substituent, or phosphonium optionally having a substituent, and $R^7$ is H or an organic group.

In the general formula (12), X is independently F or $CF_3$. It is preferable that at least one or more X are F, and it is more preferable that all X are F.

Rf and A in the general formula (12) are the same as Rf and A in the general formula (4), which represents the monomer constituting the polymer (4).

The polymer (12) may be a homopolymer containing only the polymerized unit (12) derived from the monomer (12), or may be a copolymer of the polymerized unit (12) and a polymerized unit derived from another monomer copolymerizable with the monomer (12). The other monomer is as mentioned above. The polymerized unit (12) may be the same or different in each occurrence, and the polymer (12) may comprise polymerized units (12) derived from two or more different monomers represented by the general formula (12).

The content of the polymerized unit (12) in the polymer (12) is, in the preferred order, 50 mol % or more, 60 mol % or more, 70 mol % or more, 80 mol % or more, 90 mol % or more, or 99 mol % or more, based on all polymerized units constituting the polymer (12). It is particularly preferable that the content of the polymerized unit (12) is substantially 100 mol %, and it is most preferable that the polymer (12) contains only the polymerized unit (12).

In the polymer (12), the content of the polymerized unit derived from the other monomer copolymerizable with the monomer (12) is, in the preferred order, 50 mol % or less, 40 mol % or less, 30 mol % or less, 20 mol % or less, 10 mol % or less, or 1 mol % or less, based on all polymerized units constituting the polymer (12). It is particularly preferable that the content of the polymerized unit derived from the other monomer copolymerizable with the monomer (12) is substantially 0 mol %, and it is most preferable that the polymer (12) contains no polymerized unit derived from the other monomer.

The lower limit of the weight average molecular weight (Mw) of the polymer (12) is, in the preferred order, $1.4 \times 10^4$ or more, $1.7 \times 10^4$ or more, $1.9 \times 10^4$ or more, $2.1 \times 10^4$ or more, $2.3 \times 10^4$ or more, $2.7 \times 10^4$ or more, $3.1 \times 10^4$ or more, $3.5 \times 10^4$ or more, $3.9 \times 10^4$ or more, $4.3 \times 10^4$ or more, $4.7 \times 10^4$ or more, or $5.1 \times 10^4$ or more. The upper limit of the weight average molecular weight (Mw) of the polymer (12) is, in the preferred order, $150.0 \times 10^4$ or less, $100.0 \times 10^4$ or less, $60.0 \times 10^4$ or less, $50.0 \times 10^4$ or less, or $40.0 \times 10^4$ or less.

The lower limit of the number average molecular weight (Mn) of the polymer (12) is, in the preferred order, $0.7 \times 10^4$ or more, $0.9 \times 10^4$ or more, $1.0 \times 10^4$ or more, $1.2 \times 10^4$ or more, $1.4 \times 10^4$ or more, $1.6 \times 10^4$ or more, or $1.8 \times 10^4$ or more. The upper limit of the number average molecular weight (Mn) of the polymer (12) is, in the preferred order, $75.0 \times 10^4$ or less, $50.0 \times 10^4$ or less, $40.0 \times 10^4$ or less, $30.0 \times 10^4$ or less, or $20.0 \times 10^4$ or less.

The molecular weight distribution (Mw/Mn) of the polymer (12) is preferably 3.0 or less, more preferably 2.4 or less, still more preferably 2.2 or less, particularly preferably 2.0 or less, and most preferably 1.9 or less.

It is preferable that the production method of the present disclosure comprises polymerizing the monomer (1) represented by the general formula (1) to obtain a crude composition containing the polymer of the monomer (1) and removing the dimer and trimer of the monomer (1) contained in the crude composition from the crude composition to obtain the polymer (1) in which the content of the dimer and trimer of the monomer (1) is 1.0% by mass or less based on the polymer (1).

The polymerization of the monomer (1) can be carried out by a known method. By producing the crude composition by such a method, a crude composition in which the polymer (1) is dispersed or dissolved in the aqueous medium can be obtained.

Among the polymer (1), the polymer (11) is a novel polymer, and it can be produced by a method (11) for producing the polymer (11), the method comprising polymerizing the monomer (11) represented by the general formula (11) in an aqueous medium to produce the polymer (11) of the monomer (11), wherein the oxygen concentration in the polymerization reaction system is maintained at 500 ppm by volume or less.

In the production method (11), the oxygen concentration in the polymerization reaction system is 500 ppm by volume or less. In the production method (11), the oxygen concentration in the reaction system is maintained at 500 ppm by volume or less over the entire period of polymerization of the monomer (11). The oxygen concentration in the reaction system is preferably 350 ppm by volume or less, more preferably 300 ppm by volume or less, still more preferably 100 ppm by volume or less, and particularly preferably 50 ppm by volume or less. The oxygen concentration in the reaction system is usually 0.01 ppm by volume or more.

In the production method (11), since a polymer (11) having an even higher molecular weight can be easily produced, the polymerization temperature of the monomer (11) is preferably 59° C. or lower, more preferably 57° C. or lower, still more preferably 55° C. or lower, and particularly preferably 53° C. or lower, and it is preferably 20° C. or higher, preferably 20° C. or higher, more preferably 25° C. or higher, still more preferably 30° C. or higher, and particularly preferably 35° C. or higher.

In the production method (11), the monomer (11) and the above-mentioned other monomer may be copolymerized.

In the production method (11), the polymerization pressure is usually at the atmospheric pressure to 10 MPa·G. The polymerization pressure is determined as appropriate in accordance with the types of the monomers used, the molecular weight of the target polymer, and the reaction rate.

In the production method (11), the polymerization time is usually 1 to 200 hours, and it may be 5 to 100 hours.

Among the polymer (1), the polymer (12) is a novel polymer, and it can be produced by a method (12) for producing the polymer (12), the method comprising polymerizing the monomer (12) represented by the general formula (12) in an aqueous medium to produce the polymer (12) of the monomer (12), wherein the oxygen concentration in the polymerization reaction system is maintained at 1,500 ppm by volume or less.

In the production method (12), the oxygen concentration in the polymerization reaction system is 1,500 ppm by volume or less. In the production method (12), the oxygen concentration in the reaction system is maintained at 1,500 ppm by volume or less over the entire period of polymerization of the monomer (12). The oxygen concentration in the reaction system is preferably 500 ppm by volume or less, more preferably 100 ppm by volume or less, and still more preferably 50 ppm by volume or less. The oxygen concentration in the reaction system is usually 0.01 ppm by volume or more.

In the production method (12), since a polymer (12) having an even higher molecular weight can be easily produced, the polymerization temperature of the monomer (12) is preferably 70° C. or lower, more preferably 65° C. or lower, still more preferably 60° C. or lower, particularly preferably 55° C. or lower, still further preferably 50° C. or lower, particularly preferably 45° C. or lower, and most preferably 40° C. or lower, and it is preferably 10° C. or higher, more preferably 15° C. or higher, and still more preferably 20° C. or higher.

In the production method (12), the monomer (12) and the above-mentioned other monomer may be copolymerized.

In the production method (12), the polymerization pressure is usually at the atmospheric pressure to 10 MPa·G. The polymerization pressure is determined as appropriate in accordance with the types of the monomers used, the molecular weight of the target polymer, and the reaction rate.

In the production method (12), the polymerization time is usually 1 to 200 hours, and it may be 5 to 100 hours.

In the production method (11) and the production method (12), the oxygen concentration in the polymerization reaction system can be controlled by, for example, circulating an inert gas such as nitrogen or argon, or, in the case of using a gaseous monomer, that gaseous monomer in the liquid phase or gas phase in the reactor. The oxygen concentration in the polymerization reaction system can be determined by measuring and analyzing the gas that has come out of the discharge gas line of the polymerization system with a low concentration oxygen analyzer.

In the production method (11) and the production method (12), the aqueous medium is a reaction medium in which the polymerization is performed, and means a liquid containing water. The aqueous medium may be any medium containing water, and it may be one containing water and, for example, any of fluorine-free organic solvents such as alcohols, ethers, and ketones, and/or fluorine-containing organic solvents having a boiling point of 40° C. or lower. The aqueous medium is preferably water.

In the production method (11) and the production method (12), the polymerization of the monomer can be carried out in the presence of a polymerization initiator. The polymerization initiator may be any polymerization initiator capable of generating radicals within the polymerization temperature range, and known oil-soluble and/or water-soluble polymerization initiators may be used. The polymerization initiator may be combined with a reducing agent, for example, to form a redox agent, which initiates the polymerization. The concentration of the polymerization initiator is determined as appropriate in accordance with the types of the monomers, the molecular weight of the target polymer, and the reaction rate.

The polymerization initiator used may be an organic peroxide such as a persulfate (e.g., ammonium persulfate), disuccinic acid peroxide, or diglutaric acid peroxide alone or in the form of a mixture thereof. An organic peroxide may also be used together with a reducing agent, such as sodium sulfite, to form a redox system. During the polymerization, a radical scavenger such as hydroquinone or catechol may be added, or a decomposer of the peroxide such as ammonium sulfite may be added, to adjust the radical concentration in the system.

Among the polymerization initiators, persulfates are preferable since a polymer having an even higher molecular weight can be easily produced. Examples of the persulfates include ammonium persulfate, potassium persulfate, and sodium persulfate, and ammonium persulfate is preferable.

The polymerization initiator may be added in any amount, and the polymerization initiator in an amount that does not significantly decrease the polymerization rate (e.g., concentration of several ppm in water) or more may be added at once in the initial stage of polymerization, or may be added successively or continuously. The upper limit thereof falls within a range where the reaction temperature is allowed to be increased while the polymerization reaction heat is removed through the device surfaces. The upper limit thereof is more preferably within a range where the polymerization reaction heat can be removed through the device surfaces.

In the production method (11) and the production method (12), the polymerization initiator can be added at the initiation of polymerization and can also be added during polymerization. The proportion between the amount of polymerization initiator added at the initiation of polymerization and the amount of polymerization initiator added during polymerization is preferably 95/5 to 5/95, more preferably 60/40 to 10/90, and still more preferably 30/70 to 15/85. The method for adding the polymerization initiator during polymerization is not limited, and it may be added in the entire amount at once, may be added in two or more portions, or may be added continuously.

In the production method (11) and the production method (12), since a polymer having an even higher molecular weight can be easily produced, the polymerization initiator used for polymerization is preferably added in a total amount of 0.00001 to 10% by mass based on the aqueous medium. The polymerization initiator used for polymerization is added in a total amount of preferably 0.0001% by mass or more, more preferably 0.0001% by mass or more, still more preferably 0.001% by mass or more, and particularly preferably 0.01% by mass or more, and more preferably 5% by mass or less, and still more preferably 2% by mass or less.

In the production method (11) and the production method (12), since a polymer having an even higher molecular weight can be easily produced, the polymerization initiator used for polymerization is preferably added in a total amount of 0.001 to 10 mol % based on the monomer. The polymerization initiator used for polymerization is added in a total amount of more preferably 0.005 mol % or more, and still more preferably 0.01 mol % or more, and more preferably 5 mol % or less, still more preferably 2.5 mol % or less, particularly preferably 2.2 mol % or less, and most preferably 2.0 mol % or less.

In the production method (11) and the production method (12), since a monomer having an even higher molecular weight can be easily produced, it is preferable that the amount of monomer containing the monomer (11) or monomer (12) present at the initiation of polymerization is 30% by mass or more based on the amount of aqueous medium present. The amount of monomer present is more preferably 35% by mass or more, and still more preferably 40% by mass or more. The upper limit of the amount of monomer present is not limited, and from the viewpoint of smoothly proceeding the polymerization, it may be 200% by mass or less. The amount of monomer present at the initiation of polymerization is the total amount of the monomer (11) or monomer (12), and the other monomer, if present, present in the reactor at the initiation of polymerization.

In the production method (11) and the production method (12), the polymerization may be carried out in the presence of a pH adjuster. The pH adjuster may be added before the initiation of polymerization or may be added after the initiation of polymerization.

As the pH adjuster, ammonia, sodium hydroxide, potassium hydroxide, sodium carbonate, potassium carbonate, ammonium carbonate, sodium bicarbonate, potassium bicarbonate, ammonium bicarbonate, sodium phosphate, potassium phosphate, sodium citrate, potassium citrate, ammonium citrate, sodium gluconate, potassium gluconate, ammonium gluconate, or the like can be used.

In the production method (11) and the production method (12), the polymerization of the monomer (11) or monomer (12) can be performed by; charging a reactor with the aqueous medium, the monomer (11) or monomer (12), and optionally the other monomer, and optionally other additives; stirring the contents of the reactor; maintaining the reactor at a predetermined polymerization temperature; and then adding a predetermined amount of a polymerization initiator to thereby initiate the polymerization reaction. After the initiation of the polymerization reaction, the monomers, the polymerization initiator, and the other additives may be added depending on the purpose.

It is preferable that the polymerization of the monomer (1) is carried out in the aqueous medium substantially in the absence of a fluorine-containing surfactant (except for the monomer (1) represented by the general formula (1)).

In the present disclosure, the expression "substantially in the absence of a fluorine-containing surfactant" means that the amount of the fluorine-containing surfactant is 10 ppm by mass or less based on the aqueous medium. The amount of the fluorine-containing surfactant based on the aqueous medium is preferably 1 ppm by mass or less, more preferably 100 ppb by mass or less, still more preferably 10 ppb by mass or less, and further preferably 1 ppb by mass or less.

The fluorine-containing surfactant will be mentioned later in the description on the polymerization of fluoromonomer.

In the crude composition thus obtained, as the polymer of the monomer (1), the dimer and trimer are usually contained in a total amount of greater than 1.0% by mass based on the mass of the polymer of the monomer (1). For example, the content of the dimer and trimer in the polymer of the monomer (1) may be 2.0% by mass or more or 3.0% by mass or more, and may be 30.0% by mass or less or 20.0% by mass or less, based on the polymer of the monomer (1). The content of the dimer and trimer in the crude composition can be specified by carrying out gel permeation chromatography (GPC) analysis of the crude composition and calculating the proportion (area percentage) of the total area of the dimer and trimer peaks to the total area of each peak in the chromatogram obtained by the GPC analysis.

Next, the dimer and trimer of the monomer (1) contained in the crude composition obtained by the polymerization of the monomer (1) are removed from the crude composition. The means of removing the dimer and trimer is not limited, but at least one means selected from the group consisting of ultrafiltration, microfiltration, dialysis membrane treatment, liquid separation, and reprecipitation is preferable, at least one means selected from the group consisting of ultrafiltration, microfiltration, and dialysis membrane treatment is more preferable, and ultrafiltration is still more preferable.

It has not been conventionally known that the polymerization of the monomer (1) produces the dimer and trimer of the monomer (1), resulting in the inclusion of the dimer and trimer of the monomer (1) in the polymer (1). Although the mechanism by which the dimer and trimer of the monomer (1) are produced is not necessarily clear, it is presumed that dimerization and trimerization of the monomer (1) occur with a non-negligible frequency, especially through a polymerization reaction in a polymerization system in which the monomer (1) accounts for the majority of the monomers present in the polymerization system. In the present disclosure, the presence of the dimer and trimer of the monomer (1) in the polymer (1) has been revealed for the first time, and it has been found for the first time that the dimer and trimer of the monomer (1) in the polymer (1) can be removed from the polymer (1) (crude composition) with high efficiency by at least one means selected from the group consisting of ultrafiltration, microfiltration, and dialysis membrane treatment.

When removing the dimer and trimer, the unreacted monomer (1) is usually also removed from the crude composition at the same time. Even when the unreacted monomer (1) is incorporated into the fluoropolymer by the polymerization, it does not necessarily have an adverse effect on the function of the fluoropolymer, and therefore, the unreacted monomer (1) does not necessarily need to be removed. However, by removing the unreacted monomer (1) at the same time as the dimer and trimer, the amount of monomer subjected to the polymerization can be calculated without taking into account the presence of the unreacted monomer (1), which has an advantage that it is possible to easily produce a fluoropolymer having the desired monomeric composition. Note that, even when the monomer (1) remains in the polymer (1) or when the monomer (1) is newly added as a comonomer, dimerization and trimerization of the monomer (1) hardly progress through a polymerization reaction in a polymerization system in which the fluoromonomer (except for the monomer (1)) accounts for the majority of the polymerization system among the monomers present in the polymerization system, and the dimer and trimer of the monomer (1) hardly remain in the resulting fluoropolymer.

The crude composition obtained by the polymerization of the monomer (1) may be a composition as polymerized, obtained from the polymerization, may be one formed by diluting or concentrating the composition as polymerized, obtained from the polymerization, or may be one that has undergone dispersion stabilization treatment or the like. It is also preferable to adjust the viscosity of the crude composition by such treatment in order to facilitate ultrafiltration, microfiltration, or dialysis membrane treatment.

The content of the polymer of the monomer (1) in the crude composition is not limited, and may be, for example, 0.1 to 20% by mass. From the viewpoint of removal efficiency of the dimer and trimer, the content of the polymer of the monomer (1) in the crude composition is preferably 18.0% by mass or less, more preferably 15.0% by mass or less, still more preferably 12.0% by mass or less, and particularly preferably 10.0% by mass or less, and it is preferably 0.5% by mass or more, more preferably 1.0% by mass or more, still more preferably 1.2% by mass or more, particularly preferably 1.5% by mass or more, and most preferably 2.0% by mass or more. The content of the polymer of the monomer (1) in the crude composition can be adjusted by, for example, a method in which water is added to the crude composition obtained by the polymerization of the monomer (1), a method in which the crude composition obtained by the polymerization of the monomer (1) is concentrated, and the like.

The pH of the crude composition is preferably 0 to 11, more preferably 0.5 to 8.0, and still more preferably 1.0 to 7.0. The pH of the crude composition can be adjusted by adding a pH adjuster to the crude composition obtained by the polymerization of the monomer (1). The pH adjuster may be an acid or an alkali, and examples thereof include phosphates, sodium hydroxide, potassium hydroxide, and aqueous ammonia.

The viscosity of the crude composition is preferably 25 mPa·s or less, since ultrafiltration, microfiltration, or dialysis membrane treatment progresses smoothly. The viscosity of the crude composition can be adjusted by, for example, a method in which the number average molecular weight of the polymer of the monomer (1) is adjusted, a method in which the concentration of the polymer of the monomer (1) in the crude composition is adjusted, a method in which the temperature of the crude composition is adjusted, and the like.

Although the ultrafiltration or microfiltration is not limited and may be either cross-flow type or dead-end type, the cross-flow type is preferable from the viewpoint of reducing membrane clogging.

The ultrafiltration can be carried out using an ultrafiltration membrane. The ultrafiltration can be carried out using, for example, an ultrafiltration device having an ultrafiltration membrane, and the centrifugal ultrafiltration method, batch ultrafiltration method, circulating ultrafiltration method, and the like can be adopted.

The cut-off molecular weight of the ultrafiltration membrane is usually about $0.1 \times 10^4$ to $30 \times 10^4$ Da. The ultrafiltration membrane preferably has a cut-off molecular weight of $1.5 \times 10^4$ Da or more, since it can suppress membrane clogging and efficiently reduce the dimer and trimer. The cut-off molecular weight is more preferably $2.0 \times 10^4$ Da or more, particularly preferably $3.0 \times 10^4$ Da or more, and most preferably $5.0 \times 10^4$ Da or more. The cut-off molecular weight may be $8.0 \times 10^4$ Da or more. Also, the cut-off molecular weight is preferably $20 \times 10^4$ Da or less, and more preferably $10 \times 10^4$ Da or less, from the viewpoint of removal efficiency of the dimer and trimer.

The cut-off molecular weight of the ultrafiltration membrane can be determined by, for example, passing a polystyrene with a known weight average molecular weight through the membrane and using a molecular weight that can be blocked by 90% as the cut-off molecular weight. Quantification of the polystyrene can be carried out using gel permeation chromatography.

Although the shape of the ultrafiltration membrane is not limited to those conventionally known, for example, it may be hollow fiber type, flat membrane type, spiral type, tubular type, or the like. The hollow fiber type is preferable from the viewpoint of inhibiting clogging.

The inner diameter of the hollow fiber type ultrafiltration membrane is not limited, and may be, for example, 0.1 to 2 mm. It is preferably 0.8 to 1.4 mm.

The length of the hollow fiber type ultrafiltration membrane is not limited, and may be, for example, 0.05 to 3 m. It is preferably 0.05 to 2 m.

Although the material of the ultrafiltration membrane is not limited, examples thereof include organic materials such as cellulose, cellulose ester, polysulfone, sulfonated polysulfone, polyethersulfone, sulfonated polyethersulfone, chlorinated polyethylene, polypropylene, polyolefin, polyvinyl alcohol, polymethyl methacrylate, polyacrylnitrile, polyvinylidene fluoride, and polytetrafluoroethylene; metals such as stainless steel; and inorganic materials such as ceramics.

The material of the ultrafiltration membrane is preferably an organic material, and it is more preferably chlorinated polyethylene, polypropylene, polyvinylidene fluoride, polytetrafluoroethylene, polyacrylnitrile, polysulfone, or polyethersulfone, and still more preferably polyacrylnitrile, polysulfone, or polyvinylidene fluoride.

Specific examples of the ultrafiltration membrane include the G-5 type, G-10 type, G-20 type, G-50 type, PW type, and HWS UF type from DESAL; HFM-180, HFM-183, HFM-251, HFM-300, HFM-116, HFM-183, HFM-300, HFK-131, HFK-328, MPT-U20, MPS-U20P, and MPS-U20S from KOCH; SPE1, SPE3, SPE5, SPE10, SPE30, SPV5, SPV50, and SOW30 from Synder; the Microza® UF series manufactured by Asahi Kasei Corporation; and NTR 7410 manufactured by Nitto Denko Corporation.

The ultrafiltration is preferably carried out at a pressure of 0.01 MPa or more from the viewpoint of removal efficiency of the dimer and trimer. It is more preferably 0.03 MPa or more, and still more preferably 0.05 MPa or more. Also, from the viewpoint of pressure resistance, the pressure is preferably 0.5 MPa or less, more preferably 0.25 MPa or less, and still more preferably 0.2 MPa or less.

The ultrafiltration is preferably carried out at a flow rate of 10 mL/min or more and more preferably carried out at a flow rate of 50 mL/min or more, and also preferably carried out at a flow rate of 5,000 mL/min or less and more preferably carried out at a flow rate of 1,000 mL/min or less, from the viewpoint of removal efficiency of the dimer and trimer.

The microfiltration can be carried out using a microfiltration membrane. The microfiltration membrane usually has an average pore size of 0.05 to 1.0 μm.

It is preferable that the microfiltration membrane has an average pore size of 0.1 μm or more, since it can efficiently remove the dimer and trimer. It is more preferably 0.075 μm or more, and still more preferably 0.1 μm or more. Also, the average pore size is preferably 1.00 μm or less. It is more preferably 0.50 μm or less, and still more preferably 0.25 μm or less.

The average pore size of the microfiltration membrane can be measured in conformity with ASTM F316-03 (bubble point method).

Although the shape of the microfiltration membrane is not limited to those conventionally known, for example, it may be hollow fiber type, flat membrane type, spiral type, tubular type, or the like. The hollow fiber type is preferable from the viewpoint of inhibiting clogging.

The inner diameter of the hollow fiber type microfiltration membrane is not limited, and may be, for example, 0.1 to 2 mm. It is preferably 0.8 to 1.4 mm.

The length of the hollow fiber type microfiltration membrane is not limited, and may be, for example, 0.05 to 3 m. It is preferably 0.05 to 2 m.

Examples of the material of the microfiltration membrane include cellulosic materials, aromatic polyamide, polyvinyl alcohol, polysulfone, polyethersulfone, polyvinylidene fluoride, polyethylene, polyacrylonitrile, polypropylene, polycarbonate, polytetrafluoroethylene, ceramics, and metals. Among these, aromatic polyamide, polyvinyl alcohol, polysulfone, polyvinylidene fluoride, polyethylene, polyacrylonitrile, polypropylene, polycarbonate, or polytetrafluoroethylene is preferable, and polyacrylonitrile or polyvinylidene fluoride is particularly preferable.

Specific examples of the microfiltration membrane include Cefilt manufactured by NGK Insulators, Ltd.; the Microza U series and Microza P series manufactured by Asahi Kasei Corporation; Poreflon SPMW, Poreflon OPMW, and Poreflon PM manufactured by Sumitomo Electric Industries, Ltd.; Trefil manufactured by Toray Industries, Inc.; NADIR MP005 and NADIR MV020 manufactured by Microdyn-Nadir GmbH; and X-flow manufactured by Norit N.V.

The microfiltration is preferably carried out at a pressure of 0.01 MPa or more from the viewpoint of removal efficiency of the dimer and trimer. It is more preferably 0.03 MPa or more, and still more preferably 0.05 MPa or more. Also, from the viewpoint of pressure resistance, the pressure is preferably 0.5 MPa or less, more preferably 0.25 MPa or less, and still more preferably 0.2 MPa or less.

The microfiltration is preferably carried out at a flow rate of 10 mL/min or more and more preferably carried out at a flow rate of 50 mL/min or more, and also preferably carried out at a flow rate of 5,000 mL/min or less and more preferably carried out at a flow rate of 1,000 mL/min or less, from the viewpoint of removal efficiency of the dimer and trimer.

The dialysis membrane treatment is carried out using a dialysis membrane. The cut-off molecular weight of the dialysis membrane is usually $0.05 \times 10^4$ to $100 \times 10^4$ Da.

The dialysis membrane preferably has a cut-off molecular weight of $0.3 \times 10^4$ Da or more, since it can suppress membrane clogging and efficiently remove the dimer and trimer. The cut-off molecular weight is more preferably $0.5 \times 10^4$ Da or more, still more preferably $1.0 \times 10^4$ Da or more, further preferably $1.5 \times 10^4$ Da or more, still further preferably $2.0 \times 10^4$ Da or more, particularly preferably $3.0 \times 10^4$ Da or more, and most preferably $5.0 \times 10^4$ Da or more. The cut-off molecular weight may be $8.0 \times 10^4$ Da or more.

Also, the cut-off molecular weight is preferably $20 \times 10^4$ Da or less, and more preferably $10 \times 10^4$ Da or less, from the viewpoint of removal efficiency of the dimer and trimer.

The cut-off molecular weight of the dialysis membrane can be measured by, for example, the same method as for the ultrafiltration membrane.

Although the material of the dialysis membrane is not limited, examples thereof include cellulose, polyacrylonitrile, polymethyl methacrylate, ethylene vinyl alcohol copolymers, polysulfone, polyamide, and polyester polymer alloys.

Specific examples of the dialysis membrane include Spectra/Por® Float-A-Lyzer, Tube-A-Lyzer, Dialysis tubing, 6Dialysis tubing, and 7Dialysis tubing manufactured by Spectrum Laboratories Inc.

It is preferable that the ultrafiltration, microfiltration, or dialysis membrane treatment is carried out at a temperature of 10° C. or higher. It is more preferably 15° C. or higher, still more preferably 20° C. or higher, and particularly preferably 30° C. or higher. By setting the temperature in the above range, the dimer and trimer can be reduced more efficiently. The temperature is preferably 90° C. or lower, more preferably 80° C. or lower, still more preferably 70° C. or lower, and particularly preferably 60° C. or lower.

The ultrafiltration, microfiltration, or dialysis membrane treatment can be carried out while adding water to the crude composition or while adjusting the pH of the crude composition. Water may be added intermittently to the crude composition or may be added continuously to the crude composition.

The end point of the ultrafiltration, microfiltration, or dialysis membrane treatment may be determined as appropriate and is not limited. In addition, the ultrafiltration, microfiltration, or dialysis membrane treatment may be backwashed with water about once every 1 to 24 hours of filtration time to improve the durability of the filtration membrane.

The liquid separation can be performed by, for example, adding an organic solvent to the composition to separate it into two phases, the aqueous phase and the organic solvent phase, and collecting the aqueous phase.

The reprecipitation can be performed by, for example, dropping the composition into a poor solvent to precipitate the polymer, collecting the precipitated polymer, dissolving the collected polymer in a good solvent, dropping the obtained solution into a poor solvent to precipitate the polymer again, and collecting the precipitated polymer.

By removing the dimer and trimer of the monomer (1) from the crude composition containing the polymer of the monomer (1), an aqueous solution containing the polymer (1) substantially free from the dimer and trimer is usually obtained. The polymer (1) used in the production method of the present disclosure may be a polymer (1) contained in the obtained aqueous solution or a polymer (1) obtained by separation from the aqueous solution. The method for separating the polymer (1) from the aqueous solution is not limited. For example, the polymer (1) can be separated by a method such as coagulation, washing, and drying of the polymer (1) in the aqueous solution.

As the polymer (1), an aqueous solution containing the polymer (1) can be used. The preferred content of the dimer and trimer of the monomer (1) based on the polymer (1) in the aqueous solution is as mentioned above.

<Polymerization of Fluoromonomer>

In the production method of the present disclosure, a fluoromonomer is polymerized in the aqueous medium in the presence of the polymer (1). The fluoromonomer preferably has at least one double bond. The fluoromonomer is preferably at least one selected from the group consisting of tetrafluoroethylene (TFE), hexafluoropropylene (HFP), chlorotrifluoroethylene (CTFE), vinyl fluoride, vinylidene fluoride (VDF), trifluoroethylene, fluoroalkyl vinyl ether, fluoroalkyl ethylene, fluoroalkyl allyl ether, trifluoropropylene, pentafluoropropylene, trifluorobutene, tetrafluoroisobutene, hexafluoroisobutene, a fluoromonomer represented by the general formula (100): $CHX^{101}=CX^{102}Rf^{101}$ (wherein one of $X^{101}$ and $X^{102}$ is H and the other is F, and $Rf^{101}$ is a linear or branched fluoroalkyl group having 1 to 12 carbon atoms), a fluorinated vinyl heterocyclic compound, and a monomer that provides a crosslinking site.

The fluoroalkyl vinyl ether is preferably, for example, at least one selected from the group consisting of:

a fluoromonomer represented by the general formula (110):

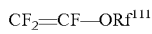

$CF_2=CF-ORf^{111}$ wherein $Rf^{111}$ represents a perfluoroorganic group;

a fluoromonomer represented by the general formula (120):

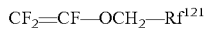

$CF_2=CF-OCH_2-Rf^{121}$ wherein $Rf^{121}$ represents a perfluoroalkyl group having 1 to 5 carbon atoms;

a fluoromonomer represented by the general formula (130):

$CF_2=CFOCF_2ORf^{131}$ wherein $Rf^{131}$ is a linear or branched perfluoroalkyl group having 1 to 6 carbon atoms, a cyclic perfluoroalkyl group having 5 to 6 carbon atoms, or a linear or branched perfluorooxyalkyl group having 2 to 6 carbon atoms and containing 1 to 3 oxygen atoms;

a fluoromonomer represented by the general formula (140):

$CF_2=CFO(CF_2CF(Y^{141})O)_m(CF_2)_nF$ wherein $Y^{141}$ represents a fluorine atom or a trifluoromethyl group; m is an integer of 1 to 4; and n is an integer of 1 to 4; and a fluoromonomer represented by the general formula (150):

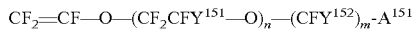

$CF_2=CF-O-(CF_2CFY^{151}-O)_n-(CFY^{152})_m-A^{151}$ wherein $Y^{151}$ represents a fluorine atom, a chlorine atom, a $-SO_2F$ group, or a perfluoroalkyl group; the perfluoroalkyl group optionally contains ether oxygen and a $-SO_2F$ group; n represents an integer of 0 to 3; n $Y^{151}$s are the same as or different from each other; $Y^{152}$ represents a fluorine atom, a chlorine atom, or a $-SO_2F$ group; m represents an integer of 1 to 5; m $Y^{152}$s are the same as or different from each other; $A^{151}$ represents $-SO_2X^{151}$, $-COZ^{151}$ or $-POZ^{152}Z^{153}$; $X^{151}$ represents F, Cl, Br, I, $-OR^{151}$, or $-NR^{152}R^{153}$; $Z^{151}$, $Z^{152}$, and $Z^{153}$ are the same as or different from each other, and each represent $-NR^{154}R^{155}$ or $-OR^{156}$; $R^{151}$, $R^{152}$, $R^{153}$, $R^{154}$, $R^{155}$, and $R^{156}$ are the same as or different from each other, and each represent H, ammonium, an alkali metal, or an alkyl group, aryl group, or sulfonyl-containing group optionally containing a fluorine atom.

The "perfluoroorganic group" in the present disclosure, means an organic group in which all hydrogen atoms bonded to the carbon atoms are replaced by fluorine atoms. The perfluoroorganic group optionally has ether oxygen.

An example of the fluoromonomer represented by the general formula (110) is a fluoromonomer in which $Rf^{111}$ is a perfluoroalkyl group having 1 to 10 carbon atoms. The perfluoroalkyl group preferably has 1 to 5 carbon atoms.

Examples of the perfluoroorganic group in the general formula (110) include a perfluoromethyl group, a perfluoroethyl group, a perfluoropropyl group, a perfluorobutyl group, a perfluoropentyl group, and a perfluorohexyl group.

Examples of the fluoromonomer represented by the general formula (110) also include those represented by the general formula (110) in which $Rf^{111}$ is a perfluoro(alkoxyalkyl) group having 4 to 9 carbon atoms; those in which $Rf^{111}$ is a group represented by the following formula:

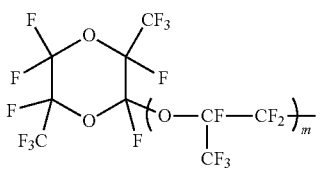

wherein m represents 0 or an integer of 1 to 4; and those in which $Rf^{111}$ is a group represented by the following formula:

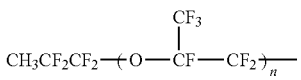

wherein n represents an integer of 1 to 4.

Of these, the fluoromonomer represented by the general formula (110) is preferably a fluoromonomer represented by the general formula (160):

wherein $Rf^{161}$ represents a perfluoroalkyl group having 1 to 10 carbon atoms. $Rf^{161}$ is preferably a perfluoroalkyl group having 1 to 5 carbon atoms.

The fluoroalkyl vinyl ether is preferably at least one selected from the group consisting of fluoromonomers represented by the general formulas (160), (130), and (140).

The fluoromonomer represented by the general formula (160) is preferably at least one selected from the group consisting of perfluoro(methyl vinyl ether), perfluoro(ethyl vinyl ether), and perfluoro(propyl vinyl ether), and is more preferably at least one selected from the group consisting of perfluoro(methyl vinyl ether) and perfluoro(propyl vinyl ether).

The fluoromonomer represented by the general formula (130) is preferably at least one selected from the group consisting of $CF_2\!=\!CFOCF_2OCF_3$, $CF_2\!=\!CFOCF_2OCF_2CF_3$, and $CF_2\!=\!CFOCF_2OCF_2CF_2OCF_3$.

The fluoromonomer represented by the general formula (140) is preferably at least one selected from the group consisting of $CF_2\!=\!CFOCF_2CF(CF_3)O(CF_2)_3F$, $CF_2\!=\!CFO(CF_2CF(CF_3)O)_2(CF_2)_3F$, and $CF_2\!=\!CFO(CF_2CF(CF_3)O)_2(CF_2)_2F$.

The fluoromonomer represented by the general formula (150) is preferably at least one selected from the group consisting of $CF_2\!=\!CFOCF_2CF_2SO_2F$, $CF_2\!=\!CFOCF_2CF(CF_3)OCF_2CF_2SO_2F$, $CF_2\!=\!CFOCF_2CF(CF_2CF_2SO_2F)OCF_2CF_2SO_2F$, and $CF_2\!=\!CFOCF_2CF(SO_2F)_2$.

The fluoromonomer represented by the general formula (100) is preferably a fluoromonomer in which $Rf^{101}$ is a linear fluoroalkyl group, and more preferably a fluoromonomer in which $Rf^{101}$ is a linear perfluoroalkyl group. $Rf^{101}$ preferably has 1 to 6 carbon atoms. Examples of the fluoromonomer represented by the general formula (100) include $CH_2\!=\!CFCF_3$, $CH_2\!=\!CFCF_2CF_3$, $CH_2\!=\!CFCF_2CF_2CF_3$, $CH_2\!=\!CFCF_2CF_2CF_2H$, $CH_2\!=\!CFCF_2CF_2CF_2CF_3$, $CHF\!=\!CHCF_3$ (E isomer), and $CHF\!=\!CHCF_3$ (Z isomer), of which preferred is 2,3,3,3-tetrafluoropropylene represented by $CH_2\!=\!CFCF_3$.

The fluoroalkyl ethylene is preferably a fluoroalkyl ethylene represented by the general formula (170):

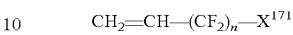

(wherein $X^{171}$ is H or F; and n is an integer of 3 to 10), and more preferably at least one selected from the group consisting of $CH_2\!=\!CH\!-\!C_4F_9$ and $CH_2\!=\!CH\!-\!C_6F_{13}$.

An example of the fluoroalkyl allyl ether is a fluoromonomer represented by the general formula (180):

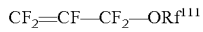

wherein $Rf^{111}$ represents a perfluoro organic group.

$Rf^{111}$ in the general formula (180) is the same as $Rf^{111}$ in the general formula (110). $Rf^{111}$ is preferably a perfluoroalkyl group having 1 to 10 carbon atoms or a perfluoroalkoxyalkyl group having 1 to 10 carbon atoms. The fluoroalkyl allyl ether represented by the general formula (180) is preferably at least one selected from the group consisting of $CF_2\!=\!CF\!-\!CF_2\!-\!O\!-\!CF_3$, $CF_2\!=\!CF\!-\!CF_2\!-\!O\!-\!C_2F_5$, $CF_2\!=\!CF\!-\!CF_2\!-\!O\!-\!C_3F_7$, and $CF_2\!=\!CF\!-\!CF_2\!-\!O\!-\!C_4F_9$, more preferably at least one selected from the group consisting of $CF_2\!=\!CF\!-\!CF_2\!-\!O\!-\!C_2F_5$, $CF_2\!=\!CF\!-\!CF_2\!-\!O\!-\!C_3F_7$, and $CF_2\!=\!CF\!-\!CF_2\!-\!O\!-\!C_4F_9$, and still more preferably $CF_2\!=\!CF\!-\!CF_2\!-\!O\!-\!CF_2CF_2CF_3$.

An example of the fluorinated vinyl heterocyclic compound is a fluorinated vinyl heterocyclic compound represented by the general formula (230):

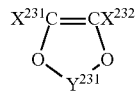

wherein $X^{231}$ and $X^{232}$ are each independently F, Cl, a methoxy group, or a fluorinated methoxy group; and $Y^{231}$ is represented by the formula $Y^{232}$ or the formula $Y^{233}$:

wherein $Z^{231}$ and $Z^{232}$ are each independently F or a fluorinated alkyl group having 1 to 3 carbon atoms.

The monomer that provides a crosslinking site is preferably at least one selected from the group consisting of:

a fluoromonomer represented by the general formula (180):

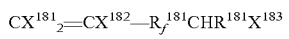

wherein $X^{181}$ and $X^{182}$ are each independently a hydrogen atom, a fluorine atom, or $CH_3$; $Rf^{181}$ is a fluoroalkylene group, a perfluoroalkylene group, a fluoro(poly)oxyalkylene group, or a perfluoro(poly)oxyalkylene group; $R^{181}$ is a hydrogen atom or $CH_3$; and $X^{183}$ is an iodine atom or a bromine atom;

a fluoromonomer represented by the general formula (190):

$$CX^{191}{}_2=CX^{192}-R_f^{191}X^{193}$$

wherein $X^{191}$ and $X^{192}$ are each independently a hydrogen atom, a fluorine atom, or $CH_3$; $R_f^{191}$ is a fluoroalkylene group, a perfluoroalkylene group, a fluoropolyoxyalkylene group, or a perfluoropolyoxyalkylene group; and $X^{193}$ is an iodine atom or a bromine atom;

a fluoromonomer represented by the general formula (200):

$$CF_2=CFO(CF_2CF(CF_3)O)_m(CF_2)_n-X^{201}$$

wherein m is an integer of 0 to 5; n is an integer of 1 to 3; and $X^{201}$ is a cyano group, a carboxyl group, an alkoxycarbonyl group, an iodine atom, a bromine atom, or $-CH_2I$; and a fluoromonomer represented by the general formula (210):

$$CH_2=CFCF_2O(CF(CF_3)CF_2O)_m(CF(CF_3))_n-X^{211}$$

wherein m is an integer of 0 to 5; n is an integer of 1 to 3; and $X^{211}$ is a cyano group, a carboxyl group, an alkoxycarbonyl group, an iodine atom, a bromine atom, or $-CH_2OH$; and a monomer represented by the general formula (220):

$$CR^{221}R^{222}=CR^{223}-Z^{221}-CR^{224}=CR^{225}R^{226}$$

wherein $R^{221}$, $R^{222}$, $R^{223}$, $R^{224}$, $R^{225}$, and $R^{226}$ are the same as or different from each other, and are each a hydrogen atom or an alkyl group having 1 to 5 carbon atoms; $Z^{221}$ is a linear or branched alkylene group having 1 to 18 carbon atoms and optionally having an oxygen atom, a cycloalkylene group having 3 to 18 carbon atoms, an at least partially fluorinated alkylene or oxyalkylene group having 1 to 10 carbon atoms, or a (per) fluoropolyoxyalkylene group which is represented by:

$$-(Q)_p-CF_2O-(CF_2CF_2O)_m(CF_2O)_n-CF_2-(Q)_p-$$

(wherein Q is an alkylene group or an oxyalkylene group; p is 0 or 1; and m/n is 0.2 to 5) and has a molecular weight of 500 to 10,000.

$X^{183}$ and $X^{193}$ are each preferably an iodine atom. $R_f^{181}$ and $R_f^{191}$ are each preferably a perfluoroalkylene group having 1 to 5 carbon atoms. $R^{181}$ is preferably a hydrogen atom. $X^{201}$ is preferably a cyano group, an alkoxycarbonyl group, an iodine atom, a bromine atom, or $-CH_2I$. $X^{211}$ is preferably a cyano group, an alkoxycarbonyl group, an iodine atom, a bromine atom, or $-CH_2OH$.

The monomer that provides a crosslinking site is preferably at least one selected from the group consisting of $CF_2=CFOCF_2CF(CF_3)OCF_2CF_2CN$, $CF_2=CFOCF_2CF(CF_3)OCF_2CF_2COOH$, $CF_2=CFOCF_2CF(CF_3)OCF_2CF_2CH_2I$, $CF_2=CFOCF_2CF_2CH_2I$, $CH_2=CFCF_2OCF(CF_3)CF_2OCF(CF_3)CN$, $CH_2=CFCF_2OCF(CF_3)CF_2OCF(CF_3)COOH$, $CH_2=CFCF_2OCF(CF_3)CF_2OCF(CF_3)CH_2OH$, $CH_2=CHCF_2CF_2I$, $CH_2=CH(CF_2)_2CH=CH_2$, $CH_2=CH(CF_2)_6CH=CH_2$, and $CF_2=CFO(CF_2)_5CN$, and is more preferably at least one selected from the group consisting of $CF_2=CFOCF_2CF(CF_3)OCF_2CF_2CN$ and $CF_2=CFOCF_2CF_2CH_2I$.

In the polymerization, the fluoromonomer may be polymerized with a fluorine-free monomer. An example of the fluorine-free monomer is a hydrocarbon monomer reactive with the fluoromonomer. Examples of the hydrocarbon monomer include alkenes such as ethylene, propylene, butylene, and isobutylene; alkyl vinyl ethers such as ethyl vinyl ether, propyl vinyl ether, butyl vinyl ether, isobutyl vinyl ether, and cyclohexyl vinyl ether; vinyl esters such as vinyl acetate, vinyl propionate, vinyl n-butyrate, vinyl isobutyrate, vinyl valerate, vinyl pivalate, vinyl caproate, vinyl caprylate, vinyl caprate, vinyl versatate, vinyl laurate, vinyl myristate, vinyl palmitate, vinyl stearate, vinyl benzoate, vinyl para-t-butylbenzoate, vinyl cyclohexanecarboxylate, monochlorovinyl acetate, vinyl adipate, vinyl acrylate, vinyl methacrylate, vinyl crotonate, vinyl sorbate, vinyl cinnamate, vinyl undecylenate, vinyl hydroxyacetate, vinyl hydroxypropionate, vinyl hydroxybutyrate, vinyl hydroxyvalerate, vinyl hydroxyisobutyrate, and vinyl hydroxycyclohexanecarboxylate; alkyl allyl ethers such as ethyl allyl ether, propyl allyl ether, butyl allyl ether, isobutyl allyl ether, and cyclohexyl allyl ether; and alkyl allyl esters such as ethyl allyl ester, propyl allyl ester, butyl allyl ester, isobutyl allyl ester, and cyclohexyl allyl ester.

The fluorine-free monomer may also be a functional group-containing hydrocarbon monomer (other than monomers that provide a crosslinking site). Examples of the functional group-containing hydrocarbon monomer include hydroxy alkyl vinyl ethers such as hydroxyethyl vinyl ether, hydroxypropyl vinyl ether, hydroxybutyl vinyl ether, hydroxyisobutyl vinyl ether, and hydroxycyclohexyl vinyl ether; fluorine-free monomers having carboxyl groups such as itaconic acid, succinic acid, succinic anhydride, fumaric acid, fumaric anhydride, crotonic acid, maleic acid, maleic anhydride, and perfluorobutenoic acid; fluorine-free monomers having a glycidyl group such as glycidyl vinyl ether and glycidyl allyl ether; fluorine-free monomers having an amino group such as aminoalkyl vinyl ether and aminoalkyl allyl ether; and fluorine-free monomers having an amide group such as (meth)acrylamide and methylol acrylamide.

In the polymerization, desired fluoropolymer particles can be obtained by polymerizing one or two or more of the above fluoromonomers.

The amount of the polymer (1) added in the polymerization is preferably 0.0001 to 10% by mass based on the aqueous medium, and the more preferred lower limit is 0.001% by mass or more and the more preferred upper limit is 1% by mass or less. When the amount of the polymer (1) added is within the above range, polymerization of the fluoromonomer in the aqueous medium can progress smoothly. The amount of the polymer (1) added is the total amount of the polymer (1) added in the polymerization.

In the polymerization, the polymer (1) may be added all at once, or the polymer (1) may be added continuously. Adding the polymer (1) continuously means, for example, adding the polymer (1) not all at once, but adding over time and without interruption or adding in portions. In the polymerization, an aqueous solution containing the polymer (1) and water may be prepared and that aqueous solution may be added.

In the polymerization, it is preferable to initiate adding the polymer (1) before the solid content of the fluoropolymer formed in the aqueous medium reaches 0.5% by mass, and to add the polymer (1) continuously thereafter as well. The timing to initiate adding the polymer (1) is preferably before the solid content of the fluoropolymer reaches 0.3% by mass, more preferably before it reaches 0.2% by mass, still more preferably before it reaches 0.1% by mass, and particularly preferably at the same time as the initiation of polymerization. The solid content is the content of the polymer (1) based on the total amount of the aqueous medium and the fluoropolymer.

In the polymerization, the presence of at least one of the polymers (1) can efficiently produce a fluoropolymer. Also, two or more of the compounds encompassed in the polymer (1) may be used at the same time, and a compound having a surfactant function other than the polymer (1) may also be used in combination insofar as the compound is volatile or is allowed to remain in a molded body formed from the fluoropolymer or the like.

In the polymerization, a nucleating agent may be used. The amount of the nucleating agent added can be selected as appropriate in accordance with the type of the nucleating agent. The amount of the nucleating agent added may be 5,000 ppm by mass or less based on the aqueous medium, and it is preferably 1,000 ppm by mass or less, more preferably 500 ppm by mass or less, still more preferably 100 ppm by mass or less, particularly preferably 50 ppm by mass or less, and most preferably 10 ppm by mass or less.

In the polymerization, it is preferable to add the nucleating agent to the aqueous medium before the initiation of polymerization or before the solid content of the fluoropolymer formed in the aqueous medium reaches 5.0% by mass. Adding the nucleating agent at the initial stage of the polymerization allows for obtaining an aqueous dispersion having a small average primary particle size and excellent stability.

The amount of the nucleating agent added at the initial stage of the polymerization is preferably 0.001% by mass or more, more preferably 0.01% by mass or more, still more preferably 0.05% by mass or more, and particularly preferably 0.1% by mass or more, based on the resulting fluoropolymer. The upper limit of the amount of the nucleating agent added at the initial stage of the polymerization may be, but is not limited to, 2,000% by mass.

The use of the nucleating agent allows for obtaining a fluoropolymer having a smaller primary particle size than that in the case of polymerization in the absence of the above nucleating agent.

Examples of the nucleating agent include dicarboxylic acids, perfluoropolyether (PFPE) acids or salts thereof, and hydrocarbon-containing surfactants. The nucleating agent is preferably free from an aromatic ring, and is preferably an aliphatic compound.

Although the nucleating agent is preferably added before addition of the polymerization initiator or simultaneously with addition of the polymerization initiator, it is also possible to adjust the particle size distribution by adding the nucleating agent during the polymerization.

The amount of the dicarboxylic acid is preferably 1,000 ppm by mass or less, more preferably 500 ppm by mass or less, and still more preferably 100 ppm by mass or less, based on the aqueous medium.

The perfluoropolyether (PFPE) acids or salts thereof may have any chain structure in which the oxygen atoms in the main chain of the molecule are separated by saturated carbon fluoride groups having 1 to 3 carbon atoms. Two or more carbon fluoride groups may be present in the molecule. Representative structures thereof have the repeating units represented by the following formulas:

  (VII)

  (VIII)

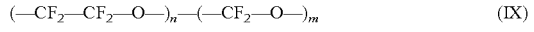  (IX)

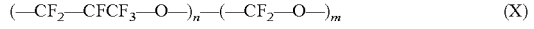  (X)

These structures are described in Kasai, J. Appl. Polymer Sci., 57, 797(1995). As disclosed in this document, the PFPE acid or a salt thereof may have a carboxylic acid group or a salt thereof at one end or both ends. The PFPE acid or a salt thereof may also have a sulfonic acid, a phosphonic acid group, or a salt thereof at one end or both ends. The PFPE acid or a salt thereof may have different groups at each end. Regarding monofunctional PFPE, the other end of the molecule is usually perfluorinated, but may contain a hydrogen or chlorine atom. The PFPE acid or a salt thereof has at least two ether oxygen atoms, preferably at least four ether oxygen atoms, and still more preferably at least six ether oxygen atoms. Preferably, at least one carbon fluoride group separating ether oxygen atoms, more preferably at least two of such carbon fluoride groups, have 2 or 3 carbon atoms. Still more preferably, at least 50% of the carbon fluoride groups separating ether oxygen atoms has 2 or 3 carbon atoms. Also preferably, the PFPE acid or a salt thereof has at least 15 carbon atoms in total, and for example, a preferable minimum value of n or n+m in the repeating unit structure is preferably at least 5. Two or more of the PFPE acids and salts thereof having an acid group at one end or both ends may be used in the production method of the present disclosure. The PFPE acid or a salt thereof preferably has a number average molecular weight of less than 6,000 g/mol.

The hydrocarbon-containing surfactant is preferably added in an amount of 40 ppm by mass or less, more preferably 30 ppm by mass or less, still more preferably 20 ppm by mass or less, based on the aqueous medium. The amounts in ppm of the oleophilic nucleation sites present in the aqueous medium will be less than the amounts in ppm disclosed herein as being added to the aqueous medium. Thus, the amounts of oleophilic nucleation sites will each be less than the 40 ppm by mass, 30 ppm by mass, and 20 ppm by mass as described above. Since it is considered that oleophilic nucleation sites exist as molecules, only a small amount of the hydrocarbon-containing surfactant can generate a large amount of oleophilic nucleation sites. Thus, addition of as little as 1 ppm by mass of the hydrocarbon-containing surfactant to the aqueous medium can provide beneficial effect. The lower limit value thereof is preferably 0.01 ppm by mass, and more preferable lower limit value thereof is 0.1 ppm by mass.

The hydrocarbon-containing surfactant encompasses nonionic surfactants and cationic surfactants, including siloxane surfactants such as those disclosed in U.S. Pat. No. 7,897,682 (Brothers et al.) and U.S. Pat. No. 7,977,438 (Brothers et al.).

The hydrocarbon-containing surfactant is preferably a nonionic surfactant (for example, a nonionic hydrocarbon surfactant). In other words, the nucleating agent is preferably a nonionic surfactant. The nonionic surfactant is preferably free from an aromatic moiety.

Examples of the nonionic surfactant include a compound represented by the following general formula (i):

  (i)

wherein $R^3$ is a linear or branched primary or secondary alkyl group having 8 to 18 carbon atoms, and $A^1$ is a polyoxyalkylene chain.

$R^3$ preferably has 10 to 16, more preferably 12 to 16 carbon atoms. When $R^3$ has 18 or less carbon atoms, the aqueous dispersion tends to have good dispersion stability. Further, when $R^3$ has more than 18 carbon atoms, it is difficult to handle due to its high flowing temperature. When $R^3$ has less than 8 carbon atoms, the surface tension of the aqueous dispersion becomes high, so that the permeability and wettability are likely to decrease.

The polyoxyalkylene chain may be composed of oxyethylene and oxypropylene. The polyoxyalkylene chain is composed of an average repeating number of 5 to 20 oxyethylene groups and an average repeating number of 0 to 2 oxypropylene groups, and is a hydrophilic group. The number of oxyethylene units may have either a broad or narrow monomodal distribution as typically supplied, or a broader or bimodal distribution which may be obtained by blending. When the average number of repeating oxypropylene groups is more than 0, the oxyethylene groups and oxypropylene groups in the polyoxyalkylene chain may be arranged in blocks or randomly.

From the viewpoint of viscosity and stability of the aqueous dispersion, a polyoxyalkylene chain composed of an average repeating number of 7 to 12 oxyethylene groups and an average repeating number of 0 to 2 oxypropylene groups is preferred. In particular, when $A^1$ has 0.5 to 1.5 oxypropylene groups on average, low foaming properties are good, which is preferable.

More preferably, $R^3$ is (R') (R")HC—, where R' and R" are the same or different linear, branched, or cyclic alkyl groups, and the total amount of carbon atoms is at least 5, preferably 7 to 17. Preferably, at least one of R' and R" is a branched or cyclic hydrocarbon group.

Specific examples of the polyoxyethylene alkyl ether represented by the general formula (i) include $C_{13}H_{27}$—O—$(C_2H_4O)_{10}$—H, $C_{12}H_{25}$—O—$(C_2H_4O)_{10}$—H, $C_{10}H_{21}CH(CH_3)CH_2$—O—$(C_2H_4O)_9$—H, $C_{13}H_{27}$—O—$(C_2H_4O)_9$—$(CH(CH_3)CH_2O)$—H, $C_{16}H_{33}$—O—$(C_2H_4O)_{10}$—H, and $HC(C_5H_{11})(C_7H_{15})$—O—$(C_2H_4O)_9$—H. Examples of commercially available products of the polyoxyethylene alkyl ether represented by the general formula (i) include Genapol X080 (product name, manufactured by Clariant), the NOIGEN TDS series (manufactured by DKS Co., Ltd.) exemplified by NOIGEN TDS-80 (trade name), the LEOCOL TD series (manufactured by Lion Corp.) exemplified by LEOCOL TD-90 (trade name), the LIONOL® TD series (manufactured by Lion Corp.), the T-Det A series (manufactured by Harcros Chemicals Inc.) exemplified by T-Det A 138 (trade name), and the Tergitol® 15S series (manufactured by Dow Chemical Co., Ltd.).

The nonionic surfactant is preferably an ethoxylate of 2,6,8-trimethyl-4-nonanol having about 4 to about 18 ethylene oxide units on average, an ethoxylate of 2,6,8-trimethyl-4-nonanol having about 6 to about 12 ethylene oxide units on average, or a mixture thereof. This type of nonionic surfactant is also commercially available, for example, as TERGITOL TMN-6, TERGITOL TMN-10, and TERGITOL TMN-100X (all product names, manufactured by Dow Chemical Co., Ltd.).

The hydrophobic group of the nonionic surfactant may be any of an alkylphenol group, a linear alkyl group, and a branched alkyl group.

Examples of the polyoxyethylene alkylphenyl ether-based nonionic compound include, for example, a compound represented by the following general formula (ii):

$$R^4—C_6H_4—O—A^2—H \qquad (ii)$$

wherein $R^4$ is a linear or branched primary or secondary alkyl group having 4 to 12 carbon atoms, and $A^2$ is a polyoxyalkylene chain. Specific examples of the polyoxyethylene alkylphenyl ether-based nonionic compound include Triton X-100 (trade name, manufactured by Dow Chemical Co., Ltd.).

Examples of the nonionic surfactant also include polyol compounds. Specific examples thereof include those described in International Publication No. WO2011/014715.

Typical examples of the polyol compound include compounds having one or more sugar units as a polyol unit. The sugar units may have been modified to contain at least one long chain. Examples of suitable polyol compounds containing at least one long chain moiety include alkyl glycosides, modified alkyl glycosides, sugar esters, and combinations thereof. Examples of the sugars include, but are not limited to, monosaccharides, oligosaccharides, and sorbitanes. Examples of monosaccharides include pentoses and hexoses. Typical examples of monosaccharides include ribose, glucose, galactose, mannose, fructose, arabinose, and xylose. Examples of oligosaccharides include oligomers of 2 to 10 of the same or different monosaccharides. Examples of oligosaccharides include, but are not limited to, saccharose, maltose, lactose, raffinose, and isomaltose.

Typically, sugars suitable for use as the polyol compound include cyclic compounds containing a 5-membered ring of four carbon atoms and one heteroatom (typically oxygen or sulfur, preferably oxygen atom), or cyclic compounds containing a 6-membered ring of five carbon atoms and one heteroatom as described above, preferably, an oxygen atom. These further contain at least two or at least three hydroxy groups (—OH groups) bonded to the carbon ring atoms. Typically, the sugars have been modified in that one or more of the hydrogen atoms of a hydroxy group (and/or hydroxyalkyl group) bonded to the carbon ring atoms has been substituted by the long chain residues such that an ether or ester bond is created between the long chain residue and the sugar moiety.

The sugar-based polyol may contain a single sugar unit or a plurality of sugar units. The single sugar unit or the plurality of sugar units may be modified with long chain moieties as described above. Specific examples of sugar-based polyol compounds include glycosides, sugar esters, sorbitan esters, and mixtures and combinations thereof.

A preferred type of polyol compounds are alkyl or modified alkyl glucosides. These type of surfactants contains at least one glucose moiety. Examples of alkyl or modified alkyl glucosides include compounds represented by:

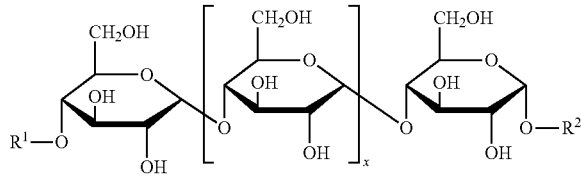

wherein x represents 0, 1, 2, 3, 4, or 5 and $R^1$ and $R^2$ each independently represent H or a long chain unit containing at least 6 carbon atoms, with the proviso that at least one of $R^1$ and $R^2$ is not H. Typical examples of $R^1$ and $R^2$ include aliphatic alcohol residues. Examples of the aliphatic alcohols include hexanol, heptanol, octanol, nonanol, decanol, undecanol, dodecanol (lauryl alcohol), tetradecanol, hexadecanol (cetyl alcohol), heptadecanol, octadecanol (stearyl alcohol), eicosanoic acid, and combinations thereof.

It is understood that the above formula represents specific examples of alkyl poly glucosides showing glucose in its pyranose form but other sugars or the same sugars but in different enantiomeric or diastereomeric forms may also be used.

Alkyl glucosides are available, for example, by acid-catalyzed reactions of glucose, starch, or n-butyl glucoside with aliphatic alcohols which typically yields a mixture of various alkyl glucosides (Alkyl polygylcoside, Rompp, Lexikon Chemie, Version 2.0, Stuttgart/New York, Georg Thieme Verlag, 1999). Examples of the aliphatic alcohols include hexanol, heptanol, octanol, nonanol, decanol, undecanol, dodecanol (lauryl alcohol), tetradecanol, hexadecanol (cetyl alcohol), heptadecanol, octadecanol (stearyl alcohol), eicosanoic acid, and combinations thereof. Alkyl glucosides are also commercially available under the trade name GLUCOPON or DISPONIL from Cognis GmbH, Dusseldorf, Germany.

Examples of other nonionic surfactants include bifunctional block copolymers supplied from BASF as Pluronic® R series, tridecyl alcohol alkoxylates supplied from BASF as Iconol® TDA series, and hydrocarbon-containing siloxane surfactants, preferably hydrocarbon surfactants. In the sense that the hydrocarbyl groups are fully substituted with hydrogen atoms where they can be substituted by halogen such as fluorine, these siloxane surfactants can also be regarded as hydrocarbon surfactants, i.e. the monovalent substituents on the hydrocarbyl groups are hydrogen.

In the polymerization, a compound having a functional group capable of reacting by radical polymerization and a hydrophilic group may be used together with the polymer (1). As the compound having a functional group capable of reacting by radical polymerization and a hydrophilic group, the same compound as a modifying monomer (A), which will be described later, can be used.

Also, in the polymerization, in addition to the polymer (1) and other compounds having a surfactant function used as necessary, an additive may also be used to stabilize the compounds. Examples of the additive include a buffer, a pH adjuster, a stabilizing aid, and a dispersion stabilizer.

The stabilizing aid is preferably paraffin wax, fluorine-containing oil, a fluorine-containing solvent, silicone oil, or the like. The stabilizing aids may be used alone or in combination of two or more. The stabilizing aid is more preferably paraffin wax. The paraffin wax may be in the form of liquid, semi-solid, or solid at room temperature, and is preferably a saturated hydrocarbon having 12 or more carbon atoms. The paraffin wax usually preferably has a melting point of 40 to 65° C., and more preferably 50 to 65° C.

The amount of the stabilizing aid used is preferably 0.1 to 12% by mass, and more preferably 0.1 to 8% by mass, based on the mass of the aqueous medium used. It is desirable that the stabilizing aid is sufficiently hydrophobic so that the stabilizing aid is completely separated from the aqueous dispersion, after polymerization, and does not serve as a contaminating component.

The polymerization is performed by charging a polymerization reactor with an aqueous medium, the polymer (1), monomers, and optionally other additives, stirring the contents of the reactor, maintaining the reactor at a predetermined polymerization temperature, and adding a predetermined amount of a polymerization initiator to thereby initiate the polymerization reaction. After the initiation of the polymerization reaction, the components such as the monomers, the polymerization initiator, a chain transfer agent, and the polymer (1) may additionally be added depending on the purpose. The polymer (1) may be added after the polymerization reaction is initiated.

The polymerization is usually performed at a polymerization temperature of 5 to 120° C. and a polymerization pressure of 0.05 to 10 MPa·G. The polymerization temperature and the polymerization pressure are determined as appropriate in accordance with the types of the monomers used, the molecular weight of the target fluoropolymer, and the reaction rate.

The polymerization initiator may be any polymerization initiator capable of generating radicals within the polymerization temperature range, and known oil-soluble and/or water-soluble polymerization initiators may be used. The polymerization initiator may be combined with a reducing agent, for example, to form a redox agent, which initiates the polymerization. The concentration of the polymerization initiator is appropriately determined depending on the types of the monomers, the molecular weight of the target fluoropolymer, and the reaction rate.

The polymerization initiator to be used may be an oil-soluble radical polymerization initiator or a water-soluble radical polymerization initiator.

The oil-soluble radical polymerization initiator may be a known oil-soluble peroxide, and representative examples thereof include dialkyl peroxycarbonates such as diisopropyl peroxydicarbonate and di-sec-butyl peroxydicarbonate; peroxy esters such as t-butyl peroxyisobutyrate and t-butyl peroxypivalate; and dialkyl peroxides such as di-t-butyl peroxide, as well as di[perfluoro (or fluorochloro) acyl] peroxides such as di(ω-hydro-dodecafluorohexanoyl)peroxide, di(ω-hydro-tetradecafluoroheptanoyl)peroxide, di(ω-hydro-hexadecafluorononanoyl)peroxide, di(perfluorobutyryl)peroxide, di(perfluorovaleryl)peroxide, di(perfluorohexanoyl)peroxide, di(perfluoroheptanoyl)peroxide, di(perfluorooctanoyl)peroxide, di(perfluorononanoyl)peroxide, di(ω-chloro-hexafluorobutyryl)peroxide, di(ω-chloro-decafluorohexanoyl)peroxide, di(ω-chloro-tetradecafluorooctanoyl)peroxide, ω-hydro-dodecafluoroheptanoyl-ω-hydrohexadecafluorononanoyl-peroxide, ω-chloro-hexafluorobutyryl-ω-chloro-decafluorohexanoyl-peroxide, ω-hydrododecafluoroheptanoyl-perfluorobutyryl-peroxide, di(dichloropentafluorobutanoyl)peroxide, di(trichlorooctafluorohexanoyl)peroxide, di(tetrachloroundecafluorooctanoyl)peroxide, di(pentachlorotetradecafluorodecanoyl)peroxide, and di(undecachlorodotoriacontafluorodocosanoyl)peroxide.

The water-soluble radical polymerization initiator may be a known water-soluble peroxide, and examples thereof include ammonium salts, potassium salts, and sodium salts of persulfuric acid, perboric acid, perchloric acid, perphosphoric acid, and percarbonic acid, organic peroxides such as disuccinic acid peroxide and diglutaric acid peroxide, t-butyl permaleate, and t-butyl hydroperoxide. A reducing agent such as a sulfite or a sulfurous acid salt may be contained together, and the amount thereof may be 0.1 to 20 times the amount of the peroxide.

For example, in a case where the polymerization is performed at a low temperature of 30° C. or lower, the polymerization initiator used is preferably a redox initiator obtained by combining an oxidizing agent and a reducing agent. Examples of the oxidizing agent include persulfates, organic peroxides, potassium permanganate, manganese triacetate, and ammonium cerium nitrate. Examples of the reducing agent include sulfites, bisulfites, bromates, diimines, and oxalic acid. Examples of the persulfates include ammonium persulfate and potassium persulfate. Examples of the sulfites include sodium sulfite and ammonium sulfite. In order to increase the decomposition rate of the initiator, the combination of the redox initiator may preferably contain a copper salt or an iron salt. An example of the copper salt is copper(II) sulfate and an example of the iron salt is iron(II) sulfate.

Examples of the redox initiator include potassium permanganate/oxalic acid, ammonium persulfate/bisulfite/iron sulfate, manganese triacetate/oxalic acid, ammonium cerium nitrate/oxalic acid, and bromate/bisulfite, and potassium permanganate/oxalic acid is preferred. In the case of using a redox initiator, either an oxidizing agent or a reducing agent may be charged into a polymerization tank in advance, followed by adding the other continuously or intermittently thereto to initiate the polymerization. For example, in the case of using potassium permanganate/oxalic acid, preferably, oxalic acid is charged into a polymerization tank and potassium permanganate is continuously added thereto.

The polymerization initiator may be added in any amount, and the initiator in an amount that does not significantly decrease the polymerization rate (e.g., concentration of several ppm in water) or more may be added at once in the initial stage of polymerization, or may be added successively or continuously. The upper limit thereof falls within a range where the reaction temperature is allowed to increase while the polymerization reaction heat is removed through the device surfaces. The upper limit thereof is more preferably within a range where the polymerization reaction heat can be removed through the device surfaces.

The aqueous medium is a reaction medium in which the polymerization is performed, and means a liquid containing water. The aqueous medium may be any medium containing water, and it may be one containing water and, for example, any of fluorine-free organic solvents such as alcohols, ethers, and ketones, and/or fluorine-containing organic solvents having a boiling point of 40° C. or lower.

In the polymerization, known chain transfer agents, radical scavengers, and decomposers may be added to adjust the polymerization rate and the molecular weight depending on the purpose.

Examples of the chain transfer agent include esters such as dimethyl malonate, diethyl malonate, methyl acetate, ethyl acetate, butyl acetate, and dimethyl succinate, as well as isopentane, methane, ethane, propane, methanol, isopropanol, acetone, various mercaptans, various halogenated hydrocarbons such as carbon tetrachloride, and cyclohexane.

The chain transfer agent to be used may be a bromine compound or an iodine compound. An example of a polymerization method using a bromine compound or an iodine compound is a method of performing polymerization of a fluoromonomer in an aqueous medium substantially in the absence of oxygen and in the presence of a bromine compound or an iodine compound (iodine transfer polymerization). Representative examples of the bromine compound or the iodine compound to be used include compounds represented by the general formula:

$$R^a I_x Br_y$$

wherein x and y are each an integer of 0 to 2 and satisfy $1 \leq x+y \leq 2$; and $R^a$ is a saturated or unsaturated fluorohydrocarbon or chlorofluorohydrocarbon group having 1 to 16 carbon atoms, or a hydrocarbon group having 1 to 3 carbon atoms, each of which optionally contains an oxygen atom. By using a bromine compound or an iodine compound, iodine or bromine is introduced into the polymer, and serves as a crosslinking point.

Examples of the bromine compound or iodine compound include 1,3-diiodoperfluoropropane, 2-iodoperfluoropropane, 1,3-diiodo-2-chloroperfluoropropane, 1,4-diiodoperfluorobutane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane, 1,2-diiodoethane, 1,3-diiodo-n-propane, $CF_2Br_2$, $BrCF_2CF_2Br$, $CF_3CFBrCF_2Br$, $CFClBr_2$, $BrCF_2CFClBr$, $CFBrClCFClBr$, $BrCF_2CF_2CF_2Br$, $BrCF_2CFBrOCF_3$, 1-bromo-2-iodoperfluoroethane, 1-bromo-3-iodoperfluoropropane, 1-bromo-4-iodoperfluorobutane, 2-bromo-3-iodoperfluorobutane, 3-bromo-4-iodoperfluorobutene-1,2-bromo-4-iodoperfluorobutene-1, and a monoiodo- and monobromo-substitution product, diiodo- and monobromo-substitution product, and (2-iodoethyl)- and (2-bromoethyl)-substitution product of benzene. These compounds may be used alone or in any combination.

Of these, 1,4-diiodoperfluorobutane, 1,6-diiodoperfluorohexane, and 2-iodoperfluoropropane are preferably used from the viewpoints of polymerization reactivity, crosslinkability, availability, and the like.

The amount of the chain transfer agent used is usually 1 to 50,000 ppm by mass, preferably 1 to 20,000 ppm by mass, based on the total amount of the fluoromonomer fed.

The chain transfer agent may be added to the reaction vessel at once before initiation of the polymerization, may be added at once after initiation of the polymerization, may be added in multiple portions during the polymerization, or may be added continuously during the polymerization.

The polymerization initiator used may be an organic peroxide such as a persulfate (e.g., ammonium persulfate), disuccinic acid peroxide, or diglutaric acid peroxide alone or in the form of a mixture thereof. An organic peroxide may also be used together with a reducing agent, such as sodium sulfite, to form a redox system. During the polymerization, a radical scavenger such as hydroquinone or catechol may be added, or a decomposer of the peroxide such as ammonium sulfite may be added, to adjust the radical concentration in the system.

In the polymerization, the fluoropolymer may be obtained by polymerizing the fluoromonomer in the aqueous medium in the presence of the polymer (1) to produce an aqueous dispersion of fluoropolymer particles, and by seed-polymerizing the fluoromonomer to the fluoropolymer particles in the aqueous dispersion of the fluoropolymer particles.

The polymerization is preferably one in which the fluoromonomer is polymerized substantially in the absence of a fluorine-containing surfactant (except for the compound having a functional group capable of reacting by radical polymerization and a hydrophilic group).

Conventionally, fluorine-containing surfactants have been used for the polymerization of fluoromonomers in an aqueous medium, but the production method of the present disclosure allows for obtaining a fluoropolymer even without using the fluorine-containing surfactants.

In the present disclosure, the expression "substantially in the absence of a fluorine-containing surfactant" means that the amount of the fluorine-containing surfactant is 10 ppm by mass or less based on the aqueous medium. The amount of the fluorine-containing surfactant based on the aqueous medium is preferably 1 ppm by mass or less, more preferably 100 ppb by mass or less, still more preferably 10 ppb by mass or less, and further preferably 1 ppb by mass or less.

Examples of the fluorine-containing surfactant include anionic fluorine-containing surfactants. The anionic fluorine-containing surfactant may be, for example, a fluorine atom-containing surfactant having 20 or less carbon atoms in total in the portion excluding the anionic group.

The fluorine-containing surfactant may also be a surfactant containing fluorine having a molecular weight of 800 or less in the anionic moiety.

The "anionic moiety" means the portion of the fluorine-containing surfactant excluding the cation. For example, in the case of F(CF$_2$)$_{n1}$COOM represented by the formula (I) described later, the anionic moiety is the "F(CF$_2$)$_{n1}$COO" portion.

Examples of the fluorine-containing surfactant also include fluorine-containing surfactants having a Log POW of 3.5 or less. The Log POW is a partition coefficient between 1-octanol and water, which is represented by Log P (wherein P represents the ratio between the concentration of the fluorine-containing surfactant in octanol and the concentration of the fluorine-containing surfactant in water in a phase-separated octanol/water (1:1) liquid mixture containing the fluorine-containing surfactant).

Log POW is determined as follows. Specifically, HPLC is performed on standard substances (heptanoic acid, octanoic acid, nonanoic acid, and decanoic acid) each having a known octanol/water partition coefficient using TOSOH ODS-120T column (44.6 mm×250 mm, Tosoh Corp.) as a column and acetonitrile/0.6% by mass HClO$_4$ aqueous solution=1/1 (vol/vol %) as an eluent at a flow rate of 1.0 ml/min, a sample amount of 300 μL, and a column temperature of 40° C.; with a detection light of UV 210 nm. For each standard substance, a calibration curve is drawn with respect to the elution time and the known octanol/water partition coefficient. Based on the calibration curve, Log POW is calculated from the elution time of the sample liquid in HPLC.

Specific examples of the fluorine-containing surfactant include those disclosed in U.S. Patent Application Publication No. 2007/0015864, U.S. Patent Application Publication No. 2007/0015865, U.S. Patent Application Publication No. 2007/0015866, and U.S. Patent Application Publication No. 2007/0276103, U.S. Patent Application Publication No. 2007/0117914, U.S. Patent Application Publication No. 2007/142541, U.S. Patent Application Publication No. 2008/0015319, U.S. Pat. Nos. 3,250,808, 3,271,341, Japanese Patent Laid-Open No. 2003-119204, International Publication No. WO2005/042593, International Publication No. WO2008/060461, International Publication No. WO2007/046377, Japanese Patent Laid-Open No. 2007-119526, International Publication No. WO2007/046482, International Publication No. WO2007/046345, U.S. Patent Application Publication No. 2014/0228531, International Publication No. WO2013/189824, and International Publication No. WO2013/189826.

Examples of the anionic fluorine-containing surfactant include a compound represented by the following general formula (N$^0$):

$$X^{n0}—Rf^{n0}—Y^0 \tag{N$^0$}$$

wherein X$^{n0}$ is H, Cl, or F; Rf$^{n0}$ is a linear, branched, or cyclic alkylene group having 3 to 20 carbon atoms in which some or all of H are replaced by F; the alkylene group optionally containing one or more ether bonds in which some of H are replaced by Cl; and Y$^0$ is an anionic group.

The anionic group Y$^0$ may be —COOM, —SO$_2$M, or —SO$_3$M, and may be —COOM or —OS$_3$M.

M is H, a metal atom, NR$^7_4$, imidazolium optionally having a substituent, pyridinium optionally having a substituent, or phosphonium optionally having a substituent, wherein R$^7$ is H or an organic group.

Examples of the metal atom include alkali metals (Group 1) and alkaline earth metals (Group 2), such as Na, K, or Li.

R$^7$ may be H or a C$_{1-10}$ organic group, may be H or a C$_{1-4}$ organic group, and may be H or a C$_{1-4}$ alkyl group.

M may be H, a metal atom, or NR$^7_4$, may be H, an alkali metal (Group 1), an alkaline earth metal (Group 2), or NR$^7_4$, and may be H, Na, K, Li, or NH$_4$.

Rf$^{n0}$ may be one in which 50% or more of H has been replaced by fluorine.

Examples of the compound represented by the general formula (N$^0$) include:

a compound represented by the following general formula (N$^1$):

$$X^{n0}—(CF_2)_{m1}—Y^0 \tag{N$^1$}$$

wherein X$^{n0}$ is H, Cl, and F; m1 is an integer of 3 to 15; and Y$^0$ is as defined above;

a compound represented by the following general formula (N$^2$):

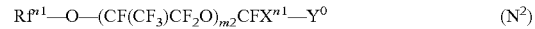

$$Rf^{n1}—O—(CF(CF_3)CF_2O)_{m2}CFX^{n1}—Y^0 \tag{N$^2$}$$

wherein Rf$^{n1}$ is a perfluoroalkyl group having 1 to 5 carbon atoms; m2 is an integer of 0 to 3; X$^{n1}$ is F or CF$_3$; and Y$^0$ is as defined above;

a compound represented by the following general formula (N$^3$):

$$Rf^{n2}(CH_2)_{m3}—(Rf^{n3})_q—Y^0 \tag{N$^3$}$$

wherein Rf$^{n2}$ is a partially or fully fluorinated alkyl group having 1 to 13 carbon atoms and optionally containing an ether bond and/or a chlorine atom; m3 is an integer of 1 to 3; Rf$^{n3}$ is a linear or branched perfluoroalkylene group having 1 to 3 carbon atoms; q is 0 or 1; and Y$^0$ is as defined above;

a compound represented by the following general formula (N$^4$):

$$Rf^{n4}—O—(CY^{n1}Y^{n2})_pCF_2—Y^0 \tag{N$^4$}$$

wherein Rf$^{n4}$ is a linear or branched partially or fully fluorinated alkyl group having 1 to 12 carbon atoms and optionally containing an ether bond; and Y$^{n1}$ and Y$^{n2}$ are the same or different and are each H or F; p is 0 or 1; and Y$^0$ is as defined above; and a compound represented by the general formula (N$^5$):

wherein X$^{n2}$, X$^{n3}$, and X$^{n4}$ may be the same or different and are each H, F, or a linear or branched partially or fully fluorinated alkyl group having 1 to 6 carbon atoms and optionally containing an ether bond; Rf$^{n3}$ is a linear or branched partially or fully fluorinated alkylene group having 1 to 3 carbon atoms and optionally containing an ether bond; L is a linking group; and Y$^0$ is as defined above, with the proviso that the total carbon number of X$^{112}$, X$^{113}$, X$^{114}$, and Rf$^{n5}$ is 18 or less.

More specific examples of the compound represented by the above general formula (N$^0$) include a perfluorocarboxylic acid (I) represented by the following general formula (I), an ω-H perfluorocarboxylic acid (II) represented by the following general formula (II), a perfluoropolyethercarboxylic acid (III) represented by the following general formula (III), a perfluoroalkylalkylenecarboxylic acid (IV) represented by the following general formula (IV), a perfluoroalkoxyfluorocarboxylic acid (V) represented by the following general formula (V), a perfluoroalkylsulfonic acid (VI) represented by the following general formula (VI), an ω-H perfluorosulfonic acid (VII) represented by the following general formula (VII), a perfluoroalkylalkylene sulfonic acid (VIII) represented by the following general formula (VIII), an alkylalkylene carboxylic acid (IX) represented by the following general formula (IX), a fluorocarboxylic acid (X) represented by the following general formula (X), an alkoxyfluorosulfonic acid (XI) represented by the following general formula (XI), a compound (XII) represented by the following general formula (XII), and a compound (XIII) represented by the following general formula (XIII).

The perfluorocarboxylic acid (I) is represented by the following general formula (I):

$$F(CF_2)_{n1}COOM \qquad (I)$$

wherein n1 is an integer of 3 to 14; and M is H, a metal atom, $NR^7_4$, imidazolium optionally having a substituent, pyridinium optionally having a substituent, or phosphonium optionally having a substituent, wherein $R^7$ is H or an organic group.

The ω-H perfluorocarboxylic acid (II) is represented by the following general formula (II):

$$H(CF_2)_{n2}COOM \qquad (II)$$

wherein n2 is an integer of 4 to 15; and M is as defined above.

The perfluoropolyethercarboxylic acid (III) is represented by the following general formula (III):

$$Rf^1-O-(CF(CF_3)CF_2O)_{n3}CF(CF_3)COOM \qquad (III)$$

wherein $Rf^1$ is a perfluoroalkyl group having 1 to 5 carbon atoms; n3 is an integer of 0 to 3; and M is as defined above.

The perfluoroalkylalkylenecarboxylic acid (IV) is represented by the following general formula (IV):

$$Rf^2(CH_2)_{n4}Rf^3COOM \qquad (IV)$$

wherein $Rf^2$ is a perfluoroalkyl group having 1 to 5 carbon atoms; $Rf^3$ is a linear or branched perfluoroalkylene group having 1 to 3 carbon atoms; n4 is an integer of 1 to 3; and M is as defined above.

The alkoxyfluorocarboxylic acid (V) is represented by the following general formula (V):

$$Rf^4-O-CY^1Y^2CF_2-COOM \qquad (V)$$

wherein $Rf^4$ is a linear or branched partially or fully fluorinated alkyl group having 1 to 12 carbon atoms and optionally containing an ether bond and/or a chlorine atom; $Y^1$ and $Y^2$ are the same or different and are each H or F; and M is as defined above.

The perfluoroalkylsulfonic acid (VI) is represented by the following general formula (VI):

$$F(CF_2)_{n5}SO_3M \qquad (VI)$$

wherein n5 is an integer of 3 to 14; and M is as defined above.

The ω-H perfluorosulfonic acid (VII) is represented by the following general formula (VII):

$$H(CF_2)_{n6}SO_3M \qquad (VII)$$

wherein n6 is an integer of 4 to 14; and M is as defined above.

The perfluoroalkylalkylenesulfonic acid (VIII) is represented by the following general formula (VIII):

$$Rf^5(CH_2)_{n7}SO_3M \qquad (VIII)$$

wherein $Rf^5$ is a perfluoroalkyl group having 1 to 13 carbon atoms; n7 is an integer of 1 to 3; and M is as defined above.

The alkylalkylenecarboxylic acid (IX) is represented by the following general formula (IX):

$$Rf^6(CH_2)_{n8}COOM \qquad (IX)$$

wherein $Rf^6$ is a linear or branched partially or fully fluorinated alkyl group having 1 to 13 carbon atoms and optionally containing an ether bond; n8 is an integer of 1 to 3; and M is as defined above.

The fluorocarboxylic acid (X) is represented by the following general formula (X):

$$Rf^7-O-Rf^8-O-CF_2-COOM \qquad (X)$$

wherein $Rf^7$ is a linear or branched partially or fully fluorinated alkyl group having 1 to 6 carbon atoms and optionally containing an ether bond and/or a chlorine atom; $Rf^8$ is a linear or branched partially or fully fluorinated alkyl group having 1 to 6 carbon atoms; and M is as defined above.

The alkoxyfluorosulfonic acid (XI) is represented by the following general formula (XI):

$$Rf^9-O-CY^1Y^2CF_2-SO_3M \qquad (XI)$$

wherein $Rf^9$ is a linear or branched partially or fully fluorinated alkyl group having 1 to 12 carbon atoms and optionally containing an ether bond and optionally containing chlorine; $Y^1$ and $Y^2$ are the same or different and are each H or F; and M is as defined above.

The compound (XII) is represented by the following general formula (XII):

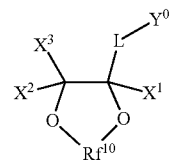

wherein $X^1$, $X^2$, and $X^3$ may be the same or different and are H, F, and a linear or branched partially or fully fluorinated alkyl group having 1 to 6 carbon atoms and optionally containing an ether bond; $Rf^{10}$ is a perfluoroalkylene group having 1 to 3 carbon atoms; L is a linking group; and $Y^0$ is an anionic group.

$Y^0$ may be —COOM, —SO$_2$M, or —SO$_3$M, and may be —SO$_3$M or COOM, where M is as defined above.

Examples of L include a single bond, a partially or fully fluorinated alkylene group having 1 to 10 carbon atoms and optionally containing an ether bond.

The compound (XIII) is represented by the following general formula (XIII):

$$Rf^{11}-O-(CF_2CF(CF_3)O)_{n9}(CF_2O)_{n10}CF_2COOM \qquad (XIII)$$

wherein $Rf^{11}$ is a fluoroalkyl group having 1 to 5 carbon atoms and containing chlorine, n9 is an integer of 0 to 3, n10 is an integer of 0 to 3, and M is as defined above. An example of the compound (XIII) is $CF_2ClO(CF_2CF(CF_3)O)_{n9}(CF_2O)_{n10}CF_2COONH_4$ (a mixture having an average molecular weight of 750, wherein n9 and n10 are as described above).

As mentioned above, examples of the anionic fluorine-containing surfactant include a carboxylic acid-based surfactant and a sulfonic acid-based surfactant.

The fluorine-containing surfactant may be one type of fluorine-containing surfactant or it may be a mixture containing two or more types of fluorine-containing surfactants.

Examples of the fluorine-containing surfactant include compounds represented by the formulas below. The fluorine-containing surfactant may be a mixture of these compounds. In one embodiment of the polymerization, the fluoromonomer is polymerized substantially in the absence of the compounds represented by the following formulas:

F(CF$_2$)$_7$COOM,
F(CF$_2$)$_5$COOM,
H(CF$_2$)$_6$COOM,
CF$_3$O(CF$_2$)$_3$OCHFCF$_2$COOM,
C$_3$F$_7$OCF(CF$_3$)CF$_2$OCF(CF$_3$)COOM,
CF$_3$CF$_2$CF$_2$OCF(CF$_3$)COOM,
CF$_3$CF$_2$OCF$_2$CF$_2$OCF$_2$COOM,
C$_2$F$_5$OCF(CF$_3$)CF$_2$OCF(CF$_3$)COOM,
CF$_3$OCF(CF$_3$)CF$_2$OCF(CF$_3$)COOM,
CF$_2$ClCF$_2$CF$_2$OCF(CF$_3$)CF$_2$OCF$_2$COOM,
CF$_2$ClCF$_2$CF$_2$OCF$_2$CF(CF$_3$)OCF$_2$COOM;
CF$_2$ClCF(CF$_3$)OCF(CF$_3$)CF$_2$OCF$_2$COOM;
CF$_2$ClCF(CF$_3$)OCF$_2$CF(CF$_3$)OCF$_2$COOM; and

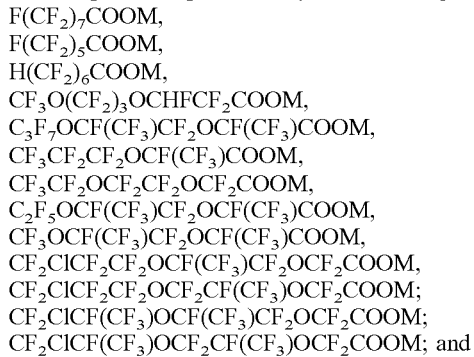

wherein, in each formula, M is H, a metal atom, NR$^7_4$, imidazolium optionally having a substituent, pyridinium optionally having a substituent, or phosphonium optionally having a substituent; and R$^7$ is H or an organic group.

By the polymerization, an aqueous dispersion containing the fluoropolymer can be obtained. The fluoropolymer is usually at a concentration of 8 to 50% by mass in the aqueous dispersion obtained by the polymerization. In the aqueous dispersion, the lower limit of the concentration of the fluoropolymer is preferably 10% by mass, and more preferably 15% by mass, while the upper limit thereof is preferably 40% by mass, and more preferably 35% by mass.

<Fluoropolymer>

Examples of the fluoropolymer include a TFE polymer in which TFE is the monomer having the highest mole fraction (hereinafter, "most abundant monomer") among the monomers in the polymer, a VDF polymer in which VDF is the most abundant monomer, and a CTFE polymer in which CTFE is the most abundant monomer.

It is preferable that the fluoropolymer has an ion exchange rate (IXR) of higher than 53. The preferred fluoropolymer has either no ionic groups at all or a limited number of ionic groups resulting in an ion exchange rate higher than about 100. The preferred ion exchange rate of the fluoropolymer is preferably 1,000 or more, more preferably 2,000 or more, and still more preferably 5,000 or more.

The TFE polymer may suitably be a TFE homopolymer, or may be a copolymer containing (1) TFE, (2) one or two or more fluorine-containing monomers each of which is different from TFE and has 2 to 8 carbon atoms, in particular VDF, HFP, or CTFE, and (3) another monomer. Examples of (3) the another monomer include fluoro(alkyl vinyl ethers) having an alkyl group having 1 to 5 carbon atoms, particularly 1 to 3 carbon atoms; fluorodioxoles; perfluoroalkyl ethylenes; and ω-hydroperfluoroolefins.

The TFE polymer may also be a copolymer of TFE and one or two or more fluorine-free monomers. Examples of the fluorine-free monomers include alkenes such as ethylene and propylene; vinyl esters; and vinyl ethers. The TFE polymer may also be a copolymer of TFE, one or two or more fluorine-containing monomers having 2 to 8 carbon atoms, and one or two or more fluorine-free monomers.

The VDF polymer may suitably be a VDF homopolymer (PVDF), or may be a copolymer containing (1) VDF, (2) one or two or more fluoroolefins each of which is different from VDF and has 2 to 8 carbon atoms, in particular TFE, HFP, or CTFE, and (3) a perfluoro(alkyl vinyl ether) having an alkyl group having 1 to 5 carbon atoms, particularly 1 to 3 carbon atoms, or the like.

The CTFE polymer may suitably be a CTFE homopolymer, or may be a copolymer containing (1) CTFE, (2) one or two or more fluoroolefins each of which is different from CTFE and has 2 to 8 carbon atoms, in particular TFE or HFP, and (3) a perfluoro(alkyl vinyl ether) having an alkyl group having 1 to 5 carbon atoms, particularly 1 to 3 carbon atoms.

The CTFE polymer may also be a copolymer of CTFE and one or two or more fluorine-free monomers, and examples of the fluorine-free monomers include alkenes such as ethylene and propylene; vinyl esters; and vinyl ethers.

The fluoropolymer may be vitreous, plastic, or elastomeric. The fluoropolymer is amorphous or partially crystallized, and may be subjected to compression firing, melt fabrication, or non-melt fabrication.

In the production method of the present disclosure, such as (I) non melt-processible fluororesins, including tetrafluoroethylene polymers (TFE polymers (PTFE)); (II) melt-fabricable fluororesins, including ethylene/TFE copolymers (ETFE), TFE/HFP copolymers (FEP), TFE/perfluoro(alkyl vinyl ether) copolymers (e.g., PFA, MFA), TFE/perfluoroallyl ether copolymers, TFE/VDF copolymers, and electrolyte polymer precursors; and (III) fluoroelastomers, including TFE/propylene copolymers, TFE/propylene/third monomer copolymers (the third monomer may be VDF, HFP, CTFE, fluoroalkyl vinyl ether, or the like), TFE/fluoroalkyl vinyl ether copolymers; HFP/ethylene copolymers, HFP/ethylene/TFE copolymers; PVDF; thermoplastic elastomers such as VDF/HFP copolymers, HFP/ethylene copolymers, and VDF/TFE/HFP copolymers; and fluorine-containing segmented polymers disclosed in Japanese Patent Publication No. 61-49327 can suitably be produced.

The fluoropolymer is preferably a fluororesin, more preferably a fluororesin having a fluorine substitution percentage, calculated by the following formula, of 50% or higher, still more preferably a fluororesin having the fluorine substitution percentage of higher than 50%, further preferably a fluororesin having the fluorine substitution percentage of 55% or higher, further preferably a fluororesin having the fluorine substitution percentage of 60% or higher, further preferably a fluororesin having the fluorine substitution percentage of 75% or higher, particularly preferably a fluororesin having the fluorine substitution percentage of 80% or higher, and most preferably a fluororesin having the fluorine substitution percentage of 90 to 100%, i.e., a perfluororesin.

Fluorine substitution percentage(%)=(number of fluorine atoms bonded to carbon atoms constituting fluoropolymer)/((number of hydrogen atoms bonded to carbon atoms constituting fluoropolymer)+(number of fluorine atoms and chlorine atoms bonded to carbon atoms constituting fluoropolymer))×100    (Formula)

The perfluororesin is more preferably a fluororesin having the fluorine substitution percentage of 95 to 100%, still more preferably PTFE, FEP, or PFA, and particularly preferably PTFE.

The fluoropolymer may have a core-shell structure. An example of the fluoropolymer having a core-shell structure is modified PTFE including a core of high-molecular-weight PTFE and a shell of a lower-molecular-weight PTFE or a modified PTFE in the particle. An example of such modified PTFE is PTFE disclosed in National Publication of International Patent Application No. 2005-527652.

The core-shell structure may have the following structures.

Core: TFE homopolymer Shell: TFE homopolymer
Core: modified PTFE Shell: TFE homopolymer
Core: modified PTFE Shell: modified PTFE
Core: TFE homopolymer Shell: modified PTFE
Core: low-molecular-weight PTFE Shell: high-molecular-weight PTFE
Core: high-molecular-weight PTFE Shell: low-molecular-weight PTFE In the fluoropolymer having the core-shell structure, the lower limit of the proportion of the core is preferably 0.5% by mass, more preferably 1.0% by mass, still more preferably 3.0% by mass, particularly preferably 5.0% by mass, and most preferably 10.0% by mass. The upper limit of the proportion of the core is preferably 99.5% by mass, more preferably 99.0% by mass, still more preferably 98.0% by mass, further preferably 97.0% by mass, particularly preferably 95.0% by mass, and most preferably 90.0% by mass.

In the fluoropolymer having the core-shell structure, the lower limit of the proportion of the shell is preferably 0.5% by mass, more preferably 1.0% by mass, still more preferably 3.0% by mass, particularly preferably 5.0% by mass, and most preferably 10.0% by mass. The upper limit of the proportion of the shell is preferably 99.5% by mass, more preferably 99.0% by mass, still more preferably 98.0% by mass, further preferably 97.0% by mass, particularly preferably 95.0% by mass, and most preferably 90.0% by mass.

In the fluoropolymer having the core-shell structure, the core or the shell may be composed of two or more layers. For example, the fluoropolymer may have a trilayer structure including a core center portion of a modified PTFE, a core outer layer portion of a TFE homopolymer, and a shell of a modified PTFE.

Examples of the fluoropolymer having a core-shell structure also include those in which a single particle of the fluoropolymer has a plurality of cores.

(I) The non melt-processible fluororesins, (II) the melt-fabricable fluororesins, and (III) the fluoroelastomers suitably produced by the production method of the present disclosure are preferably produced in the following manner.

(I) Non Melt-Processible Fluororesins

In the production method of the present disclosure, polymerization of TFE is usually performed at a polymerization temperature of 10 to 150° C. and a polymerization pressure of 0.05 to 5 MPa·G. For example, the polymerization temperature is more preferably 30° C. or higher, and still more preferably 50° C. or higher. Further, the polymerization temperature is more preferably 120° C. or lower, and still more preferably 100° C. or lower. Further, the polymerization pressure is more preferably 0.3 MPa·G or higher, still more preferably 0.5 MPa·G or higher, and more preferably 5.0 MPa·G or lower, still more preferably 3.0 MPa·G or lower. In particular, from the viewpoint of improving the yield of fluoropolymer, the polymerization pressure is preferably 1.0 MPa·G or more, more preferably 1.2 MPa·G or more, still more preferably 1.5 MPa·G or more, and more preferably 2.0 MPa·G or more.

In an embodiment, the polymerization reaction is initiated by charging pure water into a pressure-resistant reaction vessel equipped with a stirrer, deoxidizing the system, charging TFE, increasing the temperature to a predetermined level, and adding a polymerization initiator. When the pressure decreases as the reaction progresses, additional TFE is fed continuously or intermittently to maintain the initial pressure. When the amount of TFE fed reaches a predetermined level, feeding is stopped, and then TFE in the reaction vessel is purged and the temperature is returned to room temperature, whereby the reaction is completed. Additional TFE may be added continuously or intermittently to prevent pressure drop.

In production of the TFE polymer (PTFE), various known modifying monomers may be used in combination. The TFE polymer in the present disclosure is a concept that encompasses not only a TFE homopolymer but also a non melt-processible copolymer of TFE and a modifying monomer (hereinafter, referred to as a "modified PTFE").

The modifying monomer may be any modifying monomer copolymerizable with TFE, and examples thereof include a fluoromonomer and a non-fluoromonomer. Further, one or more kinds of the modifying monomers may be used.

An example of the non-fluoromonomer is, but not limited to, a monomer represented by the general formula:

$$CH_2=CR^{Q1}\text{-}LR^{Q2}$$

wherein $R^{Q1}$ represents a hydrogen atom or an alkyl group; L represents a single bond, —CO—O—*, —O—CO—*, or —O—; * represents a bond position with $R^{Q2}$; and $R^{Q2}$ represents a hydrogen atom, an alkyl group, or a nitrile group.

Examples of the non-fluoromonomer include methyl acrylate, methyl methacrylate, ethyl acrylate, ethyl methacrylate, propyl acrylate, propyl methacrylate, butyl acrylate, butyl methacrylate, hexyl methacrylate, cyclohexyl methacrylate, vinyl methacrylate, vinyl acetate, acrylic acid, methacrylic acid, acrylonitrile, methacrylonitrile, ethyl vinyl ether, and cyclohexyl vinyl ether. Of these, the non-fluoromonomer is preferably butyl methacrylate, vinyl acetate, or acrylic acid.

Examples of the fluoromonomer include perfluoroolefins such as hexafluoropropylene (HFP); hydrogen-containing fluoroolefins such as trifluoroethylene and vinylidene fluoride (VDF); perhaloolefins such as chlorotrifluoroethylene; perfluorovinyl ethers; and (perfluoroalkyl)ethylenes.

Examples of the perfluorovinyl ether include, but are not limited to, a perfluoro unsaturated compound represented by the following general formula (A):

$$CF_2=CF\text{—}ORf \qquad (A)$$

wherein Rf represents a perfluoro organic group. The "perfluoro organic group" in the present disclosure means an organic group in which all hydrogen atoms bonded to the carbon atoms are replaced by fluorine atoms. The perfluoro organic group optionally has ether oxygen.

Examples of the perfluorovinyl ether include perfluoro (alkyl vinyl ether) (PAVE) in which Rf is a perfluoroalkyl group having 1 to 10 carbon atoms in the general formula (A). The perfluoroalkyl group preferably has 1 to 5 carbon atoms.

Examples of the perfluoroalkyl group in PAVE include a perfluoromethyl group, a perfluoroethyl group, a perfluoropropyl group, a perfluorobutyl group, a perfluoropentyl group, and a perfluorohexyl group.

Examples of the perfluorovinyl ether also include:

those represented by the general formula (A) in which Rf is a perfluoro(alkoxyalkyl) group having 4 to 9 carbon atoms;

those in which Rf is a group represented by the following formula:

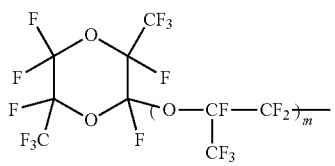

wherein m represents 0 or an integer of 1 to 4; and those in which Rf is a group represented by the following formula:

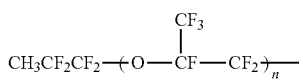

wherein n represents an integer of 1 to 4.

Examples of the hydrogen-containing fluoroolefin include $CH_2=CF_2$, $CFH=CH_2$, $CFH=CF_2$, $CF_2=CFCF_3$, $CH_2=CFCF_3$, $CH_2=CHCF_3$, $CHF=CHCF_3$ (E isomer), and $CHF=CHCF_3$ (Z isomer).

Examples of the (perfluoroalkyl)ethylene (PFAE) include, but are not limited to, (perfluorobutyl)ethylene (PFBE) and (perfluorohexyl)ethylene.

An example of the perfluoroallyl ether is a fluoromonomer represented by the general formula:

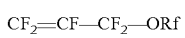

wherein Rf represents a perfluoro organic group.

Rf in the above general formula is the same as Rf in the general formula (A). Rf is preferably a perfluoroalkyl group having 1 to 10 carbon atoms or a perfluoroalkoxyalkyl group having 1 to 10 carbon atoms. The perfluoroallyl ether is preferably at least one selected from the group consisting of $CF_2=CF-CF_2-O-CF_3$, $CF_2=CF-CF_2-O-C_2F_5$, $CF_2=CF-CF_2-O-C_3F_7$, and $CF_2=CF-CF_2-O-C_4F_9$, more preferably at least one selected from the group consisting of $CF_2=CF-CF_2-O-C_2F_5$, $CF_2=CF-CF_2-O-C_3F_7$, and $CF_2=CF-CF_2-O-C_4F_9$, and still more preferably $CF_2=CF-CF_2-O-CF_2CF_2CF_3$.

The modifying monomer is also preferably exemplified by a modifying monomer (3) having a monomer reactivity ratio of 0.1 to 8. The presence of the modifying monomer (3) makes it possible to obtain PTFE particles having a small particle size, and to thereby obtain an aqueous dispersion having high dispersion stability.

Here, the monomer reactivity ratio in copolymerization with TFE is a value obtained by dividing the rate constant in the case that propagating radicals react with TFE by the rate constant in the case that the propagating radicals react with modifying monomers, in the case that the propagating radicals are less than the repeating unit derived from TFE. A smaller monomer reactivity ratio indicates higher reactivity of the modifying monomers with TFE. The monomer reactivity ratio can be determined by copolymerizing TFE with the modifying monomers, determining the compositional features in the polymer formed immediately after initiation, and calculating the monomer reactivity ratio by Fineman-Ross equation.

The copolymerization is performed by, using 3,600 g of deionized degassed water, 1,000 ppm by mass of ammonium perfluorooctanoate based on the water, and 100 g of paraffin wax contained in an autoclave made of stainless steel with an internal volume of 6.0 L at a pressure of 0.78 MPa·G and a temperature of 70° C. A modifying monomer in an amount of 0.05 g, 0.1 g, 0.2 g, 0.5 g, or 1.0 g is added into the reactor, and then 0.072 g of ammonium persulfate (20 ppm by mass based on the water) is added thereto. To maintain the polymerization pressure at 0.78 MPa·G, TFE is continuously fed thereinto. When the charged amount of TFE reaches 1,000 g, stirring is stopped and the pressure is released until the pressure in the reactor decreases to the atmospheric pressure. After cooling, the paraffin wax is separated to obtain an aqueous dispersion containing the produced polymer. The aqueous dispersion is stirred so that the resulting polymer coagulates, and the polymer is dried at 150° C. The compositional features in the resulting polymer are calculated by appropriate combination of NMR, FT-IR, elemental analysis, and X-ray fluorescence analysis depending on the types of the monomers.

The modifying monomer (3) having a monomer reactivity ratio of 0.1 to 8 is preferably at least one selected from the group consisting of modifying monomers represented by the formulas (3a) to (3d):

 (3a)

wherein $Rf^1$ is a perfluoroalkyl group having 1 to 10 carbon atoms;

 (3b)

wherein $Rf^2$ is a perfluoroalkyl group having 1 to 2 carbon atoms;

 (3c)

wherein n is 1 or 2; and

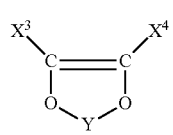 (3d)

wherein $X^3$ and $X^4$ are each F, Cl, or a methoxy group; and Y is represented by the formula Y1 or Y2;

 (Y1)

 (Y2)

in the formula Y2, Z and Z' are each F or a fluorinated alkyl group having 1 to 3 carbon atoms.

The content of the modifying monomer (3) unit is preferably in the range of 0.00001 to 1.0% by mass based on all polymerized units in PTFE. The lower limit thereof is more preferably 0.0001% by mass, more preferably 0.0005% by mass, still more preferably 0.001% by mass, further preferably 0.005% by mass. The upper limit is, in the preferred order, 0.90% by mass, 0.50% by mass, 0.40% by mass, 0.30% by mass, 0.20% by mass, 0.15% by mass, 0.10% by mass, 0.08% by mass, 0.05% by mass, or 0.01% by mass.

The modifying monomer is preferably at least one selected from the group consisting of hexafluoropropylene, chlorotrifluoroethylene, vinylidene fluoride, perfluoro(alkyl vinyl ethers), (perfluoroalkyl)ethylenes, ethylene, and modifying monomers having a functional group capable of reacting by radical polymerization and a hydrophilic group, in view of obtaining an aqueous dispersion with a small average primary particle size of a primary particle, a small aspect ratio of primary particles, and excellent stability. The use of the modifying monomer allows for obtaining an aqueous dispersion of PTFE with a smaller average primary particle size, a small aspect ratio of primary particles, and excellent dispersion stability, and it is possible to obtain aqueous dispersion with a small amount of uncoagulated polymer.

From the viewpoint of reactivity with TFE, the modifying monomer preferably contains at least one selected from the group consisting of hexafluoropropylene, perfluoro(alkyl vinyl ether), and (perfluoroalkyl)ethylene.

More preferably, the modifying monomer contains at least one selected from the group consisting of hexafluoropropylene, perfluoro(methyl vinyl ether), perfluoro(propyl vinyl ether), (perfluorobutyl)ethylene, (perfluorohexyl)ethylene, and (perfluorooctyl)ethylene.

The total amount of the hexafluoropropylene unit, perfluoro(alkyl vinyl ether) unit, and (perfluoroalkyl)ethylene unit is preferably in the range of 0.00001 to 1% by mass based on all polymerized units in PTFE. The lower limit of the total amount thereof is more preferably 0.0001% by mass, more preferably 0.0005% by mass, still more preferably 0.001% by mass, further preferably 0.005% by mass. The upper limit is, in the preferred order, 0.80% by mass, 0.70% by mass, 0.50% by mass, 0.40% by mass, 0.30% by mass, 0.20% by mass, 0.15% by mass, 0.10% by mass, 0.08% by mass, 0.05% by mass, or 0.01% by mass.

The modifying monomer preferably includes a modifying monomer having a functional group capable of reacting by radical polymerization and a hydrophilic group (hereinafter, referred to as a "modifying monomer (A)").

The presence of the modifying monomer (A) makes it possible to obtain PTFE particles having a small primary particle size. Also, the amount of uncoagulated polymer can be reduced. Furthermore, the aspect ratio of the primary particles can be made smaller.

The amount of the modifying monomer (A) used is preferably an amount greater than the amount equivalent to 0.1 ppm by mass of the aqueous medium, more preferably an amount greater than 0.5 ppm by mass, still more preferably an amount greater than 1.0 ppm by mass, further preferably 5 ppm by mass or more, and particularly preferably 10 ppm by mass or more. When the amount of the modifying monomer (A) used is too small, the average primary particle size of PTFE obtained may not be small enough.

The amount of the modifying monomer (A) used may be within the above range, but for example, the upper limit can be set to 5,000 ppm by mass. In the production method, the modifying monomer (A) may also be added into the system during the reaction in order to improve the stability of the aqueous dispersion during or after the reaction.

Since the modifying monomer (A) is highly water-soluble, even if the unreacted modifying monomer (A) remains in the aqueous dispersion, it can be easily removed by the concentration step or the coagulation and washing steps.

The modifying monomer (A) is incorporated in the produced polymer in the process of polymerization, but since the concentration of the modifying monomer (A) in the polymerization system itself is low and the amount incorporated into the polymer is small, there is no problem of the heat resistance of PTFE being degraded or coloring after sintering.

Examples of the hydrophilic group in the modifying monomer (A) include $-NH_2$, $-PO_3M$, $-OPO_3M$, $-SO_3M$, $-OSO_3M$, and $-COOM$, wherein M represents H, a metal atom, $NR^{7y}_4$, imidazolium optionally having a substituent, pyridinium optionally having a substituent, or phosphonium optionally having a substituent, wherein $R^{7y}$ is H or an organic group, and may be the same or different, and any two thereof may be bonded to each other to form a ring. Of these, the hydrophilic group is preferably $-SO_3M$ or $-COOM$. The organic group in $R^{7y}$ is preferably an alkyl group. $R^{7y}$ is preferably H or a $C_{1-10}$ organic group, more preferably H or a $C_{1-4}$ organic group, and still more preferably H or a $C_{1-4}$ alkyl group.

Examples of the metal atom include monovalent and divalent metal atoms, alkali metals (Group 1) and alkaline earth metals (Group 2), and preferred is Na, K, or Li.

Examples of the "functional group capable of reacting by radical polymerization" in the modifying monomer (A) include groups having an ethylenically unsaturated bond, such as a vinyl group or an allyl group. The group having an ethylenically unsaturated bond can be represented by the following formula:

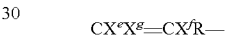

wherein $X^e$, $X^f$, and $X^g$ are each independently F, Cl, H, $CF_3$, $CF_2H$, $CFH_2$, or $CH_3$; and R is a linking group. Examples of the linking group of R include a linking group as $R^a$ described later.

Preferred are groups having an unsaturated bond, such as $-CH=CH_2$, $-CF=CH_2$, $-CH=CF_2$, $-CF=CF_2$, $-CH_2-CH=CH_2$, $-CF_2-CF=CH_2$, $-CF_2-CF=CF_2$, $-(C=O)-CH=CH_2$, $-(C=O)-CF=CH_2$, $-(C=O)-CH=CF_2$, $-(C=O)-CF=CF_2$, $-(C=O)-C(CH_3)=CH_2$, $-(C=O)-C(CF_3)=CH_2$, $-(C=O)-C(CH_3)=CF_2$, $-(C=O)-C(CF_3)=CF_2$, $-O-CH_2-CH=CH_2$, $-O-CF_2-CF=CH_2$, $-O-CH_2-CH=CF_2$, and $-O-CF_2-CF=CF_2$.

Since the modifying monomer (A) has a functional group capable of reacting by radical polymerization, it is presumed that, when used in the polymerization, it reacts with the fluorine-containing monomer in the initial stage of the polymerization reaction to form particles that have a hydrophilic group derived from the modifying monomer (A) and are highly stable. Thus, polymerization in the presence of the modifying monomer (A) is considered to increase the number of particles.

The polymerization may be carried out in the presence of one kind of the modifying monomer (A), or in the presence of two or more kinds thereof.

In the polymerization, a compound having an unsaturated bond can be used as the modifying monomer (A).

The modifying monomer (A) is preferably a compound represented by the general formula (4):

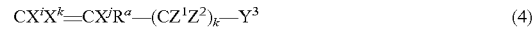
(4)

wherein $X^i$, $X^j$, and $X^k$ are each independently F, Cl, H, or $CF_3$; $Y^3$ is a hydrophilic group; $R^a$ is a linking group; $Z^1$ and $Z^2$ are each independently H, F, or $CF_3$; and k is 0 or 1.

Examples of the hydrophilic group include $-NH_2$, $-PO_3M$, $-OPO_3M$, $-SO_3M$, $-OSO_3M$, and $-COOM$, wherein M represents H, a metal atom, $NR^{7y}_4$, imidazolium optionally having a substituent, pyridinium optionally having a substituent, or phosphonium optionally having a substituent, wherein $R^{7y}$ is H or an organic group, and may be the same or different, and any two thereof may be bonded to each other to form a ring. Of these, the hydrophilic group is preferably —$SO_3M$ or —COOM. The organic group in $R^{7y}$ is preferably an alkyl group. $R^{7y}$ is preferably H or a $C_{1-10}$ organic group, more preferably H or a $C_{1-4}$ organic group, and still more preferably H or a $C_{1-4}$ alkyl group. Examples of the metal atom include monovalent and divalent metal atoms, alkali metals (Group 1) and alkaline earth metals (Group 2), and preferred is Na, K, or Li.

The use of the modifying monomer (A) allows for obtaining an aqueous dispersion having a smaller average primary particle size and superior stability. Also, the aspect ratio of the primary particles can be made smaller.

$R^a$ is a linking group. In the present disclosure, the term "linking group" refers to a divalent linking group. The linking group may be a single bond and preferably contains at least one carbon atom, and the number of carbon atoms may be 2 or more, 4 or more, 8 or more, 10 or more, or 20 or more. The upper limit thereof is not limited, and may be 100 or less, and may be 50 or less, for example.

The linking group may be linear or branched, cyclic or acyclic, saturated or unsaturated, substituted or unsubstituted, and optionally contains one or more heteroatoms selected from the group consisting of sulfur, oxygen, and nitrogen, and optionally contains one or more functional groups selected from the group consisting of esters, amides, sulfonamides, carbonyls, carbonates, urethanes, ureas and carbamates. The linking group may be free from carbon atoms and may be a catenary heteroatom such as oxygen, sulfur, or nitrogen.

$R^a$ is preferably a catenary heteroatom such as oxygen, sulfur, or nitrogen, or a divalent organic group.

When $R^a$ is a divalent organic group, the hydrogen atom bonded to the carbon atom may be replaced by a halogen other than fluorine, such as chlorine, and may or may not contain a double bond. Further, $R^a$ may be linear or branched, and may be cyclic or acyclic. $R^a$ may also contain a functional group (e.g., ester, ether, ketone, amine, halide, etc.).

$R^a$ may also be a fluorine-free divalent organic group or a partially fluorinated or perfluorinated divalent organic group.

$R^a$ may be, for example, a hydrocarbon group in which a fluorine atom is not bonded to a carbon atom, a hydrocarbon group in which some of the hydrogen atoms bonded to a carbon atom are replaced by fluorine atoms, a hydrocarbon group in which all of the hydrogen atoms bonded to the carbon atoms are replaced by fluorine atoms, —(C=O)—, —(C=O)—O—, or a hydrocarbon group containing —(C=O)—, and these groups optionally contain an oxygen atom, optionally contain a double bond, and optionally contain a functional group.

$R^a$ is preferably —(C=O)—, —(C=O)—O—, or a hydrocarbon group having 1 to 100 carbon atoms that optionally contains an ether bond and optionally contains a carbonyl group, wherein some or all of the hydrogen atoms bonded to the carbon atoms in the hydrocarbon group may be replaced by fluorine.

$R^a$ is preferably at least one selected from —$(CH_2)_a$—, —$(CF_2)_a$—, —O—$(CF_2)_a$—, —$(CF_2)_a$—O—$(CF_2)_b$—, —O$(CF_2)_a$—O—$(CF_2)_b$—, —$(CF_2)_a$—[O—$(CF_2)_b]_c$—, —O$(CF_2)_a$—[O—$(CF_2)_b]_c$—, —[$(CF_2)_a$—O]$_b$—[$(CF_2)_c$—O]$_d$—, —O[$(CF_2)_a$—O]$_b$—[$(CF_2)_c$—O]$_d$—, —O—[$CF_2CF(CF_3)O]_a$—$(CF_2)_b$—, —(C=O)—, —(C=O)—O—, —(C=O)—$(CH_2)_a$—, —(C=P)—$(CF_2)_a$—, —(C=O)—O—$(CH_2)_a$—, —(C=O)—O—$(CF_2)_a$—, —(C=O)—[$(CH_2)_a$—O]$_b$—, —(C=O)—[$(CF_2)_a$—O]$_b$—, —(C=O)—O[$(CH_2)_a$—O]$_b$—, —(C=O)—O[$(CF_2)_a$—O]$_b$—, —(C=O)—O[$(CH_2)_a$—O]$_b$—$(CH_2)_c$—, —(C=O)—O[$(CF_2)_a$—O]$_b$—$(CF_2)_c$—, —(C=O)—$(CH_2)_a$—O—$(CH_2)_b$—, —(C=O)—$(CF_2)_a$—O—$(CF_2)_b$—, —(C=O)—O—$(CH_2)_a$—O—$(CH_2)_b$—, —(C=O)—O—$(CF_2)_a$—O—$(CF_2)_b$—, —(C=O)—O—$C_6H_4$—, and combinations thereof.

In the formula, a, b, c, and d are independently at least 1 or more. a, b, c and d may independently be 2 or more, 3 or more, 4 or more, 10 or more, or 20 or more. The upper limits of a, b, c, and d are 100, for example.

Specific examples suitable for $R^a$ include —$CF_2$—O—, —$CF_2$—O—$CF_2$—, —$CF_2$—O—$CH_2$—, —$CF_2$—O—$CH_2CF_2$—, —$CF_2$—O—$CF_2CF_2$—, —$CF_2$—O—$CF_2CH_2$—, —$CF_2$—O—$CF_2CF_2CH_2$—, —$CF_2$—O—$CF(CF_3)$—, —$CF_2$—O—$CF(CF_3)CF_2$—, —$CF_2$—O—$CF(CF_3)CF_2$—O—, —$CF_2$—O—$CF(CF_3)CH_2$—, —(C=O)—, —(C=O)—O, —(C=O)—$(CH_2)$—, —(C=O)—$(CF_2)$—, —(C=O)—O—$(CH_2)$—, —(C=O)—O—$(CF_2)$—, —(C=O)—[$(CH_2)_2$—O]$_n$—, —(C=O)—[$(CF_2)_2$—O]$_n$—, —(C=O)—O[$(CH_2)_2$—O]$_n$—, —(C=O)—O[$(CF_2)_2$—O]$_n$—, —(C=O)—O[$(CH_2)_2$—O]$_n$—$(CH_2)$—, —(C=O)—O[$(CF_2)_2$—O]$_n$—$(CF_2)$—, —(C=O)—$(CH_2)_2$—O—$(CH_2)$—, —(C=O)—$(CF_2)_2$—O—$(CF_2)$—, —(C=O)—O—$(CH_2)_2$—O—$(CH_2)$—, —(C=O)—O—$(CF_2)_2$—O—$(CF_2)$—, and —(C=O)—O—$C_6H_4$—. In particular, preferred for $R^a$ among these is —$CF_2$—O—, —$CF_2$—O—$CF_2$—, —$CF_2$—O—$CF_2CF_2$—, —$CF_2$—O—$CF(CF_3)$—, —$CF_2$—O—$CF(CF_3)CF_2$—, —$CF_2$—O—$CF(CF_3)CF_2$—O—, —(C=O)—O—(C=O)—O—, —(C=O)—$(CH_2)$—, —(C=O)—O—$(CH_2)$—, —(C=O)—O[$(CH_2)_2$—O]$_n$—, —(C=O)—O[$(CH_2)_2$—O]$_n$—$(CH_2)$—, —(C=O)—$(CH_2)_2$—O—$(CH_2)$—, or —(C=O)—O—$C_6H_4$—.

In the formula, n is an integer of 1 to 10.

—$R^a$—$(CZ^1Z^2)_k$— in the general formula (4) is preferably —$CF_2$—O—$CF_2$—, —$CF_2$—O—$CF(CF_3)$—, —$CF_2$—O—$C(CF_3)_2$—, —$CF_2$—O—$CF_2$—$CF_2$—, —$CF_2$—O—$CF_2$—$CF(CF_3)$—, —$CF_2$—O—$CF_2$—C$(CF_3)_2$—, —$CF_2$—O—$CF_2CF_2$—$CF_2$—, —$CF_2$—O—$CF_2CF_2$—$CF(CF_3)$—, —$CF_2$—O—$CF_2CF_2$—$C(CF_3)_2$—, —$CF_2$—O—$CF(CF_3)$—$CF_2$—, —$CF_2$—O—$CF(CF_3)$—$CF(CF_3)$—$CF_2$—O—$CF(CF_3)$—$C(CF_3)_2$—, —$CF_2$—O—$CF(CF_3)$—$CF(CF_3)$—, —$CF_2$—O—$CF(CF_3)$—$(CF_3)_2$—, —$CF_2$—O—$CF(CF_3)$ $CF_2$—$CF_2$—, —$CF_2$—O—$CF(CF_3)CF_2$—$CF(CF_3)$—, —$CF_2$—O—$CF(CF_3)CF_2$—$C(CF_3)_2$—, —$CF_2$—O—$CF(CF_3)CF_2$—O—$CF_2$—, —$CF_2$—O—$CF(CF_3)CF_2$—O—$CF(CF_3)$—, —$CF_2$—O—$CF(CF_3)CF_2$—O—$C(CF_3)_2$—, —(C=O)—, —(C=O)—O—, —(C=O)—$(CH_2)$—, —(C=O)—$(CF_2)$—, —(C=O)—O—$(CH_2)$—, —(C=O)—O—$(CF_2)$—, —(C=O)—[$(CH_2)_2$—O]$_n$—$(CH_2)$—, —(C=O)—[$(CF_2)_2$—O]$_n$—$(CF_2)$—, —(C=O)—[$(CH_2)_2$—O]$_n$—$(CH_2)$—$(CH_2)$—, —(C=O)—[$(CF_2)_2$—O]$_n$—$(CF_2)$—$(CF_2)$—, —(C=O)—O[$(CH_2)_2$—O]$_n$—$(CH_2)$—, —(C=O)—O[$(CF_2)_2$—O]$_n$—$(CF_2)$—, —(C=O)—O[$(CH_2)_2$—O]$_n$—$(CH_2)$—$(CH_2)$—, —(C=O)—O[$(CF_2)_2$—O]$_n$—$(CF_2)$—$(CF_2)$—, —(C=O)—$(CH_2)_2$—O—$(CH_2)$—$(CH_2)$—, —(C=O)—$(CF_2)_2$—O—$(CF_2)$—$(CF_2)$—, —(C=O)—O—$(CH_2)_2$—O—$(CH_2)_2$—O—$(CH_2)$—$(CH_2)$—, —(C=O)—O—$(CH_2)_2$—O—$(CH_2)_2$—$(CF_2)$—$(CF_2)$—, —(C=O)—O—$(CF_2)_2$—O—$(CF_2)_2$—C$(CF_3)_2$—, (CF₃)₂—, or —(C═O)—O—C₆H₄—C(CF₃)₂—, and is more preferably —CF₂—O—CF(CF₃)—, —CF₂—O—CF₂—CF(CF₃)—, —CF₂—O—CF₂CF₂—CF(CF₃)—, —CF₂—O—CF(CF₃)—CF(CF₃)—, —CF₂—O—CF(CF₃)CF₂—CF(CF₃)—, —CF₂—O—CF(CF₃)CF₂—O—CF(CF₃)—, —(C═O)—, —(C═O)—O—(CH₂)—, —(C═O)—O—(CH₂)—(CH₂)—, —(C═O)—O[(CH₂)₂—O]ₙ—(CH₂)—(CH₂)—, —(C═O)—O—(CH₂)₂—O—(CH₂)₂—C(CF₃)₂—, or —(C═O)—O—C₆H₄—C(CF₃)₂—.

In the formula, n is an integer of 1 to 10.

Specific examples of the compound represented by the general formula (4) include compounds represented by the following formulas:

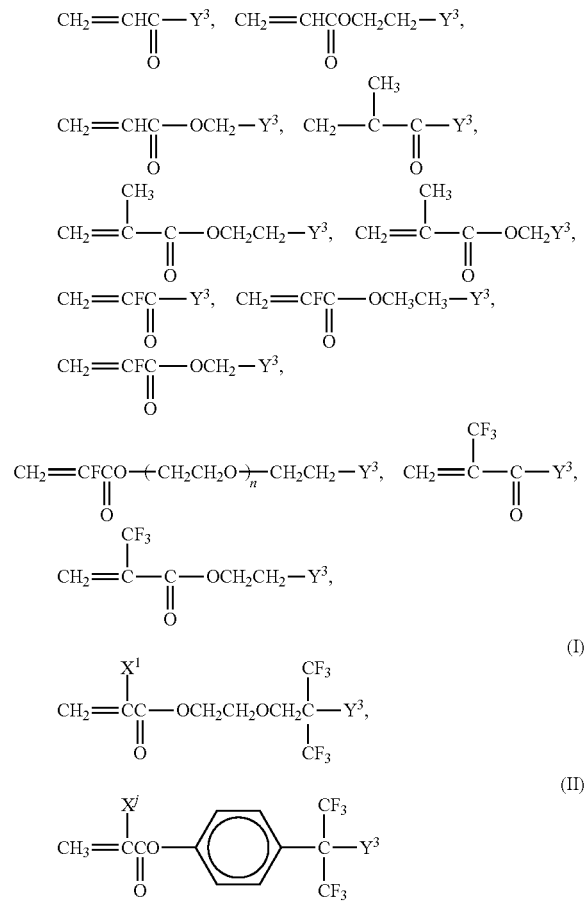

wherein $X^j$ and $Y^3$ are as described above; and n is an integer of 1 to 10.

$R^a$ is preferably a divalent group represented by the general formula (r1):

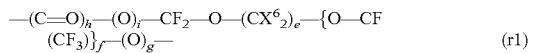

wherein $X^6$ is each independently H, F, or $CF_3$; e is an integer of 0 to 3; f is an integer of 0 to 3; g is 0 or 1; h is 0 or 1; and i is 0 or 1, and is also preferably a divalent group represented by the general formula (r2):

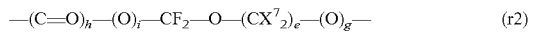

wherein $X^7$ is each independently H, F, or $CF_3$; e is an integer of 0 to 3; g is 0 or 1; h is 0 or 1; and i is 0 or 1.

$—R^a—(CZ^1Z^2)_k—$ in the general formula (4) is also preferably a divalent group represented by the following formula (t1):

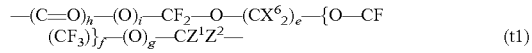

wherein $X^6$ is each independently H, F, or $CF_3$; e is an integer of 0 to 3; f is an integer of 0 to 3; g is 0 or 1; h is 0 or 1; i is 0 or 1; and $Z^1$ and $Z^2$ are each independently F or $CF_3$, and is more preferably a group in which one of $Z^1$ and $Z^2$ is F and the other is $CF_3$ in the formula (t1).

Also, in the general formula (4), $—R^a—(CZ^1Z^2)_k—$ is preferably a divalent group represented by the following formula (t2):

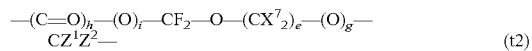

wherein $X^7$ is each independently H, F, or $CF_3$; e is an integer of 0 to 3; g is 0 or 1; h is 0 or 1; i is 0 or 1; and $Z^1$ and $Z^2$ are each independently F, or $CF_3$, and is more preferably a group in which one of $Z^1$ and $Z^2$ is F and the other is $CF_3$ in the formula (t2).

The compound represented by the general formula (4) also preferably has a C—F bond and does not have a C—H bond, in the portion excluding the hydrophilic group ($Y^3$). In other words, in the general formula (4), $X^i$, $X^j$, and $X^k$ are all F, and $R^a$ is preferably a perfluoroalkylene group having 1 or more carbon atoms; the perfluoroalkylene group may be either linear or branched, may be either cyclic or acyclic, and may contain at least one catenary heteroatom. The perfluoroalkylene group may have 2 to 20 carbon atoms or 4 to 18 carbon atoms.

The compound represented by the general formula (4) may be partially fluorinated. In other words, the compound represented by the general formula (4) also preferably has at least one hydrogen atom bonded to a carbon atom and at least one fluorine atom bonded to a carbon atom, in the portion excluding the hydrophilic group ($Y^3$).

The compound represented by the general formula (4) is also preferably a compound represented by the following formula (4a):

wherein $Y^3$ is a hydrophilic group; and $Rf^0$ is a perfluorinated divalent linking group which is perfluorinated and may be a linear or branched, cyclic or acyclic, saturated or unsaturated, substituted or unsubstituted, and optionally contains one or more heteroatoms selected from the group consisting of sulfur, oxygen, and nitrogen.

The compound represented by the general formula (4) is also preferably a compound represented by the following formula (4b):

wherein $Y^3$ is a hydrophilic group; and $Rf^0$ is a perfluorinated divalent linking group as defined in the formula (4a).

In the general formula (4), $Y^3$ is preferably $—OSO_3M$. Examples of the compound represented by the general formula (4) when $Y^3$ is $—OSO_3M$ include $CF_2$═CF(OCF₂CF₂CH₂OSO₃M), $CH_2$═CH((CF₂)₄CH₂OSO₃M), $CF_2$═CF(O(CF₂)₄CH₂OSO₃M), $CF_2$═CF(OCF₂CF(CF₃)CH₂OSO₃M), $CF_2$═CF(OCF₂CF(CF₃)OCF₂CF₂CH₂OSO₃M), $CH_2$═CH((CF₂)₄CH₂OSO₃M), $CF_2$═CF(OCF₂CF₂SO₂N(CH₃)CH₂CH₂OSO₃M), $CH_2$═CH(CF₂CF₂CH₂OSO₃M), and $CF_2$═CF(OCF₂CF₂CF₂CF₂SO₂N(CH₃)CH₂CH₂OSO₃M). In the formula, M is as described above.

In the general formula (4), $Y^3$ is preferably —$SO_3M$. Examples of the compound represented by the general formula (4) when $Y^3$ is —$SO_3M$ include $CF_2$=CF($OCF_2CF_2SO_3M$), $CF_2$=CF(O($CF_2$)$_4SO_3M$), $CF_2$=CF($OCF_2CF(CF_3)SO_3M$), $CF_2$=CF($OCF_2CF(CF_3)OCF_2CF_2SO_3M$), $CH_2$=CH($CF_2CF_2SO_3M$), $CF_2$=CF($OCF_2CF(CF_3)OCF_2CF_2CF_2SO_3M$), $CH_2$=CH(($CF_2$)$_4SO_3M$), and $CH_2$=CH(($CF_2$)$_3SO_3M$). In the formula, M is as described above.

In the general formula (4), $Y^3$ is preferably —COOM. Examples of the compound represented by the general formula (4) when $Y^3$ is —COOM include $CF_2$=CF($OCF_2CF_2COOM$), $CF_2$=CF($OCF_2CF_2CF_2COOM$), $CF_2$=CF(O($CF_2$)$_5COOM$), $CF_2$=CF($OCF_2CF(CF_3)COOM$), $CF_2$=CF($OCF_2CF(CF_3)O(CF_2)_nCOOM$) (n is greater than 1), $CH_2$=CH(($CF_2$)$_4COOM$), $CH_2$=CH($CF_2CF_2COOM$), $CH_2$=CH(($CF_2$)$_3COOM$), $CF_2$=CF($OCF_2SO_2NR'CH_2COOM$), $CF_2$=CF(O($CF_2$)$_4SO_2NR'CH_2COOM$), $CF_2$=CF($OCF_2CF(CF_3)SO_2NR'CH_2COOM$), $CF_2$=CF($OCF_2CF(CF_3)OCF_2CF_2SO_2NR'CH_2COOM$), $CF_2$=CF($OCF_2CF(CF_3)OCF_2CF_2CF_2SO_2NR'CH_2COOM$), $CH_2$=CH(($CF_2$)$_4SO_2NR'CH_2COOM$), and $CH_2$=CH(($CF_2$)$_3SO_2NR'CH_2COOM$). In the formula, R' is H or a $C_{1-4}$ alkyl group, and M is as described above.

In the general formula (4), $Y^3$ is preferably —$OPO_3M$ or —OP(O)(OM)$_2$. Examples of the compound represented by the general formula (4) when $Y^3$ is —$OPO_3M$ or —OP(O)(OM)$_2$ include $CF_2$=CF($OCF_2CF_2CH_2OP(O)(OM)_2$), $CF_2$=CF(O($CF_2$)$_4CH_2OP(O)(OM)_2$), $CF_2$=CF($OCF_2CF(CF_3)CH_2OP(O)(OM)_2$), $CF_2$=CF($OCF_2CF(CF_3)OCF_2CF_2CH_2OP(O)(OM)_2$), $CF_2$=CF($OCF_2CF_2SO_2N(CH_3)CH_2CH_2OP(O)(OM)_2$), $CF_2$=CF($OCF_2CF_2CF_2CF_2SO_2N(CH_3)CH_2CH_2OP(O)(OM)_2$), $CH_2$=CH($CF_2CF_2CH_2OP(O)(OM)_2$), $CH_2$=CH(($CF_2$)$_4CH_2OP(O)(OM)_2$), and $CH_2$=CH(($CF_2$)$_3CH_2OP(O)(OM)_2$). In the formula, M is as described above.

In the general formula (4), $Y^3$ is preferably —$PO_3M$ or —P(O)(OM)$_2$. Examples of the compound represented by the general formula (4) when $Y^3$ is —$PO_3M$ or —P(O)(OM)$_2$ include $CF_2$=CF($OCF_2CF_2P(O)(OM)_2$), $CF_2$=CF(O($CF_2$)$_4P(O)(OM)_2$), $CF_2$=CF($OCF_2CF(CF_3)P(O)(OM)_2$), $CF_2$=CF($OCF_2CF(CF_3)OCF_2CF_2P(O)(OM)_2$), $CH_2$=CH($CF_2CF_2P(O)(OM)_2$), $CH_2$=CH(($CF_2$)$_4P(O)(OM)_2$), and $CH_2$=CH(($CF_2$)$_3P(O)(OM)_2$), wherein M is as described above.

The compound represented by the general formula (4) is preferably at least one selected from the group consisting of:

a compound represented by the general formula (5):

$$CX_2=CY(-CZ_2-O-Rf-Y^3) \quad (5)$$

wherein X is the same or different and is —H or —F; Y is —H, —F, an alkyl group, or a fluorine-containing alkyl group; Z is the same or different and —H, —F, an alkyl group, or a fluorine-containing alkyl group; Rf is a fluorine-containing alkylene group having 1 to 40 carbon atoms or a fluorine-containing alkylene group having 2 to 100 carbon atoms and having an ether bond; and $Y^3$ is as described above;

a compound represented by the general formula (6):

$$CX_2=CY(-O-Rf-Y^3) \quad (6)$$

wherein X is the same or different and is —H or —F; Y is —H, —F, an alkyl group, or a fluorine-containing alkyl group; Rf is a fluorine-containing alkylene group having 1 to 40 carbon atoms or a fluorine-containing alkylene group having 2 to 100 carbon atoms and having an ether bond; and $Y^3$ is as described above; and a compound represented by the general formula (7):

$$CX_2=CY(-Rf-Y^3) \quad (7)$$

wherein X is the same or different and is —H or —F; Y is —H, —F, an alkyl group, or a fluorine-containing alkyl group; Rf is a fluorine-containing alkylene group having 1 to 40 carbon atoms or a fluorine-containing alkylene group having 2 to 100 carbon atoms and having an ether bond; and $Y^3$ is as described above.

The fluorine-containing alkylene group having 2 to 100 carbon atoms and having an ether bond is an alkylene group which does not include a structure in which an oxygen atom is an end and contains an ether bond between carbon atoms.

In the general formula (5), each X is —H or —F. X may be both —F, or at least one thereof may be —H. For example, one thereof may be —F and the other may be —H, or both may be —H.

In the general formula (5), Y is —H, —F, an alkyl group, or a fluorine-containing alkyl group.

The alkyl group is an alkyl group free from fluorine atoms and may have one or more carbon atoms. The alkyl group preferably has 6 or less carbon atoms, more preferably 4 or less carbon atoms, and still more preferably 3 or less carbon atoms.

The fluorine-containing alkyl group is an alkyl group containing at least one fluorine atom, and may have one or more carbon atoms. The fluorine-containing alkyl group preferably has 6 or less carbon atoms, more preferably 4 or less carbon atoms, and still more preferably 3 or less carbon atoms.

Y is preferably —H, —F, or —$CF_3$, and more preferably —F.

In the general formula (5), Z is the same or different and is —H, —F, an alkyl group, or a fluoroalkyl group.

The alkyl group is an alkyl group free from fluorine atoms and may have one or more carbon atoms. The alkyl group preferably has 6 or less carbon atoms, more preferably 4 or less carbon atoms, and still more preferably 3 or less carbon atoms.

The fluorine-containing alkyl group is an alkyl group containing at least one fluorine atom, and may have one or more carbon atoms. The fluorine-containing alkyl group preferably has 6 or less carbon atoms, more preferably 4 or less carbon atoms, and still more preferably 3 or less carbon atoms.

Z is preferably —H, —F, or —$CF_3$, and more preferably —F.

In the general formula (5), at least one of X, Y, and Z preferably contains a fluorine atom. For example, X, Y, and Z may be —H, —F, and —F, respectively.

In the general formula (5), Rf is a fluorine-containing alkylene group having 1 to 40 carbon atoms or a fluorine-containing alkylene group having 2 to 100 carbon atoms and having an ether bond.

The fluorine-containing alkylene group preferably has 2 or more carbon atoms. The fluorine-containing alkylene group also preferably has 30 or less carbon atoms, more preferably 20 or less carbon atoms, and still more preferably 10 or less carbon atoms. Examples of the fluorine-containing alkylene group include —$CF_2$—, —$CH_2CF_2$—, —$CF_2CF_2$—, —$CF_2CH_2$—, —$CF_2CF_2CH_2$—, —CF($CF_3$)—, —CF($CF_3$)$CF_2$—, and —CF($CF_3$)$CH_2$—. The fluorine-containing alkylene group is preferably a perfluoroalkylene group.

The fluorine-containing alkylene group having an ether bond preferably has 3 or more carbon atoms. The fluorine-containing alkylene group having an ether bond preferably has 60 or less carbon atoms, more preferably 30 or less carbon atoms, and still more preferably 12 or less carbon atoms.

It is also preferable that the fluorine-containing alkylene group having an ether bond is a divalent group represented by the following formula:

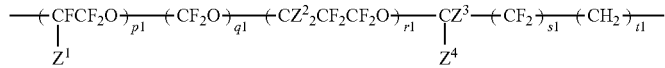

wherein $Z^1$ is F or $CF_3$; $Z^2$ and $Z^3$ are each H or F; $Z^4$ is H, F, or $CF_3$; $p1+q1+r1$ is an integer of 1 to 10; s1 is 0 or 1; and t1 is an integer of 0 to 5.

Specific examples of the fluorine-containing alkylene group having an ether bond include $-CF(CF_3)CF_2-O-CF(CF_3)-$, $-(CF(CF_3)CF_2-O)_n-CF(CF_3)-$ (where n is an integer of 1 to 10), $-CF(CF_3)CF_2-O-CF(CF_3)CH_2-$, $-(CF(CF_3)CF_2-O)_n-CF(CF_3)CH_2-$ (where n is an integer of 1 to 10), $-CH_2CF_2CF_2O-CH_2CF_2CH_2-$, $-CF_2CF_2CF_2O-CF_2CF_2-$, $-CF_2CF_2CF_2O-CF_2CF_2CH_2-$, $-CF_2CF_2O-CF_2-$, and $-CF_2CF_2O-CF_2CH_2-$.

The fluorine-containing alkylene group having an ether bond is preferably a perfluoroalkylene group.

In the general formula (5), $Y^3$ is preferably $-COOM$, $-SO_3M$, or $-OSO_3M$, wherein M is H, a metal atom, $NR^{7y}_4$, imidazolium optionally having a substituent, pyridinium optionally having a substituent, or phosphonium optionally having a substituent, wherein $R^{7y}$ is H or an organic group, and may be the same or different, and any two thereof may be bonded to each other to form a ring.

The organic group in $R^{7y}$ is preferably an alkyl group.

$R^{7y}$ is preferably H or a $C_{1-10}$ organic group, more preferably H or a $C_{1-4}$ organic group, and still more preferably H or a $C_{1-4}$ alkyl group.

Examples of the metal atom include alkali metals (Group 1) and alkaline earth metals (Group 2), and preferred is Na, K, or Li.

M is preferably $-H$, a metal atom, or $-NR^7_4$, more preferably $-H$, an alkali metal (Group 1), an alkaline earth metal (Group 2), or $-NR^7_4$, still more preferably $-H$, $-Na$, $-K$, $-Li$, or $-NH_4$, further preferably $-H$, $-Na$, $-K$, or $-NH_4$, particularly preferably $-H$, $-Na$ or $-NH_4$, and most preferably $-H$, or $-NH_4$.

$Y^3$ is preferably $-COOM$ or $-SO_3M$, and more preferably $-COOM$.

The compound represented by the general formula (5) is preferably a compound (5a) represented by the general formula (5a):

$$CH_2=CF(-CF_2-O-Rf-Y^3) \quad (5a)$$

wherein Rf and $Y^3$ are as described above.

Specific examples of the compound represented by the general formula (5a) include a compound represented by the following formula:

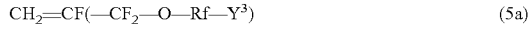

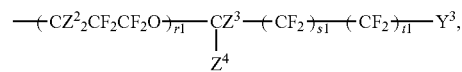

wherein $Z^1$ is F or $CF_3$; $Z^2$ and $Z^3$ are each H or F; $Z^4$ is H, F, or $CF_3$; $p1+q1+r1$ is an integer of 0 to 10; s1 is 0 or 1; t1 is an integer of 0 to 5; and $Y^3$ is as described above, with the proviso that when $Z^3$ and $Z^4$ are both H, $p1+q1+r1+s1$ is not 0. More specific preferred examples thereof include:

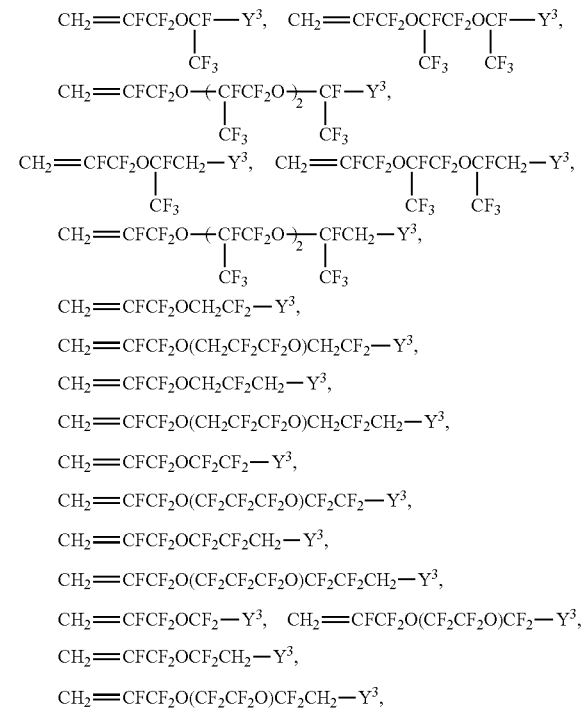

Of these, preferred are:

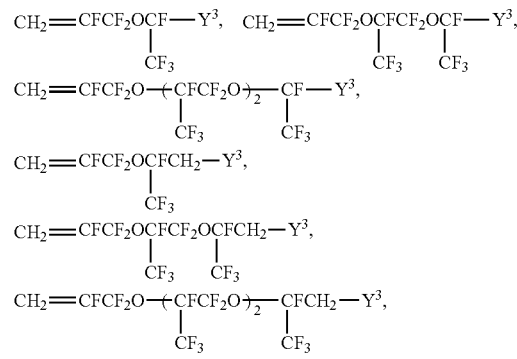

In the compound represented by the general formula (5a), $Y^3$ in the formula (5a) is preferably —COOM. Specifically, the compound represented by the general formula (5a) is preferably at least one selected from the group consisting of $CH_2=CFCF_2OCF(CF_3)COOM$ and $CH_2=CFCF_2OCF(CF_3)CF_2OCF(CF_3)COOM$ (wherein M is as defined above), and more preferably $CH_2=CFCF_2OCF(CF_3)COOM$.

The compound represented by the general formula (5) is preferably a compound (5b) represented by the general formula (5b):

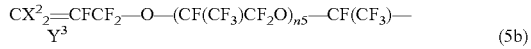
(5b)

wherein each $X^2$ is the same, and each represent F or H; n5 represents 0 or an integer of 1 to 10; and $Y^3$ is as defined above.

In the formula (5b), n5 is preferably 0 or an integer of 1 to 5, more preferably 0, 1, or 2, and still more preferably 0 or 1 from the viewpoint of stability of the resulting aqueous dispersion. $Y^3$ is preferably —COOM from the viewpoint of obtaining appropriate water-solubility and stability of the aqueous dispersion, and M is preferably H or $NH_4$ from the viewpoint of being less likely to remain as impurities and improving the heat resistance of the resulting molded body.

Examples of the compound represented by the formula (5b) include $CH_2=CFCF_2OCF(CF_3)COOM$ and $CH_2=CFCF_2OCF(CF_3)CF_2OCF(CF_3)COOM$, wherein M is as defined above.

Examples of the compound represented by the general formula (5) further include a compound represented by the general formula (5c):

(5c)

wherein Rf and $Y^3$ are as described above.
More specific examples thereof include:

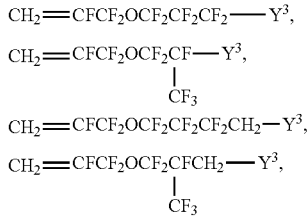

In the general formula (6), each X is —H or —F. X may be both —F, or at least one thereof may be —H. For example, one thereof may be —F and the other may be —H, or both may be —H.

In the general formula (6), Y is —H, —F, an alkyl group, or a fluorine-containing alkyl group.

The alkyl group is an alkyl group free from fluorine atoms and may have one or more carbon atoms. The alkyl group preferably has 6 or less carbon atoms, more preferably 4 or less carbon atoms, and still more preferably 3 or less carbon atoms.

The fluorine-containing alkyl group is an alkyl group containing at least one fluorine atom, and may have one or more carbon atoms. The fluorine-containing alkyl group preferably has 6 or less carbon atoms, more preferably 4 or less carbon atoms, and still more preferably 3 or less carbon atoms.

Y is preferably —H, —F, or —$CF_3$, and more preferably —F.

In the general formula (6), at least one of X and Y preferably contains a fluorine atom. For example, X, Y, and Z may be —H, —F, and —F, respectively.

In the general formula (6), Rf is a fluorine-containing alkylene group having 1 to 40 carbon atoms or a fluorine-containing alkylene group having 2 to 100 carbon atoms and having an ether bond.

The fluorine-containing alkylene group preferably has 2 or more carbon atoms. The fluorine-containing alkylene group also preferably has 30 or less carbon atoms, more preferably 20 or less carbon atoms, and still more preferably 10 or less carbon atoms. Examples of the fluorine-containing alkylene group include —$CF_2$—, —$CH_2CF_2$—, —$CF_2CF_2$—, —$CF_2CH_2$—, —$CF_2CF_2CH_2$—, —$CF(CF_3)$—, —$CF(CF_3)CF_2$—, and —$CF(CF_3)CH_2$—. The fluorine-containing alkylene group is preferably a perfluoroalkylene group.

In the general formula (6), $Y^3$ is preferably —COOM, —$SO_3M$, or —$OSO_3M$, wherein M is H, a metal atom, $NR^{7y}_4$, imidazolium optionally having a substituent, pyridinium optionally having a substituent, or phosphonium optionally having a substituent, where $R^{7y}$ is H or an organic group, and may be the same or different, and any two thereof may be bonded to each other to form a ring.

The organic group of $R^{7y}$ is preferably an alkyl group. $R^{7y}$ is preferably H or a $C_{1-10}$ organic group, more preferably H or a $C_{1-4}$ organic group, and still more preferably H or a $C_{1-4}$ alkyl group.

Examples of the metal atom include alkali metals (Group 1) and alkaline earth metals (Group 2), and preferred is Na, K, or Li.

M is preferably —H, a metal atom, or —$NR^7_4$, more preferably —H, an alkali metal (Group 1), an alkaline earth metal (Group 2), or —$NR^7_4$, still more preferably —H, —Na, —K, —Li, or —$NH_4$, further preferably —H, —Na, —K, or —$NH_4$, particularly preferably —H, —Na or —$NH_4$, and most preferably —H, or —$NH_4$.

$Y^3$ is preferably —COOM or —$SO_3M$, and more preferably —COOM.

The compound represented by the general formula (6) is preferably at least one selected from the group consisting of compounds represented by the general formulas (6a), (6b), (6c), (6d), and (6e):

(6a)

wherein n1 represents an integer of 1 to 10, and $Y^3$ is as defined above.

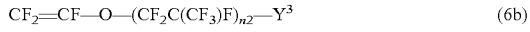
(6b)

wherein n2 represents an integer of 1 to 5, and $Y^3$ is as defined above;

(6c)

wherein $X^1$ represents F or $CF_3$; n3 represents an integer of 1 to 10; and $Y^3$ is as defined above; and

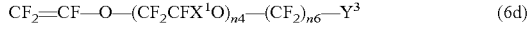
(6d)

wherein n4 represents an integer of 1 to 10, n6 represents an integer of 1 to 3, and $Y^3$ and $X^1$ are as defined above; and

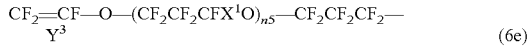
(6e)

wherein n5 represents an integer of 0 to 10, and $Y^3$ and $X^1$ are as defined above.

In the formula (6a), n1 is preferably an integer of 5 or less, and more preferably an integer of 2 or less. $Y^3$ is preferably —COOM from the viewpoint of obtaining appropriate water-solubility and stability of the aqueous dispersion, and M is preferably H or NH$_4$ from the viewpoint of being less likely to remain as impurities and improving the heat resistance of the resulting molded body.

Examples of the compound represented by the formula (6a) include CF$_2$=CF—O—CF$_2$COOM, CF$_2$=CF(OCF$_2$CF$_2$COOM), CF$_2$=CF(OCF$_2$CF$_2$CF$_2$COOM), and CF$_2$=CF(OCF$_2$CF$_2$SO$_3$M), wherein M is as defined above.

In the formula (6b), n2 is preferably an integer of 3 or less from the viewpoint of stability of the resulting aqueous dispersion, Y$^3$ is preferably —COOM from the viewpoint of obtaining appropriate water-solubility and stability of the aqueous dispersion, and M is preferably H or NH$_4$ from the viewpoint of being less likely to remain as impurities and improving the heat resistance of the resulting molded body.

In the formula (6c), n3 is preferably an integer of 5 or less from the viewpoint of water-solubility, Y$^3$ is preferably —COOM from the viewpoint of obtaining appropriate water-solubility and stability of the aqueous dispersion, and M is preferably H or NH$_4$ from the viewpoint of improving dispersion stability.

In the formula (6d), X$^1$ is preferably —CF$_3$ from the viewpoint of stability of the aqueous dispersion, n4 is preferably an integer of 5 or less from the viewpoint of water-solubility, Y$^3$ is preferably —COOM from the viewpoint of obtaining appropriate water-solubility and stability of the aqueous dispersion, and M is preferably H or NH$_4$.

Examples of the compound represented by the formula (6d) include CF$_2$=CFOCF$_2$CF(CF$_3$)OCF$_2$CF$_2$COOM, CF$_2$=CFOCF$_2$CF(CF$_3$)OCF$_2$COOM, and CF$_2$=CFOCF$_2$CF(CF$_3$)OCF$_2$CF$_2$CF$_2$COOM, wherein M represents H, NH$_4$, or an alkali metal.

In the general formula (6e), n5 is preferably an integer of 5 or less from the viewpoint of water-solubility, Y$^3$ is preferably —COOM from the viewpoint of obtaining appropriate water-solubility and stability of the aqueous dispersion, and M is preferably H or NH$_4$.

An example of the compound represented by the general formula (6e) is CF$_2$=CFOCF$_2$CF$_2$CF$_2$COOM, wherein M represents H, NH$_4$, or an alkali metal.

In the general formula (7), Rf is preferably a fluorine-containing alkylene group having 1 to 40 carbon atoms. In the general formula (7), at least one of X and Y preferably contains a fluorine atom.

The compound represented by the general formula (7) is preferably at least one selected from the group consisting of:
a compound represented by the general formula (7a):

CF$_2$=CF—(CF$_2$)$_{n1}$—Y$^3$ (7a)

wherein n1 represents an integer of 1 to 10; and Y$^3$ is as defined above; and
a compound represented by the general formula (7b):

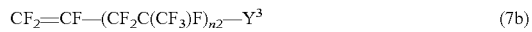

CF$_2$=CF—(CF$_2$C(CF$_3$)F)$_{n2}$—Y$^3$ (7b)

wherein n2 represents an integer of 1 to 5; and Y$^3$ is as defined above.

Y$^3$ is preferably —SO$_3$M or —COOM, and M is preferably H, a metal atom, NR$^{7y}_4$, imidazolium optionally having a substituent, pyridinium optionally having a substituent, or phosphonium optionally having a substituent. R$^{7y}$ represents H or an organic group.

In the formula (7a), n1 is preferably an integer of 5 or less, and more preferably an integer of 2 or less. Y$^3$ is preferably —COOM from the viewpoint of obtaining appropriate water-solubility and stability of the aqueous dispersion, and M is preferably H or NH$_4$ from the viewpoint of being less likely to remain as impurities and improving the heat resistance of the resulting molded body.

Examples of the compound represented by the formula (7a) include CF$_2$=CFCF$_2$COOM, wherein M is as defined above.

In the formula (7b), n2 is preferably an integer of 3 or less from the viewpoint of stability of the resulting aqueous dispersion, Y$^3$ is preferably —COOM from the viewpoint of obtaining appropriate water-solubility and stability of the aqueous dispersion, and M is preferably H or NH$_4$ from the viewpoint of being less likely to remain as impurities and improving the heat resistance of the resulting molded body.

The modifying monomer preferably includes the modifying monomer (A), preferably includes at least one selected from the group consisting of compounds represented by the general formula (5a), the general formula (5c), the general formula (6a), the general formula (6b), the general formula (6c), and the general formula (6d), and more preferably includes the compound represented by the general formula (5a) or the general formula (5c).

When the modifying monomer (A) is used as the modifying monomer, the content of the modifying monomer (A) unit is preferably in the range of 0.00001 to 1.0% by mass based on all polymerized units in the TFE polymer (PTFE). The lower limit thereof is more preferably 0.0001% by mass, more preferably 0.0005% by mass, still more preferably 0.001% by mass, and further preferably 0.005% by mass. The upper limit is, in the preferred order, 0.90% by mass, 0.50% by mass, 0.40% by mass, 0.30% by mass, 0.20% by mass, 0.15% by mass, 0.10% by mass, 0.08% by mass, 0.05% by mass, or 0.01% by mass.

In production of the TFE polymer, the polymer (1) can be used within the use range described for the production method of the present disclosure. The concentration of the polymer (1) is not limited as long as it is within the above range. Too large an amount of the polymer (1) added causes generation of needle-shaped particles having a large aspect ratio and gelling of the aqueous dispersion, impairing the stability. The lower limit of the amount of the polymer (1) used is preferably 0.0001% by mass, more preferably 0.001% by mass, still more preferably 0.01% by mass, and particularly preferably 0.02% by mass, based on the aqueous medium. The upper limit of the amount of the polymer (1) used is preferably 10% by mass and more preferably 5% by mass, based on the aqueous medium.

The polymer (1) may be added to the reaction vessel at once before initiation of the polymerization, may be added at once after initiation of the polymerization, may be added in multiple portions during the polymerization, or may be added continuously during the polymerization.

In production of the TFE polymer, the polymerization initiator used may be an organic peroxide such as a persulfate (e.g., ammonium persulfate), disuccinic acid peroxide, or diglutaric acid peroxide alone or in the form of a mixture thereof. An organic peroxide may be used together with a reducing agent such as sodium sulfite to form a redox system. Further, during the polymerization, a radical scavenger such as hydroquinone or catechol may be added or a decomposer for peroxides such as ammonium sulfite may be added to adjust the radical concentration in the system.

The redox polymerization initiator is preferably a redox initiator obtained by combining an oxidizing agent and a reducing agent. Examples of the oxidizing agent include persulfates, organic peroxides, potassium permanganate, manganese triacetate, and ammonium cerium nitrate. Examples of the reducing agent include sulfites, bisulfites, bromates, diimines, and oxalic acid. Examples of the persulfates include ammonium persulfate and potassium persulfate. Examples of the sulfites include sodium sulfite and ammonium sulfite. In order to increase the decomposition rate of the initiator, the combination of the redox initiator may preferably contain a copper salt or an iron salt. An example of the copper salt is copper(II) sulfate and an example of the iron salt is iron(II) sulfate.

Examples of the redox initiator include potassium permanganate/oxalic acid, ammonium persulfate/bisulfite/iron sulfate, manganese triacetate/oxalic acid, ammonium cerium nitrate/oxalic acid, and bromate/bisulfite, and potassium permanganate/oxalic acid is preferred. In the case of using a redox initiator, either an oxidizing agent or a reducing agent may be charged into a polymerization tank in advance, followed by adding the other continuously or intermittently thereto to initiate the polymerization. For example, in the case of potassium permanganate/oxalic acid, preferably, oxalic acid is charged into a polymerization tank and potassium permanganate is continuously added thereto.

In the production of the TFE polymer, a known chain transfer agent may be used. Examples thereof include saturated hydrocarbons such as methane, ethane, propane, and butane, halogenated hydrocarbons such as chloromethane, dichloromethane, and difluoroethane, alcohols such as methanol, ethanol, and isopropanol, and hydrogen. The chain transfer agent is preferably one in a gas state at a normal temperature and normal pressure.

The amount of the chain transfer agent used is usually 1 to 10,000 ppm by mass, preferably 1 to 5,000 ppm by mass, based on the total amount of TFE fed.

In production of the TFE polymer, a saturated hydrocarbon that is substantially inert to the reaction, that is in a liquid state under the reaction conditions, and that has 12 or more carbon atoms may be used as a dispersion stabilizer for the reaction system in an amount of 2 to 10 parts by mass based on 100 parts by mass of the aqueous medium. Ammonium carbonate, ammonium phosphate, or the like may be added as a buffer to adjust the pH during the reaction.

At completion of the polymerization of TFE, an aqueous dispersion having a solid concentration of 1.0 to 70% by mass and an average primary particle size of 50 to 500 nm can be obtained.

The lower limit of the solid concentration is preferably 5% by mass and more preferably 8% by mass. The upper limit thereof may be, but is not limited to, 40% by mass or 35% by mass.

The lower limit of the average primary particle size is preferably 100 nm and more preferably 150 nm. The upper limit thereof is preferably 400 nm and more preferably 350 nm.

The average primary particle size can be measured by dynamic light scattering. The average primary particle size may be measured by preparing an aqueous dispersion with a solid concentration being adjusted to 1.0% by mass and using dynamic light scattering at 25° C. with 70 measurement processes, wherein the solvent (water) has a refractive index of 1.3328 and the solvent (water) has a viscosity of 0.8878 mPa·s. For the dynamic light scattering, ELSZ-1000S (manufactured by Otsuka Electronics Co., Ltd.) may be used, for example.

Fine powder can be produced by coagulating the aqueous dispersion. The aqueous dispersion of the TFE polymer can be formed into fine powder through coagulation, washing, and drying. The resulting fine powder may be used for various applications. Coagulation of the aqueous dispersion of the TFE polymer is usually performed by diluting the aqueous dispersion obtained by polymerization of polymer latex, for example, with water to a polymer concentration of 5 to 20% by mass, optionally adjusting the pH to a neutral or alkaline, and stirring the polymer more vigorously than during the reaction in a vessel equipped with a stirrer. The coagulation may be performed under stirring while adding a water-soluble organic compound such as methanol or acetone, an inorganic salt such as potassium nitrate or ammonium carbonate, or an inorganic acid such as hydrochloric acid, sulfuric acid, or nitric acid as a coagulating agent. The coagulation may be continuously performed using a device such as an inline mixer.

From the viewpoint of productivity, the concentration of the non-agglomerated TFE polymer in the discharge water generated by the agglomeration is preferably low, more preferably less than 0.4% by mass, and particularly preferably less than 0.3% by mass.

Pigment-containing or filler-containing TFE polymer fine powder in which pigments and fillers are uniformly mixed can be obtained by adding pigments for coloring and various fillers for improving mechanical properties before or during the coagulation.

The wet powder obtained by coagulating the TFE polymer in the aqueous dispersion is usually dried by means of vacuum, high-frequency waves, hot air, or the like while keeping the wet powder in a state in which the wet powder is less fluidized, preferably in a stationary state. Friction between the powder particles especially at high temperature usually has unfavorable effects on the TFE polymer in the form of fine powder. This is because the particles made of such a TFE polymer are easily formed into fibrils even with a small shearing force and lose its original, stable particulate structure.

The drying is performed at a drying temperature of 10 to 300° C., preferably 100 to 300° C.

The resulting fine powder of the TFE polymer is preferred for molding, and suitable applications thereof include tubes for hydraulic systems or fuel systems of aircraft or automobiles, flexible hoses for chemicals or vapors, and electric wire coating.

The aqueous dispersion of the TFE polymer obtained by the polymerization is preferably mixed with a nonionic surfactant to stabilize and further concentrate the aqueous dispersion, and then further mixed with, depending on its purpose, an organic or inorganic filler to form a composition and used in a variety of applications. The composition, when applied to a metal or ceramic substrate, can provide a coating surface having non-stickiness, a low coefficient of friction, and excellent gloss, smoothness, abrasion resistance, weather resistance, and heat resistance, which is suitable for coating of rolls and cooking utensils and impregnation of glass cloth.

The aqueous dispersion may also be used to prepare an organosol of the TFE polymer. The organosol may contain the TFE polymer and an organic solvent, and examples of the organic solvent include ether-based solvents, ketone-based solvents, alcohol-based solvents, amide-based solvents, ester-based solvents, aliphatic hydrocarbon-based solvents, aromatic hydrocarbon-based solvents, and halogenated hydrocarbon-based solvents. Preferably used are N-methyl-2-pyrrolidone and dimethylacetamide. The organosol may be prepared by the method disclosed in International Publication No. WO2012/002038, for example.

The aqueous dispersion of the TFE polymer or the fine powder of the TFE polymer is also preferably used as a processing aid. When used as a processing aid, the aqueous dispersion or the fine powder is mixed with a host polymer, for example, to improve the melt strength of the host polymer in melt fabrication and to improve the mechanical strength, electric properties, incombustibility, anti-drop performance during combustion, and slidability of the resulting polymer.

The aqueous dispersion of the TFE polymer or the fine powder of the TFE polymer is also preferably used as a binder for batteries or used for dustproof applications.

The aqueous dispersion of the TFE polymer or the fine powder of the TFE polymer is also preferably combined with a resin other than the TFE polymer to form a processing aid before use. The aqueous dispersion or fine powder is suitable as a raw material of the PTFEs disclosed in, for example, Japanese Patent Laid-Open No. 11-49912, U.S. Pat. No. 5,804,654, Japanese Patent Laid-Open No. 11-29679, and Japanese Patent Laid-Open No. 2003-2980. Processing aids containing the aqueous dispersion or the fine powder are not inferior in any way to the processing aids disclosed in the publications.

The aqueous dispersion of the TFE polymer is also preferably mixed with an aqueous dispersion of a melt-fabricable fluororesin so that the components coagulate to form co-coagulated powder. The co-coagulated powder is suitable as a processing aid.

Examples of the melt-fabricable fluororesin include FEP, PFA, TFE/perfluoroallyl ether copolymers, ETFE, and ethylene/TFE/HFP copolymers (EFEP), of which FEP is preferred.

The aqueous dispersion also preferably contains a melt-fabricable fluororesin. Examples of the melt-fabricable fabricable fluororesin include FEP, PFA, TFE/perfluoroallyl ether copolymers, ETFE, and EFEP. The aqueous dispersion containing the melt-fabricable fluororesin may be used as a coating material. The melt-fabricable fluororesin enables sufficient fusion of the TFE polymer particles, improving the film-formability and providing the resulting film with gloss.

The fluorine-free resin to which the co-coagulated powder is added may be in the form of powder, pellets, or emulsion. In order to achieve sufficient mixing of the resins, the addition is preferably performed by a known method such as extrusion kneading or roll kneading under a shearing force.

The aqueous dispersion of the TFE polymer is also preferably used as a dust suppression treatment agent. The dust suppression treatment agent may be used in a method for suppressing dust from a dust-generating substance by mixing the dust suppression treatment agent with the dust-generating substance and subjecting the mixture to a compression-shear action at a temperature of 20 to 200° C. to fibrillate the TFE polymer, for example, methods disclosed in Japanese Patent No. 2,827,152 and Japanese Patent No. 2,538,783.

The aqueous dispersion of the TFE polymer can suitably be used for the dust suppression treatment agent composition disclosed in International Publication No. WO2007/004250, and can also suitably be used for the method of dust suppression treatment disclosed in International Publication No. WO2007/000812.

The dust control treatment agent is suitably used for dust suppression treatment in the fields of building-products, soil stabilizers, solidifying materials, fertilizers, landfill of incineration ash and harmful substance, and explosion proof equipment, cosmetics, and sands for pet excretion represented by cat sand.

The aqueous dispersion of the TFE polymer is also preferably used as a material for producing TFE polymer fibers by a dispersion spinning method. The dispersion spinning method is a method in which the aqueous dispersion of the TFE polymer and an aqueous dispersion of a matrix polymer are mixed and the mixture is extruded to form an intermediate fiber structure, and then the intermediate fiber structure is fired to decompose the matrix polymer and sinter the TFE polymer particles, thereby providing TFE polymer fibers.

The high-molecular-weight PTFE powder obtained by polymerization has stretchability and non melt processability, and is also useful as a material for a stretched body (porous body).

When the stretched body is in the form of a film (PTFE stretched film or PTFE porous film), the stretched body can be formed by stretching by a known PTFE stretching method. Stretching allows easy formation of fibrils of PTFE, resulting in a high-molecular-weight PTFE porous body (film) including nodes and fibers.

Preferably, roll-stretching a sheet-shaped or rod-shaped paste extrudate in an extruding direction can provide a uniaxially stretched film.

Further stretching in a transverse direction using a tenter, for example, can provide a biaxially stretched film.

Prebaking treatment is also preferably performed before stretching.

This PTFE stretched body is a porous body having a high porosity, and can suitably be used as a filter material for a variety of microfiltration filters such as air filters and chemical filters and a support member for polymer electrolyte films.

The PTFE stretched body is also useful as a material of products used in the fields of textiles, of medical treatment, of electrochemistry, of sealants, of air filters, of ventilation/internal pressure adjustment, of liquid filters, and of consumer goods.

The following provides examples of specific applications.

Electrochemical Field

Examples of the applications in this field include prepregs for dielectric materials, EMI-shielding materials, and heat conductive materials. More specifically, examples thereof include printed circuit boards, electromagnetic interference shielding materials, insulating heat conductive materials, and insulating materials.

Sealant Field

Examples of the applications in this field include gaskets, packings, pump diaphragms, pump tubes, and sealants for aircraft.

Air Filter Field

Examples of the applications in this field include ULPA filters (for production of semiconductors), HEPA filters (for hospitals and for production of semiconductors), cylindrical cartridge filters (for industries), bag filters (for industries), heat-resistant bag filters (for exhaust gas treatment), heat-resistant pleated filters (for exhaust gas treatment), SINBRAN filters (for industries), catalyst filters (for exhaust gas treatment), adsorbent-attached filters (for HDD embedment), adsorbent-attached vent filters (for HDD embedment), vent filters (for HDD embedment, for example), filters for cleaners (for cleaners), general-purpose multilayer felt materials, cartridge filters for GT (for interchangeable items for GT), and cooling filters (for housings of electronic devices).

Ventilation/Internal Pressure Adjustment Field

Examples of the applications in this field include materials for freeze drying such as vessels for freeze drying, ventilation materials for automobiles for electronic circuits and lamps, applications relating to vessels such as vessel caps, protective ventilation for electronic devices, including small devices such as tablet terminals and mobile phone terminals, and ventilation for medical treatment.

Liquid Filter Field

Examples of the applications in this field include liquid filters for semiconductors (for production of semiconductors), hydrophilic PTFE filters (for production of semiconductors), filters for chemicals (for chemical treatment), filters for pure water production lines (for production of pure water), and back-washing liquid filters (for treatment of industrial discharge water).

Consumer Goods Field

Examples of the applications in this field include clothes, cable guides (movable wires for motorcycles), clothes for motor cyclists, cast liners (medical supporters), filters for cleaners, bagpipes (musical instrument), cables (signal cables for guitars, etc.), and strings (for string instrument).

Textile Field

Examples of the applications in this field include PTFE fibers (fiber materials), machine threads (textiles), weaving yarns (textiles), and ropes.

Medical Treatment Field

Examples of the applications in this field include implants (stretched articles), artificial blood vessels, catheters, general surgical operations (tissue reinforcing materials), products for head and neck (dura mater alternatives), oral health (tissue regenerative medicine), and orthopedics (bandages).

By the production method of the present disclosure, a low-molecular-weight PTFE may also be produced.

The low-molecular-weight PTFE may be produced by polymerization, or may be produced by reducing the molecular weight of a high-molecular-weight PTFE obtained by polymerization by a known method (e.g., thermolysis, radiolysis).

A low-molecular-weight PTFE having a molecular weight of 600,000 or less (also referred to as PTFE micropowder) has excellent chemical stability and a very low surface energy, and is less likely to generate fibrils, and is therefore suitably used as an additive for improving the lubricity and the texture of the coating surface in production of plastics, inks, cosmetics, coating materials, greases, parts of office automation equipment, and toners (e.g., see Japanese Patent Laid-Open No. 10-147617).

A low-molecular-weight PTFE may also be obtained by dispersing a polymerization initiator and the polymer (1) in an aqueous medium in the presence of a chain transfer agent, and then polymerizing TFE alone or TFE and a monomer copolymerizable with TFE.

In the case of using the low-molecular-weight PTFE obtained by the polymerization in the form of powder, the powder particles may be obtained by coagulating the aqueous dispersion.

The high-molecular-weight PTFE as used herein means a non melt-processible and fibrillatable PTFE. The low-molecular-weight PTFE as used herein means a melt-fabricable and non-fibrillatable PTFE.

The term "non melt-processible" means a feature of polymer that the melt flow rate thereof cannot be measured at a temperature higher than the crystal melting point in conformity with ASTM D 1238 and D 2116.

The presence or absence of the fibrillation ability can be determined by "paste extrusion", a representative method of molding a "high-molecular-weight PTFE powder" which is a powder of a TFE polymer. Usually, the high-molecular-weight PTFE can be paste-extruded when it is fibrillatable. When a non-fired molded product obtained by paste extrusion shows substantially no strength or elongation (for example, when it shows an elongation of 0% and is broken when stretched), it can be regarded as non-fibrillatable.

The high-molecular-weight PTFE preferably has a standard specific gravity (SSG) of 2.130 to 2.280. The standard specific gravity is determined by the water replacement method in conformity with ASTM D-792 using a sample molded in conformity with ASTM D4895-89. The "high-molecular-weight" as used herein means that the standard specific gravity is within the above range.

The low-molecular-weight PTFE has a complex viscosity (melt viscosity) at 340° C. of $1 \times 10^2$ to $7 \times 10^3$ Pa·s. The "low-molecular-weight" as used herein means that the complex viscosity is within the above range.

The high-molecular-weight PTFE has a complex viscosity (melt viscosity) significantly higher than that of the low-molecular-weight PTFE, and the complex viscosity thereof is difficult to measure accurately. The complex viscosity of the low-molecular-weight PTFE is measurable, but the low-molecular-weight PTFE has difficulty in providing a molded article to be used in measurement of the standard specific gravity. Thus, it is difficult to measure its accurate standard specific gravity. Accordingly, in the present disclosure, the standard specific gravity is used as an index of the molecular weight of the high-molecular-weight PTFE, while the complex viscosity is used as an index of the molecular weight of the low-molecular-weight PTFE. It should be noted that there is no known measuring method for directly specifying the molecular weight of either the high-molecular-weight PTFE or the low-molecular-weight PTFE.

The high-molecular-weight PTFE preferably has a peak temperature of 333 to 347° C., more preferably 335 to 345° C. The low-molecular-weight PTFE preferably has a peak temperature of 322 to 333° C., more preferably 324 to 332° C. The peak temperature can be specified as the temperature corresponding to the maximum value appearing in the differential thermal (DTA) curve obtained by increasing the temperature of PTFE without a history of being heated to a temperature of 300° C. or higher at 10° C./min using TG/DTA (simultaneous thermogravimetric analyzer).

Preferably, the high-molecular-weight PTFE has at least one endothermic peak in a range of 333 to 347° C. on a heat-of-fusion curve with a temperature-increasing rate of 10° C./min using a differential scanning calorimeter (DSC) for a PTFE which has never been heated up to 300° C. or higher, and has an enthalpy of fusion of 62 mJ/mg or higher at 290 to 350° C. calculated from the heat-of-fusion curve.

The PTFE fine powder obtained by the above may also be used to produce unsintered tape (green tape).

(II) Melt-Fabricable Fluororesins (1) In a production method of the present disclosure, the polymerization for FEP is preferably performed at a polymerization temperature of 10 to 150° C. and a polymerization pressure of 0.3 to 6.0 MPa·G.

FEP preferably has a monomer composition ratio (% by mass) of TFE:HFP=(60 to 95):(5 to 40), more preferably (85 to 92):(8 to 15). The FEP may be modified with a perfluoro (alkyl vinyl ether) as a third component within a range of 0.1 to 2% by mass of all monomers.

In the polymerization for the FEP, the polymer (1) can be used within the use range of the production method of the present disclosure, and is usually added in an amount of 0.0001 to 10% by mass based on 100% by mass of the aqueous medium.

In the polymerization for FEP, the chain transfer agent used is preferably cyclohexane, methanol, ethanol, propanol, ethane, propane, butane, pentane, hexane, carbon tetrachloride, chloroform, methylene chloride, methyl chloride, or the like, and the pH buffer used is preferably ammonium carbonate, disodium hydrogen phosphate, or the like.

In the production method of the present disclosure, the aqueous dispersion of FEP obtained may optionally be subjected to post-treatment such as concentration, and then the concentrate may be dried and powdered, and the powder may be melt-extruded into pellets. The aqueous medium in the FEP aqueous dispersion may optionally contain an additive such as a nonionic surfactant and may contain a water-soluble organic solvent such as a water-soluble alcohol or may be free from a water-soluble organic solvent.

The melt extrusion may be performed under any appropriately set extrusion conditions usually capable of providing pellets.

In the first production method of the present disclosure, the obtained FEP may contain an end group such as —$CF_3$ or —$CF_2H$ on at least one of the polymer main chain and a polymer side chain, but it is preferable that the content of thermally unstable groups such as —COOH, —$CH_2OH$, —COF, —CF=CF—, —$CONH_2$, or —$COOCH_3$ (hereinafter, referred to as an "unstable end group") is low or absent.

The unstable end group is chemically unstable, and thus not only reduces the heat resistance of the resin but also causes increase in the attenuation of the resulting electric wire.

The production method of the present disclosure is preferably performed in such a way that a polymer in which the total number of unstable end groups and —$CF_2H$ end groups at the completion of the polymerization is 50 or less per $1 \times 10^6$ carbon atoms is produced. The number of such groups is more preferably less than 20, still more preferably 5 or less, per $1 \times 10^6$ carbon atoms. There may also be neither unstable end groups nor —$CF_2H$ end groups, i.e. all end groups may be —$CF_3$ end groups.

The unstable end groups and the —$CF_2H$ end groups may be fluorinated and converted into the —$CF_3$ end groups and thereby stabilized. Examples of the fluorination method include, but not limited to, methods of exposing the polymer to a fluorine radical source that generates fluorine radicals under fluorination conditions. Examples of the fluorine radical source include fluorine gas, $CoF_3$, $AgF_2$, $UF_6$, $OF_2$, $N_2F_2$, $CF_3OF$, and halogen fluorides such as $IF_5$ and $ClF_3$. Of these, preferred is a method of bringing fluorine gas and the FEP obtained by the production method of the present disclosure into direct contact with each other. In order to control the reaction, the contact is preferably performed using a diluted fluorine gas having a fluorine gas concentration of 10 to 50% by mass. The diluted fluorine gas is obtainable by diluting fluorine gas with an inert gas such as nitrogen gas or argon gas. The fluorine gas treatment may be performed at a temperature of 100 to 250° C. The treatment temperature is not limited to this range and may be appropriately set in accordance with the situation. The fluorine gas treatment is preferably performed by feeding a diluted fluorine gas into the reactor continuously or intermittently. This fluorination may be performed on dry powder after the polymerization or on melt-extruded pellets.

The FEP obtained by the production method of the present disclosure has good moldability and is less likely to cause molding defects, as well as has properties such as heat resistance, chemical resistance, solvent resistance, insulation, and electric properties.

The FEP powder may be produced by a method of drying the FEP obtained by the above-mentioned production method of the present disclosure to powder the FEP.

The powder may be fluorinated. The fluorinated powder may be produced by a method of feeding a fluorine gas to the powder obtained by the above-described method for producing a powder to fluorinate the powder to obtain a fluorinated powder.

The FEP pellets may be produced by a method of pelletizing FEP obtained by the above-mentioned production method of the present disclosure.

The pellets may be fluorinated. The fluorinated pellets may be produced by a method of feeding a fluorine gas to the pellets obtained by the above-described method for producing pellets to fluorinate the pellets to obtain fluorinated pellets.

Thus, this FEP may be used in production of a variety of molded articles such as coating materials for electric wires, foamed electric wires, cables, and wires, tubes, films, sheets, and filaments.

(2) In the production method of the present disclosure, the polymerization for a TFE/perfluoro(alkyl vinyl ether) copolymer such as PFA or MFA and a TFE/perfluoroallyl ether copolymer is usually preferably carried out at a polymerization temperature of 10 to 100° C. and a polymerization pressure of 0.3 to 6.0 MPa·G.

The TFE/perfluoro(alkyl vinyl ether) copolymer preferably has a monomer composition ratio (mol %) of TFE: perfluoro(alkyl vinyl ether)=(90 to 99.7):(0.3 to 10), more preferably (97 to 99):(1 to 3). The perfluoro(alkyl vinyl ether) used is preferably one represented by the formula: $CF_2$=$CFORf^4$, wherein $Rf^4$ is a perfluoroalkyl group having 1 to 6 carbon atoms.

The TFE/perfluoroallyl ether copolymer preferably has a monomer composition ratio (mol %) of TFE:perfluoroallyl ether=(90 to 99.7):(0.3 to 10), more preferably (97 to 99):(1 to 3). The perfluoroallyl ether used is preferably one represented by the formula: $CF_2$=$CFCF_2ORf^4$, wherein $Rf^4$ is a perfluoroalkyl group having 1 to 6 carbon atoms.

In the polymerization for the TFE/perfluoro(alkyl vinyl ether) copolymer and the TFE/perfluoroallyl ether copolymer, the polymer (1) may be used within the use range of the production method of the present disclosure, and is usually preferably added in an amount of 0.0001 to 10% by mass based on 100% by mass of the aqueous medium.

In the polymerization for the TFE/perfluoro(alkyl vinyl ether) copolymer and the TFE/perfluoroallyl ether copolymer, the chain transfer agent used is preferably cyclohexane, methanol, ethanol, propanol, propane, butane, pentane, hexane, carbon tetrachloride, chloroform, methylene chloride, methyl chloride, methane, ethane, or the like, and the pH buffer used is preferably ammonium carbonate, disodium hydrogen phosphate, or the like.

The aqueous dispersion of a TFE/perfluoro(alkyl vinyl ether) copolymer such as PFA or MFA and the TFE/perfluoroallyl ether copolymer obtained by the production method of the present disclosure may optionally be subjected to post-treatment such as concentration, and then the concentrate may be dried and powdered, and the powder may be melt-extruded into pellets. The aqueous medium in the aqueous dispersion may optionally contain an additive such as a nonionic surfactant and may contain a water-soluble organic solvent such as a water-soluble alcohol or may be free from a water-soluble organic solvent.

The melt extrusion may be performed under any appropriately set extrusion conditions usually capable of providing pellets.

In order to improve the heat resistance of the copolymer and to reinforce a chemical permeation suppression effect of a molded article, the copolymer is preferably subjected to a fluorine gas treatment.

The fluorine gas treatment is performed by bringing fluorine gas into contact with a chemical permeation suppressant. However, since the reaction with fluorine is extremely exothermic, it is preferable to dilute fluorine with an inert gas such as nitrogen. The amount of fluorine in the fluorine gas/inert gas mixture is 1 to 100% by mass, preferably 10 to 25% by mass. The treatment temperature is 150 to 250° C., preferably 200 to 250° C. and the fluorine gas treatment duration is 3 to 16 hours, preferably 4 to 12 hours. The fluorine gas treatment is performed at a gas pressure in the range of 1 to 10 atm, preferably atmospheric pressure. In the case of using a reactor at atmospheric pressure, the fluorine gas/inert gas mixture may be continuously passed through the reactor. This results in conversion of unstable ends of the copolymer into —$CF_3$ ends, thermally stabilizing the copolymer.

The copolymer and the composition thereof may be molded by compression molding, transfer molding, extrusion molding, injection molding, blow molding, or the like as in the case of conventional PFA.

Such a molding technique can provide a desired molded article. Examples of the molded article include sheets, films, packings, round bars, square bars, pipes, tubes, round tanks, square tanks, tanks, wafer carriers, wafer boxes, beakers, filter housings, flowmeters, pumps, valves, cocks, connectors, nuts, electric wires, and heat-resistant electric wires.

Preferred among these are tubes, pipes, tanks, connectors, and the like to be used for a variety of chemical reaction devices, semiconductor manufacturing devices, and acidic or alkaline chemical feeding devices each requiring chemical impermeability.

The aqueous dispersion of the TFE/perfluoro(alkyl vinyl ether) copolymer such as PFA or MFA and the TFE/perfluoroallyl ether copolymer may also be appropriately mixed with a nonionic surfactant, and optionally polyethersulfone, polyamide-imide, and/or polyimide, and metal powder are dissolved or dispersed in an organic solvent. Thereby, a primer composition can be obtained. This primer composition may be used for a method of applying a fluororesin to a metal surface. The method includes applying the primer composition to a metal surface, applying a melt-fabricable fluororesin composition to the resulting primer layer, and firing the melt-fabricable fluororesin composition layer together with the primer layer.

(3) In the production method of the present disclosure, the polymerization for ETFE is preferably performed at a polymerization temperature of 10 to 100° C. and a polymerization pressure of 0.3 to 2.0 MPa·G.

The ETFE preferably has a monomer composition ratio (mol %) of TFE:ethylene=(50 to 99):(50 to 1). The ETFE may be modified with a third monomer within a range of 0 to 20% by mass of all monomers. The composition ratio thereof is preferably TFE:ethylene:third monomer=(63 to 94):(27 to 2):(1 to 10). The third monomer is preferably perfluorobutyl ethylene, perfluorohexyl ethylene, 3,3,4,4,5,5,6,6,7,7,8,8,8-tridecafluorooct-1-ene, 2,3,3,4,4,5,5-heptafluoro-1-pentene ($CH_2$=$CFCF_2CF_2CF_2H$), or 2-trifluoromethyl-3,3,3-trifluoropropene (($CF_3$)$_2$C=$CH_2$).

In the polymerization for the ETFE, polymer (1) can be used within the use range of the production method of the present disclosure, and usually, the polymer (1) is added in an amount of 0.0001 to 10% by mass based on 100% by mass of the aqueous medium.

In the polymerization for ETFE, the chain transfer agent used is preferably cyclohexane, methanol, ethanol, propanol, ethane, propane, butane, pentane, hexane, carbon tetrachloride, chloroform, methylene chloride, methyl chloride, or the like.

In the production method of the present disclosure, the aqueous dispersion of ETFE obtained may optionally be subjected to post-treatment such as concentration, and then the concentrate may be dried and powdered, and the powder may be melt-extruded into pellets. The aqueous medium in the aqueous dispersion may optionally contain an additive such as a nonionic surfactant and may contain a water-soluble organic solvent such as a water-soluble alcohol or may be free from a water-soluble organic solvent.

The melt extrusion may be performed under any appropriately set extrusion conditions usually capable of providing pellets.

The ETFE may be extrusion-molded into a sheet. In other words, powder or pellets of ETFE in a molten state may be continuously extruded through a die and then cooled to provide a sheet-shaped molded article. The ETFE may be mixed with an additive.

Known additives may be incorporated as appropriate. Specific examples thereof include ultraviolet absorbers, photostabilizers, antioxidants, infrared absorbers, flame retarders, flame-retardant fillers, organic pigments, inorganic pigments, and dyes. From the viewpoint of excellent weather resistance, inorganic additives are preferred.

The content of the additive in the ETFE sheet is preferably 20% by mass or less, and particularly preferably 10% by mass or less, based on the total mass of the ETFE sheet.

The ETFE sheet has excellent mechanical strength and appearance, and thus can suitably be used for film materials (e.g., roof materials, ceiling materials, outer wall materials, inner wall materials, and coating materials) of film-structured buildings (e.g., sports facilities, gardening facilities, and atriums).

In addition to the film materials of film-structured buildings, the ETFE sheet is also useful for, for example, outdoor boards (e.g., noise-blocking walls, windbreak fences, breakwater fences, roof panels of carports, shopping arcades, footpath walls, and roof materials), shatter-resistant window films, heat-resistant waterproof sheets, building materials (e.g., tent materials of warehouse tents, film materials for shading, partial roof materials for skylights, window materials alternative to glass, film materials for flame-retardant partitions, curtains, outer wall reinforcement, waterproof films, anti-smoke films, non-flammable transparent partitions, road reinforcement, interiors (e.g., lighting, wall surfaces, and blinds), exteriors (e.g., tents and signboards)), living and leisure goods (e.g., fishing rods, rackets, golf clubs, and screens), automobile materials (e.g., hoods, damping materials, and bodies), aircraft materials, shipment materials, exteriors of home appliances, tanks, vessel inner walls, filters, film materials for construction works, electronic materials (e.g., printed circuit boards, circuit boards, insulating films, and release films), surface materials for solar cell modules, mirror protection materials for solar thermal energy, and surface materials for solar water heaters.

(4) The production method of the present disclosure may be used to produce an electrolyte polymer precursor. In the production method of the present disclosure, the polymerization for the electrolyte polymer precursor is preferably performed at a polymerization temperature of 10 to 100° C. and a polymerization pressure of 0.1 to 2.0 MPa·G. The electrolyte polymer precursor contains a vinyl ether monomer as described below and can be converted into an ion-exchangeable polymer through a hydrolysis treatment.

An example of the vinyl ether monomer to be used for the electrolyte polymer precursor is a fluoromonomer represented by the general formula (150):

$$CF_2=CF-O-(CF_2CFY^{151}-O)_n-(CFY^{152})_m-A^{151}$$

wherein $Y^{151}$ represents a fluorine atom, a chlorine atom, a $-SO_2F$ group, or a perfluoroalkyl group; the perfluoroalkyl group optionally containing ether oxygen and a $-SO_2F$ group; n represents an integer of 0 to 3; n $Y^{151}$s are the same as or different from each other; $Y^{152}$ represents a fluorine atom, a chlorine atom, or a $-SO_2F$ group; m represents an integer of 1 to 5; m $Y^{152}$s are the same as or different from each other; $A^{151}$ represents $-SO_2X^{151}$, $-COZ^{151}$, or $-POZ^{152}Z^{153}$; $X^{151}$ represents F, Cl, Br, I, $-OR^{151}$, or $-NR^{152}R^{153}$; $Z^{151}$, $Z^{152}$, and $Z^{153}$ are the same as or different from each other, and each represent $-NR^{154}R^{155}$ or $-OR^{156}$; and $R^{151}$, $R^{152}$, $R^{153}$, $R^{154}$, $R^{155}$, and $R^{156}$ are the same as or different from each other, and each represent H, ammonium, an alkali metal, or an alkyl group, aryl group, or sulfonyl-containing group optionally containing a fluorine atom. The electrolyte polymer precursor preferably has a monomer composition ratio (mol %) of TFE:vinyl ether=(50 to 99):(50 to 1), more preferably TFE:vinyl ether=(50 to 93):(50 to 7).

The electrolyte polymer precursor may be modified with a third monomer within a range of 0 to 20% by mass of all monomers. Examples of the third monomer include multifunctional monomers such as CTFE, vinylidene fluoride, perfluoroalkyl vinyl ether, and divinylbenzene.

The electrolyte polymer precursor thereby obtained may be molded into a film, followed by hydrolysis using an alkali solution and a treatment using a mineral acid, and thereby used as a polymer electrolyte film for fuel cells, electrolysis devices, redox flow batteries, and the like.

The electrolyte polymer precursor may be hydrolyzed using an alkali solution while the dispersed state thereof is maintained, thereby providing an electrolyte polymer dispersion.

This dispersion may be then heated up to 120° C. or higher in a pressurized vessel and thereby dissolved in, for example, a solvent mixture of water and an alcohol, i.e., converted into a solution state.

The solution thereby obtained may be used as a binder for electrodes. Also, the solution may be combined with a variety of additives and cast to form a film, and the film may be used for antifouling films, organic actuators, or the like.

(5) TFE/VDF Copolymer

In the production method of the present disclosure, the polymerization for the TFE/VDF copolymer may be performed at any polymerization temperature, for examples, 0 to 100° C. The polymerization pressure is determined as appropriate in accordance with the other polymerization conditions such as the polymerization temperature, and may be usually 0 to 9.8 MPa·G.

The TFE/VDF copolymer preferably has a monomer composition ratio (mol %) of TFE:VDF=(5 to 90):(95 to 10). The TFE/VDF copolymer may be modified with a third monomer within a range of 0 to 50 mol % of all monomers. The composition ratio thereof is preferably TFE:ethylene:third monomer=(30 to 85):(10 to 69.9):(0.1 to 10).

The third monomer is preferably a monomer represented by the formula:

$$CX^{11}X^{12}=CX^{13}(CX^{14}CX^{15})_{n11}X^{16}$$

wherein $X^{11}$ to $X^{16}$ are the same as or different from each other, and each represent H, F, or Cl; n11 represents an integer of 0 to 8, with the proviso that the third monomer is other than TFE and VDF; or a monomer represented by the formula:

$$CX^{21}X^{22}=CX^{23}-O(CX^{24}X^{25})_{n21}X^{26}$$

wherein $X^{21}$ to $X^{26}$ are the same as or different from each other, and each represent H, F, or Cl; and n21 represents an integer of 0 to 8.

The third monomer may be a fluorine-free ethylenic monomer. From the viewpoint of maintaining the heat resistance and the chemical resistance, the fluorine-free ethylenic monomer is preferably selected from ethylenic monomers having 6 or less carbon atoms. Examples thereof include ethylene, propylene, 1-butene, 2-butene, vinyl chloride, vinylidene chloride, alkyl vinyl ethers (e.g., methyl vinyl ether, ethyl vinyl ether, and propyl vinyl ether), maleic acid, itaconic acid, 3-butenoic acid, 4-pentenoic acid, vinylsulfonic acid, acrylic acid, and methacrylic acid.

In the polymerization for the TFE/VDF copolymer, the polymer (1) can be used within the use range of the production method of the present disclosure, and is usually added in an amount of 0.0001 to 5% by mass based on 100% by mass of the aqueous medium.

The TFE/VDF copolymer obtained by the polymerization may be amidated by bringing it into contact with a nitrogen compound capable of generating ammonia water, ammonia gas, or ammonia.

The TFE/VDF copolymer obtained by the above-described method may also preferably be used as a material for providing TFE/VDF copolymer fibers by a spinning-drawing method. The spinning-drawing method is a method for obtaining a TFE/VDF copolymer fiber by melt spinning a TFE/VDF copolymer, cooling and solidifying it to obtain an undrawn yarn, and then running the undrawn yarn in a heating cylinder to draw the undrawn yarn.

The TFE/VDF copolymer may be dissolved in an organic solvent to provide a solution of the TFE/VDF copolymer. Examples of the organic solvent include nitrogen-containing organic solvents such as N-methyl-2-pyrrolidone, N,N-dimethyl acetamide, and dimethyl formamide; ketone-based solvents such as acetone, methyl ethyl ketone, cyclohexanone, and methyl isobutyl ketone; ester-based solvents such as ethyl acetate and butyl acetate; ether-based solvents such as tetrahydrofuran and dioxane; and general-purpose organic solvents having a low boiling point such as solvent mixtures thereof. The solution may be used as a binder for batteries.

The aqueous dispersion of the TFE/VDF copolymer may preferably be used to coat a porous substrate formed from a polyolefin resin to provide a composite porous film. The aqueous dispersion may also preferably contain inorganic particles and/or organic particles dispersed therein and be used to coat a porous substrate to provide a composite porous film. The composite porous film thereby obtained may be used as a separator for lithium secondary batteries.

The powder of the melt-fabricable fluororesin is suitably used as a powdery coating material. When applied to a substrate, the powdery coating material made of the melt-fabricable fluororesin powder can provide a film having a smooth surface. The melt-fabricable fluororesin powder having an average particle size of 1 μm or greater and smaller than 100 μm is particularly suitable as a powdery coating material used for electrostatic coating. The melt-fabricable fluororesin powder having an average particle size of 100 μm or greater and 1,000 μm or smaller is particularly suitable as a powdery coating material used for rotational coating or rotational molding.

The melt-fabricable fluororesin powder can be produced by a method of drying the melt-fabricable fluororesin obtained by the above-mentioned production method of the present disclosure to powder the melt-fabricable fluororesin. The method for producing the melt-fabricable fluororesin powder is also one aspect of the present disclosure.

(III) Fluoroelastomers

In the production method of the present disclosure, the polymerization reaction for the fluoroelastomer is initiated by charging pure water and the polymer (1) into a pressure-resistant reaction vessel equipped with a stirrer, deoxidizing the system, charging the monomers, increasing the temperature to a predetermined level, and adding a polymerization initiator. The pressure decreases as the reaction progresses, and additional monomers are fed continuously or intermittently to maintain the initial pressure. When the amount of the monomers fed reaches a predetermined level, feeding is stopped, and the monomers in the reaction vessel are purged and the temperature is returned to room temperature, whereby the reaction is completed. In this case, polymer latex can be continuously taken out of the reaction vessel.

In particular, in the case of producing a thermoplastic elastomer as the fluoroelastomer, it is also possible to use a method in which fluoropolymer fine particles are synthesized at a high concentration defined as described above and then diluted for further polymerization as disclosed in International Publication No. WO00/01741, whereby the final polymerization rate can be increased as compared with ordinary polymerization.

The polymerization for the fluoroelastomer may be performed under conditions appropriately selected from the viewpoints of physical properties of the target polymer and control of the polymerization rate, and is performed at a polymerization temperature of usually −20 to 200° C., preferably 5 to 150° C., and a polymerization pressure of usually 0.5 to 10 MPa·G, preferably 1 to 7 MPa·G. The polymerization medium preferably has a pH usually maintained at 2.5 to 13 using a pH adjuster to be described later by a known method, for example.

Examples of the monomer used in the polymerization for the fluoroelastomer include vinylidene fluoride, as well as fluorine-containing ethylenically unsaturated monomers having fluorine atoms at least as much as the carbon atoms therein and copolymerizable with vinylidene fluoride. Examples of the fluorine-containing ethylenically unsaturated monomers include trifluoropropene, pentafluoropropene, hexafluorobutene, and octafluorobutene. Of these, hexafluoropropene is particularly preferred because of the properties of the elastomer obtained when hexafluoropropene blocks the crystal growth of the polymer. Examples of the fluorine-containing ethylenically unsaturated monomers also include trifluoroethylene, TFE, and CTFE. Fluorine-containing monomers containing one or two or more chlorine and/or bromine substituents may also be used. Perfluoro(alkyl vinyl ethers) such as perfluoro(methyl vinyl ether) may also be used. TFE and HFP are preferred for producing fluoroelastomer.

The fluoroelastomer preferably has a monomer composition ratio (% by mass) of vinylidene fluoride:HFP:TFE=(20 to 70):(30 to 48):(0 to 32). The fluoroelastomer having this composition ratio exhibits good elastomeric characteristics, chemical resistance, and thermal stability.

In the polymerization for the fluoroelastomer, the polymer (1) can be used within the use range of the production method of the present disclosure, and is usually added in an amount of 0.0001 to 20% by mass based on 100% by mass of the aqueous medium. It is preferably added in an amount of 10% by mass or less, and more preferably 2% by mass or less.

In the polymerization for the fluoroelastomer, the polymerization initiator used may be a known inorganic radical polymerization initiator. Examples of particularly useful inorganic radical polymerization initiators include conventionally known water-soluble inorganic peroxides, such as persulfates, perphosphates, perborates, percarbonates or permanganates of sodium, potassium, and ammonium. The radical polymerization initiator may be further activated with a reducing agent such as sulfite, bisulfite, metabisulfite, hyposulfite, thiosulfate, phosphite, or hypophosphite of sodium, potassium, or ammonium or an easily oxidizable metal compound such as an iron(I) salt, a copper(I) salt, or a silver salt. A preferred inorganic radical polymerization initiator is ammonium persulfate. More preferred is combination use of ammonium persulfate and sodium bisulfite in a redox system.

The concentration of the polymerization initiator added is appropriately determined in accordance with the molecular weight of the target fluoropolymer and the polymerization reaction rate, and is set to 0.0001 to 10% by mass, preferably 0.01 to 5% by mass, based on 100% by mass of the total amount of the monomers.

In the polymerization for the fluoroelastomer, a known chain transfer agent may be used, and examples thereof include hydrocarbons, esters, ethers, alcohols, ketones, chlorine compounds, and carbonates. A hydrocarbon, an ester, an ether, an alcohol, a chlorine compound, an iodine compound, or the like may be used as the thermoplastic elastomer, for example. Of these, preferred are acetone and isopropyl alcohol. From the viewpoint of reducing a reaction rate drop in polymerization for a thermoplastic elastomer, isopentane, diethyl malonate, and ethyl acetate are preferred. Diiodine compounds such as $I(CF_2)_4I$, $I(CF_2)_6I$, and $ICH_2I$ are preferred because they can iodize ends of the polymer and allow the resulting polymer to serve as a reactive polymer.

The amount of the chain transfer agent used is usually $0.5 \times 10^{-3}$ to $5 \times 10^{-3}$ mol %, preferably $1.0 \times 10^{-3}$ to $3.5 \times 10^{-3}$ mol %, based on the total amount of the monomers fed.

Paraffin wax may preferably be used as an emulsion stabilizer in the polymerization for the fluoroelastomer, for example. A phosphate, sodium hydroxide, potassium hydroxide, or the like may preferably be used as a pH adjuster in the polymerization for a thermoplastic elastomer, for example.

At completion of the polymerization, the fluoroelastomer obtained by the production method of the present disclosure has a solid concentration of 1.0 to 40% by mass, an average particle size of 0.03 to 1 μm, preferably 0.05 to 0.5 μm, and a number average molecular weight of 1,000 to 2,000,000.

The fluoroelastomer obtained by the production method of the present disclosure may optionally be mixed with a dispersion stabilizer such as a hydrocarbon surfactant or be concentrated, for example, to form a dispersion suitable for rubber molding. The dispersion is subjected to treatments such as pH adjustment, solidification, and heating. The treatments are performed as follows.

The pH adjustment is performed such that a mineral acid such as nitric acid, sulfuric acid, hydrochloric acid, or phosphoric acid and/or a carboxylic acid or the like having 5 or less carbon atoms and having pK=4.2 or lower is added to adjust the pH to 2 or lower.

The solidification is performed by adding an alkaline earth metal salt. Examples of the alkaline earth metal salt include nitrates, chlorates, and acetates of calcium or magnesium.

Although the pH adjustment and the solidification may be performed in any order, the pH adjustment is preferably performed prior to performing the solidification.

These operations are followed by washing with the same volume of water as the fluoroelastomer to remove a small amount of impurities such as buffer solution and salts present in the fluoroelastomer and drying of the fluoroelastomer. The drying is usually performed at about 70 to 200° C. while the air is circulated in a drying furnace at high temperature.

The fluoroelastomer may be either a partially fluorinated elastomer or a perfluoroelastomer.

It is preferable that the partially fluorinated elastomer contains a methylene group (—$CH_2$—) in the main chain. The partially fluorinated elastomer containing —$CH_2$— in the main chain is not limited as long as it contains the chemical structure represented by —$CH_2$—. Examples thereof include partially fluorinated elastomers containing the structure of —$CH_2$—$CF_2$—, —$CH_2$—$CH(CH_3)$—, —$CH_2$—$CH_2$—, or the like, which for example can be introduced into the main chain of the partially fluorinated elastomer by polymerizing vinylidene fluoride, propylene, ethylene, or the like. The content of the tetrafluoroethylene unit in the partially fluorinated elastomer (the content of the polymerized unit derived from tetrafluoroethylene based on all polymerized units of the partially fluorinated elastomer) may be less than 40 mol %.

It is preferable that the partially fluorinated elastomer contains a monomer unit derived from at least one monomer selected from the group consisting of, for example, tetrafluoroethylene (TFE), vinylidene fluoride (VdF), and a perfluoroethylenically unsaturated compound (such as hexafluoropropylene (HFP) or perfluoro(alkyl vinyl ether) (PAVE)) represented by the general formula: $CF_2$=CF—$Rf^a$, wherein $Rf^a$ is —$CF_3$ or —$ORf^b$ (where $Rf^b$ is a perfluoroalkyl group having 1 to 5 carbon atoms). Above all, it is preferable that the partially fluorinated elastomer contains VdF units or TFE units.

Examples of the partially fluorinated elastomer include vinylidene fluoride (VdF)-based fluoroelastomers, tetrafluoroethylene (TFE)/propylene (Pr)-based fluoroelastomers, tetrafluoroethylene (TFE)/propylene/vinylidene fluoride (VdF)-based fluoroelastomers, ethylene/hexafluoropropylene (HFP)-based fluoroelastomers, ethylene/hexafluoropropylene (HFP)/vinylidene fluoride (VdF)-based fluoroelastomers, and ethylene/hexafluoropropylene (HFP)/tetrafluoroethylene (TFE)-based fluoroelastomers. Of these, the partially fluorinated elastomer is preferably at least one selected from the group consisting of vinylidene fluoride-based fluoroelastomers and tetrafluoroethylene/propylene-based fluoroelastomers.

The vinylidene fluoride-based fluoroelastomer is preferably a copolymer containing 45 to 85 mol % of vinylidene fluoride and 55 to 15 mol % of at least one monomer copolymerizable with and different from vinylidene fluoride. The vinylidene fluoride-based fluoroelastomer is more preferably a copolymer containing 50 to 80 mol % of vinylidene fluoride and 50 to 20 mol % of at least one monomer copolymerizable with and different from vinylidene fluoride.

Examples of the at least one monomer copolymerizable with and different from vinylidene fluoride include monomers such as tetrafluoroethylene (TFE), hexafluoropropylene (HFP), fluoroalkyl vinyl ethers, chlorotrifluoroethylene (CTFE), trifluoroethylene, trifluoropropylene, pentafluoropropylene, trifluorobutene, tetrafluoroisobutene, hexafluoroisobutene, vinyl fluoride, a fluoromonomer represented by the general formula (100):

$CHX^{101}$=$CX^{102}Rf^{101}$ (wherein one of $X^{101}$ and $X^{102}$ is H and the other is F, and $Rf^{101}$ is a linear or branched fluoroalkyl group having 1 to 12 carbon atoms), a fluoromonomer represented by the general formula (170):

$CH_2$=CH—$(CF_2)_n$—$X^{171}$ (wherein $X^{171}$ is H or F, and n is an integer of 3 to 10), and a monomer that provides a crosslinking site; and non-fluorinated monomers such as ethylene, propylene, and alkyl vinyl ethers. These may be used alone or in any combination thereof. Of these, preferred is at least one selected from the group consisting of TFE, HFP, fluoroalkyl vinyl ether, and CTFE. The fluoroalkyl vinyl ether is preferably a fluoromonomer represented by the general formula (160).

Specific examples of the vinylidene fluoride-based fluoroelastomers include VdF/HFP-based rubber, VdF/HFP/TFE-based rubber, VdF/CTFE-based rubber, VdF/CTFE/TFE-based rubber, rubber based on VDF and a fluoromonomer represented by the general formula (100), rubber based on VDF, a fluoromonomer represented by the general formula (100), and TFE, rubber based on VDF and perfluoro(methyl vinyl ether) (PMVE), VDF/PMVE/TFE-based rubber, and VDF/PMVE/TFE/HFP-based rubber. The rubber based on VDF and a fluoromonomer represented by the general formula (100) is preferably VDF/$CH_2$=$CFCF_3$-based rubber. The rubber based on VDF, a fluoromonomer represented by the formula (100), and TFE is preferably VDF/TFE/$CH_2$=$CFCF_3$-based rubber.

The vinylidene fluoride-based fluoroelastomer is more preferably a VdF/HFP copolymer or a VdF/HFP/TFE copolymer, and particularly preferably one with the compositional features of VdF/HFP/TFE being (32 to 85)/(10 to 34)/(0 to 40) (mol %). The compositional features of VdF/HFP/TFE are more preferably (32 to 85)/(15 to 34)/(0 to 34) (mol %), and still more preferably (47 to 81)/(17 to 32)/(0 to 26) (mol %).

For example, in the VdF/HFP copolymer, the compositional features of VdF/HFP are preferably (45 to 85)/(15 to 55) (mol %), more preferably (50 to 83)/(17 to 50) (mol %), still more preferably (55 to 81)/(19 to 45) (mol %), and particularly preferably (60 to 80)/(20 to 40) (mol %).

The VDF/$CH_2$=$CFCF_3$-based rubber is preferably a copolymer containing 40 to 99.5 mol % of VDF and 0.5 to 60 mol % of $CH_2$=$CFCF_3$, more preferably a copolymer containing 50 to 85 mol % of VDF and 20 to 50 mol % of $CH_2$=$CFCF_3$.

The tetrafluoroethylene/propylene-based fluoroelastomer is preferably a copolymer containing 45 to 70 mol % of tetrafluoroethylene, 55 to 30 mol % of propylene, and 0 to 5 mol % of a fluoromonomer that provides a crosslinking site.

The fluoroelastomer may be a perfluoroelastomer. The perfluoroelastomer is preferably at least one selected from the group consisting of perfluoroelastomers containing TFE, such as a copolymer containing TFE and a fluoromonomer represented by the general formula (160), (130), or (140) and a copolymer containing TFE, a fluoromonomer represented by the general formula (160), (130), or (140), and a monomer that provides a crosslinking site.

In the case of the TFE/PMVE copolymer, the composition ratio thereof is preferably 45 to 90/10 to 55 (mol %), more preferably 55 to 80/20 to 45, and still more preferably 55 to 70/30 to 45.

In the case of the copolymer of TFE, PMVE, and a monomer that provides a crosslinking site, the composition ratio thereof is preferably 45 to 89.9/10 to 54.9/0.01 to 4 (mol %), more preferably 55 to 77.9/20 to 49.9/0.1 to 3.5, and still more preferably 55 to 69.8/30 to 44.8/0.2 to 3.

In the case of the copolymer of TFE and a fluoromonomer represented by the general formula (160), (130), or (140) having 4 to 12 carbon atoms, the composition ratio thereof is preferably 50 to 90/10 to 50 (mol %), more preferably 60 to 88/12 to 40, and still more preferably 65 to 85/15 to 35.

In the case of the copolymer of TFE, a fluoromonomer represented by the general formula (160), (130), or (140) having 4 to 12 carbon atoms, and a monomer that provides a crosslinking site, the composition ratio thereof is preferably 50 to 89.9/10 to 49.9/0.01 to 4 (mol %), more preferably 60 to 87.9/12 to 39.9/0.1 to 3.5, and still more preferably 65 to 84.8/15 to 34.8/0.2 to 3.

When these copolymers have compositional features outside these ranges, the properties as a rubber elastic body are lost, and the properties tend to be close to those of a resin.

The perfluoroelastomer is preferably at least one selected from the group consisting of copolymers of TFE, a fluoromonomer represented by the general formula (140), and a fluoromonomer that provides a crosslinking site, copolymers of TFE and a perfluorovinyl ether represented by the general formula (140), copolymers of TFE and a fluoromonomer represented by the general formula (160), and copolymers of TFE, a fluoromonomer represented by the general formula (160), and a monomer that provides a crosslinking site.

Examples of the perfluoroelastomer further include the perfluoroelastomers disclosed in documents such as International Publication No. WO97/24381, Japanese Patent Publication No. 61-57324, Japanese Patent Publication No. 04-81608, and Japanese Patent Publication No. 05-13961.

From the viewpoint of achieving an excellent compression set at high temperature, the fluoroelastomer preferably has a glass transition temperature of −70° C. or higher, more preferably −60° C. or higher, and still more preferably −50° C. or higher. From the viewpoint of achieving good cold resistance, the glass transition temperature is preferably 5° C. or lower, more preferably 0° C. or lower, and still more preferably −3° C. or lower.

The glass transition temperature can be determined as follows. Specifically, using a differential scanning calorimeter (DSC822e, manufactured by Mettler-Toledo International Inc.), 10 mg of a sample is heated at a rate of 10° C./min to give a DSC curve, and the temperature is read at the midpoint of two intersections between each of the extension lines of the base lines before and after the secondary transition of the DSC curve and the tangent line at the inflection point of the DSC curve.

From the viewpoint of achieving good heat resistance, the fluoroelastomer preferably has a Mooney viscosity ML(1+20) at 170° C. of 30 or higher, more preferably 40 or higher, and still more preferably 50 or higher. From the viewpoint of achieving good processability, the Mooney viscosity is preferably 150 or lower, more preferably 120 or lower, and still more preferably 110 or lower.

From the viewpoint of achieving good heat resistance, the fluoroelastomer preferably has a Mooney viscosity ML(1+20) at 140° C. of 30 or higher, more preferably 40 or higher, and still more preferably 50 or higher. From the viewpoint of achieving good processability, the Mooney viscosity is preferably 180 or lower, more preferably 150 or lower, and still more preferably 110 or lower.

From the viewpoint of achieving good heat resistance, the fluoroelastomer preferably has a Mooney viscosity ML(1+10) at 100° C. of 10 or higher, more preferably 20 or higher, and still more preferably 30 or higher. From the viewpoint of achieving good processability, the Mooney viscosity is preferably 120 or lower, more preferably 100 or lower, and still more preferably 80 or lower.

The Mooney viscosity can be determined using a Mooney viscometer MV2000E manufactured by Alpha Technologies Inc. at 170° C., 140° C., or 100° C. in conformity with JIS K 6300.

The fluoroelastomer obtained by the production method of the present disclosure may be in any form as long as it is obtainable by the polymerization. The fluoroelastomer may be in the form of an aqueous dispersion as polymerized, or may be used in the form of a gum or a crumb obtained by conventionally known coagulation, drying, and any other treatment on the aqueous dispersion as polymerized. The polymer (1) used in the production method of the present disclosure can improve the stability of the aqueous dispersion, and is more preferably used in a polymerization method in which substances insoluble in water such as an initiator, including an organic peroxide, and a chain transfer agent, including an iodine or bromine compound, are added during the polymerization defined as described above.

The gum is a small particulate mass of the fluoroelastomer. The crumb is an amorphous mass of the fluoroelastomer resulting from fusion of particles that cannot maintain the form of small particles as gum at room temperature.

The fluoroelastomer may be mixed with an additive such as a curing agent and a filler to be processed into a fluoroelastomer composition.

Examples of the curing agent include polyols, polyamines, organic peroxides, organotins, bis(aminophenol)tetraamine, and bis(thioaminophenol).

The fluoroelastomer composition is made of the above fluoroelastomer, and thus is substantially free from an emulsifier and is excellent in that it is easily crosslinked during molding.

The fluoroelastomer may be molded to form a fluoroelastomer molded body. The molding may be performed by any method such as a known method using the above-mentioned curing agent. Examples of the molding method include, but are not limited to, compression molding, injection molding, injection molding, extrusion molding, and molding by Roto-cure.

When the fluoroelastomer composition contains a curing agent (cross-linking agent), by crosslinking the fluoroelastomer composition, a crosslinked product can be obtained as the fluoroelastomer molded body. As for the crosslinking method, steam crosslinking, crosslinking by heating, radiation crosslinking, and other methods can be adopted, and among them, steam crosslinking and crosslinking by heating are preferable. Non-limiting specific crosslinking conditions may be determined as appropriate in accordance with the types of crosslinking accelerator, cross-linking agent, acid acceptor, and others, usually within a temperature range of 140 to 250° C. and a crosslinking time of 1 minute to 24 hours.

The fluoroelastomer molded body is suitable for seals, gaskets, electric wire coatings, hoses, tubes, laminated products, and accessories, particularly parts for semiconductor manufacturing devices and automobile parts.

In the production method of the present disclosure, when the fluoropolymer is subjected to coagulation, washing, drying, or the like, discharge water or off gas is generated. The polymer (1), decomposition products and by-products of the polymer (1) by-produced from the polymer (1), residual monomers, and the like may be collected from discharge water generated in the coagulation or the washing and/or from off gas generated by the drying, and then purified to reuse the polymer (1), the decomposition products and by-products of the polymer (1) by-produced from the polymer (1), the residual monomers, and the like. The collection and the purification may be performed by known methods, although not limited thereto. For example, they may be performed by the methods disclosed in National Publication of International Patent Application No. 2011-520020. Examples thereof further include the methods disclosed in U.S. Patent Application Publication No. 2007/15937, U.S. Patent Application Publication No. 2007/25902, and U.S. Patent Application Publication No. 2007/27251. Specific examples of the methods are as follows.

An example of the method of collecting the polymer (1), the decomposition products and by-products of the polymer (1) by-produced from the polymer (1), the residual monomers, and the like from discharge water is a method in which the discharge water is brought into contact with adsorbent particles formed of ion exchange resin, activated carbon, silica gel, clay, zeolite, or the like, so that the particles are allowed to adsorb the polymer (1) and the others, and then the discharge water and the adsorbent particles are separated. Incinerating the adsorbent particles having adsorbed the polymer (1) and the others can prevent emission of the polymer (1) and the others into the environment.

Alternatively, the polymer (1) and the others may be removed and eluted by a known method from the ion exchange resin particles having adsorbed the polymer (1) and the others, and collected. For example, in the case of using anion exchange resin particles as the ion exchange resin particles, the polymer (1) and the others can be eluted by bringing a mineral acid into contact with an anion exchange resin. When a water-soluble organic solvent is added to the resulting eluate, the mixture is usually separated into two phases. Since the lower phase contains the polymer (1) and the others, it is possible to collect the polymer (1) and the others by collecting and neutralizing the lower phase. Examples of the water-soluble organic solvent include polar solvents such as alcohols, ketones, and ethers.

Other methods of collecting the polymer (1) and the others from ion exchange resin particles include a method of using an ammonium salt and a water-soluble organic solvent and a method of using an alcohol and, if necessary, an acid. In the latter method, ester derivatives of the polymer (1) and the others are generated, and thus, they can easily be separated from the alcohol by distillation.

When the discharge water contains fluoropolymer particles and other solids, they are preferably removed before the discharge water and the adsorbent particles are brought into contact with each other. Examples of methods of removing the fluoropolymer particles and other solids include a method of adding an aluminum salt, for example, to deposit these components, and then separating the discharge water and the deposits, and an electrocoagulation method. The components may also be removed by a mechanical method, and examples thereof include a cross-flow filtration method, a depth filtration method, and a precoat filtration method.

From the viewpoint of productivity, the discharge water preferably contains the fluoropolymer in a non-agglomerated form in a low concentration, more preferably less than 0.4% by mass, and particularly preferably less than 0.3% by mass.

An example of the method of collecting the polymer (1) and the others from the off gas is a method in which a scrubber is brought into contact with deionized water, an alkaline aqueous solution, an organic solvent such as a glycol ether solvent, or the like to provide a scrubber solution containing the polymer (1) and the others. When the alkaline aqueous solution used is a highly concentrated alkaline aqueous solution, the scrubber solution can be collected in a state where the polymer (1) and the others are phase-separated, and thus the polymer (1) and the others can be easily collected and reused. Examples of the alkali compound include alkali metal hydroxides and quaternary ammonium salts.

The scrubber solution containing the polymer (1) and the others may be concentrated using a reverse osmosis membrane, for example. The concentrated scrubber solution usually contains fluoride ions. Still, the fluoride ions may be removed by adding alumina after the concentration so that the polymer (1) and the others can easily be reused. Alternatively, the scrubber solution may be brought into contact with adsorbent particles so that the adsorbent particles can adsorb the polymer (1) and the others, and thereby the polymer (1) and the others may be collected by the aforementioned method.

The polymer (1) and the others collected by any of the methods may be reused in the production of fluoropolymer.

The present disclosure also relates to a method for producing a PTFE, the method comprising polymerizing TFE in an aqueous medium in the presence of a polymer (2) to obtain a PTFE, wherein the polymer (2) is a polymer of a monomer (2) represented by the general formula (2) below, and primary particles of the PTFE have an aspect ratio of less than 2.00:

$$CF_2=CF-R-CZ^1Z^2-COOM \qquad (2)$$

wherein R is a linking group; $Z^1$ and $Z^2$ are each independently F or $CF_3$; M is H, a metal atom, $NR^7_4$, imidazolium optionally having a substituent, pyridinium optionally having a substituent, or phosphonium optionally having a substituent; and $R^7$ is H or an organic group.

According to the method for producing a PTFE of the present disclosure, a PTFE of which primary particles having a small aspect ratio can be produced using the polymer (2). Also, since the aspect ratio of primary particles of the resulting PTFE is small, polymerization progresses smoothly and an aqueous dispersion solution with excellent stability can be obtained.

The polymer (2) represented by the general formula (2) used in the method for producing a PTFE of the present disclosure has the same structure as the polymer (1) of the monomer (1) represented by the general formula (1), except that the anionic group ($A^0$) in the general formula (1) is —COOM, and R, $Z^1$, $Z^2$, and M in the general formula (2) are also the same as R, $Z^1$, $Z^2$, and M in the general formula (1).

The polymer (2) used in the method for producing a PTFE of the present disclosure is preferably a polymer of a monomer in which A in the general formula (3), the general formula (4), and the general formula (5) is —COOM, more preferably a polymer of a monomer in which A in the general formula (4) is —COOM, and still more preferably a polymer of a monomer in which A in the general formula (4a) and the general formula (4d) is —COOM. The general formula (3), the general formula (4), and the general formula (5) are the general formulas of monomers (3) to (5) that form the polymerized units constituting the polymer (1).

In the method for producing a PTFE of the present disclosure, it is preferable that the content of a dimer and a trimer of the monomer (2) in the polymer (2) is 1.0% by mass or less based on the polymer (2). The dimer and trimer of the monomer (2) are usually generated when the monomer (2) is polymerized to obtain the polymer (2). The content of the dimer and trimer in the polymer (2) is 1.0% by mass or less, preferably 0.1% by mass or less, more preferably 0.01% by mass or less, still more preferably 0.001% by mass or less, and particularly preferably 0.0001% by mass or less, based on the polymer (2).

The content of the dimer and trimer in the polymer (2) can be measured by a method that is the same as that for the content of the dimer and trimer in the polymer (1).

It is preferable that the method for producing a PTFE of the present disclosure comprises polymerizing the monomer (2) represented by the general formula (2) to obtain a crude composition containing the polymer of the monomer (2) and removing the dimer and trimer of the monomer (2) contained in the crude composition from the crude composition to obtain the polymer (2) in which the content of the dimer and trimer of the monomer (2) is 1.0% by mass or less based on the polymer (2).

The polymerization of the monomer (2) can be carried out by a method that is the same as that for the monomer (1) mentioned above. In the method for producing a PTFE of the present disclosure, the monomer (2) and another monomer may be copolymerized. The other monomer is as mentioned above as the other monomer to be copolymerized with the monomer (1). The configuration of a copolymer obtained as the polymer (2) is also the same as that of the polymer (1).

In the method for producing a PTFE of the present disclosure, it is preferable that the polymerization of the monomer (2) is carried out in the aqueous medium substantially in the absence of a fluorine-containing surfactant (except for the monomer (2) represented by the general formula (2)).

In the present disclosure, the expression "substantially in the absence of a fluorine-containing surfactant" means that the amount of the fluorine-containing surfactant is 10 ppm by mass or less based on the aqueous medium. The amount of the fluorine-containing surfactant based on the aqueous medium is preferably 1 ppm by mass or less, more preferably 100 ppb by mass or less, still more preferably 10 ppb by mass or less, and further preferably 1 ppb by mass or less.

The fluorine-containing surfactant is as mentioned above in the description on the polymerization of fluoromonomer.

After the polymerization of the monomer (2), the dimer and trimer of the monomer (2) contained in the crude composition obtained by the polymerization of the monomer (2) are removed from the crude composition. The means of removing the dimer and trimer is as mentioned above.

The polymerization of TFE can be carried out by the method mentioned above, except for the use of the polymer (2). Along with TFE, a modifying monomer may also be polymerized, as mentioned above. By using the modifying monomer, a PTFE of which the aspect ratio is small can be easily produced. In particular, it is preferable to add the modifying monomer to the polymerization system at the initial stage of TFE polymerization. In the polymerization, it is preferable to add a modifying monomer copolymerizable with TFE before initiating the polymerization reaction, or before the polymerization reaction progresses and the concentration of the PTFE in the aqueous dispersion reaches 10.0% by mass, preferably 5.0% by mass.

The present disclosure also relates to a composition comprising a PTFE of which primary particles having an aspect ratio of less than 2.00 and a polymer (2) of a monomer (2) represented by the following general formula (2):

$$CF_2\!=\!CF\!-\!R\!-\!CZ^1Z^2\!-\!COOM \tag{2}$$

wherein R is a linking group; $Z^1$ and $Z^2$ are each independently F or $CF_3$; M is H, a metal atom, $NR^7_4$, imidazolium optionally having a substituent, pyridinium optionally having a substituent, or phosphonium optionally having a substituent; and $R^7$ is H or an organic group.

The composition of the present disclosure can be produced by the method for producing a PTFE of the present disclosure.

The composition of the present disclosure may be a PTFE aqueous dispersion in which primary particles of the PTFE are dispersed in the aqueous medium. The aqueous dispersion may be any of an aqueous dispersion obtained by the polymerization mentioned above, a dispersion obtained by concentrating this aqueous dispersion or subjecting the aqueous dispersion to dispersion stabilization treatment, and an aqueous dispersion obtained by dispersing powder of the PTFE into an aqueous medium in the presence of the surfactant. The composition of the present disclosure may also be PTFE powder. The PTFE powder is obtained by, for example, coagulation of the PTFE in a PTFE aqueous dispersion by a known method.

The aspect ratio is the aspect ratio of primary particles of the PTFE. The upper limit of the aspect ratio of primary particles of the PTFE is, in the preferred order, 1.90 or less, 1.80 or less, 1.70 or less, 1.60 or less, 1.50 or less, 1.45 or less, 1.40 or less, 1.35 or less, 1.30 or less, 1.20 or less, or 1.10 or less. A relatively small aspect ratio of primary particles can be obtained by, for example, adding a modifying monomer to the polymerization system at the initial stage of TFE polymerization.

In the case of measuring the aspect ratio of PTFE using an aqueous dispersion of the PTFE, it can be determined by preparing a PTFE aqueous dispersion whose polymer solid concentration has been adjusted to about 1.0% by mass and observing it by a scanning electron microscope (SEM), subjecting 400 or more randomly extracted particles to image processing, and obtaining the aspect ratio from the average of the ratios of the major axis to the minor axis thereof. In the case of measuring the aspect ratio of PTFE using PTFE powder, it can be determined by irradiating the PTFE powder with an electron beam, then adding it into an aqueous solution of a fluorine-containing surfactant, applying ultrasonic waves to redisperse it in the aqueous solution to thereby prepare a PTFE aqueous dispersion. The aspect ratio can be obtained by the method described above using the aqueous dispersion thus prepared.

The content of the polymer (2) in the composition is preferably 0.001% by mass or more, more preferably 0.005% by mass or more, still more preferably 0.01% by mass or more, particularly preferably 0.05% by mass or more, and most preferably 0.10% by mass or more, based on the PTFE. Also, the content of the polymer (2) in the composition is preferably 10% by mass or less, more preferably 5.0% by mass or less, still more preferably 2.0% by mass or less, particularly preferably 1.0% by mass or less, and most preferably 0.50% by mass or less, based on the PTFE.

The content of the polymer (2) can be determined by solid-state NMR measurement.

Also, International Publication No. WO 2014/099453, International Publication No. WO 2010/075497, International Publication No. WO 2010/075496, International Publication No. WO 2011/008381, International Publication No.

WO 2009/055521, International Publication No. WO 1987/007619, Japanese Patent Laid-Open No. 61-293476, International Publication No. WO 2010/075494, International Publication No. WO 2010/075359, International Publication No. WO 2012/082454, International Publication No. WO 2006/119224, International Publication No. WO 2013/085864, International Publication No. WO 2012/082707, International Publication No. WO 2012/082703, International Publication No. WO 2012/082454, International Publication No. WO 2012/082451, International Publication No. WO 2006/135825, International Publication No. WO 2004/067588, International Publication No. WO 2009/068528, Japanese Patent Laid-Open No. 2004-075978, Japanese Patent Laid-Open No. 2001-226436, International Publication No. WO 1992/017635, International Publication No. WO 2014/069165, Japanese Patent Laid-Open No. 11-181009, and the like describe methods for measuring the content of the respective polymers disclosed therein. The methods for measuring the respective polymers described therein can be used as the method for measuring the content of the polymer (2).

In the composition of a PTFE of the present disclosure, it is preferable that the content of a dimer and a trimer of the monomer (2) in the polymer (2) is 1.0% by mass or less based on the polymer (2). The content of the dimer and trimer in the composition of a PTFE of the present disclosure is 1.0% by mass or less, preferably 0.1% by mass or less, more preferably 0.01% by mass or less, still more preferably 0.001% by mass or less, and particularly preferably 0.0001% by mass or less, based on the polymer (2).

The content of the dimer and trimer of the polymer (2) in the composition of a PTFE of the present disclosure can be measured by a method that is the same as that for the content of the dimer and trimer in the polymer (1).

In one embodiment, the composition of the present disclosure contains a fluorine-containing surfactant. A composition containing a fluorine-containing surfactant has an advantage that it can be stably produced with high productivity using a fluorine-containing surfactant.

In one embodiment, the composition of the present disclosure is substantially free from a fluorine-containing surfactant. In order to produce a composition substantially free from a fluorine-containing surfactant, TFE needs to be polymerized without using a fluorine-containing surfactant, but the method for producing a PTFE of the present disclosure, which uses the polymer (2), has enabled the production of such a composition.

In the present disclosure, the expression "substantially free from a fluorine-containing surfactant" means that the content of the fluorine-containing surfactant in the composition is 10 ppm by mass or less, and it is preferably 1 ppm by mass or less, more preferably 100 ppb by mass or less, still more preferably 10 ppb by mass or less, further preferably 1 ppb by mass or less, and particularly preferably the fluorine-containing surfactant is at or below the detection limit as measured by liquid chromatography-mass spectrometry (LC/MS/MS).

The content of the fluorine-containing surfactant can be quantified by a known method. For example, it can be quantified by LC/MS/MS analysis.

First, methanol is added to the composition for extraction, and the obtained extracted liquid is subjected to LC/MS/MS analysis. In order to further increase the extraction efficiency, a treatment by Soxhlet extraction, ultrasonic treatment, or the like may be performed.

The molecular weight information is extracted from the obtained LC/MS/MS spectrum to confirm agreement with the structural formula of the candidate fluorine-containing surfactant.

Thereafter, aqueous solutions having five or more different content levels of the confirmed fluorine-containing surfactant are prepared, and LC/MS/MS analysis is performed on the aqueous solutions with the respective content levels, and the relationship between the content level and the area corresponding to that content level is plotted to draw a calibration curve.

Then, using the calibration curve, the area of the LC/MS/MS chromatogram of the fluorine-containing surfactant in the extracted liquid can be converted to the content of the fluorine-containing surfactant.

The PTFE in the composition of the present disclosure can have a configuration that is the same as that of the TFE polymer (PTFE) mentioned above. The PTFE may be a TFE homopolymer containing only the TFE unit, or a modified PTFE containing the TFE unit and a modifying monomer unit.

In the modified PTFE, the content of a polymerized unit derived from the modifying monomer (hereinafter, also referred to as a "modifying monomer unit") is preferably in the range of 0.00001 to 1% by mass based on all polymerized units in the PTFE. The lower limit of the content of the modifying monomer unit is more preferably 0.0001% by mass, still more preferably 0.001% by mass, and further preferably 0.005% by mass. The upper limit of the content of the modifying monomer unit is, in the preferred order, 0.50% by mass, 0.30% by mass, 0.20% by mass, 0.15% by mass, 0.10% by mass, or 0.05% by mass. In the present disclosure, the modifying monomer unit means a portion of the molecular structure of the PTFE as a part derived from the modifying monomer.

In the present disclosure, the content of each monomer unit constituting the PTFE can be calculated by combining NMR, FT-IR, elemental analysis, and fluorescent X-ray analysis as appropriate depending on the type of monomer. The content of each monomer unit constituting the PTFE can also be determined by calculation from the amount of the modifying monomer added for use in the polymerization.

When the modifying monomer contains the modifying monomer (A), the content of a polymerized unit derived from the modifying monomer (A) is preferably in the range of 0.00001 to 1.0% by mass based on all polymerized units in the PTFE. The lower limit thereof is more preferably 0.0001% by mass, more preferably 0.0005% by mass, still more preferably 0.001% by mass, and further preferably 0.005% by mass. The upper limit is, in the preferred order, 0.90% by mass, 0.50% by mass, 0.40% by mass, 0.30% by mass, 0.20% by mass, 0.15% by mass, 0.10% by mass, 0.08% by mass, 0.05% by mass, or 0.01% by mass.

In the PTFE, the average primary particle size of primary particles is preferably 500 nm or less, more preferably 400 nm or less, and still more preferably 350 nm or less. A relatively small average primary particle size of primary particles can be obtained by, for example, adding a modifying monomer to the polymerization system at the initial stage of TFE polymerization. The lower limit of the average primary particle size may be, for example, but is not limited to, 50 nm or 100 nm. From the viewpoint of molecular weight, it is preferably 100 nm or more and still more preferably 150 nm or more.

The average primary particle size of primary particles of the PTFE can be measured by dynamic light scattering. It may be measured by first preparing a PTFE aqueous dispersion whose polymer solid concentration has been adjusted to about 1.0% by mass, and then using dynamic light scattering at a measurement temperature of 25° C. with 70 times of measurement processes, wherein the solvent (water) has a refractive index of 1.3328 and the solvent (water) has a viscosity of 0.8878 mPa·s. In the dynamic light scattering, ELSZ-1000S (manufactured by Otsuka Electronics Co., Ltd.) may be used, for example.

The PTFE contained in the composition of a PTFE of the present disclosure may be a high-molecular-weight PTFE.

In the PTFE, the standard specific gravity (SSG) is preferably 2.280 or less, more preferably 2.200 or less, still more preferably 2.190 or less, and further preferably 2.180 or less. It is also preferably 2.130 or more. The SSG is measured by the water replacement method in conformity with ASTM D792 using a sample molded in conformity with ASTM D4895-89.

The PTFE may have a thermal instability index (TII) of 20 or more. The thermal instability index (TII) of the PTFE can be adjusted within the above range by, for example, using the polymer (2) to produce the PTFE. The TII is preferably 25 or more, more preferably 30 or more, and still more preferably 35 or more. It is particularly preferably 40 or more. The TII is measured in conformity with ASTM D4895-89.

The 0.1% mass loss temperature of the PTFE may be 400° C. or lower. The 0.1% mass loss temperature of the PTFE can be adjusted within the above range by, for example, using the polymer (2) to produce the PTFE.

The 0.1% mass loss temperature can be measured by precisely weighing about 10 mg of PTFE powder without a history of being heated to a temperature of 300° C. or higher, accommodating it in a dedicated aluminum pan, and using TG/DTA (simultaneous thermogravimetric analyzer). The 0.1% mass loss temperature can be specified as the temperature corresponding to the point where the aluminum pan is heated up in the temperature range from 25° C. to 600° C. at 10° C./min under an atmospheric atmosphere and the mass is reduced by 0.1% by mass.

The 1.0% mass loss temperature of the PTFE may be 492° C. or lower. The 1.0% mass loss temperature of the PTFE can be adjusted within the above range by, for example, using the polymer (2) to produce the PTFE.

The 1.0% mass loss temperature can be measured by precisely weighing about 10 mg of PTFE powder without a history of being heated to a temperature of 300° C. or higher, accommodating it in a dedicated aluminum pan, and using TG/DTA (simultaneous thermogravimetric analyzer). The 1.0% mass loss temperature can be specified as the temperature corresponding to the point where the aluminum pan is heated up in the temperature range from 25° C. to 600° C. at 10° C./min under an atmospheric atmosphere and the mass is reduced by 1.0% by mass.

The peak temperature of the PTFE is preferably 347° C. or lower, more preferably 346° C. or lower, still more preferably 345° C. or lower, and particularly preferably 344° C. or lower. The peak temperature of the PTFE is also preferably 343° C. or lower, more preferably 342° C. or lower, still more preferably 341° C. or lower, and particularly preferably 340° C. or lower. The lower limit of the peak temperature of the PTFE may be 333° C. or higher, or 335° C. or higher.

The peak temperature of the PTFE can be measured by precisely weighing about 10 mg of PTFE powder without a history of being heated to a temperature of 300° C. or higher, accommodating it in a dedicated aluminum pan, and using TG/DTA (simultaneous thermogravimetric analyzer). The peak temperature can be specified as the temperature corresponding to the maximum value appearing in the differential thermal (DTA) curve obtained by increasing the temperature of a PTFE without a history of being heated to a temperature of 300° C. or higher at 10° C./min using TG/DTA (simultaneous thermogravimetric analyzer).

The composition of a PTFE of the present disclosure can be suitably utilized for the applications mentioned above.

The present disclosure also relates to a method for producing a low-molecular-weight PTFE, the method comprising polymerizing TFE in an aqueous medium in the presence of a polymer (1) and a chain transfer agent to obtain a low-molecular-weight PTFE, wherein the polymer (1) is a polymer of a monomer (1) represented by the general formula (1) below, and the chain transfer agent being at least one selected from the group consisting of alkanes having 2 to 4 carbon atoms:

$$CF_2=CF-R-CZ^1Z^2-A^0 \quad (1)$$

wherein R is a linking group; $Z^1$ and $Z^2$ are each independently F or $CF_3$; and $A^0$ is an anionic group.

According to the method for producing a low-molecular-weight PTFE of the present disclosure, a low-molecular-weight PTFE of which the average primary particle size is small can be produced using the polymer (1) and a specific type of chain transfer agent. Also, since the particle size of primary particles of the resulting low-molecular-weight PTFE is small, polymerization progresses smoothly and an aqueous dispersion solution with excellent stability can be obtained.

The chain transfer agent is preferably at least one selected from the group consisting of alkanes having 2 to 4 carbon atoms. Specifically, the chain transfer agent is more preferably methane, ethane, propane, butane, or isobutane, and still more preferably ethane or propane. The chain transfer agent is preferably added in an amount of 10 ppm by mass or more based on the aqueous medium, and in an amount of preferably 10,000 ppm by mass or less, and more preferably 1,000 ppm by mass or less.

The polymer (1) used in the method for producing a low-molecular-weight PTFE of the present disclosure is as mentioned above.

The polymer (1) used in the method for producing a low-molecular-weight PTFE of the present disclosure is preferably a polymer of the monomer (4) represented by the general formula (4), and more preferably a polymer of the monomer in which A in the general formula (4) is $-SO_3M$. The general formula (4) is the general formula of the monomer (4) that forms the polymerized unit constituting the polymer (1).

In the method for producing a low-molecular-weight PTFE of the present disclosure, it is preferable that the content of a dimer and a trimer of the monomer (1) in the polymer (1) is 1.0% by mass or less based on the polymer (1). The dimer and trimer of the monomer (1) are usually generated when the monomer (1) is polymerized to obtain the polymer (1). The content of the dimer and trimer in the polymer (1) is 1.0% by mass or less, preferably 0.1% by mass or less, more preferably 0.01% by mass or less, still more preferably 0.001% by mass or less, and particularly preferably 0.0001% by mass or less, based on the polymer (1).

The content of the dimer and trimer in the polymer (1) can be measured by a method that is the same as that for the content of the dimer and trimer in the polymer (1).

It is preferable that the method for producing a low-molecular-weight PTFE of the present disclosure comprises polymerizing the monomer (1) represented by the general formula (1) to obtain a crude composition containing the polymer of the monomer (1) and removing the dimer and trimer of the monomer (1) contained in the crude composition from the crude composition to obtain the polymer (1) in which the content of the dimer and trimer of the monomer (1) is 1.0% by mass or less based on the polymer (1).

The polymerization of the monomer (1) can be carried out by a method that is the same as that for the monomer (1) mentioned above. In the method for producing a low-molecular-weight PTFE of the present disclosure, the monomer (1) and another monomer may be copolymerized. The other monomer is as mentioned above as the other monomer to be copolymerized with the monomer (1).

In the method for producing a low-molecular-weight PTFE of the present disclosure, it is preferable that the polymerization of the monomer (1) is carried out in the aqueous medium substantially in the absence of a fluorine-containing surfactant (except for the monomer (1) represented by the general formula (1)). A polymer (1) substantially free from a fluorine-containing surfactant may also be obtained by carrying out the polymerization of the monomer (1) in the aqueous medium in the presence of a fluorine-containing surfactant, and after the polymerization, carrying out a means of removing the dimer and trimer of the monomer (1).

In the present disclosure, the expression "substantially in the absence of a fluorine-containing surfactant" means that the amount of the fluorine-containing surfactant is 10 ppm by mass or less based on the aqueous medium. The amount of the fluorine-containing surfactant based on the aqueous medium is preferably 1 ppm by mass or less, more preferably 100 ppb by mass or less, still more preferably 10 ppb by mass or less, and further preferably 1 ppb by mass or less.

The fluorine-containing surfactant is as mentioned above in the description on the polymerization of fluoromonomer.

After the polymerization of the monomer (1), the dimer and trimer of the monomer (1) contained in the crude composition obtained by the polymerization of the monomer (1) are removed from the crude composition. The means of removing the dimer and trimer is as mentioned above.

The polymerization of TFE can be carried out by the method mentioned above, except for the use of the polymer (1) and the chain transfer agent. Along with TFE, a modifying monomer may also be polymerized, as mentioned above. By using the modifying monomer, a low-molecular-weight PTFE of which the average primary particle size is even smaller can be easily produced. In particular, it is preferable to add the modifying monomer to the polymerization system at the initial stage of TFE polymerization. In the polymerization, it is preferable to add a modifying monomer copolymerizable with TFE before initiating the polymerization reaction, or before the polymerization reaction progresses and the concentration of the low-molecular-weight PTFE in the aqueous dispersion reaches 10.0% by mass, preferably 5.0% by mass.

The present disclosure also provides a composition comprising a low-molecular-weight PTFE and a polymer (1) of a monomer (1) represented by the following general formula (1):

$$CF_2=CF-R-CZ^1Z^2-A^0 \quad (1)$$

wherein R is a linking group; $Z^1$ and $Z^2$ are each independently F or $CF_3$; and $A^0$ is an anionic group.

The composition of a low-molecular-weight PTFE of the present disclosure can be produced by the method for producing a low-molecular-weight PTFE of the present disclosure.

The low-molecular-weight PTFE is distinguished from the high-molecular-weight PTFE in that it has a lower melt viscosity. The low-molecular-weight PTFE usually has a melt viscosity at 380° C. of $1 \times 10^2$ to $7 \times 10^3$ Pa·s. That is, in the present disclosure, "low-molecular-weight" means that the PTFE has a melt viscosity in the range of $1 \times 10^2$ to $7 \times 10^3$ Pa·s.

The melt viscosity is a value measured in conformity with ASTM D1238, using a flow tester (manufactured by Shimadzu Corporation) and a 2φ-8 die, by keeping 2 g of the sample that has been heated in advance at 380° C. for 5 minutes, at the above temperature under a load of 0.7 MPa.

The composition of a low-molecular-weight PTFE of the present disclosure may be a low-molecular-weight PTFE aqueous dispersion in which primary particles of the low-molecular-weight PTFE are dispersed in the aqueous medium. The aqueous dispersion may be any of an aqueous dispersion obtained by the polymerization mentioned above, a dispersion obtained by concentrating this aqueous dispersion or subjecting the aqueous dispersion to dispersion stabilization treatment, and an aqueous dispersion obtained by dispersing powder of the low-molecular-weight PTFE into an aqueous medium in the presence of the surfactant. The composition of a low-molecular-weight PTFE of the present disclosure may also be low-molecular-weight PTFE powder. The low-molecular-weight PTFE powder is obtained by, for example, coagulation of the low-molecular-weight PTFE in a low-molecular-weight PTFE aqueous dispersion by a known method.

The content of the polymer (1) in the composition is preferably 0.001% by mass or more, more preferably 0.005% by mass or more, still more preferably 0.01% by mass or more, particularly preferably 0.05% by mass or more, and most preferably 0.10% by mass or more, based on the low-molecular-weight PTFE. Also, the content of the polymer (1) in the composition is preferably 10% by mass or less, more preferably 5.0% by mass or less, still more preferably 2.0% by mass or less, particularly preferably 1.0% by mass or less, and most preferably 0.50% by mass or less, based on the low-molecular-weight PTFE.

The content of the polymer (1) can be determined by solid-state NMR measurement.

Also, International Publication No. WO 2014/099453, International Publication No. WO 2010/075497, International Publication No. WO 2010/075496, International Publication No. WO 2011/008381, International Publication No. WO 2009/055521, International Publication No. WO 1987/007619, Japanese Patent Laid-Open No. 61-293476, International Publication No. WO 2010/075494, International Publication No. WO 2010/075359, International Publication No. WO 2012/082454, International Publication No. WO 2006/119224, International Publication No. WO 2013/085864, International Publication No. WO 2012/082707, International Publication No. WO 2012/082703, International Publication No. WO 2012/082454, International Publication No. WO 2012/082451, International Publication No. WO 2006/135825, International Publication No. WO 2004/067588, International Publication No. WO 2009/068528, Japanese Patent Laid-Open No. 2004-075978, Japanese Patent Laid-Open No. 2001-226436, International Publication No. WO 1992/017635, International Publication No. WO 2014/069165, Japanese Patent Laid-Open No. 11-181009, and the like describe methods for measuring the content of the respective polymers disclosed therein. The methods for measuring the respective polymers described therein can be used as the method for measuring the content of the polymer (1).

In the composition of a low-molecular-weight PTFE of the present disclosure, it is preferable that the content of a dimer and a trimer of the monomer (1) in the polymer (1) is 1.0% by mass or less based on the polymer (1). The content of the dimer and trimer in the composition of a low-molecular-weight PTFE of the present disclosure is 1.0% by mass or less, preferably 0.1% by mass or less, more preferably 0.01% by mass or less, still more preferably 0.001% by mass or less, and particularly preferably 0.0001% by mass or less, based on the polymer (1).

The content of the dimer and trimer of the polymer (1) in the composition of a low-molecular-weight PTFE of the present disclosure can be measured by a method that is the same as that for the content of the dimer and trimer in the polymer (1).

In one embodiment, the composition of the present disclosure contains a fluorine-containing surfactant. A composition containing a fluorine-containing surfactant has an advantage that it can be stably produced with high productivity using a fluorine-containing surfactant.

In one embodiment, the composition of the present disclosure is substantially free from a fluorine-containing surfactant. In order to produce a composition substantially free from a fluorine-containing surfactant, TFE needs to be polymerized without using a fluorine-containing surfactant, but the method for producing a low-molecular-weight PTFE of the present disclosure, which uses the polymer (1), has enabled the production of such a composition.

In the present disclosure, the expression "substantially free from a fluorine-containing surfactant" means that the content of the fluorine-containing surfactant in the composition is 10 ppm by mass or less, and it is preferably 1 ppm by mass or less, more preferably 100 ppb by mass or less, still more preferably 10 ppb by mass or less, further preferably 1 ppb by mass or less, and particularly preferably the fluorine-containing surfactant is at or below the detection limit as measured by liquid chromatography-mass spectrometry (LC/MS/MS).

The content of the fluorine-containing surfactant can be quantified by a known method. For example, it can be quantified by LC/MS/MS analysis.

First, methanol is added to the composition for extraction, and the obtained extracted liquid is subjected to LC/MS/MS analysis. In order to further increase the extraction efficiency, a treatment by Soxhlet extraction, ultrasonic treatment, or the like may be performed.

The molecular weight information is extracted from the obtained LC/MS/MS spectrum to confirm agreement with the structural formula of the candidate fluorine-containing surfactant.

Thereafter, aqueous solutions having five or more different content levels of the confirmed fluorine-containing surfactant are prepared, and LC/MS/MS analysis is performed on the aqueous solutions with the respective content levels, and the relationship between the content level and the area corresponding to that content level is plotted to draw a calibration curve.

Then, using the calibration curve, the area of the LC/MS/MS chromatogram of the fluorine-containing surfactant in the extracted liquid can be converted to the content of the fluorine-containing surfactant.

The low-molecular-weight PTFE in the composition of the present disclosure can have a configuration that is the same as that of the TFE polymer (PTFE) mentioned above. The low-molecular-weight PTFE may be a TFE homopolymer containing only the TFE unit, or a modified PTFE containing the TFE unit and a modifying monomer unit.

In the modified PTFE, the content of a polymerized unit derived from the modifying monomer (hereinafter, also referred to as a "modifying monomer unit") is preferably in the range of 0.00001 to 1% by mass based on all polymerized units in the low-molecular-weight PTFE. The lower limit of the content of the modifying monomer unit is more preferably 0.0001% by mass, still more preferably 0.001% by mass, and further preferably 0.005% by mass. The upper limit of the content of the modifying monomer unit is, in the preferred order, 0.50% by mass, 0.30% by mass, 0.20% by mass, 0.15% by mass, 0.10% by mass, or 0.05% by mass. In the present disclosure, the modifying monomer unit means a portion of the molecular structure of the low-molecular-weight PTFE as a part derived from the modifying monomer.

In the present disclosure, the content of each monomer unit constituting the low-molecular-weight PTFE can be calculated by combining NMR, FT-IR, elemental analysis, and fluorescent X-ray analysis as appropriate depending on the type of monomer. The content of each monomer unit constituting the low-molecular-weight PTFE can also be determined by calculation from the amount of the modifying monomer added for use in the polymerization.

When the modifying monomer contains the modifying monomer (A), the content of a polymerized unit derived from the modifying monomer (A) is preferably in the range of 0.00001 to 1.0% by mass based on all polymerized units in the low-molecular-weight PTFE. The lower limit thereof is more preferably 0.0001% by mass, more preferably 0.0005% by mass, still more preferably 0.001% by mass, and further preferably 0.005% by mass. The upper limit is, in the preferred order, 0.90% by mass, 0.50% by mass, 0.40% by mass, 0.30% by mass, 0.20% by mass, 0.15% by mass, 0.10% by mass, 0.08% by mass, 0.05% by mass, or 0.01% by mass.

The average primary particle size of primary particles of the low-molecular-weight PTFE is preferably 10 to 200 nm, and it is more preferably 20 nm or more, more preferably 140 nm or less, still more preferably 150 nm or less, and particularly preferably 90 nm or less. A relatively small average primary particle size of primary particles can be obtained by, for example, adding a modifying monomer to the polymerization system at the initial stage of TFE polymerization.

The average primary particle size of primary particles of the low-molecular-weight PTFE can be measured by dynamic light scattering. It may be measured by first preparing a low-molecular-weight PTFE aqueous dispersion whose polymer solid concentration has been adjusted to about 1.0% by mass, and then using dynamic light scattering at a measurement temperature of 25° C. with 70 times of measurement processes, wherein the solvent (water) has a refractive index of 1.3328 and the solvent (water) has a viscosity of 0.8878 mPa·s. In the dynamic light scattering, ELSZ-1000S (manufactured by Otsuka Electronics Co., Ltd.) may be used, for example.

The upper limit of the peak temperature of the low-molecular-weight PTFE may be 333° C. or lower, or 332° C. or lower.

The lower limit of the peak temperature of the low-molecular-weight PTFE may be 322° C. or higher, or 324° C. or higher.

The peak temperature of the low-molecular-weight PTFE can be measured by precisely weighing about 10 mg of low-molecular-weight PTFE powder without a history of being heated to a temperature of 300° C. or higher, accommodating it in a dedicated aluminum pan, and using TG/DTA (simultaneous thermogravimetric analyzer). The peak temperature can be specified as the temperature corresponding to the maximum value appearing in the differential thermal (DTA) curve obtained by increasing the temperature of a low-molecular-weight PTFE without a history of being heated to a temperature of 300° C. or higher at 10° C./min using TG/DTA (simultaneous thermogravimetric analyzer).

The 0.1% mass loss temperature of the low-molecular-weight PTFE may be 400° C. or lower. The 0.1% mass loss temperature of the low-molecular-weight PTFE can be adjusted within the above range by, for example, using the polymer (1) to produce the low-molecular-weight PTFE.

The 0.1% mass loss temperature can be measured by precisely weighing about 10 mg of low-molecular-weight PTFE powder without a history of being heated to a temperature of 300° C. or higher, accommodating it in a dedicated aluminum pan, and using TG/DTA (simultaneous thermogravimetric analyzer). The 0.1% mass loss temperature can be specified as the temperature corresponding to the point where the aluminum pan is heated up in the temperature range from 25° C. to 600° C. at 10° C./min under an atmospheric atmosphere and the mass is reduced by 0.1% by mass.

The 1.0% mass loss temperature of the low-molecular-weight PTFE may be 492° C. or lower. The 1.0% mass loss temperature of the low-molecular-weight PTFE can be adjusted within the above range by, for example, using the polymer (1) to produce the low-molecular-weight PTFE.

The 1.0% mass loss temperature can be measured by precisely weighing about 10 mg of low-molecular-weight PTFE powder without a history of being heated to a temperature of 300° C. or higher, accommodating it in a dedicated aluminum pan, and using TG/DTA (simultaneous thermogravimetric analyzer). The 1.0% mass loss temperature can be specified as the temperature corresponding to the point where the aluminum pan is heated up in the temperature range from 25° C. to 600° C. at 10° C./min under an atmospheric atmosphere and the mass is reduced by 1.0% by mass.

The composition of a low-molecular-weight PTFE of the present disclosure can be suitably utilized for the applications mentioned above.

The present disclosure also relates to a method for producing a perfluoroelastomer, the method comprising polymerizing a perfluoromonomer in an aqueous medium in the presence of a polymer (2) to obtain a perfluoroelastomer, wherein the polymer (2) is a polymer of a monomer (2) represented by the following general formula (2):

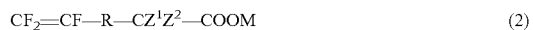

$$CF_2=CF-R-CZ^1Z^2-COOM \qquad (2)$$

wherein R is a linking group; $Z^1$ and $Z^2$ are each independently F or $CF_3$; M is H, a metal atom, $NR^7_4$, imidazolium optionally having a substituent, pyridinium optionally having a substituent, or phosphonium optionally having a substituent; and $R^7$ is H or an organic group.

Conventionally, fluorine-containing surfactants have been used for the polymerization of perfluoromonomers, but the production method of the present disclosure allows for, by using the polymer (2), polymerizing a perfluoromonomer to obtain a perfluoroelastomer even without using the fluorine-containing surfactants.

The polymer (2) represented by the general formula (2) used in the method for producing a perfluoroelastomer of the present disclosure has the same structure as the polymer (1) of the monomer (1) represented by the general formula (1), except that the anionic group $(A^0)$ in the general formula (1) is —COOM, and R, $Z^1$, $Z^2$, and M in the general formula (2) are also the same as R, $Z^1$, $Z^2$, and M in the general formula (1).

The polymer (2) used in the method for producing a perfluoroelastomer preferably has an ion exchange capacity of 1.50 meq/g or more. By using a polymer (2) having a high ion exchange capacity, a sufficient number of perfluoroelastomer particles can be generated at a sufficient polymerization rate while suppressing the adhesion of the perfluoroelastomer to the polymerization tank. Furthermore, by using a polymer (2) having a high ion exchange capacity, it is possible to produce a perfluoroelastomer that exhibits excellent compression set characteristics even at a very high temperature.

The ion exchange capacity of the polymer (2) is, in the order of becoming more preferred, 1.50 meq/g or more, 1.75 meq/g or more, 2.00 meq/g or more, 2.40 meq/g or more, 2.50 meq/g or more, 2.60 meq/g or more, 3.00 meq/g or more, or 3.50 meq/g or more. The ion exchange capacity is the content of ionic groups (anionic groups) in the polymer (2) and can be determined by calculation from the compositional features of the polymer (2). Precursor groups that become ionic by hydrolysis (for example, $-COOCH_3$) are not considered to be ionic groups, for the purpose of determining the ion exchange capacity. It is presumed that the higher the ion exchange capacity of the polymer (2), the more anionic groups in the polymer (2), the more stable particles are formed, and also the higher the particle forming ability, resulting in a higher number of particles per unit water volume and a higher polymerization rate. When the ion exchange capacity of the polymer (2) is too low, the perfluoroelastomer produced by the polymerization may be adhered to the polymerization tank, a sufficient polymerization rate may not be obtained, or the number of perfluoroelastomer particles generated may be small.

The polymer (2) used in the method for producing a perfluoroelastomer of the present disclosure is preferably a polymer of a monomer in which A in the general formula (3), the general formula (4), and the general formula (5) is —COOM, more preferably a polymer of a monomer in which A in the general formula (4) is —COOM, and still more preferably a polymer of a monomer in which A in the general formula (4a) and the general formula (4d) is —COOM. The general formula (3), the general formula (4), and the general formula (5) are the general formulas of monomers (3) to (5) that form the polymerized units constituting the polymer (1).

In the method for producing a perfluoroelastomer of the present disclosure, it is preferable that the content of a dimer and a trimer of the monomer (2) in the polymer (2) is 1.0% by mass or less based on the polymer (2). The dimer and trimer of the monomer (2) are usually generated when the monomer (2) is polymerized to obtain the polymer (2). The content of the dimer and trimer in the polymer (2) is 1.0% by mass or less, preferably 0.1% by mass or less, more preferably 0.01% by mass or less, still more preferably 0.001% by mass or less, and particularly preferably 0.0001% by mass or less, based on the polymer (2).

The content of the dimer and trimer in the polymer (2) can be measured by a method that is the same as that for the content of the dimer and trimer in the polymer (1).

It is preferable that the method for producing a perfluoroelastomer of the present disclosure comprises polymerizing the monomer (2) represented by the general formula (2) to obtain a crude composition containing the polymer of the monomer (2) and removing the dimer and trimer of the monomer (2) contained in the crude composition from the crude composition to obtain the polymer (2) in which the content of the dimer and trimer of the monomer (2) is 1.0% by mass or less based on the polymer (2).

The polymerization of the monomer (2) can be carried out by a method that is the same as that for the monomer (1) mentioned above. In the method for producing a perfluoroelastomer of the present disclosure, the monomer (2) and another monomer may be copolymerized. The other monomer is as mentioned above as the other monomer to be copolymerized with the monomer (1). The configuration of a copolymer obtained as the polymer (2) is also the same as that of the polymer (1).

In the method for producing a perfluoroelastomer of the present disclosure, it is preferable that the polymerization of the monomer (2) is carried out in the aqueous medium substantially in the absence of a fluorine-containing surfactant (except for the monomer (2) represented by the general formula (2)).

In the present disclosure, the expression "substantially in the absence of a fluorine-containing surfactant" means that the amount of the fluorine-containing surfactant is 10 ppm by mass or less based on the aqueous medium. The amount of the fluorine-containing surfactant based on the aqueous medium is preferably 1 ppm by mass or less, more preferably 100 ppb by mass or less, still more preferably 10 ppb by mass or less, and further preferably 1 ppb by mass or less.

The fluorine-containing surfactant is as mentioned above in the description on the polymerization of fluoromonomer.

After the polymerization of the monomer (2), the dimer and trimer of the monomer (2) contained in the crude composition obtained by the polymerization of the monomer (2) are removed from the crude composition. The means of removing the dimer and trimer is as mentioned above.

The perfluoromonomer is preferably at least one selected from the group consisting of:
tetrafluoroethylene (TFE);
hexafluoropropylene (HFP);
a fluoromonomer represented by the general formula: $CF_2=CF-ORf^{13}$, 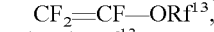
wherein $Rf^{13}$ represents a perfluoroalkyl group having 1 to 8 carbon atoms;
a fluoromonomer represented by the general formula: $CF_2=CFOCF_2ORf^{14}$, 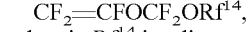
wherein $Rf^{14}$ is a linear or branched perfluoroalkyl group having 1 to 6 carbon atoms, a cyclic perfluoroalkyl group having 5 to 6 carbon atoms, or a linear or branched perfluorooxyalkyl group having 2 to 6 carbon atoms and containing 1 to 3 oxygen atoms; and
a fluoromonomer represented by the general formula: $CF_2=CFO(CF_2CF(Y^{15})O)_m(CF_2)_nF$, 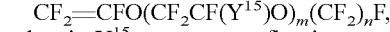
wherein $Y^{15}$ represents a fluorine atom or a trifluoromethyl group, m is an integer of 1 to 4, and n is an integer of 1 to 4.

Also, in the polymerization of the perfluoromonomer, a monomer that provides a crosslinking site may be polymerized together with the perfluoromonomer.

The polymerization of the perfluoromonomer can be carried out by the method mentioned above, except for the use of the polymer (2).

It is preferable that the polymer (2) is added in an amount of 0.01 to 20% by mass based on 100% by mass of the aqueous medium. When the amount of the polymer (2) added in the polymerization (the amount present) is within the above range, the polymerization reaction of the perfluoromonomer progresses smoothly and the perfluoroelastomer can be produced efficiently. When the amount of the polymer (2) added is too small, a sufficient polymerization rate cannot be obtained or a sufficient yield cannot be obtained.

Since the polymerization reaction of the perfluoromonomer progresses further smoothly, the amount of the polymer (2) added is more preferably 0.1% by mass or more, still more preferably 0.5% by mass or more, particularly preferably 0.75% by mass or more, and most preferably 1.0% by mass or more, based on 100% by mass of the aqueous medium.

In addition, when the amount added is too large, effects commensurate with the amount added cannot be obtained, which is economically disadvantageous, and post-treatment after the completion of the polymerization may be cumbersome. Therefore, the amount of the polymer (2) added is more preferably 15% by mass or less, still more preferably 10% by mass or less, and particularly preferably 5% by mass or less, based on 100% by mass of the aqueous medium.

The polymerization of the perfluoromonomer may be carried out in the presence of a polymerization initiator. The polymerization initiator is as mentioned above. The amount of the polymerization initiator added is preferably 0.0001 to 10% by mass, and more preferably 0.01 to 5% by mass, based on 100% by mass of the perfluoromonomer. When the amount of the polymerization initiator added in the polymerization (the amount present) is within the above range, the polymerization reaction of the perfluoromonomer progresses smoothly and the perfluoroelastomer can be produced efficiently. When the amount of the polymerization initiator added is too small, a sufficient polymerization rate cannot be obtained or a sufficient yield cannot be obtained.

The polymerization of the perfluoromonomer may be carried out in the presence of a pH adjuster. By carrying out the polymerization in the presence of a pH adjuster, a sufficient number of perfluoroelastomer particles can be generated at a sufficient polymerization rate while further suppressing the adhesion of the perfluoroelastomer to the polymerization tank. The pH adjuster may be added before the initiation of polymerization or may be added after the initiation of polymerization.

As the pH adjuster, ammonia, sodium hydroxide, potassium hydroxide, sodium carbonate, potassium carbonate, ammonium carbonate, sodium bicarbonate, potassium bicarbonate, ammonium bicarbonate, sodium phosphate, potassium phosphate, sodium citrate, potassium citrate, ammonium citrate, sodium gluconate, potassium gluconate, ammonium gluconate, or the like can be used.

The present disclosure also relates to a composition comprising a perfluoroelastomer and a polymer (2) of a monomer (2) represented by the following general formula (2):

$$CF_2=CF-R-CZ^1Z^2-COOM \qquad (2)$$

wherein R is a linking group; $Z^1$ and $Z^2$ are each independently F or $CF_3$; M is H, a metal atom, $NR^7_4$, imidazolium optionally having a substituent, pyridinium optionally having a substituent, or phosphonium optionally having a substituent; and $R^7$ is H or an organic group.

The composition of the present disclosure can be produced by the method for producing a perfluoroelastomer of the present disclosure.

The form of the composition of the present disclosure is not limited, but it may be in the form of, for example, an aqueous dispersion, gum, crumb, powder, pellets, or the like.

The lower limit value of the content of the polymer (2) in the composition is preferably 0.0001% by mass, more preferably 0.001% by mass, still more preferably 0.01% by mass, and particularly preferably 0.1% by mass, based on the perfluoroelastomer. The upper limit value of the content of the polymer (2) in the composition is preferably 20% by mass, more preferably 10% by mass, still more preferably 6% by mass, further preferably 4% by mass, still further preferably 2% by mass, particularly preferably 1.5% by mass, and most preferably 1% by mass.

The content of the polymer (2) in the composition can be determined by, for example, solid-state $^{19}$F-MAS NMR measurement. Examples of a method for measuring the content of the polymer (2) include methods for measuring the content of the polymer disclosed in International Publication No. WO2014/099453, International Publication No. WO2010/075497, International Publication No. WO2010/075496, International Publication No. WO2011/008381, International Publication No. WO2009/055521, International Publication No. WO1987/007619, Japanese Patent Laid-Open No. 61-293476, International Publication No. WO2010/075494, International Publication No. WO2010/075359, International Publication No. WO2012/082454, International Publication No. WO2006/119224, International Publication No. WO2013/085864, International Publication No. WO2012/082707, International Publication No. WO2012/082703, International Publication No. WO2012/082454, International Publication No. WO2012/082451, International Publication No. WO2006/135825, International Publication No. WO2004/067588, International Publication No. WO2009/068528, Japanese Patent Laid-Open No. 2004-075978, Japanese Patent Laid-Open No. 2001-226436, International Publication No. WO1992/017635, International Publication No. WO2014/069165, Japanese Patent Laid-Open No. 11-181009, and the like. Specific examples of the device used therefor include AVANCE III HD400 manufactured by Bruker and AVANCE300 manufactured by Bruker. The rotation speed is set according to the resonance frequency of the device, and is set such that the spinning side band does not overlap the peaks used for the content calculation of the perfluoroelastomer or the polymer (2).

Also, the content of the polymer (2) in the composition may be measured by the following method. It can be measured by a method in which the composition is mixed with a solvent that dissolves the perfluoroelastomer, deionized water is added to the obtained mixed solution to extract the polymer (2) from the obtained mixed solution, the upper phase (aqueous phase) containing the polymer (2) is collected, and the mass of the residue (polymer (2)) obtained by heating and drying the collected upper phase is measured to calculate the content of the polymer (2).

As the solvent that dissolves the perfluoroelastomer, a perhalo solvent in which all of the hydrogen atoms are replaced by halogen atoms is preferable, and in particular, a perfluoro solvent in which all of the hydrogen atoms are replaced by fluorine atoms is preferable. Specific examples of the perfluoro solvent include perfluoro tertiary amines such as perfluorotri-n-butylamine and perfluorotriethylamine, perfluorinated tetrahydrofuran, perfluorobenzene, Fluorinert FC-77 (manufactured by 3M Company), Demnum Solvent (manufactured by Daikin Industries, Ltd., main component: $C_6F_{14}$), R-318 (manufactured by Daikin Industries, Ltd., main component: $C_4F_8Cl_2$), and Fluorinert FC-43 (manufactured by 3M Company, main component: $(C_4F_9)_3N$), and among these, perfluorotri-n-butylamine and Fluorinert FC-77 are preferable from the viewpoint of handling properties.

Also, as the solvent that dissolves the perfluoroelastomer, various fluorine-containing solvents are preferably used in addition to those exemplified above, and specific examples thereof include perfluoroalkanes, HFCs (hydrofluorocarbons), HFEs (hydrofluoroethers), and HCFCs (hydrochlorofluorocarbons). Specifically, mention may be made of HFE-7100 (manufactured by 3M Company, main component: $C_4F_9OCH_3$), HFE-7200 (manufactured by 3M Company, main component: $C_4F_9OC_2H_5$), and Vertrel XF (manufactured by The Chemours Company, main component: $C_5H_2F_{10}$).

In the composition of a perfluoroelastomer of the present disclosure, it is preferable that the content of a dimer and a trimer of the monomer (2) in the polymer (2) is 1.0% by mass or less based on the polymer (2). The content of the dimer and trimer in the composition of a perfluoroelastomer of the present disclosure is 1.0% by mass or less, preferably 0.1% by mass or less, more preferably 0.01% by mass or less, still more preferably 0.001% by mass or less, and particularly preferably 0.0001% by mass or less, based on the polymer (2).

The content of the dimer and trimer of the polymer (2) in the composition of a perfluoroelastomer of the present disclosure can be measured by a method that is the same as that for the content of the dimer and trimer in the polymer (1).

In one embodiment, the composition of the present disclosure contains a fluorine-containing surfactant. A composition containing a fluorine-containing surfactant has an advantage that it can be stably produced with high productivity using a fluorine-containing surfactant.

In one embodiment, the composition of the present disclosure is substantially free from a fluorine-containing surfactant. In order to produce a composition substantially free from a fluorine-containing surfactant, the perfluoromonomer needs to be polymerized without using a fluorine-containing surfactant, but the method for producing a perfluoroelastomer of the present disclosure, which uses the polymer (2), has enabled the production of such a composition.

In the present disclosure, the expression "substantially free from a fluorine-containing surfactant" means that the content of the fluorine-containing surfactant in the composition is 10 ppm by mass or less, and it is preferably 1 ppm by mass or less, more preferably 100 ppb by mass or less, still more preferably 10 ppb by mass or less, further preferably 1 ppb by mass or less, and particularly preferably the fluorine-containing surfactant is at or below the detection limit as measured by liquid chromatography-mass spectrometry (LC/MS/MS).

The content of the fluorine-containing surfactant can be quantified by a known method. For example, it can be quantified by LC/MS/MS analysis. First, methanol is added to the composition for extraction, and the obtained extracted liquid is subjected to LC/MS/MS analysis.

In order to further increase the extraction efficiency, a treatment by Soxhlet extraction, ultrasonic treatment, or the like may be performed.

The molecular weight information is extracted from the obtained LC/MS/MS spectrum to confirm agreement with the structural formula of the candidate fluorine-containing surfactant.

Thereafter, aqueous solutions having five or more different content levels of the confirmed fluorine-containing surfactant are prepared, and LC/MS/MS analysis is performed on the aqueous solutions with the respective content levels, and the relationship between the content level and the area corresponding to that content level is plotted to draw a calibration curve.

Then, using the calibration curve, the area of the LC/MS/MS chromatogram of the fluorine-containing surfactant in the extracted liquid can be converted to the content of the fluorine-containing surfactant.

The perfluoroelastomer in the composition of the present disclosure can have a configuration that is the same as that of the perfluoroelastomer mentioned above.

The composition of a perfluoroelastomer of the present disclosure can further contain a curing agent (cross-linking agent), a filler, and the like. Examples of the curing agent include polyols, polyamines, organic peroxides, organotins, bis(aminophenol)tetraamine, and bis(thioaminophenol).

It is preferable that the composition of a perfluoroelastomer of the present disclosure contains at least one selected from the group consisting of an inorganic nitride, an organotin compound, an ammonia-generating compound, and a cross-linking agent.

Examples of the cross-linking agent include cross-linking agents used in peroxide crosslinking, polyol crosslinking, polyamine crosslinking, triazine crosslinking, oxazole crosslinking, imidazole crosslinking, and thiazole crosslinking.

From the viewpoint of heat resistance, steam resistance, amine resistance, and good crosslinkability, 2,2-bis[3-amino-4-(N-phenylamino)phenyl]hexafluoropropane (AFTA-Ph) is preferable as the cross-linking agent.

The content of the cross-linking agent is preferably 0.05 to 10 parts by mass, and more preferably 0.5 to 5 parts by mass, based on 100 parts by mass of the perfluoroelastomer.

Examples of the filler include organic fillers made of engineering plastics such as polyarylate, polysulfone, polyethersulfone, polyphenylene sulfide, polyoxybenzoate, and polytetrafluoroethylene powder; metal oxide fillers such as aluminum oxide, silicon oxide, yttrium oxide, and titanium oxide; metal carbide fillers such as silicon carbide and aluminum carbide, and metal nitride fillers such as silicon nitride and aluminum nitride; and inorganic fillers such as aluminum fluoride, fluorocarbon, barium sulfate, carbon black, silica, clay, and talc.

The content of the filler is preferably 0.5 to 100 parts by mass, and more preferably 5 to 50 parts by mass, based on 100 parts by mass of the perfluoroelastomer.

Particularly, in a field where high purity and antistaining properties are not demanded, usual additives to be compounded into perfluoroelastomers if required, such as processing aids, plasticizers, and coloring agents, can be compounded, and one or more types of ordinary cross-linking agents or cross-linking aids different from those described above may also be compounded.

The composition of a perfluoroelastomer of the present disclosure can be suitably utilized for the applications mentioned above.

The present disclosure also relates to a method for producing a partially fluorinated elastomer, the method comprising polymerizing a fluoromonomer in an aqueous medium in the presence of a polymer (2) to obtain a partially fluorinated elastomer, wherein the polymer (2) is a polymer of a monomer (2) represented by the following general formula (2):

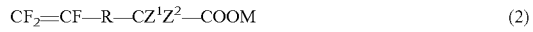

$$CF_2=CF-R-CZ^1Z^2-COOM \qquad (2)$$

wherein R is a linking group; $Z^1$ and $Z^2$ are each independently F or $CF_3$; M is H, a metal atom, $NR^7_4$, imidazolium optionally having a substituent, pyridinium optionally having a substituent, or phosphonium optionally having a substituent; and $R^7$ is H or an organic group.

Conventionally, fluorine-containing surfactants have been used for the polymerization of fluoromonomers, but the production method of the present disclosure allows for, by using the polymer (2), polymerizing a fluoromonomer to obtain a partially fluorinated elastomer even without using the fluorine-containing surfactants.

Furthermore, since the production method of the present disclosure comprises polymerizing the fluoromonomer in the aqueous medium in the presence of the polymer (2), a sufficient number of partially fluorinated elastomer particles can be generated at a sufficient polymerization rate while suppressing the adhesion of the partially fluorinated elastomer to the polymerization tank.

The polymer (2) represented by the general formula (2) used in the method for producing a partially fluorinated elastomer of the present disclosure has the same structure as the polymer (1) of the monomer (1) represented by the general formula (1), except that the anionic group ($A^0$) in the general formula (1) is —COOM, and R, $Z^1$, $Z^2$, and M in the general formula (2) are also the same as R, $Z^1$, $Z^2$, and M in the general formula (1).

The polymer (2) used in the method for producing a partially fluorinated elastomer of the present disclosure is preferably a polymer of a monomer in which A in the general formula (3), the general formula (4), and the general formula (5) is —COOM, more preferably a polymer of a monomer in which A in the general formula (4) is —COOM, and still more preferably a polymer of a monomer in which A in the general formula (4a) and the general formula (4d) is —COOM. The general formula (3), the general formula (4), and the general formula (5) are the general formulas of monomers (3) to (5) that form the polymerized units constituting the polymer (1).

In the method for producing a partially fluorinated elastomer of the present disclosure, it is preferable that the content of a dimer and a trimer of the monomer (2) in the polymer (2) is 1.0% by mass or less based on the polymer (2). The dimer and trimer of the monomer (2) are usually generated when the monomer (2) is polymerized to obtain the polymer (2). The content of the dimer and trimer in the polymer (2) is 1.0% by mass or less, preferably 0.1% by mass or less, more preferably 0.01% by mass or less, still more preferably 0.001% by mass or less, and particularly preferably 0.0001% by mass or less, based on the polymer (2).

The content of the dimer and trimer in the polymer (2) can be measured by a method that is the same as that for the content of the dimer and trimer in the polymer (1).

It is preferable that the method for producing a partially fluorinated elastomer of the present disclosure comprises polymerizing the monomer (2) represented by the general formula (2) to obtain a crude composition containing the polymer of the monomer (2) and removing the dimer and trimer of the monomer (2) contained in the crude composition from the crude composition to obtain the polymer (2) in which the content of the dimer and trimer of the monomer (2) is 1.0% by mass or less based on the polymer (2).

The polymerization of the monomer (2) can be carried out by a method that is the same as that for the monomer (1) mentioned above. In the method for producing a partially fluorinated elastomer of the present disclosure, the monomer (2) and another monomer may be copolymerized. The other monomer is as mentioned above as the other monomer to be copolymerized with the monomer (1). The configuration of a copolymer obtained as the polymer (2) is also the same as that of the polymer (1).

In the method for producing a partially fluorinated elastomer of the present disclosure, it is preferable that the polymerization of the monomer (2) is carried out in the aqueous medium substantially in the absence of a fluorine-containing surfactant (except for the monomer (2) represented by the general formula (2)).

In the present disclosure, the expression "substantially in the absence of a fluorine-containing surfactant" means that the amount of the fluorine-containing surfactant is 10 ppm by mass or less based on the aqueous medium. The amount of the fluorine-containing surfactant based on the aqueous medium is preferably 1 ppm by mass or less, more preferably 100 ppb by mass or less, still more preferably 10 ppb by mass or less, and further preferably 1 ppb by mass or less.

The fluorine-containing surfactant is as mentioned above in the description on the polymerization of fluoromonomer.

After the polymerization of the monomer (2), the dimer and trimer of the monomer (2) contained in the crude composition obtained by the polymerization of the monomer (2) are removed from the crude composition. The means of removing the dimer and trimer is as mentioned above.

The fluoromonomer is as mentioned above.

The fluoromonomer is preferably at least one selected from the group consisting of vinylidene fluoride (VdF), tetrafluoroethylene (TFE), hexafluoropropylene (HFP), a perfluoro(alkyl vinyl ether) (PAVE), chlorotrifluoroethylene (CTFE), trifluoroethylene, trifluoropropylene, tetrafluoropropylene, pentafluoropropylene, trifluorobutene, tetrafluoroisobutene, hexafluoroisobutene, vinyl fluoride, an iodine-containing fluorinated vinyl ether, and a fluorine-containing monomer (2) represented by the general formula: $CHX^1=CX^2Rf$, wherein one of $X^1$ and $X^2$ is H and the other is F, and Rf is a linear or branched fluoroalkyl group having 1 to 12 carbon atoms.

In the method for producing a partially fluorinated elastomer of the present disclosure, since it is possible to generate an even larger number of partially fluorinated elastomer particles at a higher polymerization rate while further suppressing the adhesion of the partially fluorinated elastomer to the polymerization tank, it is preferable to polymerize at least vinylidene fluoride or tetrafluoroethylene as the fluoromonomer, and it is more preferable to polymerize vinylidene fluoride.

The polymerization of the fluoromonomer can be carried out by the method mentioned above, except for the use of the polymer (2).

It is preferable that the polymer (2) is added in an amount of 0.01 to 20% by mass based on 100% by mass of the aqueous medium. When the amount of the polymer (2) added in the polymerization (the amount present) is within the above range, the polymerization reaction of the fluoromonomer progresses smoothly and the partially fluorinated elastomer can be produced efficiently. When the amount of the polymer (2) added is too small, a sufficient polymerization rate cannot be obtained or a sufficient yield cannot be obtained.

Since the polymerization reaction of the fluoromonomer progresses further smoothly, the amount of the polymer (2) added is more preferably 0.0001% by mass or more, still more preferably 0.0005% by mass or more, further preferably 0.001% by mass or more, particularly preferably 0.005% by mass or more, and most preferably 0.01% by mass or more, based on 100% by mass of the aqueous medium.

In addition, when the amount added is too large, effects commensurate with the amount added cannot be obtained, which is economically disadvantageous, and therefore, the amount of the polymer (2) added is more preferably 2% by mass or less, still more preferably 1% by mass or less, and particularly preferably 0.5% by mass or less, based on 100% by mass of the aqueous medium.

The polymerization of the fluoromonomer may be carried out in the presence of a polymerization initiator. The polymerization initiator is as mentioned above. The amount of the polymerization initiator is determined as appropriate in accordance with the types of the monomers, the molecular weight of the target partially fluorinated elastomer, and the reaction rate. The amount of the polymerization initiator is appropriately determined in accordance with the molecular weight of the target partially fluorinated elastomer and the polymerization reaction rate, and is preferably 0.00001 to 10% by mass, and more preferably 0.0001 to 1% by mass, based on 100% by mass of the total amount of the monomers.

The present disclosure also relates to a composition comprising a partially fluorinated elastomer and a polymer (2) of a monomer (2) represented by the following general formula (2):

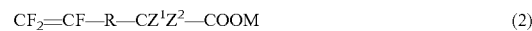

$$CF_2=CF-R-CZ^1Z^2-COOM \qquad (2)$$

wherein R is a linking group; $Z^1$ and $Z^2$ are each independently F or $CF_3$; M is H, a metal atom, $NR^7_4$, imidazolium optionally having a substituent, pyridinium optionally having a substituent, or phosphonium optionally having a substituent; and $R^7$ is H or an organic group.

The composition of the present disclosure can be produced by the method for producing a partially fluorinated elastomer of the present disclosure.

The form of the composition of the present disclosure is not limited, but it may be in the form of, for example, an aqueous dispersion, gum, crumb, powder, pellets, or the like.

The lower limit value of the content of the polymer (2) in the composition is preferably 0.00001% by mass, more preferably 0.0001% by mass, still more preferably 0.001% by mass, and particularly preferably 0.01% by mass, based on the partially fluorinated elastomer. The upper limit value of the content of the polymer (2) in the composition is preferably 20% by mass, more preferably 10% by mass, still more preferably 6% by mass, further preferably 4% by mass, and most preferably 2% by mass or less.

The content of the polymer (2) in the composition can be determined by, for example, solid-state $^{19}$F-MAS NMR measurement. Examples of a method for measuring the content of the polymer (2) include methods for measuring the content of the polymer disclosed in International Publication No. WO2014/099453, International Publication No. WO2010/075497, International Publication No. WO2010/075496, International Publication No. WO2011/008381, International Publication No. WO2009/055521, International Publication No. WO1987/007619, Japanese Patent Laid-Open No. 61-293476, International Publication No. WO2010/075494, International Publication No. WO2010/075359, International Publication No. WO2012/082454, International Publication No. WO2006/119224, International Publication No. WO2013/085864, International Publication No. WO2012/082707, International Publication No. WO2012/082703, International Publication No. WO2012/082454, International Publication No. WO2012/082451, International Publication No. WO2006/135825, International Publication No. WO2004/067588, International Publication No. WO2009/068528, Japanese Patent Laid-Open No. 2004-075978, Japanese Patent Laid-Open No. 2001-226436, International Publication No. WO1992/017635, International Publication No. WO2014/069165, Japanese Patent Laid-Open No. 11-181009, and the like. Specific examples of the device used therefor include AVANCE III HD400 manufactured by Bruker and AVANCE300 manufactured by Bruker. The rotation speed is set according to the resonance frequency of the device, and is set such that the spinning side band does not overlap the peaks used for the content calculation of the partially fluorinated elastomer or the polymer (2).

Also, the content of the polymer (2) in the composition may be measured by the following method. It can be measured by a method in which the composition is mixed with a solvent that dissolves the partially fluorinated elastomer, the obtained mixed solution is added dropwise to deionized water to extract the polymer (2) from the obtained mixed solution, the aqueous phase containing the polymer (2) is collected, and the mass of the residue (polymer (2)) obtained by heating and drying the collected aqueous phase is measured to calculate the content of the polymer (2).

Examples of the solvent that dissolves the partially fluorinated elastomer include ketone-based solvents, ether-based solvents, ester-based solvents, and perfluorobenzene, and acetone is preferable as the ketone-based solvent, tetrahydrofuran is preferable as the ether-based solvent, and ethyl acetate is preferable as the ester-based solvent.

In the composition of a partially fluorinated elastomer of the present disclosure, it is preferable that the content of a dimer and a trimer of the monomer (2) in the polymer (2) is 1.0% by mass or less based on the polymer (2). The content of the dimer and trimer in the composition of a partially fluorinated elastomer of the present disclosure is 1.0% by mass or less, preferably 0.1% by mass or less, more preferably 0.01% by mass or less, still more preferably 0.001% by mass or less, and particularly preferably 0.0001% by mass or less, based on the polymer (2).

The content of the dimer and trimer of the polymer (2) in the composition of a partially fluorinated elastomer of the present disclosure can be measured by a method that is the same as that for the content of the dimer and trimer in the polymer (1).

In one embodiment, the composition of the present disclosure contains a fluorine-containing surfactant. A composition containing a fluorine-containing surfactant has an advantage that it can be stably produced with high productivity using a fluorine-containing surfactant.

In one embodiment, the composition of the present disclosure is substantially free from a fluorine-containing surfactant. In order to produce a composition substantially free from a fluorine-containing surfactant, the fluoromonomer needs to be polymerized without using a fluorine-containing surfactant, but the method for producing a partially fluorinated elastomer of the present disclosure, which uses the polymer (2), has enabled the production of such a composition.

In the present disclosure, the expression "substantially free from a fluorine-containing surfactant" means that the content of the fluorine-containing surfactant in the composition is 10 ppm by mass or less, and it is preferably 1 ppm by mass or less, more preferably 100 ppb by mass or less, still more preferably 10 ppb by mass or less, further preferably 1 ppb by mass or less, and particularly preferably the fluorine-containing surfactant is at or below the detection limit as measured by liquid chromatography-mass spectrometry (LC/MS/MS).

The content of the fluorine-containing surfactant can be quantified by a known method. For example, it can be quantified by LC/MS/MS analysis. First, methanol is added to the composition for extraction, and the obtained extracted liquid is subjected to LC/MS/MS analysis.

In order to further increase the extraction efficiency, a treatment by Soxhlet extraction, ultrasonic treatment, or the like may be performed.

The molecular weight information is extracted from the obtained LC/MS/MS spectrum to confirm agreement with the structural formula of the candidate fluorine-containing surfactant.

Thereafter, aqueous solutions having five or more different content levels of the confirmed fluorine-containing surfactant are prepared, and LC/MS/MS analysis is performed on the aqueous solutions with the respective content levels, and the relationship between the content level and the area corresponding to that content level is plotted to draw a calibration curve.

Then, using the calibration curve, the area of the LC/MS/MS chromatogram of the fluorine-containing surfactant in the extracted liquid can be converted to the content of the fluorine-containing surfactant.

The partially fluorinated elastomer in the composition of the present disclosure can have a configuration that is the same as that of the partially fluorinated elastomer mentioned above.

The composition of a partially fluorinated elastomer of the present disclosure can further contain a cross-linking agent (curing agent), a filler, and the like. Examples of the cross-linking agent include polyamine cross-linking agents, polyol cross-linking agents, and peroxide cross-linking agents, and among them, at least one cross-linking agent selected from the group consisting of polyol cross-linking agents and peroxide cross-linking agents is preferable, and a peroxide cross-linking agent is more preferable.

The amount of the cross-linking agent compounded may be appropriately selected depending on the type of cross-linking agent and the like, and it is preferably 0.2 to 6.0 parts by mass, and more preferably 0.3 to 5.0 parts by mass, based on 100 parts by mass of the partially fluorinated elastomer.

To the composition of a partially fluorinated elastomer of the present disclosure, various additives such as crosslinking accelerators, acid acceptors, cross-linking aids, fillers (carbon black, barium sulfate, and the like), processing aids (waxes and the like), plasticizers, coloring agents, stabilizers, stickiness imparting agents (coumarone resin, coumarone-indene resin, and the like), mold release agents, electric conductivity imparting agents, thermal conductivity imparting agents, surface non-stickiness agents, flexibility imparting agents, heat resistance improving agents, and flame retarders can be further compounded, and one or more types of ordinary cross-linking agents or crosslinking accelerators different from those described above may also be compounded.

The composition of a partially fluorinated elastomer of the present disclosure can be suitably utilized for the applications mentioned above.

Although the embodiments have been described above, it will be understood that a wide variety of modifications can be made in the form and details without departing from the spirit and scope of the claims.

The present disclosure provides a method for producing a fluoropolymer, the method comprising polymerizing a fluoromonomer in an aqueous medium in the presence of a polymer (1) to obtain a fluoropolymer, wherein the polymer (1) is a polymer of a monomer (1) represented by the general formula (1) below, in which a content of a dimer and a trimer of the monomer (1) is 1.0% by mass or less based on the polymer (1):

$$CF_2=CF-R-CZ^1Z^2-A^0 \quad (1)$$

wherein R is a linking group; $Z^1$ and $Z^2$ are each independently F or $CF_3$; and $A^0$ is an anionic group.

In the production method of the present disclosure, it is preferable that the monomer (1) is a monomer (2) represented by the following general formula (2):

$$CF_2=CF-R-CZ^1Z^2-COOM \quad (2)$$

wherein R is a linking group; $Z^1$ and $Z^2$ are each independently F or $CF_3$; M is H, a metal atom, $NR^7_4$, imidazolium optionally having a substituent, pyridinium optionally having a substituent, or phosphonium optionally having a substituent; and $R^7$ is H or an organic group.

In the production method of the present disclosure, it is preferable that the monomer (1) is a monomer (4) represented by the following general formula (4):

$$CF_2=CF(-O-Rf-A) \quad (4)$$

wherein Rf is a fluorine-containing alkylene group having 1 to 40 carbon atoms or a fluorine-containing alkylene group having 2 to 100 carbon atoms and having an ether bond or a keto group; and A is $-COOM$, $-SO_3M$, $-OSO_3M$, or $-C(CF_3)_2OM$, where M is H, a metal atom, $NR^7_4$, imidazolium optionally having a substituent, pyridinium optionally having a substituent, or phosphonium optionally having a substituent, and $R^7$ is H or an organic group.

In the production method of the present disclosure, it is preferable that A is $-COOM$, where M is H, a metal atom, $NR^7_4$, imidazolium optionally having a substituent, pyridinium optionally having a substituent, or phosphonium optionally having a substituent, and $R^7$ is H or an organic group.

In the production method of the present disclosure, it is preferable to polymerize the monomer (1) represented by the general formula (1) to obtain a crude composition containing the polymer of the monomer (1) and to remove the dimer and trimer of the monomer (1) contained in the crude composition from the crude composition to obtain the polymer (1) in which the content of the dimer and trimer of the monomer (1) is 1.0% by mass or less based on the polymer (1).

The present disclosure also provides a method for producing a polytetrafluoroethylene, the method comprising polymerizing tetrafluoroethylene in an aqueous medium in the presence of a polymer (2) to obtain a polytetrafluoroethylene, wherein the polymer (2) is a polymer of a monomer (2) represented by the general formula (2) below, and primary particles of the polytetrafluoroethylene have an aspect ratio of less than 2.00:

$$CF_2=CF-R-CZ^1Z^2-COOM \quad (2)$$

wherein R is a linking group; $Z^1$ and $Z^2$ are each independently F or $CF_3$; M is H, a metal atom, $NR^7_4$, imidazolium optionally having a substituent, pyridinium optionally having a substituent, or phosphonium optionally having a substituent; and $R^7$ is H or an organic group.

In the method for producing a polytetrafluoroethylene of the present disclosure, it is preferable that the content of a dimer and a trimer of the monomer (2) in the polymer (2) is 1.0% by mass or less based on the polymer (2).

The present disclosure also provides a method for producing a perfluoroelastomer, the method comprising polymerizing a perfluoromonomer in an aqueous medium in the presence of a polymer (2) to obtain a perfluoroelastomer, wherein the polymer (2) is a polymer of a monomer (2) represented by the following general formula (2):

$$CF_2=CF-R-CZ^1Z^2-COOM \quad (2)$$

wherein R is a linking group; $Z^1$ and $Z^2$ are each independently F or $CF_3$; M is H, a metal atom, $NR^7_4$, imidazolium optionally having a substituent, pyridinium optionally having a substituent, or phosphonium optionally having a substituent; and $R^7$ is H or an organic group.

In the method for producing a perfluoroelastomer of the present disclosure, it is preferable that the content of a dimer and a trimer of the monomer (2) in the polymer (2) is 1.0% by mass or less based on the polymer (2).

The present disclosure also provides a composition comprising a polytetrafluoroethylene of which primary particles having an aspect ratio of less than 2.00 and a polymer (2) of a monomer (2) represented by the following general formula (2):

$$CF_2=CF-R-CZ^1Z^2-COOM \quad (2)$$

wherein R is a linking group; $Z^1$ and $Z^2$ are each independently F or $CF_3$; M is H, a metal atom, $NR^7_4$, imidazolium optionally having a substituent, pyridinium optionally having a substituent, or phosphonium optionally having a substituent; and $R^7$ is H or an organic group.

In the composition of a polytetrafluoroethylene of the present disclosure, it is preferable that the content of a dimer and a trimer of the monomer (2) in the polymer (2) is 1.0% by mass or less based on the polymer (2).

The present disclosure also provides a composition comprising a perfluoroelastomer and a polymer (2) of a monomer (2) represented by the following general formula (2):

$$CF_2=CF-R-CZ^1Z^2-COOM \quad (2)$$

wherein R is a linking group; $Z^1$ and $Z^2$ are each independently F or $CF_3$; M is H, a metal atom, $NR^7_4$, imidazolium optionally having a substituent, pyridinium optionally having a substituent, or phosphonium optionally having a substituent; and $R^7$ is H or an organic group.

In the composition of a perfluoroelastomer of the present disclosure, it is preferable that the content of a dimer and a trimer of the monomer (2) in the polymer (2) is 1.0% by mass or less based on the polymer (2).

The present disclosure also provides a method for producing a low-molecular-weight polytetrafluoroethylene, the method comprising polymerizing tetrafluoroethylene in an aqueous medium in the presence of a polymer (1) and a chain transfer agent to obtain a low-molecular-weight polytetrafluoroethylene, wherein the polymer (1) is a polymer of a monomer (1) represented by the general formula (1) below, and the chain transfer agent is at least one selected from the group consisting of alkanes having 2 to 4 carbon atoms:

$$CF_2=CF-R-CZ^1Z^2-A^0 \quad (1)$$

wherein R is a linking group; $Z^1$ and $Z^2$ are each independently F or $CF_3$; and $A^0$ is an anionic group.

In the method for producing a low-molecular-weight polytetrafluoroethylene of the present disclosure, it is preferable that the content of a dimer and a trimer of the monomer (1) in the polymer (1) is 1.0% by mass or less based on the polymer (1).

The present disclosure also provides a composition comprising a low-molecular-weight polytetrafluoroethylene and a polymer (1) of a monomer (1) represented by the following general formula (1):

$$CF_2=CF-R-CZ^1Z^2-A^0 \quad (1)$$

wherein R is a linking group; $Z^1$ and $Z^2$ are each independently F or $CF_3$; and $A^0$ is an anionic group.

In the composition of a low-molecular-weight polytetrafluoroethylene of the present disclosure, it is preferable that the content of a dimer and a trimer of the monomer (1) in the polymer (1) is 1.0% by mass or less based on the polymer (1).

The present disclosure also provides a method for producing a partially fluorinated elastomer, the method comprising polymerizing a fluoromonomer in an aqueous medium in the presence of a polymer (2) to obtain a partially fluorinated elastomer, wherein the polymer (2) is a polymer of a monomer (2) represented by the following general formula (2):

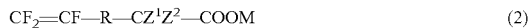

$$CF_2=CF-R-CZ^1Z^2-COOM \qquad (2)$$

wherein R is a linking group; $Z^1$ and $Z^2$ are each independently F or $CF_3$; M is H, a metal atom, $NR^7_4$, imidazolium optionally having a substituent, pyridinium optionally having a substituent, or phosphonium optionally having a substituent; and $R^7$ is H or an organic group.

In the method for producing a partially fluorinated elastomer of the present disclosure, it is preferable that the content of a dimer and a trimer of the monomer (2) in the polymer (2) is 1.0% by mass or less based on the polymer (2).

The present disclosure also provides a composition comprising a partially fluorinated elastomer and a polymer (2) of a monomer (2) represented by the following general formula (2):

$$CF_2=CF-R-CZ^1Z^2-COOM \qquad (2)$$

wherein R is a linking group; $Z^1$ and $Z^2$ are each independently F or $CF_3$; M is H, a metal atom, $NR^7_4$, imidazolium optionally having a substituent, pyridinium optionally having a substituent, or phosphonium optionally having a substituent; and $R^7$ is H or an organic group.

In the composition of a partially fluorinated elastomer of the present disclosure, it is preferable that the content of a dimer and a trimer of the monomer (2) in the polymer (2) is 1.0% by mass or less based on the polymer (2).

EXAMPLES

Hereinafter, the embodiments of the present disclosure will be described with reference to Examples, but the present disclosure is not limited solely to such Examples.

Each numerical value in Examples was measured by the following methods.

<Method for Measuring Weight Average Molecular Weight (Mw) and Number Average Molecular Weight (Mn)>

The Mw and Mn of the polymer (such as the polymers E and F (except for the polymer G)) were determined by performing measurement by gel permeation chromatography (GPC) using GPC HLC-8020 manufactured by Tosoh Corporation, using columns manufactured by SHOWA DENKO K.K. (one GPC KF-801, one GPC KF-802, and two GPC KF-806M connected in series), and allowing tetrahydrofuran (THF) to flow at a flow rate of 1 ml/min as the solvent, and by calculating the molecular weights using monodisperse polystyrene as the standard.

<Method for Measuring Content of Dimer and Trimer of Monomer (Such as Monomers E, F, and G) in Polymer (such as Polymers E, F, and G)>

(1) Extraction from Aqueous Solution

The solids in the aqueous solution of the polymer were measured, and the aqueous solution in an amount corresponding to 0.2 g of the solids of the polymer was weighed. Then, water and methanol were added such that the volume ratio of water to methanol was 50/50 (% by volume) in combination with the water contained in the aqueous solution, and a mixed solution containing the polymer and water and methanol was obtained. Thereafter, centrifugation was carried out using the obtained mixed solution at 4,000 rpm for 1 hour, and the supernatant containing the polymer was collected as the extracted liquid.

Analysis of the extracted liquid was carried out using a liquid chromatograph mass spectrometer (Waters, LC-MS ACQUITY UPLC/TQD), and the chromatogram of the extracted liquid was obtained.

The content of the dimer and trimer of the monomer contained in the extracted liquid was determined by converting the peak integrated value derived from the dimer and trimer of the monomer appearing in the chromatogram of the extracted liquid into the content of the dimer and trimer of the monomer using a calibration curve.

(2) Calibration Curve of Monomer

Methanol standard solutions of the monomer with five known content levels of 1 ng/mL to 100 ng/mL were prepared, and measurement was carried out using a liquid chromatograph mass spectrometer (Waters, LC-MS ACQUITY UPLC/TQD). The relationship between the respective monomer contents and the peak integrated values corresponding to those contents were plotted to prepare a calibration curve (first approximation) for each monomer. Next, the calibration curve (first approximation) for each monomer was used to prepare a calibration curve for the dimer and trimer of each monomer.

Measurement equipment configuration and LC-MS measurement conditions are below:

TABLE 1

| | LC unit |
|---|---|
| Device | Acquity UPLC manufactured by Waters |
| Column | Acquity UPLC BEH C18 1.7 mm (2.1 × 50 mm) manufactured by Waters |
| Mobile phase | A $CH_3CN$ |
| | B 20 mM $CH_3COONH_4/H_2O$ |
| | 0→1.5 min    A:B = 10:90 |
| | 1.5→8.5 min  A:B = 10:90 → |
| | 8.5→10 min   A:B = 90:10 Linear gradient |
| | A:B = 90:10 |
| Flow rate | 0.4 mL/min |
| Column temperature | 40° C. |
| Sample injection volume | 5 μL |

TABLE 1-continued

MS unit

| | |
|---|---|
| Device | TQ Detector |
| Measurement mode | MRM(Multiple Reaction Monitoring) |
| Ionization method | Electrospray ionization |
| | SCAN |

The quantification limit in this measurement equipment configuration is 1 ng/mL.

<Content of Modifying Monomer Unit>

In order to determine the content of the HFP unit, a thin film disk was prepared by subjecting the PTFE powder to press molding, and based on the infrared absorbance thereof obtained by FT-IR measurement of the thin film disk, the value obtained by multiplying the ratio of absorbance at 982 cm$^{-1}$/absorbance at 935 cm$^{-1}$ by 0.3 was taken as the HFP unit content.

The content of the perfluoro(methyl vinyl ether) (PMVE) unit was determined from the spectrum obtained by solid-state $^{19}$F-MAS NMR measurement using the following equation:

$$X=(4B/3)/(A+(B/3))\times 100$$

X: content of PMVE unit (mol %)
A: integration value of signal at −120 ppm
B: integration value of CF signal at −52 ppm The chemical shift value used was that when the peak top of the signal derived from the main chain of PTFE was −120 ppm.

<Concentration of Polymer (Such as Polymer E)>

In a vacuum dryer, about 1 g of the aqueous solution of the polymer was dried at a condition of 60° C. for 60 minutes, the mass of the non-volatile matter was measured, and the proportion of the mass of the non-volatile matter to the mass of the polymer aqueous solution (1 g) was expressed by percentage and taken as the concentration of the polymer.

<Solid Concentration of Aqueous Dispersion Containing PTFE>

In an air dryer, 1 g of the aqueous dispersion was dried at a condition of 150° C. for 60 minutes, and the proportion of the mass of the non-volatile matter to the mass of the aqueous dispersion (1 g) was expressed by percentage and taken as the solid concentration thereof.

<Average Primary Particle Size>

A PTFE aqueous dispersion with the solid concentration being adjusted to about 1.0% by mass was prepared. The average primary particle size was measured from 70 measurement processes using ELSZ-1000S (manufactured by Otsuka Electronics Co., Ltd.) at 25° C. The refractive index of the solvent (water) was 1.3328 and the viscosity of the solvent (water) was 0.8878 mPa·s.

<Number of PTFE Particles>

The number of particles can be calculated from the polymer solid concentration, assuming that the primary particles are spherical whose diameter is the average primary particle size measured by the method described above and the specific gravity of the spherical particles is 2.28. When the primary particle size is defined as A nm and the polymer solid concentration as B % by mass, the number of PTFE particles, X, can be calculated by the following equation:

$$X=((B/100)/(1-B/100))/(4/3\times 3.14\times((A/2)\times 10^{-7})^3\times 2.28)$$

<Aspect Ratio>

The aqueous dispersion was diluted to have a solid concentration of about 1% by mass and observed by a scanning electron microscope (SEM), and 400 or more randomly extracted particles were subjected to image processing, and the aspect ratio was obtained from the average of the ratios of the major axis to the minor axis thereof.

<Standard Specific Gravity (SSG)>

The SSG was measured by the water replacement method in conformity with ASTM D792 using a sample molded in conformity with ASTM D4895-89.

<Peak Temperature>

The peak temperature was measured by precisely weighing about 10 mg of PTFE powder without a history of being heated to a temperature of 300° C. or higher, accommodating it in a dedicated aluminum pan, and using TG/DTA (simultaneous thermogravimetric analyzer). The aluminum pan was heated up in the temperature range from 25° C. to 600° C. at 10° C./min under an atmospheric atmosphere to obtain a differential thermal (DTA) curve, and the peak temperature was defined as the temperature corresponding to the maximum value in the obtained differential thermal (DTA) curve.

<Content of Polymers E, F, G, I, and J>

The content of the polymers E, F, G, I, and J contained in the PTFE powder was determined from the spectrum obtained by solid-state $^{19}$F-MAS NMR measurement.

<Melt Viscosity>

The melt viscosity was measured in conformity with ASTM D1238, using a flow tester (manufactured by Shimadzu Corporation) and a 2φ-8L die and keeping 2 g of the sample that has been heated in advance at 340° C. for 5 minutes, at the above temperature under a load of 0.7 MPa.

<Oxygen Concentration in Reactor>

The oxygen concentration in the reactor during polymerization was determined by measuring and analyzing the gas discharged out of the discharge gas line connected to the reactor using a low concentration oxygen analyzer (trade name "PS-820-L", manufactured by Iijima Electronics Corporation).

Preparation Example 1

10 g of the monomer E represented by $CF_2=CFOCF_2CF_2COOH$, 30 g of water, and ammonium persulfate (APS) (6.0 mol % based on the monomer E) were added to a reactor, and heated and stirred at 80° C. for 23 hours under a nitrogen atmosphere to thereby obtain a polymer E aqueous solution E-1 containing the polymer E, which is a homopolymer of $CF_2=CFOCF_2CF_2COOH$. As a result of GPC analysis of the obtained polymer E aqueous solution E-1, the polymer E had Mw of $0.7\times 10^4$ and Mn of $0.5\times 10^4$.

Water was added to the obtained polymer E aqueous solution E-1, which was brought into contact with a dialysis membrane (cut-off molecular weight of 35,000 Da, made of polyethylene) at 30° C. to perform filtration, thereby obtaining a polymer E aqueous solution E-2. As a result of GPC analysis of the obtained polymer E aqueous solution E-2, the polymer E had Mw of $0.7 \times 10^4$ and Mn of $0.6 \times 10^4$, and the content of the dimer and trimer was less than 1 ppm by mass based on the polymer E. The obtained polymer E aqueous solution E-2 had a concentration of 3.6% by mass.

Example 1

To a glass reactor equipped with a stirrer having an internal capacity of 1 L, 515 g of deionized water, 30 g of paraffin wax, and 15.28 g of the polymer E aqueous solution E-2, and aqueous ammonia were added adjusting the pH to 9.2. Next, while the contents of the reactor were heated to 70° C. and sucked, the reactor was purged with the TFE monomer to remove oxygen in the reactor. Thereafter, the contents were stirred at 540 rpm. After adding 0.13 g of PMVE into the reactor, the TFE monomer was added until the pressure reached 0.73 MPa·G.

2.75 mg of ammonium persulfate (APS) initiator dissolved in 20 g of deionized water was injected into the reactor and the pressure in the reactor was adjusted to 0.83 MPa·G. A drop in pressure occurred after injection of the initiator, indicating the initiation of polymerization. The TFE monomer was added to the reactor to maintain the pressure, and the polymerization was continued until about 140 g of the TFE monomer was consumed in the reaction. Then, the reactor was evacuated to normal pressure, and the contents were taken out from the reactor and cooled. The supernatant paraffin wax was removed from the PTFE aqueous dispersion.

The solid concentration in the obtained PTFE aqueous dispersion was 21.0% by mass, and the average primary particle size thereof was 216 nm.

The obtained PTFE aqueous dispersion was diluted with deionized water to have a solid concentration of about 10% by mass and solidified under a high-speed stirring condition. The solidified wet powder was dried at 150° C. for 18 hours. Various physical properties of the obtained PTFE powder were measured. The results are shown in Table 2.

Example 2

Polymerization was carried out in the same manner as in Example 1 except that 0.13 g of PMVE was changed to 0.18 g of HFP and that, at the point when the TFE monomer consumed in the reaction reached about 70 g, feeding of the TFE monomer was stopped.

The solid concentration in the obtained PTFE aqueous dispersion was 10.7% by mass, and the average primary particle size thereof was 221 nm.

The obtained PTFE aqueous dispersion was diluted with deionized water to have a solid concentration of about 10% by mass and solidified under a high-speed stirring condition. The solidified wet powder was dried at 150° C. for 18 hours. Various physical properties of the obtained PTFE powder were measured. The results are shown in Table 2.

Preparation Example 2

4.1 g of the monomer F represented by $CF_2=CFOCF_2CF(CF_3)OCF_2CF_2COOH$, 5.2 g of $CF_2=CF_2$, and APS (8.8 mol % based on the monomer F) were added to a reactor, and heated and stirred at 80° C. for 7 hours under a nitrogen atmosphere to thereby obtain a polymer F aqueous solution F-1 containing the polymer F, which is a copolymer of the monomer F represented by $CF_2=CFOCF_2CF(CF_3)OCF_2CF_2COOH$ and $CF_2=CF_2$. As a result of GPC analysis of the obtained polymer F aqueous solution F-1, the polymer F had Mw of $0.7 \times 10^4$ and Mn of $0.4 \times 10^4$.

The obtained polymer F aqueous solution F-1 was brought into contact with a dialysis membrane (cut-off molecular weight of 35,000 Da, made of polyethylene) at 30° C. to perform filtration, thereby obtaining a polymer F aqueous solution F-2. As a result of GPC analysis of the obtained polymer F aqueous solution F-2, the polymer F had Mw of $0.9 \times 10^4$ and Mn of $0.6 \times 10^4$, and the content of the dimer and trimer of the monomer F was less than 1 ppm by mass based on the polymer F. The obtained polymer F aqueous solution F-2 had a concentration of 2.0% by mass.

Example 3

Polymerization was carried out in the same manner as in Example 1 except that 515 g of deionized water was changed to 500 g of deionized water and that 15.28 g of the polymer E aqueous solution E-2 was changed to 27.50 g of the polymer F aqueous solution F-2. The solid concentration in the obtained PTFE aqueous dispersion was 20.8% by mass, and the average primary particle size thereof was 200 nm.

Also, the PTFE powder was obtained in the same manner as in Example 1, and various physical properties of the obtained PTFE powder were measured. The results are shown in Table 2.

Example 4

Polymerization was carried out in the same manner as in Example 1 except that 515 g of deionized water was changed to 500 g of deionized water, that 15.28 g of the polymer E aqueous solution E-2 was changed to 27.50 g of the polymer F aqueous solution F-2, that 0.13 g of PMVE was changed to 0.18 g of HFP, and that, at the time when the TFE monomer consumed in the reaction reached about 70 g, feeding of the TFE monomer was stopped. The solid concentration in the obtained PTFE aqueous dispersion was 13.8% by mass, and the average primary particle size thereof was 190 nm.

Also, the PTFE powder was obtained in the same manner as in Example 1, and various physical properties of the obtained PTFE powder were measured. The results are shown in Table 2.

TABLE 2

|  |  | Example 1 | Example 2 | Example 3 | Example 4 |
| --- | --- | --- | --- | --- | --- |
| Modifying monomer |  | PMVE | HFP | PMVE | HFP |
| Content of modifying monomer unit | % by mass | 0.072 | 0.074 | 0.075 | 0.081 |
| Aspect ratio | — | 1.22 | 1.75 | 1.29 | 1.45 |
| Standard specific gravity | — | 2.168 | 2.205 | 2.167 | 2.190 |
| Peak temperature | ° C. | 343 | 341 | 342 | 340 |

TABLE 2-continued

|  |  | Example 1 | Example 2 | Example 3 | Example 4 |
|---|---|---|---|---|---|
| Content of polymer E | % by mass | 0.35 | 0.79 |  |  |
| Content of polymer F | % by mass |  |  | 0.36 | 0.59 |

Preparation Example 3

According to the procedure described in Comparative Example 2 of International Publication No. WO2011/034179, a polymer G aqueous solution G-1 containing 24.8% by mass of the polymer G, which contains repeating units derived from $CF_2=CF_2$ and $CF_2=CF-O-(CF_2)_2-SO_3H$, with a content of the repeating unit derived from $CF_2=CF-O-(CF_2)_2-SO_3H$ (monomer G) being 18 mol %, was obtained. The number average molecular weight of the obtained polymer G was $3.0\times10^5$. The number average molecular weight of the polymer G was calculated from the melt flow rate of the polymer G. The melt flow rate was measured in conformity with JIS K 7210 under the conditions of 270° C. and a load of 2.16 kg. The monomeric composition of the polymer G was calculated from the melt-state NMR measurements at 300° C.

Water was added to the obtained polymer G aqueous solution G-1, which was brought into contact with an ultrafiltration membrane (cut-off molecular weight of 10,000 Da, made of polyethylene) at 30° C. under a water pressure of 0.1 MPa to perform ultrafiltration. While pouring water as appropriate, the ultrafiltration was continued until a water filtrate of 5 times the volume of the aqueous solution was finally eluted to thereby obtain a polymer G aqueous solution G-2. The content of the dimer and trimer of the monomer G was less than 1 ppm by mass based on the polymer G. The obtained polymer G aqueous solution G-2 had a concentration of 23.2% by mass.

Example 5

To a glass reactor equipped with a stirrer having an internal capacity of 1 L, 520 g of deionized water and 11.9 g of the polymer G aqueous solution G-2 were added. Next, while the contents of the reactor were heated to 70° C. and sucked, the reactor was purged with the TFE monomer to remove oxygen in the reactor. Thereafter, the contents were stirred at 540 rpm. After adding 0.12 g of ethane into the reactor, the TFE monomer was added until the pressure reached 0.73 MPa·G.

55 mg of ammonium persulfate (APS) initiator dissolved in 20 g of deionized water was injected into the reactor and the pressure in the reactor was adjusted to 0.83 MPa·G. A drop in pressure occurred after injection of the initiator, indicating the initiation of polymerization. The TFE monomer was added to the reactor to maintain the pressure, and the polymerization was continued until about 50 g of the TFE monomer was consumed in the reaction. Then, the reactor was evacuated to normal pressure, and the contents were taken out from the reactor and cooled to thereby obtain a PTFE aqueous dispersion. Various physical properties of the obtained PTFE aqueous dispersion were measured. The results are shown in Table 3.

Also, the PTFE powder was obtained in the same manner as in Example 1, and various physical properties of the obtained PTFE powder were measured. The results are shown in Table 3.

The obtained PTFE was a low-molecular-weight PTFE.

TABLE 3

|  |  | Example 5 |
|---|---|---|
| Solid concentration | % by mass | 8.6 |
| Average primary particle size | nm | 63 |
| Number of particles | $\times10^{13}$ particles/ml | 31.6 |
| Melt viscosity | Pa·s | $7.1 \times 10^2$ |
| Peak temperature | ° C. | 325 |
| Content of polymer G | % by mass | 4.98 |

Preparation Example 4

To a reactor, 10 g of $CF_2=CFOCF_2CF_2COOH$ (monomer E), 20 g of water, and ammonium persulfate (APS) in an amount corresponding to 0.5 mol % based on the amount of the monomer E were added and stirred at 52° C. under $N_2$ flow. When 24 hours had passed since the addition of APS, APS in an amount corresponding to 1.0 mol % was added, and when 48 hours had passed, APS in an amount corresponding to 1.5 mol % was further added, and by stirring at 52° C. for 72 hours in total, a polymer I aqueous solution I-1 containing the polymer I, which is a homopolymer of the monomer E, was obtained. The oxygen concentration in the reactor fluctuated in the range of 15 ppm by volume to 40 ppm by volume.

Water was added to the obtained polymer I aqueous solution I-1 to adjust the concentration of the polymer I to 2.0% by mass, and the solution was then brought into contact with an ultrafiltration membrane (cut-off molecular weight of 6,000 Da, made of polysulfone) at 25° C. under a water pressure of 0.1 MPa to perform ultrafiltration. While pouring water as appropriate, the ultrafiltration was continued until a water filtrate of 7 times the volume of the aqueous solution was finally eluted to thereby obtain a polymer I aqueous solution I-2. The obtained aqueous solution had a concentration of 2.1% by mass.

The aqueous solution obtained by performing the ultrafiltration was analyzed. The obtained polymer I had a weight average molecular weight (Mw) of $1.7\times10^4$ and a number average molecular weight (Mn) of $1.1\times10^4$. The content of the dimer and trimer in the aqueous solution obtained by performing the ultrafiltration was 0.1% by mass or less based on the polymer I.

Example 6

To a glass reactor equipped with a stirrer having an internal capacity of 1 L, 504 g of deionized water, 30 g of paraffin wax, and 26.2 g of the polymer I aqueous solution I-2 were added. Next, while the contents of the reactor were heated to 70° C. and sucked, the reactor was purged with the TFE monomer to remove oxygen in the reactor. Thereafter, the contents were stirred at 540 rpm. After adding 0.54 g of HFP into the reactor, the TFE monomer was added until the pressure reached 0.73 MPa·G. 2.75 mg of ammonium persulfate (APS) initiator dissolved in 20 g of deionized water was injected into the reactor and the pressure in the reactor was adjusted to 0.83 MPa·G. A drop in pressure occurred after injection of the initiator, indicating the initiation of polymerization. The TFE monomer was added to the reactor to maintain the pressure, and the polymerization was continued until about 140 g of the TFE monomer was consumed in the reaction. Then, the reactor was evacuated to normal pressure, and the contents were taken out from the reactor and cooled. The supernatant paraffin wax was removed from the PTFE aqueous dispersion.

The solid concentration in the obtained PTFE aqueous dispersion was 21.6% by mass, and the average primary particle size thereof was 176 nm.

The obtained PTFE aqueous dispersion was diluted with deionized water to have a solid concentration of about 10% by mass and solidified under a high-speed stirring condition. The solidified wet powder was dried at 210° C. for 18 hours. The results are shown in Table 4.

Example 7

Polymerization was carried out in the same manner as in Example 6 except that, after adding the polymer I aqueous solution 1-2 to the reactor, the pH was adjusted to 8.9 by further adding aqueous ammonia before the contents of the reactor were heated.

The solid concentration in the obtained PTFE aqueous dispersion was 21.4% by mass, and the average primary particle size thereof was 222 nm.

The obtained PTFE aqueous dispersion was diluted with deionized water to have a solid concentration of about 10% by mass and solidified under a high-speed stirring condition. The solidified wet powder was dried at 210° C. for 18 hours. The results are shown in Table 4.

Example 8

To a SUS reactor equipped with a stirrer having an internal capacity of 6 L, 3,223 g of deionized water, 104 g of paraffin wax, 341 g of the polymer I aqueous solution 1-2, and 3.58 g of an isopropanol aqueous solution having a concentration of 0.1% by mass were added. Next, while the contents of the reactor were heated to 70° C. and sucked, the reactor was purged with TFE to remove oxygen in the reactor, and the contents were stirred. After adding 3.2 g of HFP into the reactor, TFE was added until the pressure reached 0.73 MPa·G. 17.9 mg of ammonium persulfate (APS) initiator dissolved in 20 g of deionized water was injected into the reactor and the pressure in the reactor was adjusted to 0.83 MPa·G. A drop in pressure occurred after injection of the initiator, indicating the initiation of polymerization. TFE was added to the reactor to keep the pressure constant at 0.78 MPa·G. At the time when the TFE consumed in the reaction reached about 180 g, the feeding of TFE and stirring were stopped.

Subsequently, the gas in the reactor was slowly released until the pressure in the reactor reached 0.02 MPa·G. Thereafter, TFE was fed until the pressure in the reactor reached 0.78 MPa·G, and stirring was started again, whereby the reaction was continued. At the time when the TFE consumed in the reaction reached about 540 g, 14.3 mg of hydroquinone dissolved in 20 g of deionized water was injected into the reactor, whereby the reaction was continued. At the time when the TFE consumed in the reaction reached about 1,250 g, the feeding of TFE was stopped and stirring was stopped, whereby the reaction was completed. Then, the reactor was evacuated to normal pressure, and the contents were taken out from the reactor and cooled. The supernatant paraffin wax was removed from the PTFE aqueous dispersion. The solid concentration in the obtained PTFE aqueous dispersion was 26.0% by mass, and the average primary particle size thereof was 175 nm.

The obtained PTFE aqueous dispersion was diluted with deionized water to have a solid concentration of about 10% by mass and solidified under a high-speed stirring condition, and the solidified wet powder was dried at 210° C. for 18 hours. Various physical properties of the obtained PTFE powder were measured. The results are shown in Table 4.

Also, the obtained PTFE aqueous dispersion was diluted with deionized water to have a solid concentration of about 10% by mass and solidified under a high-speed stirring condition, and the solidified wet powder was dried at 240° C. for 18 hours. Various physical properties of the obtained PTFE powder were measured. The results are shown in Table 5.

Preparation Example 5

To a reactor, 30 g of $CF_2$=$CFOCF_2CF(CF_3)OCF_2CF_2COOH$ (monomer F), 60 g of water, ammonia in an amount corresponding to 0.5 mol % based on the amount of the monomer F, and ammonium persulfate (APS) in an amount corresponding to 2.0 mol % based on the amount of the monomer F were added and stirred at 52° C. for 72 hours under $N_2$ flow. The oxygen concentration in the reactor fluctuated in the range of 20 ppm by volume to 50 ppm by volume. A polymer J aqueous solution J-1 containing the polymer J, which is a homopolymer of the monomer F, was obtained.

Water and ammonia in an amount corresponding to 0.4 equivalents based on the amount of the monomer F were added to the obtained polymer J aqueous solution J-1 to adjust the concentration of the monomer J to 3.0% by mass, and the solution was then brought into contact with an ultrafiltration membrane (cut-off molecular weight of 6,000, made of polysulfone) at room temperature under a water pressure of 0.1 MPa to perform ultrafiltration, thereby obtaining a polymer J aqueous solution J-2.

The obtained polymer J had a weight average molecular weight (Mw) of $1.4 \times 10^4$ and a number average molecular weight (Mn) of $0.9 \times 10^4$. In the polymer J aqueous solution J-2 obtained by performing the ultrafiltration, the concentration of the polymer J was 1.9% by mass. The content of the dimer and trimer in the aqueous solution obtained by performing the ultrafiltration was 0.1% by mass or less based on the polymer J.

Example 9

Polymerization was carried out in the same manner as in Example 6 except that 26.2 g of the polymer I aqueous solution 1-2 was replaced by 57.9 g of the polymer J aqueous solution J-2, that 504 g of deionized water was changed to 473 g of deionized water, and that about 140 g of the TFE monomer was changed to about 80 g of the TFE monomer. The solid concentration in the obtained PTFE aqueous dispersion was 13.0% by mass, and the average primary particle size thereof was 119 nm.

The obtained PTFE aqueous dispersion was diluted with deionized water to have a solid concentration of about 10% by mass and solidified under a high-speed stirring condition. The solidified wet powder was dried at 210° C. for 18 hours. The results are shown in Table 4.

TABLE 4

|  |  | Example 6 | Example 7 | Example 8 | Example 9 |
|---|---|---|---|---|---|
| Type of modifying monomer |  | HFP | HFP | HFP | HFP |
| Modification amount | % by mass/PTFE | 0.421 | 0.413 | 0.181 | 0.679 |
| Solid concentration | % by mass | 21.6 | 21.4 | 26.0 | 13.0 |
| Average primary particle size | nm | 176 | 222 | 175 | 119 |
| Standard specific gravity | — | 2.166 | 2.162 | 2.167 | 2.202 |
| Aspect ratio | — | 1.34 | 1.39 | 1.40 | 1.48 |
| Peak temperature | ° C. | 342 | 342 | 345 | 343 |
| Content of polymer I | % by mass | 0.36 | 0.37 | 0.60 |  |
| Content of polymer J | % by mass |  |  |  | 1.34 |

TABLE 5

|  |  | Example 8 |
|---|---|---|
| Extrusion pressure | MPa | 19.8 |
| Breaking strength A | N | 18.4 |
| Stress relaxation time | sec | 121 |
| Appearance of stretched body | — | Uniform |

Next, the production method and composition of the partially fluorinated elastomer (partially fluorinated rubber) will be described with reference to Examples.

Each numerical value in these Examples was measured by the methods described above, unless otherwise noted. Values measured by methods other than those described above were measured by the following methods.

<Solid Concentration of Aqueous Dispersion Containing Partially Fluorinated Elastomer>

In an air dryer, 1 g of the aqueous dispersion containing the partially fluorinated elastomer was dried at a condition of 150° C. for 180 minutes, the mass of the non-volatile matter was measured, and the proportion of the mass of the non-volatile matter to the mass of the aqueous dispersion (1 g) was determined (% by mass) as the solid concentration thereof.

<Compositional Features of Partially Fluorinated Elastomer>

The compositional features were determined by NMR analysis.

<Mooney Viscosity of Partially Fluorinated Elastomer>

The Mooney viscosity was measured using a Mooney viscometer MV2000E manufactured by Alpha Technologies Inc. at 100° C. in conformity with JIS K 6300-1:2013.

<Polymer Adhesion Rate>

The ratio of the mass of polymer adhered matter adhered to the polymerization tank after the completion of the polymerization to the total amount of polymer (partially fluorinated elastomer) after the completion of the polymerization (adhesion rate to the polymerization tank) was determined by the following equation:

polymer adhesion rate (% by mass)=mass of polymer adhered matter/mass of obtained polymer (including polymer adhered matter)×100 mass of obtained polymer=mass of aqueous dispersion×solid concentration of aqueous dispersion (% by mass)/100+mass of polymer adhered matter The polymer adhered matter includes the polymer adhered to the inner walls of the polymerization tank and the inside of the polymerization tank such as stirring blades after the aqueous dispersion is drawn out of the polymerization tank after the completion of the polymerization, and the polymer that has been released from the aqueous dispersion solution due to agglomeration and is suspended or precipitated without being dispersed in the aqueous dispersion. The mass of the polymer adhered matter is the mass after drying and removing the moisture contained in the polymer adhered matter at 120° C.

<Polymerization Rate>

The polymerization rate was calculated by the following equation:

polymerization rate={weight of aqueous dispersion× solid concentration/100}/{(amount of pure water used in polymerization+amount of water contained in aqueous solution of polymer (1) used in polymerization)×polymerization time}

The units for each amount in the equation are as follows.
weight of aqueous dispersion: g
solid concentration: % by mass
amount of pure water used in polymerization: kg
amount of water contained in aqueous solution of polymer (1) used in polymerization: kg
polymerization time: hour
polymerization rate: g/(hour×kg)

<Average Particle Size>

The average particle size of partially fluorinated elastomer particles in the aqueous dispersion (cumulant average size) was calculated by the cumulant method, using ELSZ-1000S (manufactured by Otsuka Electronics Co., Ltd.) and carrying out measurement by dynamic light scattering.

<Number of Partially Fluorinated Elastomer Particles in Aqueous Dispersion>

The number of partially fluorinated elastomer particles in the aqueous dispersion was calculated by the following equation:

$$\text{Number of polymer particles} = \left\{ \frac{\text{Solid concentration of aqueous dispersion (mass \%)}}{100 - \text{Solid concentration of aqueous dispersion (mass \%)}} \right\} / \left\{ \frac{4}{3} \times 3.14 \times \left( \frac{\text{Average particle size (nm)}}{2} \times 10^{-9} \right)^3 \times \text{Specific gravity} \times 10^6 \right\}$$

In the equation, the average particle size is the cumulant average size calculated by the method described above, the number of polymer particles (number of partially fluorinated elastomer particles) is the number of particles per 1 cc of water, and the specific gravity of all partially fluorinated elastomers in Examples was defined as 1.8.

Preparation Example 11

To 110 g of the monomer E represented by $CF_2=CFOCF_2CF_2COOH$ and 220 g of water, ammonium persulfate (APS) was added, and the mixture was stirred at 52° C. for 96 hours under a nitrogen atmosphere to thereby obtain a polymer QA aqueous solution QA-1 containing the polymer QA, which is a homopolymer of $CF_2=CFOCF_2CF_2COOH$. APS was additionally added as appropriate during the reaction, and a total of 5 mol % was used. The oxygen concentration in the reactor fluctuated in the range of 11 ppm by volume to 61 ppm by volume.

Water was added to the obtained polymer QA aqueous solution QA-1 to adjust the concentration to 3.0% by mass, and then, while pouring water as appropriate, the ultrafiltration was performed using an ultrafiltration membrane (cut-off molecular weight of 6,000, made of polysulfone) at room temperature under a water pressure of 0.1 MPa until a filtrate of 4 times the volume of the aqueous solution before filtration was eluted. As a result of GPC analysis of the obtained polymer QA aqueous solution QA-2, the polymer QA had Mw of $1.5 \times 10^4$ and Mn of $1.0 \times 10^4$. The obtained polymer QA aqueous solution QA-2 had a concentration of 2.2% by mass. The content of the dimer and trimer in the aqueous solution obtained by performing the ultrafiltration was 0.1% by mass or less based on the polymer QA.

Preparation Example 12

30 g of the monomer F represented by $CF_2=CFOCF_2CF(CF_3)OCF_2CF_2COOH$, 60 g of water, 0.5 eq of $NH_3$ (in an amount corresponding to 0.5 equivalents based on the monomer F), and 2 mol % of APS were added, and stirred at 52° C. for 72 hours under a nitrogen atmosphere to thereby obtain a polymer QB aqueous solution QB-1 containing the polymer QB, which is a homopolymer of $CF_2=CFOCF_2CF(CF_3)OCF_2CF_2COOH$. The oxygen concentration in the reactor fluctuated in the range of 20 ppm by volume to 50 ppm by volume.

Water and 0.4 eq of $NH_3$ (in an amount corresponding to 0.4 equivalents based on the monomer F used in the polymerization) were added to the obtained polymer QB aqueous solution QB-1 to adjust the concentration to 3.0% by mass, and then, while pouring water as appropriate, the ultrafiltration was performed using an ultrafiltration membrane (cut-off molecular weight of 6,000, made of polysulfone) at room temperature under a water pressure of 0.1 MPa until a filtrate of 4 times the volume of the aqueous solution before filtration was eluted. As a result of GPC analysis of the obtained polymer QB aqueous solution QB-2, the polymer QB had Mw of $1.4 \times 10^4$ and Mn of $0.9 \times 10^4$. The obtained polymer QB aqueous solution QB-2 had a concentration of 1.9% by mass. The content of the dimer and trimer in the aqueous solution obtained by performing the ultrafiltration was 0.1% by mass or less based on the polymer QB.

Example 11

To a polymerization tank made of SUS with an internal volume of 3 L, 1,466 g of deionized water and 34.09 g of the polymer QA aqueous solution QA-2 (2.2% by mass) were added. The polymerization tank was sealed and the system was purged with nitrogen to remove oxygen. The temperature of the polymerization tank was raised to 80° C., and while stirring, monomers (initial monomers) consisting of vinylidene fluoride (VDF)/tetrafluoroethylene (TFE)/hexafluoropropylene (HFP) (=19/11/70 mol %) were fed under pressure until the internal pressure of the polymerization tank reached 1.47 MPa·G.

Then, a polymerization initiator aqueous solution prepared by dissolving 0.026 g of ammonium persulfate (APS) in deionized water was fed under nitrogen gas pressure to initiate the polymerization. At the point when the internal pressure dropped to 1.45 MPa·G as the polymerization progressed, a mixed monomer consisting of VDF/TFE/HFP (=50/20/30 mol %) was charged until the internal pressure was kept constant at 1.47 MPa·G.

When 14 g of the mixed monomer was added, 2.19 g of a diiodine compound $I(CF_2)_4I$ was fed under nitrogen gas pressure.

After 3.0 hours, 6.0 hours, and 9.0 hours from the initiation of polymerization, respectively, a polymerization initiator aqueous solution containing 0.026 g of APS was fed under nitrogen gas pressure.

At the time when 477 g of the mixed monomer was added, the stirring was stopped and the pressure was released until the polymerization tank was adjusted to the atmospheric pressure. The polymerization tank was cooled to thereby obtain an aqueous dispersion. The results are shown in Table 6.

An aqueous aluminum sulfate solution was added to the aqueous dispersion to cause coagulation. The obtained coagulated product was washed with water and dried to obtain a partially fluorinated elastomer. The Mooney viscosity of the partially fluorinated elastomer was ML1+10 (100° C.)=54.9. The copolymer compositional features were determined by NMR analysis to be VDF/TFE/HFP=50/20/30 (mol %).

Example 12

The experiment was carried out under the same conditions as in Example 11 except that 34.09 g of the polymer QA aqueous solution QA-2 (2.2% by mass) was neutralized with aqueous ammonia to a pH of 5.6 before being added to the polymerization tank.

The polymerization tank was cooled to thereby obtain an aqueous dispersion. The results are shown in Table 6.

An aqueous aluminum sulfate solution was added to the aqueous dispersion to cause coagulation. The obtained coagulated product was washed with water and dried to obtain a partially fluorinated elastomer. The Mooney viscosity of the partially fluorinated elastomer was ML1+10 (100° C.)=54.7. The copolymer compositional features were determined by NMR analysis to be VDF/TFE/HFP=50/20/30 (mol %).

Example 13

The experiment was carried out under the same conditions as in Example 11 except that deionized water used was 1,460 g, that 40.32 g of the polymer QB aqueous solution QB-2 (1.9% by mass) was added to the polymerization tank instead of 34.09 g of the polymer QA aqueous solution QA-2 (2.2% by mass), and that, after 3.0 hours and 6.0 hours from the initiation of polymerization, respectively, a polymerization initiator aqueous solution containing 0.026 g of APS was fed under nitrogen gas pressure.

The polymerization tank was cooled to thereby obtain an aqueous dispersion. The results are shown in Table 6.

An aqueous aluminum sulfate solution was added to the aqueous dispersion to cause coagulation. The obtained coagulated product was washed with water and dried to obtain a partially fluorinated elastomer. The Mooney viscosity of the partially fluorinated elastomer was ML1+10 (100° C.)=63.9. The copolymer compositional features were determined by NMR analysis to be VDF/TFE/HFP=50/20/30 (mol %).

TABLE 6

|  |  | Example 11 | Example 12 | Example 13 |
|---|---|---|---|---|
| Reaction time | min. | 573 | 706 | 438 |
| Polymer adhesion rate | % by mass | 1.62 | 1.43 | 1.74 |
| Solid concentration | % by mass | 22.8 | 22.8 | 22.8 |
| Mass of aqueous dispersion | g | 1939 | 1930 | 1933 |
| Average particle size | nm | 197 | 232 | 150 |
| Number of particles | particles/cc | $4.08 \times 10^{13}$ | $2.48 \times 10^{13}$ | $9.28 \times 10^{13}$ |
| Polymerization rate | g/(hour × kg) | 30.9 | 24.9 | 40.2 |

<Crosslinking Characteristics>

The partially fluorinated elastomers obtained in Examples 11 to 13 were kneaded according to the formulations shown in Table 7 to obtain partially fluorinated elastomer compositions. For the obtained partially fluorinated elastomer compositions, a curemeter for rubber MDRH2030 (manufactured by M&K Co., Ltd.) was used at the time of press crosslinking to determine crosslinking curves, and the minimum viscosity (ML), the maximum torque level (MH), the induction time (T10), and the optimum crosslinking time (T90) were determined. Also, the partially fluorinated elastomer compositions were crosslinked by press crosslinking and oven crosslinking subsequent to press crosslinking to thereby obtain crosslinked molded article sheets.
  kneading method: roll kneading
  press crosslinking: 160° C. for 10 minutes
  oven crosslinking: 180° C. for 4 hours
The materials shown in Table 7 are as follows.
  MT carbon: Thermax N-990 manufactured by Cancarb Limited
  TRIC: triallyl isocyanurate, TRIC manufactured by Nippon Kasei Chemical Company Limited
  PERHEXA 25B: 2,5-dimethyl-2,5-di(t-butylperoxy)hexane, manufactured by NOF CORPORATION <Ordinary-State Properties>

Using the crosslinked molded article sheets, test pieces in the shape of No. 6 dumbbell were prepared according to JIS K 6251, and the 100% modulus (M100), tensile strength at break (TB), and elongation at break (EB) of the prepared test pieces in ordinary state were measured.

<Hardness>

Test pieces in the shape of No. 6 dumbbell were prepared in the same manner as described above, and the hardness (Shore A) of the prepared test pieces was measured according to JIS K 6253 (peak value, 1 sec, 3 sec).

<Compression Set>

Using the partially fluorinated elastomer compositions, O-rings (P24 size) were prepared by press crosslinking and oven crosslinking under the conditions described above, and the compression set of the prepared O-rings was measured under the conditions of 200° C., 72 hours, and a compressibility of 25%, according to JIS K 6262.

The results of the above are shown in Table 7.

TABLE 7

|  |  |  | Example 11 | Example 12 | Example 13 |
|---|---|---|---|---|---|
| Formulation | Fluorine-containing elastomer | phr | 100 | 100 | 100 |
|  | MT carbon | phr | 20 | 20 | 20 |
|  | TAIC | phr | 4 | 4 | 4 |
|  | PERHEXA 25B | phr | 1.5 | 1.5 | 1.5 |
| Crosslinking characteristics 160° C. | ML | dNm | 0.8 | 0.8 | 0.9 |
|  | MH | dNm | 25.9 | 25.7 | 25.8 |
|  | T10 | min | 1.2 | 1.2 | 1.2 |
|  | T90 | min | 3.7 | 3.5 | 3.4 |
| Crosslinking conditions | Press crosslinking |  | 160° C. × 10 min | 160° C. × 10 min | 160° C. × 10 min |
|  | Oven crosslinking |  | 180° C. × 4 h | 180° C. × 4 h | 180° C. × 4 h |
| Ordinary-state properties | M100 | MPa | 2.9 | 3.0 | 2.9 |
|  | TB | MPa | 22.4 | 23.6 | 20.4 |
|  | TB | % | 312 | 325 | 284 |
| Hardness | ShoreA peak | point | 69 | 69 | 68 |
|  | ShoreA 1 sec | point | 67 | 67 | 66 |
|  | ShoreA 3 sec | point | 65 | 66 | 65 |
| Compression set |  | % | 21 | 23 | 22 |

Next, the production method and composition of the perfluoroelastomer will be described with reference to Examples.

Each numerical value in these Examples was measured by the methods described above, unless otherwise noted. Values measured by methods other than those described above were measured by the following methods.

<Solid Concentration of Aqueous Dispersion Containing Perfluoroelastomer>

In an air dryer, 1 g of the aqueous dispersion containing the perfluoroelastomer was dried at a condition of 150° C. for 60 minutes, and the proportion of the mass of the non-volatile matter to the mass of the aqueous dispersion (1 g) was expressed by percentage and taken as the solid concentration thereof.

<Compositional Features of Perfluoroelastomer>

Measurement was performed by $^{19}$F-NMR (solid-state NMR) and a Fourier transform infrared spectrophotometer (FT-IR).

<Content of Iodine>

The content of iodine was measured by elemental analysis.

<Glass Transition Temperature of Perfluoroelastomer>

As for the glass transition temperature, by using a differential scanning calorimeter (manufactured by Mettler-Toledo, DSC822e) and increasing the temperature of 10 mg of the sample at 10° C./min, a DSC curve was obtained, and then the peak top temperature of the differential curve specified in JIS K 6240 was taken as the glass transition temperature.

<Mooney Viscosity of Perfluoroelastomer>

The Mooney viscosity was measured using a Mooney viscometer MV2000E manufactured by Alpha Technologies Inc. at 170° C. or 100° C. in conformity with JIS K 6300.

<Polymer Adhesion Rate>

The ratio of the mass of polymer adhered matter adhered to the polymerization tank after the completion of the polymerization to the total amount of polymer (perfluoroelastomer) after the completion of the polymerization (adhesion rate to the polymerization tank) was determined by the following equation:

polymer adhesion rate (% by mass)=mass of polymer adhered matter/mass of obtained polymer (including polymer adhered matter)×100 mass of obtained polymer=mass of aqueous dispersion×solid concentration of aqueous dispersion (% by mass)/100+mass of polymer adhered matter The polymer adhered matter includes the polymer adhered to the inner walls of the polymerization tank and the inside of the polymerization tank such as stirring blades after the aqueous dispersion is drawn out of the polymerization tank after the completion of the polymerization, and the polymer that has been released from the aqueous dispersion solution due to agglomeration and is suspended or precipitated without being dispersed in the aqueous dispersion. The mass of the polymer adhered matter is the mass after drying and removing the moisture contained in the polymer adhered matter at 120° C.

<Polymerization Rate>

The polymerization rate was calculated by the following equation:

polymerization rate={weight of aqueous dispersion× solid concentration/100}/{(amount of pure water used in polymerization+amount of water contained in aqueous solution of polymer (1) used in polymerization)×polymerization time}

The units for each amount in the equation are as follows.
weight of aqueous dispersion: g
solid concentration: % by mass
amount of pure water used in polymerization: kg
amount of water contained in aqueous solution of polymer (1) used in polymerization: kg
polymerization time: hour
polymerization rate: g/(hour×kg)

<Average Particle Size>

The average particle size of perfluoroelastomer particles in the aqueous dispersion (cumulant average size) was calculated by the cumulant method, using ELSZ-1000S (manufactured by Otsuka Electronics Co., Ltd.) and carrying out measurement by dynamic light scattering.

<Number of Perfluoroelastomer Particles in Aqueous Dispersion>

The number of perfluoroelastomer particles in the aqueous dispersion was calculated by the following equation:

Number of polymer particles =

$$\left\{ \frac{\text{Solid concentration of aqueous dispersion (mass \%)}}{100 - \text{Solid concentration of aqueous dispersion (mass \%)}} \right\} / \left\{ \frac{4}{3} \times 3.14 \times \left( \frac{\text{Average particle size (nm)}}{2} \times 10^{-9} \right)^3 \times \text{Specific gravity} \times 10^6 \right\}$$

In the equation, the average particle size is the cumulant average size calculated by the method described above, the number of polymer particles (number of perfluoroelastomer particles) is the number of particles per 1 cc of water, and the specific gravity used was the measured value of the specific gravity of the perfluoroelastomer.

Preparation Example 21

To 110 g of the monomer E represented by $CF_2$=$CFOCF_2CF_2COOH$ and 220 g of water, ammonium persulfate (APS) was added, and the mixture was stirred at 52° C. for 96 hours under a nitrogen atmosphere to thereby obtain a polymer XA aqueous solution XA-1 containing the polymer XA, which is a homopolymer of $CF_2$=$CFOCF_2CF_2COOH$. APS was additionally added as appropriate during the reaction, and a total of 5 mol % was used. The oxygen concentration in the reactor fluctuated in the range of 11 ppm by volume to 61 ppm by volume.

Water was added to the polymer XA aqueous solution XA-1 to adjust the concentration to 3.0% by mass, and then, while pouring water as appropriate, the ultrafiltration was performed using an ultrafiltration membrane (cut-off molecular weight of 6,000, made of polysulfone) at room temperature under a water pressure of 0.1 MPa until a filtrate of 4 times the volume of the aqueous solution before filtration was eluted. As a result of GPC analysis of the obtained polymer XA aqueous solution XA-2, the polymer XA had Mw of $1.5 \times 10^4$ and Mn of $1.0 \times 10^4$. The obtained polymer XA aqueous solution XA-2 had a concentration of 2.2% by mass. The content of the dimer and trimer in the aqueous solution obtained by performing the ultrafiltration was 0.1% by mass or less based on the polymer XA.

Preparation Example 22

To 150 g of the monomer E represented by $CF_2$=$CFOCF_2CF_2COOH$ and 300 g of water, APS was added, and the mixture was stirred at 52° C. for 96 hours under a nitrogen atmosphere to thereby obtain a polymer XB aqueous solution XB-1 containing the polymer XB, which is a homopolymer of $CF_2$=$CFOCF_2CF_2COOH$. APS was additionally added as appropriate during the reaction, and a total of 4 mol % was used. The oxygen concentration in the reactor fluctuated in the range of 30 ppm by volume to 65 ppm by volume.

Water was added to the obtained polymer XB aqueous solution XB-1 to adjust the concentration to 3.0% by mass, and then, while pouring water as appropriate, the ultrafiltration was performed using an ultrafiltration membrane (cut-off molecular weight of 6,000, made of polysulfone) at room temperature under a water pressure of 0.1 MPa until a filtrate of 4 times the volume of the aqueous solution before filtration was eluted. As a result of GPC analysis of the obtained polymer XB aqueous solution XB-2, the polymer XB had Mw of $1.7 \times 10^4$ and Mn of $1.1 \times 10^4$. The obtained polymer XB aqueous solution XB-2 had a concentration of 2.2% by mass. The content of the dimer and trimer in the aqueous solution obtained by performing the ultrafiltration was 0.1% by mass or less based on the polymer XB.

Preparation Example 23

30 g of the monomer F represented by $CF_2=CFOCF_2CF(CF_3)OCF_2CF_2COOH$, 60 g of water, 0.5 eq of $NH_3$ (in an amount corresponding to 0.5 equivalents based on the monomer F), and 2 mol % of APS were added, and stirred at 52° C. for 72 hours under a nitrogen atmosphere to thereby obtain a polymer XC aqueous solution XC-1 containing the polymer XC, which is a homopolymer of $CF_2=CFOCF_2CF(CF_3)OCF_2CF_2COOH$. The oxygen concentration in the reactor fluctuated in the range of 20 ppm by volume to 50 ppm by volume.

Water and 0.4 eq of $NH_3$ (in an amount corresponding to 0.4 equivalents based on the monomer F used in the polymerization) were added to the obtained polymer XC aqueous solution XC-1 to adjust the concentration to 3.0% by mass, and then, while pouring water as appropriate, the ultrafiltration was performed using an ultrafiltration membrane (cut-off molecular weight of 6,000, made of polysulfone) at room temperature under a water pressure of 0.1 MPa until a filtrate of 4 times the volume of the aqueous solution before filtration was eluted. As a result of GPC analysis of the obtained polymer XC aqueous solution XC-2, the polymer XC had Mw of $1.4×10^4$ and Mn of $0.9×10^4$. The obtained polymer XC aqueous solution XC-2 had a concentration of 2.8% by mass. The content of the dimer and trimer in the aqueous solution obtained by performing the ultrafiltration was 0.1% by mass or less based on the polymer XC.

Example 21

(Polymerization of CN Group-Containing Perfluoroelastomer)

In a stainless steel autoclave with an internal volume of 0.5 liters (made of SUS316, equipped with a FULLZONE type stirring blade and one baffle plate) without an ignition source, 108.2 g of deionized water and 88.6 g of the polymer XA aqueous solution XA-2 (solid concentration: 2.2% by mass) were placed, and the system was thoroughly purged with nitrogen gas, then degassed, and heated to 54° C. while stirring at 1,000 rpm. Then, a mixed gas of tetrafluoroethylene (TFE) and perfluoromethyl vinyl ether (PMVE) (TFE/PMVE=24/76 mol % ratio) was charged therein such that the internal pressure reached 0.83 MPa·G. Next, 0.259 g of $CF_2=CFOCF_2CF(CF_3)OCF_2CF_2CN$ (CNVE) was fed under nitrogen pressure along with 0.8 g of deionized water, and then 1.03 g of ammonium persulfate (APS) was dissolved in 2.5 g of deionized water and fed under nitrogen pressure to initiate the reaction.

As the polymerization progressed, the pressure in the tank was decreased, and therefore, when the pressure reached 0.735 MPa·G, 2 g of TFE and 2.2 g of PMVE were introduced into the autoclave to raise the pressure. Similarly, as the reaction progressed, TFE and PMVE were fed under pressure at a ratio of 60/40 mol %, and the pressure was repeatedly increased and decreased between 0.735 MPa·G and about 0.89 MPa·G, so that 28 g of TFE and 30.8 g of PMVE were fed under pressure by the completion of polymerization. During the polymerization, $CF_2=CFOCF_2CF(CF_3)OCF_2CF_2CN$, divided into 0.259 g each, was fed under nitrogen pressure five times along with 0.8 g of deionized water when the total amount of TFE charged reached 6 g, 10 g, 14 g, 18 g, and 24 g, respectively.

Thereafter, the autoclave was cooled and the unreacted monomer was released to obtain 248 g of an aqueous dispersion with a solid concentration of 19.7% by mass. The polymerization time was 7.3 hours. After the aqueous dispersion was taken out, the polymer adhered to the stirring blade of the autoclave, the inner wall of the tank, and the baffle plate was collected, heated to remove the moisture, and found to be 5.7 g. The adhesion rate was calculated by the equation described above and found to be 10.4% by mass.

(Post-Treatment of CN Group-Containing Perfluoroelastomer)

By adding 75 g of deionized water, 100 g of the obtained aqueous dispersion was mixed with and diluted with it. This mixed and diluted solution was added dropwise to 700 g of 10% aqueous hydrochloric acid solution. The dropping was carried out while stirring the aqueous hydrochloric acid solution.

The perfluoroelastomer was coagulated in the aqueous hydrochloric acid solution, and thus the coagulated perfluoroelastomer was filtered out, transferred to 100 g of deionized water, and washed with stirring for 5 minutes. After the 5 minutes, the perfluoroelastomer was again filtered out, transferred to 100 g of deionized water, and washed with stirring for 5 minutes. Thereafter, this washing operation with 100 g of deionized water was repeated, and the perfluoroelastomer was filtered out when the pH of the washing water after water washing reached 6 or more. The filtered-out perfluoroelastomer was vacuum dried at 70° C. for 48 hours. The obtained perfluoroelastomer was 19.3 g.

(Analysis of CN Group-Containing Perfluoroelastomer)

Analysis of the obtained perfluoroelastomer showed the following results.

compositional features of perfluoroelastomer: TFE/PMVE/CNVE=58.4/41.1/0.53 mol % glass transition temperature: −3.4° C.

The polymerization rate was calculated by the equation described above and found to be 34.2 g/(hour×kg).

The cumulant average size of perfluoroelastomer particles in the aqueous dispersion was 49.7 nm. The number of perfluoroelastomer particles in the aqueous dispersion was calculated by the equation described above and found to be $1.9×10^{15}$/cc.

Example 22

Polymerization was carried out in the same manner as in Example 21 except that the amount of deionized water initially charged was changed to 86.5 g and the amount of the polymer XA aqueous solution XA-2 (solid concentration: 2.2% by mass) was changed to 110.8 g, respectively, to thereby obtain 255 g of an aqueous dispersion having a solid concentration of 21.2% by mass.

The polymerization time was 6.8 hours. The polymer adhered inside the tank was collected, heated to remove the moisture, and found to be 2.8 g. The adhesion rate was 5.0% by mass.

For the obtained aqueous dispersion, the post-treatment was carried out in the same manner as in Example 21, thereby obtaining 19.6 g of a perfluoroelastomer.

Analysis of the obtained perfluoroelastomer showed the following results.

compositional features of perfluoroelastomer: TFE/PMVE/CNVE=57.7/41.7/0.58 mol % glass transition temperature: −3.4° C.

The polymerization rate was 40.7 g/(hour×kg), the cumulant average size of perfluoroelastomer particles in the aqueous dispersion was 45.4 nm, and the number of perfluoroelastomer particles in the aqueous dispersion was $2.7 \times 10^{15}$/cc.

Example 23

Polymerization was carried out in the same manner as in Example 21 except that the amount of deionized water initially charged was changed to 64.8 g and the amount of the polymer XA aqueous solution XA-2 (solid concentration: 2.2% by mass) was changed to 133.0 g, respectively, to thereby obtain 257 g of an aqueous dispersion having a solid concentration of 21.4% by mass.

The polymerization time was 6.9 hours. The polymer adhered inside the tank was collected, heated to remove the moisture, and found to be 0.7 g. The adhesion rate was 1.3% by mass.

For the obtained aqueous dispersion, the post-treatment was carried out in the same manner as in Example 21, thereby obtaining 19.6 g of a perfluoroelastomer.

Analysis of the obtained perfluoroelastomer showed the following results.
compositional features of perfluoroelastomer: TFE/PMVE/CNVE=57.3/42.1/0.64 mol % glass transition temperature: −3.3° C.

The polymerization rate was 41.2 g/(hour×kg), the cumulant average size of perfluoroelastomer particles in the aqueous dispersion was 44.3 nm, and the number of perfluoroelastomer particles in the aqueous dispersion was $3.0 \times 10^{15}$/cc.

Example 24

(Production of CN Group-Containing Perfluoroelastomer)

In a stainless steel autoclave with an internal volume of 6 liters (made of SUS316, equipped with a MAXBLEND type stirring blade and one baffle plate) without an ignition source, 1,255.3 g of deionized water and 1,083.3 g of the polymer XB aqueous solution XB-2 (solid concentration: 2.2% by mass) were placed, and the system was thoroughly purged with nitrogen gas, then degassed, and heated to 54.5° C. while stirring at 400 rpm. Then, a mixed gas of tetrafluoroethylene (TFE) and perfluoromethyl vinyl ether (PMVE) (TFE/PMVE=24/76 mol % ratio) was charged therein such that the internal pressure reached 0.83 MPa·G. Next, 1.21 g of $CF_2=CFOCF_2CF(CF_3)OCF_2CF_2CN$ (CNVE) was fed under nitrogen pressure along with 1.5 g of deionized water, and then 14.7 g of ammonium persulfate (APS) was dissolved in 30 g of deionized water and fed under nitrogen pressure to initiate the reaction.

As the polymerization progressed, when the pressure reached 0.735 MPa·G, 12 g of TFE and 13.3 g of PMVE were introduced into the autoclave to raise the pressure. Similarly, as the reaction progressed, TFE and PMVE were fed under pressure at a ratio of 60/40 mol %, and the pressure was repeatedly increased and decreased between 0.735 MPa·G and about 0.85 MPa·G. When 202.4 g of the mixed monomer was added, 16.44 g of 10% aqueous ammonia solution was fed under nitrogen pressure, and by the completion of polymerization, 328 g of TFE and 363.1 g of PMVE were fed under pressure, including 12 g of TFE and 13.3 g of PMVE described above. During the polymerization, CNVE, divided into 1.21 g each with midway addition, was fed under pressure into the polymerization tank 17 times, along with 1.5 g of deionized water. The xth (1≤x≤17) midway addition of CNVE was carried out when the amount of TFE charged exceeded {(328/18)×x} g.

Thereafter, the autoclave was cooled and the unreacted monomer was released to obtain 3,127 g of an aqueous dispersion with a solid concentration of 23.1% by mass. The polymerization time was 6.6 hours. After taking out the aqueous dispersion, the polymer adhered inside the tank was collected, heated to remove the moisture, and found to be 20.1 g. The adhesion rate was 2.7% by mass.

For 1,000 g of the obtained aqueous dispersion, the post-treatment was carried out in the same manner as in Example 21 except that the deionized water added was changed to 750 g, that the 10% aqueous hydrochloric acid solution to which the diluted solution was added dropwise was changed to 7,000 g, and that the deionized water for washing was changed to 1,000 g, respectively, thereby obtaining 221.3 g of a perfluoroelastomer.

Analysis of the obtained perfluoroelastomer showed the following results.
compositional features of perfluoroelastomer: TFE/PMVE/CNVE=58.1/41.3/0.53 mol % Mooney viscosity: (ML1+20 (170° C.))=71 glass transition temperature: −3.4° C.

The polymerization rate was 46.6 g/(hour×kg), the cumulant average size of perfluoroelastomer particles in the aqueous dispersion was 54.6 nm, and the number of perfluoroelastomer particles in the aqueous dispersion was $1.8 \times 10^{15}$/cc.

To 100 parts by mass of the perfluoroelastomer obtained by carrying out the post-treatment, 2.0 parts by mass of 2,2-bis[3-amino-4-(N-phenylamino)phenyl]hexafluoropropane (AFTA-Ph) as the cross-linking agent and 5 parts by mass of calcium oxide (CML #35, manufactured by Ohmi Chemical Industry Co., Ltd.) as the filler were compounded, and the mixture was kneaded in an open roll to prepare a crosslinkable perfluoroelastomer composition.

The obtained perfluoroelastomer composition was crosslinked by pressing at 200° C. for 40 minutes, and further subjected to oven crosslinking at 290° C. for 24 hours to prepare a crosslinked product with a thickness of 2 mm and an O-ring (P-24). By the following methods, various physical properties of the perfluoroelastomer composition and the crosslinked product were measured. The results are shown in Table 8.

<Crosslinkability>

For the perfluoroelastomer composition, RPA2000 manufactured by Alpha Technologies Inc. was used to determine a crosslinking curve at 200° C., and the minimum torque (ML), the maximum torque (MH), the induction time (T10), and the optimum crosslinking time (T90) were determined.

<Ordinary-State Properties>

Using the crosslinked product with a thickness of 2 mm, the 100% modulus (MPa), the tensile strength at break (MPa), and the elongation at break (%) were measured according to JIS K 6251.

<Hardness>

Using the crosslinked product with a thickness of 2 mm, the hardness (Shore A) was measured according to JIS K 6253 (peak value).

<Specific Gravity of Crosslinked Product>

Using the crosslinked product with a thickness of 2 mm, the specific gravity of the crosslinked product was measured using an automatic specific gravity meter DMA-220H (manufactured by Shinko Denshi Co., Ltd.).

Furthermore, by the following method, the compression set of the O-ring (P-24) was measured. The compression set of the O-ring was 24.4%.

<Compression Set>

The compression set was measured according to the method described in ASTM D395 or JIS K 6262. The O-ring was compressed by a compressibility of 25% at normal temperature, using a compression device (the O-ring with a thickness (cross-sectional diameter) of 3.5 mm was compressed to a thickness of 2.625 mm).

Next, the compression device to which the compressed O-ring was fixed was placed statically in an electric furnace and left at 300° C. for 70 hours, after which the compression device was taken out of the electric furnace. Thereafter, the compression device to which the compressed O-ring was fixed was placed statically in another electric furnace and left at 70° C. for 24 hours. The O-ring was removed from the compression device, the removed O-ring was placed statically in a thermostatic chamber and left at 23° C. for 30 minutes, and the thickness of the O-ring (t2) was measured. The compression set was determined by the equation below. A small compression set means that the compression set is small even after the crosslinked product has been used under severe conditions and that it has excellent compression set characteristics.

compression set(%)=$(t_0-t_2)/(t_0-t_1) \times 100$ $t_0$: original thickness of O-ring (mm)
$t_1$: thickness of spacer (mm)
$t_2$: thickness of O-ring after compression test (mm)
In the above test, $t_0$ was 3.5 mm and $t_1$ was 2.625 mm.

Example 25

Polymerization was carried out in the same manner as in Example 21 except that the amount of deionized water initially charged was changed to 84.9 g and the amount of the polymer XA aqueous solution XA-2 (solid concentration: 2.2% by mass) was changed to 110.8 g, respectively, and that the pH was adjusted to 7.1 by adding aqueous ammonia, to thereby obtain 256 g of an aqueous dispersion having a solid concentration of 21.1% by mass.

The polymerization time was 11.5 hours. The polymer adhered inside the tank was collected, heated to remove the moisture, and found to be 0.5 g. The adhesion rate was 0.8% by mass.

For the obtained aqueous dispersion, the post-treatment was carried out in the same manner as in Example 21, thereby obtaining 20.0 g of a perfluoroelastomer.

Analysis of the obtained perfluoroelastomer showed the following results.
compositional features of perfluoroelastomer: TFE/PMVE/CNVE=57.6/41.8/0.60 mol % glass transition temperature: −3.1° C.

The polymerization rate was 24.2 g/(hour×kg), the cumulant average size of perfluoroelastomer particles in the aqueous dispersion was 82.3 nm, and the number of perfluoroelastomer particles in the aqueous dispersion was $4.5 \times 10^{14}$/cc.

Example 26

Polymerization was carried out in the same manner as in Example 21 except that the amount of deionized water initially charged was changed to 128.1 g and the amount of the polymer XA aqueous solution XA-2 (solid concentration: 2.2% by mass) was changed to 66.5 g, respectively, and that, after the initiation of polymerization, when 16.8 g of the mixed monomer was added, 1.03 g of 10% aqueous ammonia solution was fed under nitrogen pressure, to thereby obtain 248 g of an aqueous dispersion having a solid concentration of 19.6% by mass.

The polymerization time was 7.5 hours. The polymer adhered inside the tank was collected, heated to remove the moisture, and found to be 6.3 g. The adhesion rate was 11.5% by mass.

For 100 g of the obtained aqueous dispersion, the post-treatment was carried out in the same manner as in Example 21 except that the deionized water added was changed to 75 g, that the 10% aqueous hydrochloric acid solution to which the diluted solution was added dropwise was changed to 500 g, and that the deionized water for washing was changed to 100 g, respectively, thereby obtaining 19.0 g of a perfluoroelastomer.

Analysis of the obtained perfluoroelastomer showed the following results.
compositional features of perfluoroelastomer: TFE/PMVE/CNVE=57.7/41.9/0.48 mol % glass transition temperature: −3.2° C.

The polymerization rate was 33.4 g/(hour x kg), the cumulant average size of perfluoroelastomer particles in the aqueous dispersion was 54.8 nm, and the number of perfluoroelastomer particles in the aqueous dispersion was $1.4 \times 10^{15}$/cc.

Example 27

(Polymerization of Iodine-Containing Perfluoroelastomer)

In a stainless steel autoclave with an internal volume of 0.5 liters (made of SUS316, equipped with a FULLZONE type stirring blade and one baffle plate) without an ignition source, 113.2 g of deionized water and 101.6 g of the polymer XB aqueous solution XB-2 (solid concentration: 2.2% by mass) were placed, and the system was thoroughly purged with nitrogen gas, then degassed, and heated to 50° C. while stirring at 1,000 rpm. Then, a mixed gas of tetrafluoroethylene (TFE) and perfluoromethyl vinyl ether (PMVE) (TFE/PMVE=25.6/74.4 mol % ratio) was charged therein such that the internal pressure reached 0.83 MPa·G, and then 0.0424 g of ammonium persulfate (APS) was dissolved in 1.5 g of deionized water and fed under nitrogen pressure to initiate the reaction.

At the point when the pressure dropped to 0.783 MPa·G as the polymerization progressed, 0.416 g of a diiodine compound I(CF$_2$)$_4$I was fed under pressure as the chain transfer agent, along with 1.5 g of deionized water. Then, when the pressure reached 0.735 MPa·G, 2 g of TFE and 1.8 g of PMVE were introduced into the autoclave to raise the pressure. Similarly, as the reaction progressed, TFE and PMVE were fed under pressure at a ratio of 64.8/35.2 mol %, and the pressure was repeatedly increased and decreased between 0.735 MPa·G and about 0.89 MPa·G. After the initiation of the reaction, 0.00294 g of APS was fed under nitrogen pressure along with 1.5 g of deionized water every 12 hours to continue the reaction. When 26.6 g of the mixed monomer was added, 1.54 g of 10% aqueous ammonia solution was fed under nitrogen pressure, and by the completion of polymerization, 44 g of TFE and 39.6 g of PMVE were fed under pressure.

Thereafter, the autoclave was cooled and the unreacted monomer was released to obtain 298 g of an aqueous dispersion with a solid concentration of 23.8% by mass. The polymerization time was 34.2 hours. After taking out the aqueous dispersion, the polymer adhered inside the tank was collected, heated to remove the moisture, and found to be 0.5 g. The adhesion rate was 0.7% by mass.

(Post-Treatment of Iodine-Containing Perfluoroelastomer)

For 200 g of the obtained aqueous dispersion, the post-treatment was carried out in the same manner as in Example 21 except that the deionized water added was changed to 150 g, that the 10% aqueous hydrochloric acid solution to which the diluted solution was added dropwise was changed to 1,300 g, and that the deionized water for washing was changed to 200 g, respectively, thereby obtaining 46.6 g of a perfluoroelastomer.

Analysis of the obtained perfluoroelastomer showed the following results.
compositional features of perfluoroelastomer: TFE/PMVE=61.1/38.9 mol %
content of iodine: 0.19% by mass
Mooney viscosity: (ML1+10 (100° C.))=69
glass transition temperature: −3.8° C.

The polymerization rate was 9.1 g/(hour×kg), the cumulant average size of perfluoroelastomer particles in the aqueous dispersion was 119.9 nm, and the number of perfluoroelastomer particles in the aqueous dispersion was $1.7 \times 10^{14}$/cc.

To 100 parts by mass of the perfluoroelastomer obtained by carrying out the post-treatment, 2.0 parts by mass of triallyl isocyanurate (TRIC, manufactured by Nippon Kasei Chemical Company Limited) and 1.0 parts by mass of 2,5-dimethyl-2,5-bis(t-butylperoxy)hexane (PERHEXA 25B, manufactured by NOF CORPORATION) as the crosslinking agents, and 15 parts by mass of carbon black (Thermax N-990, manufactured by Cancarb Limited) as the filler were compounded, and the mixture was kneaded in an open roll to prepare a crosslinkable perfluoroelastomer composition.

The obtained perfluoroelastomer composition was crosslinked by pressing at 160° C. for 10 minutes, and further subjected to oven crosslinking at 180° C. for 4 hours to prepare a crosslinked product with a thickness of 2 mm and an O-ring (P-24). In the same manner as in Example 24, various physical properties of the perfluoroelastomer composition and the crosslinked product were measured. The results are shown in Table 8.

Example 28

Polymerization was carried out in the same manner as in Example 21 except that the amount of deionized water initially charged was changed to 46.9 g and the polymer XA aqueous solution XA-2 was changed to 152.2 g of the polymer XC aqueous solution XC-2 (solid concentration: 2.8% by mass), to thereby obtain 253 g of an aqueous dispersion having a solid concentration of 21.8% by mass.

The polymerization time was 9.2 hours. The polymer adhered inside the tank was collected, heated to remove the moisture, and found to be 4.3 g. The adhesion rate was 7.2% by mass.

For 100 g of the obtained aqueous dispersion, the post-treatment was carried out in the same manner as in Example 21 except that the deionized water added was changed to 75 g, that the 10% aqueous hydrochloric acid solution to which the diluted solution was added dropwise was changed to 800 g, and that the deionized water for washing was changed to 100 g, respectively, thereby obtaining 16.6 g of a perfluoroelastomer.

Analysis of the obtained perfluoroelastomer showed the following results.
compositional features of perfluoroelastomer: TFE/PMVE/CNVE=58.3/41.2/0.51 mol % glass transition temperature: −3.0° C.

The polymerization rate was 30.9 g/(hour×kg), the cumulant average size of perfluoroelastomer particles in the aqueous dispersion was 105.2 nm, and the number of perfluoroelastomer particles in the aqueous dispersion was $2.3 \times 10^{14}$/cc.

TABLE 8

|  | Example 24 | Example 27 |
|---|---|---|
| Formulation (parts by mass) | | |
| CN Group-containing perfluoroelastomer | 100 | |
| Iodine-containing perfluoroelastomer | | 100 |
| AFTA-Ph | 2 | |
| PERHEXA 25B | | 1 |
| TAIC | | 2 |
| Calcium oxide | 5 | |
| MT carbon | | 15 |
| Crosslinkability | | |
| Crosslinking temperature (° C.) | 200 | 160 |
| ML (dNm) | 2.4 | 9.2 |
| MH (dNm) | 13.0 | 12.1 |
| T10 (min) | 6.1 | 1.6 |
| T90 (min) | 24.4 | 4.9 |
| Crosslinking conditions | | |
| Press crosslinking | 200° C. for 40 minutes | 160° C. for 30 minutes |
| Oven crosslinking | 290° C. for 24 hours | 180° C. for 4 hours |
| Ordinary-state properties | | |
| 100% modulus (MPa) | 2.0 | 5.7 |
| Tensile strength at break (MPa) | 14.4 | 14.9 |
| Elongation at break (%) | 244 | 199 |
| Crosslinked product | | |
| Hardness (peak value) | 60.5 | 74.4 |
| Specific gravity | 2.05 | 2.00 |

What is claimed is:

1. A method for producing a fluoropolymer, the method comprising polymerizing a fluoromonomer in an aqueous medium in the presence of a polymer (1) to obtain a fluoropolymer, wherein
the polymer (1) is a polymer of a monomer (1) represented by the general formula (1) below and has a number average molecular weight of $0.3 \times 10^4$ or more, in which a content of a dimer and a trimer of the monomer (1) is 1.0% by mass or less based on the polymer (1):

$$CF_2=CF-R-CZ^1Z^2-A^0 \tag{1}$$

wherein R is a linking group; $Z^1$ and $Z^2$ are each independently F or $CF_3$; and $A^0$ is an anionic group,
polymerizing the monomer (1) represented by the general formula (1) to obtain a crude composition containing the polymer of the monomer (1); and
removing the dimer and trimer of the monomer (1) contained in the crude composition from the crude composition to obtain the polymer (1) in which the content of the dimer and trimer of the monomer (1) is 1.0% by mass or less based on the polymer (1).

2. The method for production according to claim 1, wherein the monomer (1) is a monomer (2) represented by the following general formula (2):

$$CF_2=CF-R-CZ^1Z^2-COOM \tag{2}$$

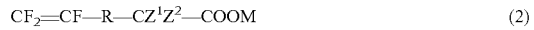

wherein R is a linking group; $Z^1$ and $Z^2$ are each independently F or $CF_3$; M is H, a metal atom, $NR^7_4$, imidazolium optionally having a substituent, pyridinium optionally having a substituent, or phosphonium optionally having a substituent; and $R^7$ is H or an organic group.

3. The method for production according to claim 1, wherein the monomer (1) is a monomer (4) represented by the following general formula (4):

$$CF_2=CF(-O-Rf-A) \qquad (4)$$

wherein Rf is a fluorine-containing alkylene group having 1 to 40 carbon atoms or a fluorine-containing alkylene group having 2 to 100 carbon atoms and having an ether bond or a keto group; and A is —COOM, —SO$_3$M, —OSO$_3$M, or —C(CF$_3$)$_2$OM, where M is H, a metal atom, NR$^7_4$, imidazolium optionally having a substituent, pyridinium optionally having a substituent, or phosphonium optionally having a substituent, and R$^7$ is H or an organic group.

4. The method for production according to claim 3, wherein A is —COOM, where M is H, a metal atom, NR$^7_4$, imidazolium optionally having a substituent, pyridinium optionally having a substituent, or phosphonium optionally having a substituent, and R$^7$ is H or an organic group.

* * * * *